(12) United States Patent
Nickolov et al.

(10) Patent No.: US 10,608,911 B2
(45) Date of Patent: **\*Mar. 31, 2020**

(54) TECHNIQUES FOR EVALUATING SERVER SYSTEM RELIABILITY, VULNERABILITY AND COMPONENT COMPATIBILITY USING CROWDSOURCED SERVER AND VULNERABILITY DATA

(71) Applicant: Datagrid Systems, Inc., Los Altos Hills, CA (US)

(72) Inventors: Peter Nickolov, San Clemente, CA (US); Ross Schibler, Los Altos Hills, CA (US); Bert Armijo, Mission Viejo, CA (US)

(73) Assignee: Datagrid Systems, Inc., Los Altos Hills, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 16/197,273

(22) Filed: Nov. 20, 2018

(65) Prior Publication Data

US 2019/0097907 A1    Mar. 28, 2019

Related U.S. Application Data

(63) Continuation of application No. 15/219,789, filed on Jul. 26, 2016, now Pat. No. 10,142,204.

(60) Provisional application No. 62/197,141, filed on Jul. 27, 2015.

(51) Int. Cl.
*H04L 29/06* (2006.01)
*H04L 12/26* (2006.01)
*G06F 8/65* (2018.01)
*H04L 12/24* (2006.01)
*G06F 8/658* (2018.01)

(52) U.S. Cl.
CPC ........... *H04L 43/0817* (2013.01); *G06F 8/65* (2013.01); *H04L 41/0869* (2013.01); *H04L 63/1433* (2013.01); *G06F 8/658* (2018.02)

(58) Field of Classification Search
CPC .................................................. H04L 43/0817
See application file for complete search history.

(56) References Cited

U.S. PATENT DOCUMENTS

| | | |
|---|---|---|
| 10,142,204 B2 | 11/2018 | Nickolov et al. |
| 2011/0289517 A1 | 11/2011 | Sather et al. |
| 2012/0117203 A1 | 5/2012 | Taylor et al. |
| 2014/0012945 A1 | 1/2014 | Barnhill, Jr. et al. |
| 2015/0088772 A1 | 3/2015 | Shwartz et al. |

FOREIGN PATENT DOCUMENTS

WO    2017019684 A1    2/2017

OTHER PUBLICATIONS

PCT International Search Report, PCT Application No. PCT/US2016/044040 based on U.S. Appl. No. 15/219,789, International Filing Date Jul. 26, 2016, Search report dated Oct. 5, 2016.

*Primary Examiner* — Adnan M Mirza
(74) *Attorney, Agent, or Firm* — Wolf IP Law PLCC; Dean E. Wolf, Esq.

(57) ABSTRACT

Various aspects described herein are directed to different techniques for: evaluating server system reliability, vulnerability and component compatibility using crowdsourced server and vulnerability data; generating automated recommendations for improving server system metrics; and automatically and conditionally updating or upgrading system packages/components.

16 Claims, 83 Drawing Sheets

C. Recommended Upgrades

Your System — 2110

Red Hat Enterprise Linux Server 7.0 (Maipo)
Current system DGRI - 85%

Recommended Upgrades — 2120

| package | version | release | arch | target version | upgrade reliability | data points |
|---|---|---|---|---|---|---|
| python | 2.7.5 | 16.el7 | x86_64 | 2.9.9 (best) | 93% | 3,040 |
| tar | 1.26 | 29.el7 | x86_64 | 1.31 (best) | 99% | 13,115 |
| less | 458 | 8.el7 | x86_64 | 461 (best) | 97% | 2,997 |

Aggregate upgrade reliability - 91%
Estimated system DGRI after upgrades - 93%

FIG. 21 datagrid

Hello, John! Account Library & Snapshots

Scope > Florida, Ireland (95) > App Servers (19) ← 3113

Recommended Changes

[ add another package 🔍 ]

Show: All Recommendations ▼ Sort by: Best Improvement ▼

| From: ★★★☆☆ 650 | | To: ★★★★★ 967 | Success Chance: |
|---|---|---|---|
| ☑ openssl 1.0.2-1.el7<br>★★★★☆ 319 • 23,385 data points • 💬1 | ↑ | openssl 1.0.2a-1.el7<br>★★★★★ 942 • 18,215 data points | 95%<br>8,385 data points |
| ☑ python 2.6.5-12.el7<br>★★★★☆ 718 • 23,385 data points | ↑ | python 2.7.5-16.el7 MODIFIED<br>★★★★★ 981 • 18,215 data points | 97%<br>177 data points |
| ☑ less 458-8.el7<br>★★★★☆ 751 • 1,385 data points | ↑ | less 461-9.el7<br>★★★★★ 887 • 8,385 data points | 99%<br>3,321 data points |
| ☑ oracleasmlib 1.4.5-1.el4<br>★★★★★ 809 • 4,425 data points | ↑ | oracleasmlib 2.0.4-1.el6 👎 🔍<br>★★★★★ 893 • 3,125 data points | 91%<br>1,354 data points |
| ☐ jdk 8u25-linux<br>★★★★★ 379 • 9,358 data points | ↑ | jdk 9u27-linux ✏️<br>★★★★★ 384 • 13,305 data points | 96%<br>351 data points |

3112 ↗

⎧ 3110

[ Discard ]  [ ✓ Save ]

3101 ⎯

FIG. 31 datagrid           Hello, John!   Account   Library & Snapshots

Scope > Florida, Ireland (95) > App Servers (19)

Recommended Changes        Show: All Recommendations ▼   Sort by: Best Improvement ▼

| | From: ★★★☆☆ 650    add another package 🔍 | | To: ★★★★★ 967 | Success Chance: |
|---|---|---|---|---|
| ☑ | openssl 1.0.2-1.el7<br>★★★☆☆ 319 • 23,385 data points • ♥1 | ↑ | openssl 1.0.2a-1.el7<br>★★★★★ 942 • 18,215 data points | 95%<br>8,385 data points |
| ☑ | python 2.6.5-12.el7<br>★★★★☆ 718 • 23,385 data points | ↑ | python 2.7.5-16.el7   MODIFIED<br>★★★★★ 981 • 18,215 data points | 97%<br>177 data points |
| ☑ | less 458-8.el7<br>★★★★☆ 751 • 1,385 data points | ↑ | less 461-9.el7<br>★★★★★ 887 • 8,385 data points | 99%<br>3,321 data points |
| ☑ | oracleasmlib 1.4.5-1.el4<br>★★★★☆ 809 • 4,425 data points | ↑ | 👎 oracleasmlib 2.0.4-1.el6<br>★★★★☆ 893 • 3,125 data points | 91%<br>1,354 data points |
| ☐ | jdk 8u25-linux<br>★★★☆☆ 379 • 9,358 data points | ↑ | 🔍👍 | 96%<br>351 data points |

DGRI: 849    Data Points:
Systems: 8,385
Score Details:    Signals: 233,110
Security: 911
Performance: 844
Reliability: 794
Vulnerabilities: ♥3
[ Click for Details ] ← 3311

← 3310

Discard    ✓ Save

FIG. 36 datagrid

Scope ⟩ Florida, Ireland (95) ⟩ App Servers (19)

Hello, John! Account Library & Snapshots

Recommended Changes | add another package | 🔍

Show: All Recommendations ▾ Sort by: Best Improvement ▾

| | From: ★★★☆☆ 650 | | To: ★★★★★ 967 | Success Chance: |
|---|---|---|---|---|
| ☑ | openssl 1.0.2-1.el7<br>★★★★☆ 319·23,385 data points 💬1 | ↑ | openssl 1.0.2a-1.el7<br>★★★★★ 942·18,215 data points | 95%<br>8,385 data points |
| ☑ | python 2.6.5-12.el7<br>★★★★☆ 718·23,385 data points | ↑ | python 2.7.5-16.el7<br>★★★★★ 981·18,215 data points<br>MODIFIED | 97%<br>177 data points |
| ☑ | less 458-8.el7<br>★★★★★ 751·1,385 data points | ↑ | less 461-9.el7<br>★★★★★ 887·8,385 data points | 99%<br>3,321 data points |
| ☑ | oracleasmlib 1.4.5-1.el4<br>★★★★★ 809·4,425 data points | ↑ | 👎 oracleasmlib 2.0.4-1.el6<br>★★★★★ 893·3,125 data points 🔍 —3619 | 91%<br>1,354 data points |
| ☐ | jdk 8u25-linux<br>★★★★★ 379·9,358 data points | ↑ | 3611— 3613 3615—3617<br>Recommended \| Search \| History \| Uninstall<br>Recommended versions:<br>oracle 2.0.7-1.el6  935 DGRI  18,317 data points ←3612<br>oracle 2.0.9-1.el6  941 DGRI  12,466 data points ←3614<br>[ More Options ]  —3616 | 96%<br>351 data points |

—3610

—3601

Discard ✓ Save

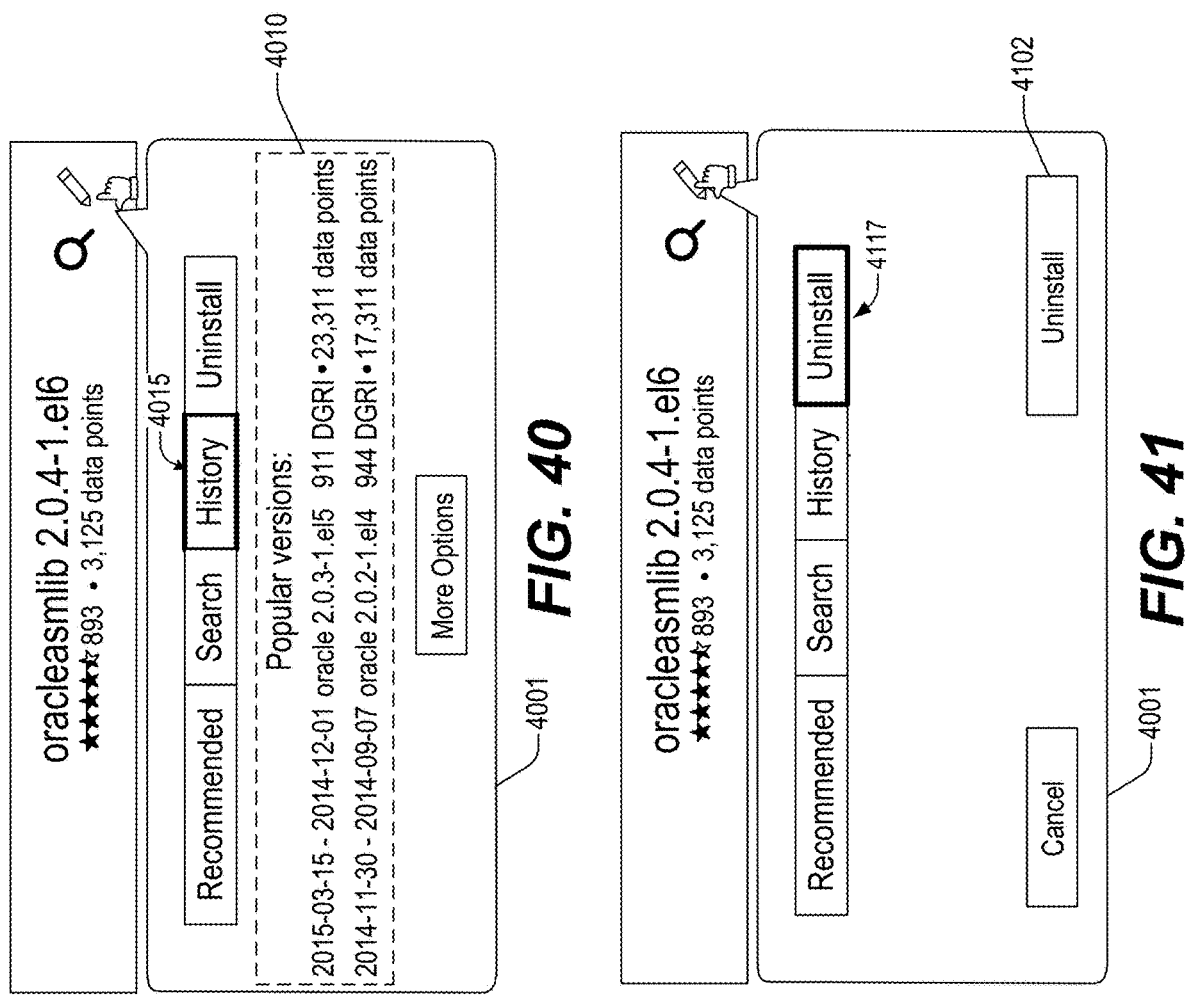

Search Systems:

[Enter Hostname ID or IP Address..... ] ← 4302

| HOSTNAME | SYSTEM ID | IP ADDRESS |
|---|---|---|
| Mercury | 4747393 | 172.17.0.1 |
| Venus | 4389495 | 172.17.0.2 |
| Earth | 8984843 | 172.17.0.3 |
| Mars | 4372938 | 172.17.0.4 |
| Jupiter | 3598573 | 172.17.0.5 |
| Saturn | 4389095 | 172.17.0.8 |
| Uranus | 3238784 | 172.17.0.9 |
| Neptune | 3822945 | 172.17.0.10 |
| Pluto | 4809523 | 172.17.0.11 |

*FIG. 43*

| ← BACK TO ALL SYSTEMS | | | | | | |
|---|---|---|---|---|---|---|
| Hostname Mercury | 4747393 | | IP Address 172.17.0.13 | | | |
| Configuration ConfigID centos-7-13b6 Created 2015-12-14 07:15:52 Last Signal 2015-12-14 07:17:39 (4 signals total) First Reported 2015-12-14 07:16:58 | | | OS Name CentOS Linux 7 (Core) Architecture x86_64 Type linux Distro & Version centos 7 | | | |

▸ Packages

▾ Vulnerabilities 
Evaluated 2016-02-04 02:01:07 | Number of Vulnerabilities 80 | Max Severity 10.0 | Max Severity After Fixes 10.0

| CVE ID | Severity | Confidence | Description | Vector | Fix | Packages |
|---|---|---|---|---|---|---|
| Enter ID... | > 7.5 | = 9.5 | Search descriptions... | Network | Any | Search packages... |
| CVE-2000-0803 | 10.0 | 9.5 | GNU Groff uses the current working directory to find a device description file, which allows a local user to gain... | Network | No | groff-base-1.22.2-8.el7 |
| CVE-2015-2806 | 10.0 | 9.5 | Stack-based buffer overflow in asn1_der_decoding in libtasn1 before 4.4 allows remote attackers to have... | Network | No | libtasn1-3.8-2.el7 |
| CVE-2015-5600 | 8.5 | 9.0 | The kbdint_next_device function in auth2-chall.c in sshd in OpenSSH through 6.9 does not properly restrict the processing of keyboard-interactive devices within a single connection... | Network | Yes | openssh-subscriber-6.6.1p1-12.el7_1, openssh-6.61p1-12.el7_1 |
| CVE-1999-0428 | 7.5 | 9.5 | OpenSSL and SSLeay allow remote attackers to reuse SSL sessions and bypass access controls | Network | No | 1:openssl-libs-1.0.1e-42.el7.9 |
| CVE-1999-1090 | 7.5 | 9.5 | The default configuration of NCSA Telnet package for Macintosh and PC enables FTP, even though it does... | Network | No | 1:telnet-0.17-59.el7 |
| CVE-2005-0469 | 7.5 | 9.5 | Buffer overflow in the slc_add_reply function in various BSD-based Telnet subscribers, when handling LINEMODE... | Network | No | 1:telnet-0.17-59.el7 |
| CVE-2014-3512 | 7.5 | 9.5 | Multiple buffer overflows in crypto/srp_lib.c in the SRP implementation in OpenSSL 1.0.1 before 1.0.1i allow... | Network | No | 1:openssl-libs-1.0.1e-42.el7.9 |

▸ History

▸ Repositories

*FIG. 44*

FIG. 45 plesk web admin edition

Logged in as Administrator ▼ ⓘ Help ▼
Webspace ip-172-31-26-79.ec2.internal ▼
Settings Search...
- ⓠ Websites & Domains
- ✉ Mail
- ⓐ Applications
- ▢ Files
- ⓓ Databases
- ⓢ File Sharing
- ⓘ Statistics
- ⚙ Tools & Settings
- ⓔ Extensions
- ⓤ Users
- ⓜ My Profile Extensions Management
DataGrid Reliability and Vulnerability Evaluation datagrid SYSTEMS

Evaluation Results — 4520
- OS/Version: centos 7
- Collected Date: 2016-05-04 15:14:30 UTC
- Evaluation Date: 2016-05-12 15:08:41 UTC

4510

🖨 PRINT

| Number of Packages | Number of Vulnerabilities | Max Severity | Max Severity After Fixes |
|---|---|---|---|
| 628 | 108 | 10.0 | 00.0 |

4530

VULNERABILITIES | PACKAGES — 4540

4543

| ↑NAME — 4541 | VERSION | ARCH |
|---|---|---|
| acl | 2.2.51-12.el7 | x86_64 |
| apr | 1.4.8-3.el7 | x86_64 |
| apr-util | 1.5.2-6.3.el7 | x86_64 |
| aspell | 12:0.60.6.1-9.el7 | x86_64 |
| audit | 2.4.1-5.el7 | x86_64 |
| audit-libs | 2.4.1-5.el7 | x86_64 |
| audit-libs-python | 2.4.1-5.el7 | x86_64 |

```
# dgri-report --help
usage: dgri-report <action> [<param>==<value> ...]
<actions>:
    collect [on_unchanged_config=nop ping]
    signal [<signalname>]
```

```
prompt@test: ansible-playbook /usr/share/dgri/ansible-playbooks/dgri.yml -v

PLAY [test] **********************************************************

GATHERING FACTS ******************************************************
ok: [54.86.68.166]
ok: [54.173.136.9]

TASK: [DataGrid module] **********************************************
changed: [54.86.68.166] => {"changed": true, "output": "", "srv_code": "ok"}
changed: [54.173.136.9] => {"changed": true, "output": "", "srv_code": "ok"}

PLAY RECAP ***********************************************************
54.173.136.9    : ok=2    changed=1    unreachable=0    failed=0
54.86.68.166    : ok=2    changed=1    unreachable=0    failed=0
```

```
prompt@test: ansible-playbook /usr/share/dgri/ansible-playbooks/dgri.yml -v -e "action=score"

PLAY [test] ******************************************************************

GATHERING FACTS **************************************************************
ok: [54.86.68.166]
ok: [54.173.136.9]

TASK: [DataGrid module] ******************************************************
changed: [54.86.68.166] => {"changed": false, "dgri_score": 775, "output": "", "system_id": "i-ac252453"}
changed: [54.173.136.9] => {"changed": false, "dgri_score": 775, "output": "", "system_id": "i-ad252452"}

PLAY RECAP *******************************************************************
54.173.136.9      : ok=2    changed=1    unreachable=0    failed=0
54.86.68.166      : ok=2    changed=1    unreachable=0    failed=0
```

```
prompt@test: dgri-query --help usage: dgri-query [-h] [-p] [--dev] [--advoptions ADVOPTIONS] query DataGrid Systems Query Tool
Copyright (c) 2015, DataGrid Systems, Inc. All rights reserved.

positional arguments:
  query                 DataGrid database query optional arguments:
  -h, --help            show this help message and exit
  -p, --pretty          Display any output pretty-printed
  --dev                 use ./api-dev.conf instead of /etc/dgri.conf
  --advoptions ADVOPTIONS
                        List of advanced options, comma-separated The following queries are supported:
  health                   - check if DataGrid API is available and working
  systems                  - list of all systems in the account
  systems/<sid>            - info on specified system ID (_ or from system list)
  systems/<sid>/score      - DGRI score and metrics on a system's current config
  systems/<sid>/config     - Config info for a system
  configs/<cid>            - info on a specified configuration
  configs/<cid>/score      - DGRI score and metrics on specified configuration
  vulnerabilities/<vid>    - info on a specified vulnerability
  vulnerable               - list of all vulnerable systems in the account As <sid>, use just _ for current system or value from systems list
As <cid>, use the config_id (current or previous) from any system
As <vid>, use the vulnerability ID (CVE-yyyy-nnnn, where yyyy is the year and
          nnnn is the serial number); as found in config's vulnerability list API invocation parameters are specified in /etc/dgri.conf.
```

*FIG. 50A*

```
prompt@test: dgri-query –p systems

{
  "status": "0",
  "type": "None.response",
  "status_msg": "ok",
  "ctx": null,
  "query": null,
  "data": [
    {
      "ts_last_config": "2015-06-23T17:04:22.826938Z",
      "config_history": [
        {
          "ts_start": "2015-06-23T05:12:55.935075Z",
          "config_id": "be12d572e566cc1ecfaf4381be597d65",
          "ts_end": "2015-06-23T17:04:22.826938Z"
        }
      ],
      "hostname": "ip-172-31-61-221.ec2.internal",
      "fqdn": "ip-172-31-61-221.ec2.internal",
      "last_config": "e3fc878879ddea19c4a0769147658122",
      "ts_last_ping": "2015-06-23T17:04:22.826938Z",
      "system_id": "i-2cad8885",
      "n_pings": 2,
      "ts_created": "2015-06-23T05:12:55.935075Z"
    },

...

{
      "ts_last_config": "2015-06-23T17:04:25.659633Z",
      "config_history": [
        {
          "ts_start": "2015-06-23T17:01:55.124728Z",
          "config_id": "151328a6d08d0a949ccb58cd6fc6af90",
          "ts_end": "2015-06-23T17:04:25.659633Z"
        }
      ],
      "hostname": "ip-172-31-56-42",
      "fqdn": "ip-172-31-56-42.ec2.internal",
      "last_config": "0871acf8520d4b3b5459852efffb3917",
      "ts_last_ping": "2015-06-23T17:04:25.659633Z",
      "system_id": "i-d332137a",
      "n_pings": 2,
      "ts_created": "2015-06-23T17:01:55.124728Z"
    }
  ]
}
```

*FIG. 50B*

```
prompt@test: dgri-query -p systems/i-d332137a/score
{
  "status": "0",
  "type": "None.response",
  "status_msg": "ok",
  "ctx": null,
  "query": null,
  "data": {
    "config_tstamp": "2015-06-23T17:04:25.659633Z",
    "config_id": "0871acf8520d4b3b5459852efffb3917",
    "dgri": {
      "n_systems": 3,
      "n_success": 0,
      "vuln": [
        {
          "id": "CVE-2015-0239"
        },
        {
          "id": "CVE-2015-0274"
        },
        ...
        {
          "id": "CVE-2014-9710"
        },
        {
          "id": "CVE-2014-9715"
        }
      ],
      "score_pending": false,
      "score": 300,
      "survey": {
        "success_user": 0,
        "fail_user": 0,
        "fail_reboot": 0,
        "fail_offline": 0,
        "fail_test": 0,
        "success_online": 0,
        "success_test": 0,
        "fail_logerror": 0,
        "success_ping": 0,
        "fail_crash": 0,
        "fail_rollback": 0
      },
      "n_total": 0,
      "n_fail": 0,
      "n_systems_ever": 3
    },
    "config_friendly_name": "centos-7-0871",
    "system_id": "i-d332137a"
  }
}
```

*FIG. 51*

```
prompt@test: dgri-query -p systems/i-d332137a/config
{
  "status": "0",
  "type": "None.response",
  "status_msg": "ok",
  "ctx": null,
  "query": null,
  "data": {
    "config_tstamp": "2015-06-23T17:04:25.659633Z",
    "config_id": "0871acf8520d4b3b5459852efffb3917",
    "dgri": {
      "n_systems": 3,
      "n_success": 0,
      "vuln": [
        {
          "timestamp": "2015-03-25",
          "id": "CVE-2015-0239"
        },
        {
          "timestamp": "2015-03-26",
          "id": "CVE-2015-0274"
        },

...

{
          "timestamp": "2015-05-27",
          "id": "CVE-2014-9710"
        },
        {
          "timestamp": "2015-06-03",
          "id": "CVE-2014-9715"
        }
      ],
      "score_pending": false,
      "score": 300,
      "survey": {
        "success_user": 0,
        "fail_user": 0,
        "fail_reboot": 0,
        "fail_offline": 0,
        "fail_test": 0,
        "success_online": 0,
        "success_test": 0,
        "fail_logerror": 0,
        "success_ping": 0,
        "fail_crash": 0,
        "fail_rollback": 0
```

*FIG. 52A*

```
},
"n_total": 0,
"n_fail": 0,
"n_systems_ever": 3
},
"config_friendly_name": "centos-7-0871",
"system_id": "i-d332137a",
"packages": {
  "keyutils": {
    "vendor": "CentOS",
    "ver": "1.5.8",
    "arch": "x86_64",
    "rel": "3.el7",
    "type": "rpm"
  },

...

"python-kitchen": {
    "vendor": "CentOS",
    "ver": "1.1.1",
    "arch": "noarch",
    "rel": "5.el7",
    "type": "rpm"
  },
  "gpg-pubkey": {
    "ver": "f4a80eb5",
    "type": "rpm",
    "rel": "53a7ff4b"
  }
},
"os": {
  "name": "CentOS Linux",
  "ansi_color": "0;31",
  "id_like": "rhel fedora",
  "version_id": "7",
  "bug_report_url": "https://bugs.centos.org/",
  "pretty_name": "CentOS Linux 7 (Core)",
  "version": "7 (Core)",
  "home_url": "https://www.centos.org/",
  "cpe_name": "cpe:/o:centos:centos:7",
  "id": "centos"
}
}
}
```

FIG. 52B

```
prompt@test: dgri-query -p configs/49a628bda5872af7bf8862acba1ebdb9
{
 "status": "0",
 "type": "None.response",
 "status_msg": "ok",
 "ctx": null,
 "query": null,
 "data": {
   "os": {
     "name": "CentOS Linux",
     "ansi_color": "0;31",
     "id_like": "rhel fedora",
     "version_id": "7",
     "bug_report_url": "https://bugs.centos.org/",
     "pretty_name": "CentOS Linux 7 (Core)",
     "version": "7 (Core)",
     "home_url": "https://www.centos.org/",
     "cpe_name": "cpe:/o:centos:centos:7",
     "id": "centos"
   },
   "config_id": "0871acf8520d4b3b5459852efffb3917",
   "packages": {
     "keyutils": {
       "vendor": "CentOS",
       "ver": "1.5.8",
       "arch": "x86_64",
       "rel": "3.el7",
       "type": "rpm"
     },
     ...
     "python-kitchen": {
       "vendor": "CentOS",
       "ver": "1.1.1",
       "arch": "noarch",
       "rel": "5.el7",
       "type": "rpm"
     },
     "gpg-pubkey": {
       "ver": "f4a80eb5",
       "type": "rpm",
       "rel": "53a7ff4b"
     }
```

*FIG. 53A*

```
},
"dgri": {
  "n_systems": 3,
  "n_success": 0,
  "vuln": [
    {
      "timestamp": "2015-03-25",
      "id": "CVE-2015-0239"
    },

...

{
      "timestamp": "2015-06-03",
      "id": "CVE-2014-9715"
    }
  ],
  "score_pending": false,
  "score": 300,
  "survey": {
    "success_user": 0,
    "fail_user": 0,
    "fail_reboot": 0,
    "fail_offline": 0,
    "fail_test": 0,
    "success_online": 0,
    "success_test": 0,
    "fail_logerror": 0,
    "success_ping": 0,
    "fail_crash": 0,
    "fail_rollback": 0
  },
  "n_total": 0,
  "n_fail": 0,
  "n_systems_ever": 3
},
"config_friendly_name": "centos-7-0871"
}
}
```

*FIG. 53B*

```
prompt@test: dgri-query -p vulnerabilities/CVE-2015-4002
{
 "status": "0",
 "type": "None.response",
 "status_msg": "ok",
 "ctx": null,
 "query": null,
 "data": {
  "url": "https://web.nvd.nist.gov/view/vuln/detail?vulnId=CVE-2015-4002",
  "ts_created": "2015-06-18T23:24:46.223815Z",
  "id": "CVE-2015-4002",
  "entity_spec": [
   {
    "ver_spec": [
     {
      "ver_flag": "<=",
      "ver": "4.0.5"
     }
    ],
    "vendor": "linux",
    "name": "kernel"
   }
  ],
  "desc": "drivers/staging/ozwpan/ozusbsvc1.c in the OZWPAN driver in the Linux kernel through 4.0.5 does not ensure that certain length values are sufficiently large, which allows remote attackers to cause a denial of service (system crash or large loop) or possibly execute arbitrary code via a crafted packet, related to the (1) oz_usb_rx and (2) oz_usb_handle_ep_data functions."
 }
}
```

*FIG. 54*

```
prompt@test:  dgri-query –p vulnerable
{
 "status": "0",
 "type": "None.response",
 "status_msg": "ok",
 "ctx": null,
 "query": null,
 "data": [
   {
    "ts_last_config": "2015-06-23T17:04:22.826938Z",
    "config_history": [
      {
       "ts_start": "2015-06-23T05:12:55.935075Z",
       "config_id": "be12d572e566cc1ecfaf4381be597d65",
       "ts_end": "2015-06-23T17:04:22.826938Z"
      }
    ],
    "vulnerabilities": [
      {
       "id": "CVE-2015-0239"
      },
      {
       "id": "CVE-2015-0274"
      },

...

{
       "id": "CVE-2014-9710"
      },
      {
       "id": "CVE-2014-9715"
      }
    ],
    "ts_last_ping": "2015-06-23T17:04:22.826938Z",
    "last_config": "e3fc878879ddea19c4a0769147658122",
    "last_config_friendly": "centos-7-e3fc",
    "score": 300,
    "system_id": "i-2cad8885",
    "n_pings": 2,
    "ts_created": "2015-06-23T05:12:55.935075Z",
    "id": {
      "machine_id": "f9afeb75a5a382dce8269887a67fbf58",
      "hostname": "ip-172-31-61-221.ec2.internal",
      "fqdn": "ip-172-31-61-221.ec2.internal",
      "ec2_ami_id": "ami-96a818fe",
      "ec2_instance_id": "i-2cad8885"
    }
   },
```

*FIG. 55A*

```
...
{
  "ts_last_config": "2015-06-23T17:04:25.659633Z",
  "config_history": [
    {
      "ts_start": "2015-06-23T17:01:55.124728Z",
      "config_id": "151328a6d08d0a949ccb58cd6fc6af90",
      "ts_end": "2015-06-23T17:04:25.659633Z"
    }
  ],
  "vulnerabilities": [
    {
      "id": "CVE-2015-0239"
    },
    {
      "id": "CVE-2015-0274"
    },
    ...
    {
      "id": "CVE-2014-9710"
    },
    {
      "id": "CVE-2014-9715"
    }
  ],
  "ts_last_ping": "2015-06-23T17:04:25.659633Z",
  "last_config": "0871acf8520d4b3b5459852efffb3917",
  "last_config_friendly": "centos-7-0871",
  "score": 300,
  "system_id": "i-d332137a",
  "n_pings": 2,
  "ts_created": "2015-06-23T17:01:55.124728Z",
  "id": {
    "machine_id": "f9afeb75a5a382dce8269887a67fbf58",
    "hostname": "ip-172-31-56-42",
    "fqdn": "ip-172-31-56-42.ec2.internal",
    "ec2_ami_id": "ami-96a818fe",
    "ec2_instance_id": "i-d332137a"
  }
}
}
]
}
```

*FIG. 55B*

```
prompt@test: ansible-playbook /usr/share/dgri/ansible-playbooks/dgri-yum.yml -v
-e "name=bind-utils"

PLAY [test] ************************************************************

GATHERING FACTS ********************************************************
ok: [54.86.68.166]
ok: [54.173.136.9]

TASK: [DataGrid yum module] ********************************************
changed: [54.173.136.9] => {"changed": true, "dgri-output": {"collect": "New config
reported ok", "n_fail": 0, "n_success": 0, "n_systems": 0, "n_systems_ever": 0, "n_total":
0, "score_diff": -50, "score_new": 750, "score_old": 800}, "msg": "", "rc": 0, "results":
["Loaded plugins: fastestmirror
    Loading mirror speeds from cached hostfile
     * base: mirror.vcu.edu
     * extras: mirrors.lga7.us.voxel.net
     * updates: mirrors.advancedhosters.com
    Resolving Dependencies
    --> Running transaction check
    ---> Package bind-utils.x86_64 32:9.9.4-18.el7_1.1 will be installed
    --> Finished Dependency Resolution
    Dependencies Resolved ================================================================
     Package          Arch       Version              Repository   Size
    ================================================================
    Installing:
     bind-utils       x86_64     32:9.9.4-18.el7_1.1  updates      199 k
    Transaction Summary
    ================================================================
    Install  1 Package
    Total download size: 199 k
    Installed size: 434 k
    Downloading packages:
    Running transaction check
    Running transaction test
    Transaction test succeeded
    Running transaction
     Installing : 32:bind-utils-9.9.4-18.el7_1.1.x86_64             1/1
     Verifying  : 32:bind-utils-9.9.4-18.el7_1.1.x86_64             1/1
    Installed:
     bind-utils.x86_64 32:9.9.4-18.el7_1.1
    Complete!"]}
changed: [54.86.68.166] => {"changed": true, "dgri-output": {"collect": "New config
reported ok", "n_fail": 0, "n_success": 0, "n_systems": 0, "n_systems_ever": 0, "n_total":
0, "score_diff": -50, "score_new": 750, "score_old": 800}, "msg": "", "rc": 0, "results":
["Loaded plugins: fastestmirror
    ...
    Complete!"]}

PLAY RECAP *************************************************************
54.173.136.9              : ok=2   changed=1   unreachable=0   failed=0
54.86.68.166              : ok=2   changed=1   unreachable=0   failed=0
```

*FIG. 56*

```
prompt@test: ansible-playbook /usr/share/dgri/ansible-playbooks/dgri-yum.yml -v -e "name=httpd dry_run=1"

PLAY [test] ************************************************************

GATHERING FACTS ********************************************************
ok: [54.173.136.9]
ok: [54.86.68.166]

TASK: [DataGrid yum module] ********************************************
ok: [54.86.68.166] => {"changed": false, "dgri-output": {"n_fail": 0, "n_success": 0, "n_systems": 0, "n_systems_ever": 0, "n_total": 0, "score_diff": -25, "score_new": 750, "score_old": 775}, "msg": "Config check is successful. This was just a dry run, nothing is changed on the system, re-run with dgri_dry_run=0 to apply the changes"}
ok: [54.173.136.9] => {"changed": false, "dgri-output": {"n_fail": 0, "n_success": 0, "n_systems": 0, "n_systems_ever": 0, "n_total": 0, "score_diff": -25, "score_new": 750, "score_old": 775}, "msg": "Config check is successful. This was just a dry run, nothing is changed on the system, re-run with dgri_dry_run=0 to apply the changes"}

PLAY RECAP *************************************************************
54.173.136.9      : ok=2    changed=0    unreachable=0    failed=0
54.86.68.166      : ok=2    changed=0    unreachable=0    failed=0
```

*FIG. 57*

```
prompt@test: ansible-playbook /usr/share/dgri/ansible-playbooks/dgri/dgri-yum.yml -v -e "name=httpd min_score=700"

PLAY [test] ********************************************************************

GATHERING FACTS ****************************************************************
ok: [54.173.136.9]
ok: [54.86.68.166]

TASK: [DataGrid yum module] ****************************************************
changed: [54.173.136.9] => {"changed": true, "dgri-output": {"collect": {"New config reported ok", "n_fail": 0,
"n_success": 0, "n_systems": 0, "n_systems ever": 0, "n_total": 0, "score_diff": -25, "score_new": 750, "score_old": 775},
"msg": "", "rc": 0, "results": ["Loaded plugins: fastestmirror
Loading mirror speeds from cached hostfile
 * base: mirror.vcu.edu
 * extras: mirrors.lga7.us.voxel.net
 * updates: mirrors.advancedhosters.com
Resolving Dependencies
...
Dependencies Resolved
...
Installing : apr-1.4.8-3.el7.x86_64                               1/5
Installing : apr-util-1.5.2-6.el7.x86_64                          2/5
Installing : httpd-tools-2.4.6-31.el7.centos.x86_64               3/5
...
Installed:
  httpd.x86_64 0:2.4.6-31.el7.centos
Dependency Installed:
  apr.x86_64 0:1.4.8-3.el7                  apr-util.x86_64 0:1.5.2-6.el7
  httpd-tools.x86_64 0:2.4.6-31.el7.centos  mailcap.noarch 0:2.1.41-2.el7
Complete!"]}
changed: [54.86.68.166] => {"changed": true, "dgri-output": {"collect": {"New config reported ok", "n_fail": 0,
"n_success": 0, "n_systems": 0, "n_systems ever": 0, "n_total": 0, "score_diff": -25, "score_new": 750, "score_old": 775},
"msg": "", "rc": 0, "results": ["Loaded plugins: fastestmirror
...
Complete!"]}

PLAY RECAP *********************************************************************
54.173.136.9               : ok=2    changed=1    unreachable=0    failed=0
54.86.68.166               : ok=2    changed=1    unreachable=0    failed=0
```

FIG. 58

```
prompt@test: ansible-playbook /usr/share/dgri/ansible-playbooks/dgri-yum.yml -v -e "name=httpd state=absent"

PLAY [test] ************************************************************

GATHERING FACTS ********************************************************
ok: [54.173.136.9]
ok: [54.86.68.166]

TASK: [DataGrid yum module] ********************************************
changed: [54.173.136.9] => {"changed": true, "dgri-output": {"collect": "New config reported ok", "n_fail": 0,
"n_success": 0, "n_systems": 1, "n_systems_ever": 3, "n_total": 0, "score_diff": 475, "score_new": 800, "score_old": 325},
"msg": "", "rc": 0, "results": ["Loaded plugins: fastestmirror
Resolving Dependencies
    Dependencies Resolved
    ...
    Running transaction
        Erasing    : httpd-2.4.6-31.el7.centos.x86_64                    1/1
        Verifying  : httpd-2.4.6-31.el7.centos.x86_64                    1/1
    Removed:
        httpd.x86_64 0:2.4.6-31.el7.centos
    Complete!"]}
changed: [54.86.68.166] => {"changed": true, "dgri-output": {"collect": "New config reported ok", "n_fail": 0,
"n_success": 0, "n_systems": 1, "n_systems_ever": 3, "n_total": 0, "score_diff": 475, "score_new": 800, "score_old": 325},
"msg": "", "rc": 0, "results": ["Loaded plugins: fastestmirror
    ...
    Complete!"]}

PLAY RECAP *************************************************************
54.173.136.9               : ok=2    changed=1    unreachable=0    failed=0
54.86.68.166               : ok=2    changed=1    unreachable=0    failed=0
```

*FIG. 59*

```
prompt@test: ansible-playbook /usr/share/dgri/ansible-playbooks/dgri-yum.yml -v -e "name=httpd max_degrade=0"

PLAY [test] ********************************************************************

GATHERING FACTS ****************************************************************
ok: [54.173.136.9]
ok: [54.86.68.166]

TASK: [DataGrid yum module] ****************************************************
failed: [54.173.136.9] => {"dgri-info": {"n_fail": 0, "n_success": 0, "n_systems_ever": 0,
"n_total": 0, "score_diff": -250, "score_new": 750, "score_old": 1000}, "failed": true}
msg: The taget score 750 is a decrease of 250, which is more than the maximum allowed score decrease of 0.
failed: [54.86.68.166] => {"dgri-info": {"n_fail": 0, "n_success": 0, "n_systems_ever": 0,
"n_total": 0, "score_diff": -250, "score_new": 750, "score_old": 1000}, "failed": true}
msg: The taget score 750 is a decrease of 250, which is more than the maximum allowed score decrease of 0.

FATAL: all hosts have already failed -- aborting

PLAY RECAP *********************************************************************
          to retry, use: --limit @/root/dgri-yum.retry 54.173.136.9            : ok=1    changed=0    unreachable=0    failed=1
54.86.68.166            : ok=1    changed=0    unreachable=0    failed=1
```

*FIG. 60*

```
prompt@test: yum install screen

Loaded plugins: amazon-id, dgri-yum, rhui-lb
Hello DGRI plugin: init hook (/root/dgri/demo/subscriber)
Hello DGRI plugin: exclude_hook
Resolving Dependencies
...
Dependencies Resolved
...
Transaction Summary Install  1 Package Total download size: 551 k
Installed size: 914 k
Is this ok [y/d/N]: y
Downloading packages:
screen-4.1.0-0.19.20120314git3c2946.el7.x86_64.rpm
| 551 kB  00:00:00
Running transaction check
Running transaction test
Transaction test succeeded
Running transaction
Hello DGRI plugin: pretrans_hook
=== DGRI validation ===
  DGRI score will change from 800 to 750 (degrade by -50 points)
  Data points: 0 system(s), 0/0 failure(s),
  Do you want to proceed with this update (y/N/?):y Installing : screen-4.1.0-0.19.20120314git3c2946.el7.x86_64
...
Complete!
```

FIG. 61

```
prompt@test: yum upgrade openssl

Loaded plugins: amazon-id, dgri-yum, rhui-lb
Hello DGRI plugin: init_hook (/root/dgri/demo/subscriber)
Hello DGRI plugin: exclude_hook
Resolving Dependencies
--> ...
Dependencies Resolved ================================================================================
Transaction Summary
================================================================================
Upgrade  1 Package (+1 Dependent package)

Total download size: 1.6 M
Is this ok [y/d/N]: y
Downloading packages:
Delta RPMs disabled because /usr/bin/applydeltarpm not installed.
(1/2): openssl-1.0.1e-42.el7_1.8.x86_64.rpm           | 711 kB  00:00
(2/2): openssl-libs-1.0.1e-42.el7_1.8.x86_64.rpm      | 949 kB  00:00
--------------------------------------------------------------------------------
Total                                      3.6 MB/s | 1.6 MB  00:00
Running transaction check
Running transaction
Hello DGRI plugin: pretrans_hook
=== DGRI validation ===
    DGRI score will change from 800 to 750 (degrade by -50 points)
    Data points: 4,105 system(s), 3/39,265 failure(s)/total signals,
Do you want to proceed with this update (y/N/?):y
  Updating    : 1:openssl-libs-1.0.1e-42.el7_1.8.x86_64           1/4
  Updating    : 1:openssl-1.0.1e-42.el7_1.8.x86_64                2/4
  Cleanup     : 1:openssl-1.0.1e-42.el7_1.8.x86_64                3/4
  Cleanup     : 1:openssl-libs-1.0.1e-42.el7.x86_64               4/4
Hello DGRI plugin: posttrans_hook
   using DGRI at: /root/dgri/demo/subscriber
  Verifying   : 1:openssl-1.0.1e-42.el7_1.8.x86_64                1/4
  Verifying   : 1:openssl-libs-1.0.1e-42.el7_1.8.x86_64           2/4
  Verifying   : 1:openssl-libs-1.0.1e-42.el7.x86_64               3/4
  Verifying   : 1:openssl-1.0.1e-42.el7.x86_64                    4/4
...
Complete!
```

*FIG. 62*

```
prompt@test: yum history undo 6

Loaded plugins: amazon-id, dgri-yum, rhui-lb
Hello DGRI plugin: init hook (/root/dgri/demo/subscriber)
Undoing transaction 6, from Fri Jun 26 07:37:40 2015
    Updated openssl-1:1.0.1e-42.el7.x86_64        @anaconda/7.1
    Update         1:1.0.1e-42.el7_1.8.x86_64     @rhui-REGION-rhel-server-releases
    Updated openssl-libs-1:1.0.1e-42.el7.x86_64   @anaconda/7.1
    Update           1:1.0.1e-42.el7_1.8.x86_64 @rhui-REGION-rhel-server-releases
...
Resolving Dependencies
...
Dependencies Resolved
...
Transaction Summary
=================================================================
Downgrade  2 Packages Total download size: 1.6 M
Is this ok [y/d/N]: y
Downloading packages:
(1/2): openssl-libs-1.0.1e-42.el7.x86_64.rpm       | 947 kB  00:00
(2/2): openssl-1.0.1e-42.el7.x86_64.rpm            | 709 kB  00:00
-----------------------------------------------------------------
Total                                   2.9 MB/s | 1.6 MB  00:00
Running transaction check
Running transaction test
Transaction test succeeded
Running transaction
Hello DGRI plugin: pretrans_hook
=== DGRI validation ===
    DGRI score will change from 750 to 800 (improve by 50 points)
    Data points: 6,710 system(s), 4/55,412 failure(s)/total signals,
Do you want to proceed with this update (Y/n/?):y Installing : 1:openssl-libs-1.0.1e-42.el7.x86_64           1/4
  Installing : 1:openssl-1.0.1e-42.el7.x86_64                2/4
  Cleanup    : 1:openssl-1.0.1e-42.el7_1.8.x86_64            3/4
  Cleanup    : 1:openssl-libs-1.0.1e-42.el7_1.8.x86_64       4/4
Hello DGRI plugin: posttrans_hook
  using DGRI at: /root/dgri/demo/subscriber
  Verifying  : 1:openssl-libs-1.0.1e-42.el7.x86_64           1/4
  Verifying  : 1:openssl-1.0.1e-42.el7.x86_64                2/4
  Verifying  : 1:openssl-1.0.1e-42.el7_1.8.x86_64            3/4
  Verifying  : 1:openssl-libs-1.0.1e-42.el7_1.8.x86_64       4/4

Complete!
```

*FIG. 63*

```
prompt@test: yum update

Loaded plugins: amazon-id, dgri-yum, rhui-lb
Hello DGRI plugin: init hook (/root/dgri/demo/subscriber)
Hello DGRI plugin: exclude_hook
Resolving Dependencies
...
Dependencies Resolved
...
Transaction Summary
================================================================
Install  1 Package  (+1 Dependent package)
Upgrade  47 Packages Total size: 84 M
Is this ok [y/d/N]: y
Downloading packages:
Running transaction check
Running transaction test
Transaction test succeeded
Running transaction
Hello DGRI plugin: pretrans_hook
=== DGRI validation ===
    DGRI score will change from 800 to 941 (improve by 141 points)
    Data points: 43,221 system(s), 21/143,344 failure(s)/total signals,
Do you want to proceed with this update (Y/n/?):?

Details:
  Target DGRI score 941 (configuration rhel-7.1-df25)
  Used in 43,221 systems total, currently in 37,831
  143,344 events received: 143,323 success, 21 fail (<0.001%)
  Success: user(6,392) online(136,931)
  Failure: user(1) reboot(12) offline(7) logerror(0) crash(0) rollback(1)
  Target configuration vulnerabilities:

================================================================
  Vulnerability Id      CVSS severity    Change
  ================================================================
    CVE-2015-0239         4.7            new
    CVE-2015-0274         7.2            new
    ...
    CVE-2014-9710         6.9            retained
    CVE-2014-9715         4.9            retained
```

*FIG. 64A*

24 vulnerabilities removed

=== DGRI validation ===
  DGRI score will change from 800 to 941.0 (improve by 141 points)
  Data points: 43,221 system(s), 21/143,344 failure(s)/total signals,
Do you want to proceed with this update (Y/n/?):y

| | | |
|---|---|---|
| Updating | : nspr-4.10.8-1.el7_1.x86_64 | 1/96 |
| Updating | : nss-util-3.19.1-1.el7_1.x86_64 | 2/96 |

...
Cleanup    : 14:libpcap-1.5.3-3.el7_0.1.x86_64          96/96
Hello DGRI plugin: posttrans_hook
  using DGRI at: /root/dgri/demo/subscriber
  Verifying  : gnutls-3.3.8-12.el7_1.1.x86_64           1/96
  Verifying  : libgudev1-208-20.el7_1.5.x86_64          2/96

...
  Verifying  : libgcrypt-1.5.3-12.el7.x86_64            96/96

Installed:
  kernel.x86_64 0:3.10.0-229.7.2.el7

Dependency Installed:
  linux-firmware.noarch 0:20140911-0.1.git365e80c.el7

Updated:
  bind-libs-lite.x86_64 32:9.9.4-18.el7_1.1
  bind-license.noarch 32:9.9.4-18.el7_1.1

...
  wpa_supplicant.x86_64 1:2.0-17.el7_1

Complete!

*FIG. 64B*

```
{
  "boundary": {
    "connections": [
      {
        "local": "172.31.53.215:22",
        "protocol": "tcp",
        "remote": "54.86.229.3:39293"
      }
    ],
    "servers": [
      {
        "local": "127.0.0.1:25",
        "protocol": "tcp",
        "remote": "0.0.0.0:*"
      },
      ...
      {
        "local": ":::1:323",
        "protocol": "udp6",
        "remote": ":::*"
      }
    ],
    "subscriber_tstamp": "2015-06-20T00:31:05.681361Z",
    "id": {
      "ec2_ami_id": "ami-96a818fe",
      "ec2_instance_id": "i-0fa2eba6",
      "fqdn": "ip-172-31-53-215.ec2.internal",
      "hostname": "ip-172-31-53-215",
      "ipaddr": {
        "output": [
          "1: lo: <LOOPBACK,UP,LOWER_UP> mtu 65536 qdisc noqueue state UNKNOWN ",
          "   link/loopback 00:00:00:00:00:00 brd 00:00:00:00:00:00",
          "   inet 127.0.0.1/8 scope host lo",
          "      valid_lft forever preferred_lft forever",
```

*FIG. 65A*

```
        inet6 ::1/128 scope host ",
           valid_lft forever preferred_lft forever",
        "2: eth0: <BROADCAST,MULTICAST,UP,LOWER_UP> mtu 9001 qdisc pfifo_fast state UP qlen 1000",
        "   link/ether 12:59:77:7f:78:d1 brd ff:ff:ff:ff:ff:ff",
        "   inet 172.31.53.215/20 brd 172.31.63.255 scope global dynamic eth0",
        "      valid_lft 3438sec preferred_lft 3438sec",
        "   inet6 fe80::1059:77ff:fe7f:78d1/64 scope link",
        "      valid_lft forever preferred_lft forever"
    ],
    "util": "ip"
},
"machine_id": "f9afeb75a5a382dce8269887a67fbf58"
"os": {
    "ansi_color": "0;31",
    "bug_report_url": "https://bugs.centos.org/",
    "cpe_name": "cpe:/o:centos:centos:7",
    "home_url": "https://www.centos.org/",
    "id": "centos",
    "id_like": "rhel fedora",
    "name": "CentOS Linux",
    "pretty_name": "CentOS Linux 7 (Core)",
    "version": "7 (Core)",
    "version_id": "7"
},
"packages": [
    {
        "arch": "noarch",
        "name": "python-pygments",
        "provides": [
            "python-pygments"
        ],
        "rel": "9.el7",
        "requires": [
```

*FIG. 65B*

```
{
  "flag": "",
  "name": "/usr/bin/python",
  "ver": ""
},
...
{
  "flag": "<=",
  "name": "rpmlib(PayloadIsXz)",
  "ver": "5.2-1"
}
],
"vendor": "CentOS",
"ver": "1.4"
},
...
{
  "arch": "x86_64",
  "name": "libwebp",
  "provides": [
    "libwebp",
    "libwebp(x86-64)",
    "libwebp.so.4()(64bit)",
    "libwebpmux.so.0()(64bit)"
  ],
  "rel": "3.el7",
  "requires": [
    {
      "flag": "",
      "name": "/sbin/ldconfig",
      "ver": ""
    },
    ...
```

FIG. 65C

```
{
  "flag": "<=",
  "name": "rpmlib(PayloadIsXz)",
  "ver": "5.2-1"
}
],
"vendor": "CentOS",
"ver": "0.3.0"
},
"repo": [
  {
    "repo_baseurl": "http://mirrors.advancedhosters.com/centos/7.1.1503/os/x86_64/ (9)",
    "repo_id": "base/7/x86_64",
    "repo_mirrors": "http://mirrorlist.centos.org/?release=7&arch=x86_64&repo=os&infra=genclo",
    "repo_name": "CentOS-7 - Base",
    "repo_pkgs": "8652"
  },
  {
    "repo_baseurl": "http://mirror.ash.fastserv.com/pub/linux/centos/7.1.1503/extras/x86_64/",
    "repo_id": "extras/7/x86_64",
    "repo_mirrors": "http://mirrorlist.centos.org/?release=7&arch=x86_64&repo=extras&infra=genclo",
    "repo_name": "CentOS-7 - Extras",
    "repo_pkgs": "128"
  },
  {
    "repo_baseurl": "http://mirror.symnds.com/CentOS/7.1.1503/updates/x86_64/ (9 more)",
    "repo_id": "updates/7/x86_64",
    "repo_mirrors": "http://mirrorlist.centos.org/?release=7&arch=x86_64&repo=updates&infra=genclo",
    "repo_name": "CentOS-7 - Updates",
    "repo_pkgs": "684"
  }
],
"sys_rebooted": 0,
"type": "config"
}
```

*FIG. 65D*

```
{
  "subscriber_tstamp": "2015-06-20T04:44:03.952327Z",
  "signal": "ping",
  "type": "signal",
  "sys_rebooted": 0,
  "id": _
  "hostname": "ip-172-31-53-216",
  "ipaddr": {
  "util": "ip",
  "output": [
    "1: lo: <LOOPBACK,UP,LOWER_UP> mtu 65536 qdisc noqueue state UNKNOWN ",
    "    link/loopback 00:00:00:00:00:00 brd 00:00:00:00:00:00",
    "    inet 127.0.0.1/8 scope host lo",
    "       valid_lft forever preferred_lft forever",
    "    inet6 ::1/128 scope host ",
    "       valid_lft forever preferred_lft forever",
    "2: eth0: <BROADCAST,MULTICAST,UP,LOWER_UP> mtu 9001 qdisc pfifo_fast state UP qlen 1000",
    "    link/ether 12:42:fc:32:70:eb brd ff:ff:ff:ff:ff:ff",
    "    inet 172.31.53.216/20 brd 172.31.63.255 scope global dynamic eth0",
    "       valid_lft 2068sec preferred_lft 2068sec",
    "    inet6 fe80::1042:fcff:fe32:70eb/64 scope link ",
    "       valid_lft forever preferred_lft forever"
  ]
  },
  "fqdn": "ip-172-31-53-216.ec2.internal",
  "ec2_instance_id": "i-0ea2eba7",
  "machine_id": "f9afeb75a5a382dce8269887a67fbf58",
  "ec2_ami_id": "ami-96a818fe"
}
```

*FIG. 66*

```
{
  "status": "0",
  "type": "None.response",
  "status_msg": "ok",
  "ctx": null,
  "query": null,
  "data": [
    {
      "ts_last_config": "2015-06-19T22:29:07.995973Z",
      "hostname": "ip-172-31-53-216",
      "ts_last_ping": "2015-06-19T22:29:07.995973Z",
      "last_config": "169d941a47702160bd2e6f94db0d06bc",
      "fqdn": "ip-172-31-53-216.ec2.internal",
      "system_id": "i-0ea2eba7",
      "n_pings": 1,
      "ts_created": "2015-06-19T22:29:07.995973Z"
    },

...

{
      "ts_last_config": "2015-06-19T13:44:09.621008Z",
      "config_history": [
        {
          "ts_start": "2015-06-19T11:22:47.777474Z",
          "config_id": "169d941a47702160bd2e6f94db0d06bc",
          "ts_end": "2015-06-19T11:36:17.947402Z"
        },
        {
          "ts_start": "2015-06-19T11:36:17.947402Z",
          "config_id": "f2eebbe1778db28db5f1c101619b99f5",
          "ts_end": "2015-06-19T13:44:09.621008Z"
        }
      ],
      "hostname": "ip-172-31-6-121",
      "fqdn": "ip-172-31-6-121.ec2.internal",
      "last_config": "d43d26ab4caf2838999f8b2e8c4e5e4c",
      "ts_last_ping": "2015-06-19T22:29:02.682841Z",
      "system_id": "i-e1c26008",
      "n_pings": 5,
      "ts_created": "2015-06-19T11:22:47.777474Z"
    }
  ]
}
```

*FIG. 67*

```
{
  "status": "0",
  "type": "None.response",
  "status_msg": "ok",
  "ctx": null,
  "query": null,
  "data": {
    "ts_last_config": "2015-06-19T13:44:09.621008Z",
    "config_history": [
      {
        "ts_start": "2015-06-19T11:22:47.777474Z",
        "config_id": "169d941a47702160bd2e6f94db0d06bc",
        "ts_end": "2015-06-19T11:36:17.947402Z"
      },
      {
        "ts_start": "2015-06-19T11:36:17.947402Z",
        "config_id": "f2eebbe1778db28db5f1c101619b99f5",
        "ts_end": "2015-06-19T13:44:09.621008Z"
      }
    ],
    "hostname": "ip-172-31-6-121",
    "fqdn": "ip-172-31-6-121.ec2.internal",
    "last_config": "d43d26ab4caf2838999f8b2e8c4e5e4c",
    "ts_last_ping": "2015-06-19T22:29:02.682841Z",
    "system_id": "i-e1c26008",
    "n_pings": 5,
    "ts_created": "2015-06-19T11:22:47.777474Z"
  }
}
```

*FIG. 68*

```
{
  "status": "0",
  "type": "None.response",
  "status_msg": "ok",
  "ctx": null,
  "query": null,
  "data": {
    "config_tstamp": "2015-06-19T13:44:09.621008Z",
    "config_id": "d43d26ab4caf2838999f8b2e8c4e5e4c",
    "dgri": {
      "n_systems": 1,
      "n_success": 0,
      "vuln": [
        {
          "timestamp": "2015-03-25",
          "id": "CVE-2015-0239"
        },
        {
          "timestamp": "2015-03-26",
          "id": "CVE-2015-0274"
        },
        ...
        {
          "timestamp": "2015-05-27",
          "id": "CVE-2014-9710"
        },
        {
          "timestamp": "2015-06-03",
          "id": "CVE-2014-9715"
        }
      ],
      "score": 300,
      "survey": {
        "success_user": 0,
        "fail_user": 0,
        "fail_reboot": 0,
        "fail_offline": 0,
        "fail_test": 0,
        "success_online": 0,
        "success_test": 0,
        "fail_logerror": 0,
        "success_ping": 0,
        "fail_crash": 0,
        "fail_rollback": 0
      },
      "n_total": 0,
      "n_fail": 0,
      "n_systems_ever": 1
    },
    "config_friendly_name": "centos-7-d43d",
    "system_id": "i-e1c26008"
  }
}
```

*FIG. 69*

```
{
  "status": "0",
  "type": "None.response",
  "status_msg": "ok",
  "ctx": null,
  "query": null,
  "data": {
    "config_tstamp": "2015-06-19T13:44:09.621008Z",
    "config_id": "d43d26ab4caf2838999f8b2e8c4e5e4c",
    "dgri": {
      "n_systems": 1,
      "n_success": 0,
      "vuln": [
        {
          "timestamp": "2015-03-25",
          "id": "CVE-2015-0239"
        },

...

{
          "timestamp": "2015-06-03",
          "id": "CVE-2014-9715"
        }
      ],
      "score": 300,
      "survey": {
        "success_user": 0,
        "fail_user": 0,
        "fail_reboot": 0,
        "fail_offline": 0,
        "fail_test": 0,
        "success_online": 0,
        "success_test": 0,
        "fail_logerror": 0,
        "success_ping": 0,
        "fail_crash": 0,
        "fail_rollback": 0
      },
      "n_total": 0,
      "n_fail": 0,
      "n_systems_ever": 1
    },
    "config_friendly_name": "centos-7-d43d",
    "system_id": "i-e1c26008",
    "packages": {
      "libtevent": {
        "vendor": "CentOS",
        "ver": "0.9.21",
        "arch": "x86_64",
        "rel": "3.el7",
        "type": "rpm"
```

*FIG. 70A*

```
    },
    ...
    "libini_config": {
      "vendor": "CentOS",
      "ver": "1.1.0",
      "arch": "x86_64",
      "rel": "24.el7",
      "type": "rpm"
    }
  },
  "os": {
    "name": "CentOS Linux",
    "ansi_color": "0;31",
    "id_like": "rhel fedora",
    "version_id": "7",
    "bug_report_url": "https://bugs.centos.org/",
    "centos_mantisbt_project": "CentOS-7",
    "pretty_name": "CentOS Linux 7 (Core)",
    "version": "7 (Core)",
    "redhat_support_product_version": "7",
    "centos_mantisbt_project_version": "7",
    "redhat_support_product": "centos",
    "home_url": "https://www.centos.org/",
    "cpe_name": "cpe:/o:centos:centos:7",
    "id": "centos"
  }
 }
}
```

FIG. 70B

```
{
  "status": "0",
  "type": "None.response",
  "status_msg": "ok",
  "ctx": null,
  "query": null,
  "data": {
    "os": {
      "name": "CentOS Linux",
      "ansi_color": "0;31",
      "id_like": "rhel fedora",
      "version_id": "7",
      "bug_report_url": "https://bugs.centos.org/",
      "pretty_name": "CentOS Linux 7 (Core)",
      "version": "7 (Core)",
      "home_url": "https://www.centos.org/",
      "cpe_name": "cpe:/o:centos:centos:7",
      "id": "centos"
    },
    "config_id": "169d941a47702160bd2e6f94db0d06bc",
    "packages": {
      "keyutils": {
        "vendor": "CentOS",
        "ver": "1.5.8",
        "arch": "x86_64",
        "rel": "3.el7",
        "type": "rpm"
      },

...

"python-decorator": {
        "vendor": "CentOS",
        "ver": "3.4.0",
        "arch": "noarch",
        "rel": "3.el7",
        "type": "rpm"
      }
    },
    "dgri": {
      "n_systems": 2,
      "n_success": 1,
      "vuln": [
        {
          "timestamp": "2015-03-25",
          "id": "CVE-2015-0239"
```

FIG. 71A

```
    },
    ...
    {
      "timestamp": "2015-06-03",
      "id": "CVE-2014-9715"
    }
  ],
  "score": 300,
  "survey": {
    "success_user": 0,
    "fail_user": 0,
    "fail_reboot": 0,
    "fail_offline": 0,
    "fail_test": 0,
    "success_online": 0,
    "success_test": 0,
    "fail_logerror": 0,
    "success_ping": 1,
    "fail_crash": 0,
    "fail_rollback": 0
  },
  "n_total": 1,
  "n_fail": 0,
  "n_systems_ever": 3
  },
  "config_friendly_name": "centos-7-169d"
 }
}
```

*FIG. 71B*

```
{
  "status": "0",
  "type": "None.response",
  "status_msg": "ok",
  "ctx": null,
  "query": null,
  "data": {
    "config_id": "169d941a47702160bd2e6f94db0d06bc",
    "dgri": {
      "n_systems": 2,
      "n_success": 1,
      "vuln": [
        {
          "timestamp": "2015-03-25",
          "id": "CVE-2015-0239"
        },

...

{
          "timestamp": "2015-06-03",
          "id": "CVE-2014-9715"
        }
      ],
      "score": 300,
      "survey": {
        "success_user": 0,
        "fail_user": 0,
        "fail_reboot": 0,
        "fail_offline": 0,
        "fail_test": 0,
        "success_online": 0,
        "success_test": 0,
        "fail_logerror": 0,
        "success_ping": 1,
        "fail_crash": 0,
        "fail_rollback": 0
      },
      "n_total": 1,
      "n_fail": 0,
      "n_systems_ever": 3
    },
    "config_friendly_name": "centos-7-169d"
  }
}
```

*FIG. 72*

```
{
 "status": "0",
 "type": "None.response",
 "status_msg": "ok",
 "ctx": null,
 "query": null,
 "data": [
  {
   "ts_last_config": "2015-06-19T22:29:07.995973Z",
   "vulnerabilities": [
    {
     "id": "CVE-2015-0239"
    },
    ...
    {
     "id": "CVE-2014-9715"
    }
   ],
   "ts_last_ping": "2015-06-19T22:29:07.995973Z",
   "last_config": "169d941a47702160bd2e6f94db0d06bc",
   "last_config_friendly": "centos-7-169d",
   "score": 300,
   "system_id": "i-0ea2eba7",
   "n_pings": 1,
   "ts_created": "2015-06-19T22:29:07.995973Z",
   "id": {
    "hostname": "ip-172-31-53-216",
    "ipaddr": {
     "util": "ip",
     "output": [
      "1: lo: <LOOPBACK,UP,LOWER_UP> mtu 65536 qdisc noqueue state UNKNOWN ",
      "    link/loopback 00:00:00:00:00:00 brd 00:00:00:00:00:00",
      "    inet 127.0.0.1/8 scope host lo",
      "       valid_lft forever preferred_lft forever",
      "    inet6 ::1/128 scope host ",
      "       valid_lft forever preferred_lft forever",
```

*FIG. 73A*

```
"2: eth0: <BROADCAST,MULTICAST,UP,LOWER_UP> mtu 9001 qdisc pfifo_fast state UP qlen 1000",
"    link/ether 12:42:fc:32:70:eb brd ff:ff:ff:ff:ff:ff",
"    inet 172.31.53.216/20 brd 172.31.63.255 scope global dynamic eth0",
"       valid_lft 2986sec preferred_lft 2986sec",
"    inet6 fe80::1042:fcff:fe32:70eb/64 scope link ",
"       valid_lft forever preferred_lft forever"
        ],
        "fqdn": "ip-172-31-53-216.ec2.internal",
        "ec2_instance_id": "i-0ea2eba7",
        "machine_id": "f9afeb75a5a382dce8269887a67fbf58",
        "ec2_ami_id": "ami-96a818fe"
      },
      ...
      {
        "ts_last_config": "2015-06-19T13:44:09.621008Z",
        "config_history": [
          {
            "ts_start": "2015-06-19T11:22:47.777474Z",
            "config_id": "169d941a47702160bd2e6f94db0d06bc",
            "ts_end": "2015-06-19T11:36:17.947402Z"
          },
          {
            "ts_start": "2015-06-19T11:36:17.947402Z",
            "config_id": "f2eebbe1778db28db5f1c101619b99f5",
            "ts_end": "2015-06-19T13:44:09.621008Z"
          }
        ],
        "vulnerabilities": [
          {
            "id": "CVE-2015-0239"
          },
          ...
```

*FIG. 73B*

```
{
    "id": "CVE-2014-9715"
},
"ts_last_ping": "2015-06-19T22:29:02.682841Z",
"last_config": "d43d26ab4caf2838999f8b2e8c4e5e4c",
"last_config_friendly": "centos-7-d43d",
"score": 300,
"system_id": "i-e1c26008",
"n_pings": 5,
"ts_created": "2015-06-19T11:22:47.777474Z",
"id": {
    "hostname": "ip-172-31-6-121",
    "ipaddr": {
    "util": "ip",
    "output": [
        "1: lo: <LOOPBACK,UP,LOWER_UP> mtu 65536 qdisc noqueue state UNKNOWN ",
        "    link/loopback 00:00:00:00:00:00 brd 00:00:00:00:00:00",
        "    inet 127.0.0.1/8 scope host lo",
        "       valid_lft forever preferred_lft forever",
        "    inet6 ::1/128 scope host ",
        "       valid_lft forever preferred_lft forever",
        "2: eth0: <BROADCAST,MULTICAST,UP,LOWER_UP> mtu 9001 qdisc pfifo_fast state UP qlen 1000",
        "    link/ether 06:38:5b:d8:64:77 brd ff:ff:ff:ff:ff:ff",
        "    inet 172.31.6.121/20 brd 172.31.15.255 scope global dynamic eth0",
        "       valid_lft 3543sec preferred_lft 3543sec",
        "    inet6 fe80::438:5bff:fed8:6477/64 scope link ",
        "       valid_lft forever preferred_lft forever"
    ]
},
"fqdn": "ip-172-31-6-121.ec2.internal",
"ec2_instance_id": "i-e1c26008",
"machine_id": "f9afeb75a5a382dce8269887a67fbf58",
"ec2_ami_id": "ami-96a818fe"
},
{
```

*FIG. 73C*

TECHNIQUES FOR EVALUATING SERVER SYSTEM RELIABILITY, VULNERABILITY AND COMPONENT COMPATIBILITY USING CROWDSOURCED SERVER AND VULNERABILITY DATA

RELATED APPLICATION DATA

This application is a continuation application, pursuant to the provisions of 35 U.S.C. § 120, of prior U.S. patent application Ser. No. 15/219,789 titled "TECHNIQUES FOR EVALUATING SERVER SYSTEM RELIABILITY, VULNERABILITY AND COMPONENT COMPATIBILITY USING CROWDSOURCED SERVER AND VULNERABILITY DATA" by NICKOLOV et al., filed 26 Jul. 2016, the entirety of which is incorporated herein by reference for all purposes.

U.S. patent application Ser. No. 15/219,789 claims benefit, pursuant to the provisions of 35 U.S.C. § 119, of U.S. Provisional Application Ser. No. 62/197,141, titled "TECHNIQUES FOR EVALUATING SERVER SYSTEM RELIABILITY, VULNERABILITY AND COMPONENT COMPATIBILITY USING CROWDSOURCED SERVER AND VULNERABILITY DATA", naming Nickolov et al. as inventors, and filed 27 Jul. 2015, the entirety of which is incorporated herein by reference for all purposes.

BACKGROUND

The present disclosure generally relates to computer networks. More particularly, the present disclosure relates to techniques for evaluating server system reliability, vulnerability and component compatibility using crowdsourced server and vulnerability data.

BRIEF DESCRIPTION OF THE DRAWINGS

FIGS. 13-46 illustrate example screenshots of different graphical user interfaces (GUIs) which may be used to facilitate, initiate and/or perform various operation(s) and/or action(s) relating to the DataGrid Technology.

FIGS. 47-49, 50A-B, 51, 52A-B, 53A-B, 54, 55A-B, 56, 57-63, 64A-B, 65A-D, 66-69, 70A-B, 71A-B, 72, and 73A-C illustrate example screenshots of different command line interfaces (CLIs) and/or application programming interfaces (APIs), which may be used to facilitate, initiate and/or perform various operation(s) and/or action(s) relating to the DataGrid Technology.

DESCRIPTION OF EXAMPLE EMBODIMENTS

Overview

Figure 1:
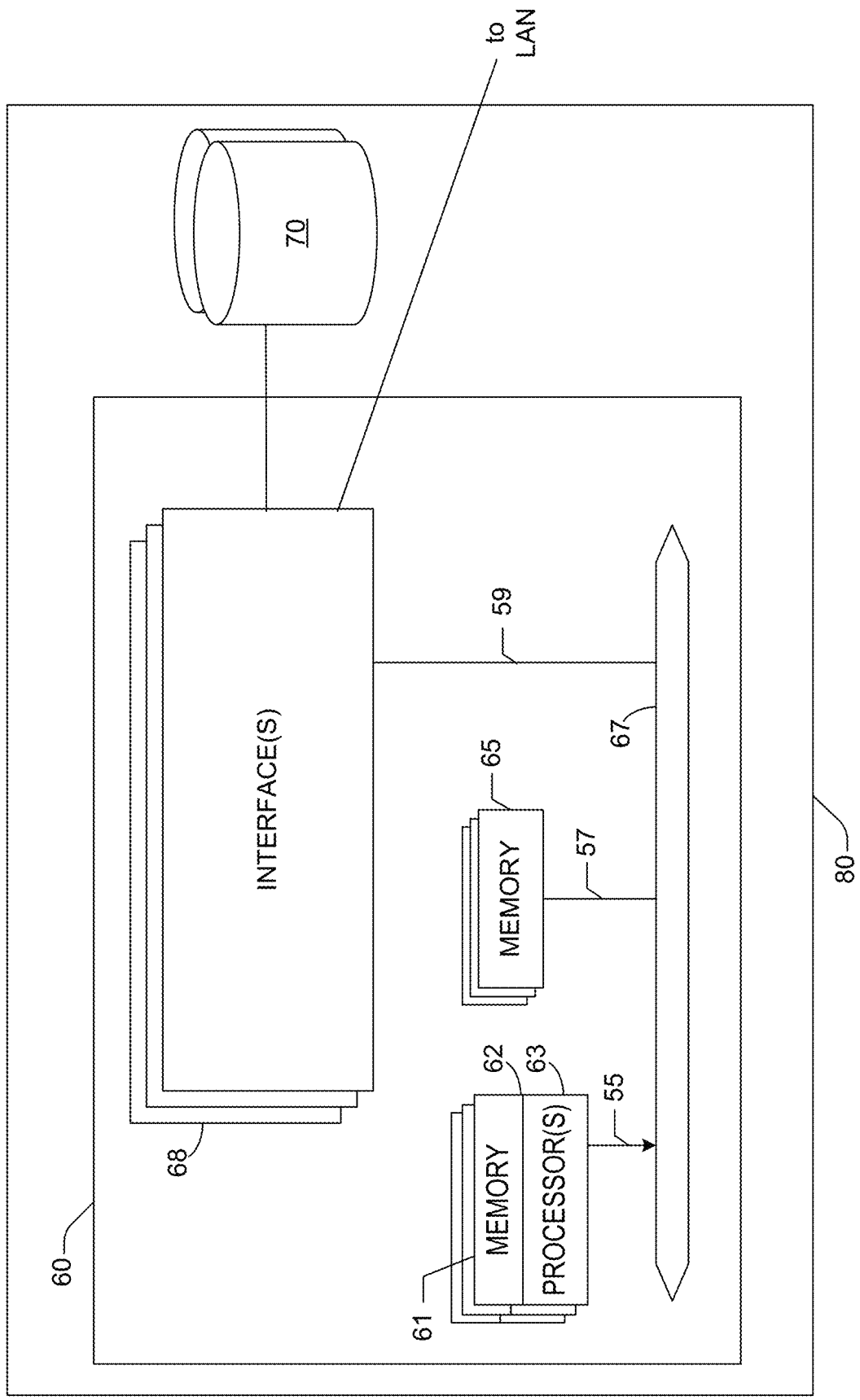
FIG. 1 illustrates an example embodiment of a server system 80 which may be used for implementing various aspects/features described herein.

Various aspects described herein are directed to different services, methods, systems, and computer program products (collectively referred to herein as "DataGrid technology" or "DataGrid techniques") for evaluating server system reliability, vulnerability and component compatibility using crowdsourced server and vulnerability data; for generating automated recommendations for improving server system metrics; and for automatically and conditionally updating or upgrading system package s/components.

One aspect disclosed herein is directed to different methods, systems, and computer program products for facilitating automated management of a plurality of subscriber systems communicatively coupled to a computer network. In at least one embodiment, various method(s), system(s) and/or computer program product(s) may be operable to cause at least one processor to execute a plurality of instructions for: accessing first subscriber system telemetry information relating to an operating environment of the first subscriber system; identifying, using the first subscriber system telemetry information, a first set of configuration elements associated with the first subscriber system; acquiring crowdsourced telemetry information for a plurality of systems, the crowdsourced telemetry information including information about attributes, characteristics and/or configuration elements relating to respective operating environments of the plurality of systems; analyzing the first subscriber system telemetry information and the crowdsourced telemetry information to dynamically evaluate at least one metric associated with at least one entity of the first subscriber system, wherein the at least one metric includes at least one performance metric associated with the at least one entity of the first subscriber system; and automatically implementing or initiating, based on the analysis of the first subscriber system telemetry information and crowdsourced telemetry information, a first set of activities relating to management of the first subscriber system; wherein the first set of activities includes at least one activity selected from a group consisting of: automatically and dynamically generating, based on the analysis of the first subscriber system telemetry information and crowdsourced telemetry information, first subscriber system reliability information, the first subscriber system reliability information identifying at least one configuration element of the first subscriber system which may cause reliability issues at the first subscriber system; automatically and dynamically generating, based on the analysis of the first subscriber system telemetry information and crowdsourced telemetry information, first subscriber system compatibility information, the first subscriber system compatibility information identifying at least one configuration element installed at the first subscriber system which may cause compatibility issues at the first subscriber system; automatically and dynamically generating, based on the analysis of the first subscriber system telemetry information and crowdsourced telemetry information, the first subscriber system vulnerability information identifying at least one configuration element installed at the first subscriber system which may cause vulnerability issues at the first subscriber system; automatically and dynamically generating, based on the analysis of the first subscriber system telemetry information and crowdsourced telemetry information, at least one configuration recommendation relating to a recommended modification of at least one configuration element at the first subscriber system; automatically and dynamically initiating, based on the analysis of the first subscriber system telemetry information and crowdsourced telemetry information, at least one modification of at least one configuration element at the first subscriber system; and automatically and dynamically preventing, based on the analysis of the first subscriber system telemetry information and crowdsourced telemetry information, initiation of at least one modification of at least one configuration element at the first subscriber system.

Other aspects disclosed herein are directed to different methods, systems, and computer program products for facilitating automated management of a plurality of subscriber systems communicatively coupled to a computer network. In at least one embodiment, various method(s), system(s) and/or computer program product(s) may be operable to cause at least one processor to execute a plurality of instructions for: accessing first subscriber system telemetry information relating to an operating environment of a first subscriber system; identifying, using the first subscriber system telemetry information, a first set of configuration elements associated with the first subscriber system; acquiring crowdsourced telemetry information for a plurality of systems, the crowdsourced telemetry information including information about attributes, characteristics and/or configuration elements relating to respective operating environments of the plurality of systems; analyzing the first subscriber system telemetry information and the crowdsourced telemetry information to dynamically evaluate at least one metric associated with at least one entity of the first subscriber system, wherein the at least one metric includes at least one metric selected from a group consisting of: performance, reliability, security, operation, functionality, vulnerability, compatibility, capability, maintainability, stability, and utility; and automatically implementing or initiating, based on the analysis of the first subscriber system telemetry information and crowdsourced telemetry information, a first set of activities relating to management of the first subscriber system; wherein the first set of activities includes one or more of the following (or combinations thereof): automatically and dynamically generating, based on the analysis of the first subscriber system telemetry information and crowdsourced telemetry information, first subscriber system reliability information, the first subscriber system reliability information identifying at least one configuration element of the first subscriber system which may cause reliability issues at the first subscriber system; automatically and dynamically generating, based on the analysis of the first subscriber system telemetry information and crowdsourced telemetry information, first subscriber system compatibility information, the first subscriber system compatibility information identifying at least one configuration element installed at the first subscriber system which may cause compatibility issues at the first subscriber system; automatically and dynamically generating, based on the analysis of the first subscriber system telemetry information and crowdsourced telemetry information, the first subscriber system vulnerability information identifying at least one configuration element installed at the first subscriber system which may cause vulnerability issues at the first subscriber system; automatically and dynamically generating, based on the analysis of the first subscriber system telemetry information and crowdsourced telemetry information, at least one configuration recommendation relating to a recommended modification of at least one configuration element at the first subscriber system; automatically and dynamically initiating, based on the analysis of the first subscriber system telemetry information and crowdsourced telemetry information, at least one modification of at least one configuration element at the first subscriber system; and/or automatically and dynamically preventing, based on the analysis of the first subscriber system telemetry information and crowdsourced telemetry information, initiation of at least one modification of at least one configuration element at the first subscriber system.

According to different embodiments, the first subscriber system may correspond to a physical server, a virtual server, a virtual machine, a switch, a router, a mobile device, a network device, a printer, or a container.

In at least one embodiment, the telemetry information may include various types of information relating to an operating environment of a first subscriber system including, for example, one or more of the following (or combinations thereof): package version information, package name information, IP address information, open port information, network connection information, configuration parameter information, OS version information, CPU consumption information, memory consumption information, network service end connection information, configuration element information, configuration parameter value information, reboot event information, crash event information, error event information, system health status information, system or application log event information, and successful event information.

According to different embodiments, a configuration element may correspond to one or more of the following: a system component or device, a package name, a package version, a package release, a container name, a container version, a virtual machine, a system attribute, a system characteristic, an operating system name, an operating system version, an operating system release, a configuration parameter or setting, a BIOS version, a driver name, a driver version, and/or a firmware version.

In at least one embodiment, the at least one configuration recommendation may include, but are not limited to, one or more of the following (or combinations thereof): a package change recommendation, a package version change recommendation, a code change recommendation, a system attribute change recommendation, a system characteristic change recommendation, a system configuration parameter change recommendation, a component version change recommendation, a container change recommendation, an operating system change recommendation, a component change recommendation, a virtual machine change recommendation, a version upgrade recommendation, and a version downgrade recommendation.

In at least some embodiments, the automated modification of at least one configuration element may include, but are not limited to, one or more of the following activities (or combinations thereof): change of system component, change of system component version, change of configuration setting or parameter, change of system package, change of system package version, change of system container, change of system container version, change of OS version, change of virtual machine, change of system configuration parameter, change of system attribute, change of system resource allocation, and/or change of system operational parameter.

According to different embodiments, various method(s), system(s) and/or computer program product(s) may be operable to cause at least one processor to execute instructions for causing at least one component of the computer network to automatically initiate a first conditional modification of a first configuration element at the first subscriber system if it is determined that specific threshold criteria has been satisfied for allowing the conditional modification of the first configuration element to proceed; automatically prevent initiation of a first conditional modification of a first configuration element at the first subscriber system if it is determined that specific threshold criteria has not been satisfied for allowing the conditional modification of the first configuration element to proceed.

According to different embodiments, the plurality of subscriber systems may further comprise a second subscriber system, and various method(s), system(s) and/or computer program product(s) may be operable to cause at least one processor to execute instructions for causing at least one component of the computer network to automatically initiate, based on the analysis of the crowdsourced telemetry information, a second set of activities relating to management of the second subscriber system, wherein the second set of activities includes at least one activity selected from a group consisting of: automatically and dynamically generating, based on the analysis of the crowdsourced telemetry information, second subscriber system reliability information, the second subscriber system reliability information identifying at least one configuration element of the second subscriber system which may cause reliability issues at the second subscriber system; automatically and dynamically generating, based on the analysis of the crowdsourced telemetry information, second subscriber system compatibility information, the second subscriber system compatibility information identifying at least one configuration element installed at the second subscriber system which may cause compatibility issues at the second subscriber system; automatically and dynamically generating, based on the analysis of the crowdsourced telemetry information, the second subscriber system vulnerability information identifying at least one configuration element installed at the second subscriber system which may cause vulnerability issues at the second subscriber system; automatically and dynamically generating, based on the analysis of the crowdsourced telemetry information, at least one configuration recommendation relating to a recommended modification of at least one configuration element at the second subscriber system; automatically and dynamically initiating, based on the analysis of the crowdsourced telemetry information, at least one modification of at least one configuration element at the second subscriber system; and/or automatically and dynamically preventing, based on the analysis of the crowdsourced telemetry information, initiation of at least one modification of at least one configuration element at the second subscriber system.

In some embodiments, at least a portion of the various DataGrid Technology aspects described herein may be implemented as a SaaS service combining crowdsourced server and vulnerability data with big-data analytics to provide visibility into server reliability, vulnerability and change confidence, such as, for example, confidence in the likelihood that server configuration changes may have a good outcome (e.g., before the contemplated changes are made/implemented).

Various features of the DataGrid Technology may also be configured or designed to provide functionality for identifying troublesome configurations, such as, for example, one or more of the following (or combinations thereof):

When a configuration has been previously determined or changed without recourse to the DataGrid service.

After this service has received new data impacting the confidence of a configuration such as new vulnerability data.

Data indicating the likelihood of stability or performance issues with a configuration which emerges from analysis of growing data sets of crowdsourced server information.

Etc.

One aspect disclosed herein introduces the concept of a DataGrid Reliability Index Score (DGRI Score) which, in one embodiment, may be implemented as a single number representing a statistical assessment of the confidence of a particular server configuration, or of a particular package. As used herein, the terms "server" and/or "system" may refer to a physical service, a virtual server, a Docker container, and/or other similar software execution environment(s)

In at least one embodiment, the DGRI Score may be implemented to be dynamic and predictive rather than forensic. For example, in one embodiment, the DGRI Score is programmatically calculated from a large, and growing, set of historical data crowdsourced from many servers. The determination of a DGRI Score may also be affected by other data sources such as publicly available package vulnerability data, package issue-tracking databases, and test results published for particular package versions. While other data sources aside from the crowdsourced server data which is collected by the DataGrid service may be useful for refining DGRI Scores, this data is not essential for implementing one or more of the various DataGrid aspects described herein.

Examined as a system, at least one embodiment of the DataGrid functionality may be implemented as components which are embodied with the DataGrid application, embodied with an individual server contributing crowdsourced data, and/or embodied elsewhere in the DataGrid System (e.g., typically integrating with different configuration management tools).

In some embodiments, the DataGrid Application may be implemented using a dedicated virtual private cloud and is deployed over a collection of virtual machines within this cloud. In one embodiment, the DataGrid Application may be configured or designed to expose an API (e.g., REST API) which may be used to feed configuration and signal data for servers belonging to different customer accounts to the application.

In some embodiments, configuration data may include, but are not limited to, one or more of the following (or combinations thereof):

Server identifiers such as the FQDN (Fully Qualified Domain Name).

Unique Machine IDs.

Operating system identifiers such as name and version.

Identifiers for each installed package such as name, version, release, architecture, vendor and dependencies.

And/or other types of configurable parameters/criteria.

In some embodiments, Signal Data may include indicators of server events such as, for example, one or more of the following (or combinations thereof):

Reboot.

Crash.

Log error.

Configuration rollback.

Online.

Offline.

And/or other types of signals or indicators.

In some embodiments, the DataGrid Application processes this data and stores it in a database, where, in general, configurations are associated with a timespan of operation of one or more servers and signals are associated to a particular time of the operation of a server or to the configuration associated to that server at that time. Some signals are interpreted to increase confidence in a given configuration (e.g., service going on-line), while other signals are interpreted to decrease confidence in the configuration (e.g., crash).

In some embodiments, the DataGrid Application also exposes a REST API which may be used to get information about servers, configurations and vulnerabilities pertaining to a particular customer account, including the DGRI Scores for configurations and other entities. The DataGrid Application periodically checks public feeds of CVE (Common Vulnerabilities and Exposures) data and package changelogs, and processes this data, storing it in a database and using it to associate vulnerabilities to packages and to configurations, thereby impacting the DGRI Score for configurations and packages. The DataGrid Application also includes an analytics engine which analyzes server, configuration, signal, and vulnerability data in order to determine the DGRI Scores for configurations or other entities such as packages. The DataGrid Application also includes a monitoring server which processes signals received in the form of email from monitoring systems.

In some embodiments, components of the DataGrid System which are embodied with an individual server contributing crowdsourced data may be referred to as "subscriber component(s)" or "DataGrid Subscriber component(s)". In some embodiments, the DataGrid Subscriber component(s) may include, but are not limited to, one or more of the following (or combinations thereof):

A command line utility for enabling local and/or remote users to query the DataGrid Application API to get information about servers, configurations and vulnerabilities pertaining to a particular account.

A program which sends configuration data to the application API.

A program which sends signal data to the application API.

A program which monitors the server system log and uses this information to send signals (e.g., crash) to the application API.

A graphical user interface dashboard for displaying at-a-glance information about systems. In one embodiment, the dashboard program is packaged in a Docker container for easy deployment within the customer's environment A program for sending various notifications when certain user-configured configuration and/or vulnerability criteria are met, prompting user intervention in modifying configurations, approving recommended changes or reviewing automatically applied changes; notifications may include e-mail, SMS, "chatops" systems such as IRC and Slack, web hooks for integrating with other applications, etc.

A plugin for a command-line package management utility such as yum. In one embodiment, this plugin intercepts configuration change operations before they are performed and queries the DataGrid Application API for the DGRI Score and other information relevant to the confidence of the proposed configuration changes. This information may be used, either by a user or programmatically, to determine whether or not to proceed with the proposed configuration changes.

Etc.

In some embodiments, components of the DataGrid System which are embodied with configuration management tools may include, but are not limited to, one or more of the following (or combinations thereof):

A command line utility for querying the DataGrid Application API to get information about servers, configurations and vulnerabilities pertaining to one or more specified accounts(s).

Plugins, modules or other software+hardware component(s), such as Ansible modules and playbooks, which enable the configuration management tool to perform operations particular to or related to the DataGrid System. For example, in one embodiment, the DataGrid Ansible playbooks may be used to cause configuration data or signals to be sent to the DataGrid API for a group of servers being managed with Ansible, or to get the DGRI Score for servers, or to install or uninstall packages on servers (e.g., based on the resulting DGRI Score).

While one aspect of the DataGrid Technology is directed at improving the confidence in and outcome of server configuration changes, the methods described herein relating to crowdsourcing server configuration data and server event signals, and using this data to perform analyses of packages and configurations (e.g., including predictive analyses of server configuration changes), may readily be extended to include many other kinds of crowdsourced server metrics such as, for example, one or more of the following (or combinations thereof):

Resource usage(s).

Operational load(s) (e.g., CPU, disk and network load).

Bios version(s).

Chipset(s).

Kernel or driver compatibilities and performance(s).

Virtualization driver(s).

Etc.

At least a portion of this data may be analyzed not only to provide insight into the confidence of configurations and proposed configuration changes, but also to propose changes, whether in server configuration or resource allocation or any other characteristic of server composition or functioning. In this way the DataGrid System facilitates automation of such changes.

As more and more systems in our lives become controlled by connected computers and these computers use complex, componentized software configurations, in one embodiment, the DataGrid technology can be applied to networked systems beyond servers, including but not limited to:

Desktop, laptop, tablet computers.

Mobile devices, such as smartphones and phablets.

Person-area networks and wearable devices, such as smartwatches, virtual reality and augmented reality headsets and augmented human sense devices.

Network routers, switches, firewalls, load balancers, storage area networks/network-attached storage and other IT appliances.

Medical devices such as remote surgery robots and implanted computers.

Embedded systems such as Automated Teller Machines and kiosks.

Connected devices such as various Internet-of-Things devices, like water pumps, lighting systems, smart home appliances (e.g., refrigerators, washing machines, etc.), physical security monitoring and intrusion-detection systems (such as home or industrial security).

Industrial or factory machinery, such as heating, ventilation and air conditioning systems (HVAC), computer numerical control (CNC) mills and lathes.

Connected computer-controlled components in transportation systems, such as cars, airplanes, ships, space stations, as well as transportation infrastructure such as road barriers, traffic lights, toll booths, control towers, etc.

Manufacturing and/or home assistance robot devices.

Etc.

Additional objects, features and advantages of the various aspects described herein will become apparent from the following description of its preferred embodiments, which description should be taken in conjunction with the accompanying drawings.

DETAILED DESCRIPTION

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) is described with reference to one or more particular embodiments or Figures that form a part of the present disclosure, and in which are shown, by way of illustration, specific embodiments of one or more of the invention(s). It should be understood, however, that such features are not limited to usage in the one or more particular embodiments or Figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s). Further, although process steps, method steps, algorithms or the like is described in a sequential order, such processes, methods and algorithms is configured to work in alternate orders. In other words, any sequence or order of steps that is described in this patent application does not, in and of itself, indicate a requirement that the steps be performed in that order. The steps of described processes may be performed in any order practical. Further, some steps is performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) is used in place of a single device/article. Similarly, where more than one device or article is described (whether or not they cooperate), it will be readily apparent that a single device/article is used in place of the more than one device or article. The functionality and/or the features of a device is alternatively embodied by one or more other devices that are not explicitly described as having such functionality/features. Thus, other embodiments of one or more of the invention(s) need not include the device itself.

Techniques and mechanisms described herein will sometimes be described in singular form for clarity. However, it should be noted that particular embodiments include multiple iterations of a technique or multiple instantiations of a mechanism unless noted otherwise.

Almost all modern enterprise makes use of physical or virtual computer servers. Wherever these servers may be located they need to be managed. An important aspect of this management includes server configuration management, including the management of changes to the operating system kernel and software packages. For example, a modern Linux operating system may include several thousand packages. These packages may be changed individually in accord with their dependencies, or in groups, or as part of a major change to the operating system. These changes may include installation, configuration, upgrading to newer versions, downgrading to older versions, or removal. Existing configuration management tools such as Chef, Puppet and Ansible are often used to control, streamline and automate the configuration and maintenance of groups of servers. However, as described in greater detail herein, currently existing server configuration management tools have significant limitations. Moreover, using currently existing server configuration management tools, server configuration changes can often be a troublesome undertaking with unforeseen and potentially significant consequences. This is further exacerbated by the fact that organizations with substantial numbers of servers often make tens of thousands of such changes each month.

Server configuration changes may significantly impact the functioning of operating systems or applications. The business impact of such changes on production systems may be significant. Configuration changes may impair or break essential functionality, or introduce security vulnerabilities, or introduce problems difficult to diagnose or even reproduce, or which may not become evident until some while after their introduction. There is often little visibility into the impact of such changes beforehand. In order to improve the likelihood of a good outcome, it is desirable to provide server management and configuration services which include features and/or functionality such as, for example, one or more of the following (or combinations thereof):

Functionality for accessing technical resources such as kernel and package release notes or websites which discuss server management or discuss particular packages or operating systems and their potential defects, vulnerabilities and limitations, individually or in combination.

Functionality for accessing the advice of experts who have relevant experience and expertise, including through online forums and email lists.

Functionality for testing such changes before deployment to production systems.

Functionality for using configuration management tools to obtain consistent results and provide for managed rollbacks.

Functionality for using monitoring tools such as Nagios or Ganglia to monitor resources and performance of servers, networks, applications and services. These tools may improve visibility into the impact of server configuration changes after such changes have been made.

Functionality for limiting configuration changes to a set of known "good" configurations which have been carefully vetted.

Functionality for limiting the frequency of configuration changes.

Functionality for using configuration management databases to track the composition, change in composition and relationship among information system resources, including server configurations.

Etc.

FIG. 1 illustrates an example embodiment of a server system 80 which may be used for implementing various aspects/features described herein. In at least one embodiment, the server system 80 includes at least one network device 60, and at least one storage device 70 (such as, for example, a direct attached storage device). In one embodiment, server system 80 may be suitable for implementing at least some of the DataGrid techniques described herein.

In according to one embodiment, network device 60 may include a master central processing unit (CPU) 62, interfaces 68, and one or more interconnects/busses (e.g., PCI or PCI Express bus 59, system interconnect(s) 67 (e.g., AMD's HyperTransport, Intel's QuickPath Interconnect)). When acting under the control of appropriate software or firmware, the CPU 62 may be responsible for implementing specific functions associated with the functions of a desired network device. For example, when configured as a server, the CPU 62 may be responsible for analyzing packets; encapsulating packets; forwarding packets to appropriate network devices; instantiating various types of virtual machines, virtual interfaces, virtual storage volumes, virtual appliances; etc. The CPU 62 preferably accomplishes at least a portion of these functions under the control of software including an operating system (e.g. Linux), and any appropriate system software (such as, for example, AppLogic™ software).

CPU 62 may include one or more processors 63 such as, for example, one or more processors from the AMD, Motorola, Intel, ARM and/or MIPS families of microprocessors. In an alternative embodiment, processor 63 may be specially designed hardware for controlling the operations of server system 80. In a specific embodiment, a memory 61 (such as non-volatile RAM and/or ROM) also forms part of CPU 62. However, there may be many different ways in which memory could be coupled to the system. Memory block 61 may be used for a variety of purposes such as, for example, caching and/or storing data, programming instructions, etc.

The interfaces 68 may be typically provided as interface cards (sometimes referred to as "line cards"). Alternatively, one or more of the interfaces 68 may be provided as on-board interface controllers built into the system motherboard. Generally, they control the sending and receiving of data packets over the network and sometimes support other peripherals used with the server system 80. Among the interfaces that may be provided may be FibreChannel interfaces, Ethernet interfaces, frame relay interfaces, cable interfaces, DSL interfaces, token ring interfaces, Infiniband interfaces, and the like. In addition, various very high-speed interfaces may be provided, such as Gigabit and 10 Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

In at least one embodiment, some interfaces may be configured or designed to allow the server system 80 to communicate with other network devices associated with various local area network (LANs) and/or wide area networks (WANs). Other interfaces may be configured or designed to allow network device 60 to communicate with one or more direct attached storage device(s) 70.

Although the system shown in FIG. 1 illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 65, which, for example, may include random access memory (RAM)) configured to store data, program instructions for the general-purpose network operations and/or other information relating to the functionality of the various DataGrid techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Generally, the DataGrid techniques described herein may be implemented on software and/or hardware. For example, they can be implemented in an operating system kernel, in a separate user process, in a library package bound into network applications, on a specially constructed machine, over a utility computing grid, on a network interface card, etc. In a specific embodiment of this invention, the technique described herein may be implemented in software such as an operating system or in an application running on an operating system.

A software or software/hardware hybrid implementation of various DataGrid related techniques may be implemented on a general-purpose programmable machine selectively activated or reconfigured by a computer program stored in memory. Such programmable machine may be a network device designed to handle network traffic, such as, for example, a router, a switch and/or a server. Such network devices may have multiple network interfaces including frame relay and ISDN interfaces, for example A general architecture for some of these devices will appear from the description given below. In other embodiments, some DataGrid techniques described herein may be implemented on a general-purpose network host machine such as a personal computer, server, or workstation. Further, at least one embodiment may be at least partially implemented on a card (e.g., an interface card) for a network device or a general-purpose computing device.

Figure 2:
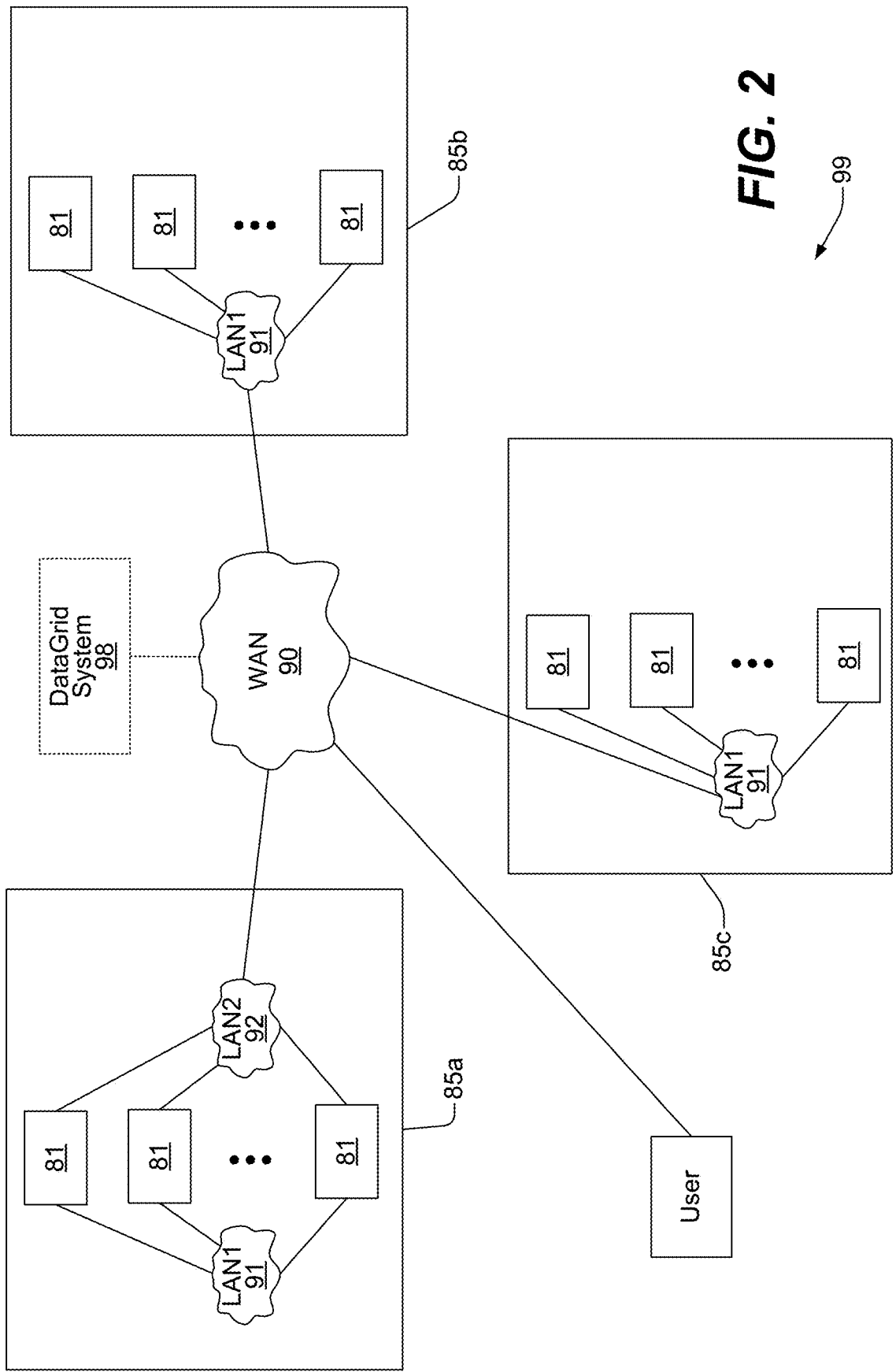
FIG. 2 shows an example embodiment of a global network portion 99 which may be used for implementing various aspects described herein.

FIG. 2 shows an example embodiment of a global network portion 99 which may be used for implementing various aspects described herein. As illustrated in the example of FIG. 2, global network portion 99 may include a plurality of different data centers (e.g., 85a-c) which, for example, may reside at different physical and/or geographic locations. For example, in one embodiment, data center 85a may be located in the United States, data center 85b may be located in Europe, and data center 85c may be located in Asia. In at least one embodiment, each of the different data centers may be communicatively coupled to each other via a wide area network (e.g., WAN 90) such as, for example, the Internet or world wide web.

In at least one embodiment, each data center may include a respective plurality of server systems 81 (herein "servers") which may be communicatively coupled together via one or more local area networks (e.g., LAN1 91 and/or LAN2 92). In at least one embodiment, at least a portion of the data center servers may include at least a portion of features and/or components similar server system 80 of FIG. 1.

According to specific embodiments, at least some of the data centers may include several different types of local area networks (e.g., LANs 91, 92) such as, for example, a backbone LAN which may be utilized for providing localized communication between various local network elements within a given data center, an internet LAN which, for example, may be utilized for providing WAN or Internet access to various local network elements within the data center.

In at least one embodiment, one or more of the data centers may be operable to host a variety of different types of system applications and/or other software. Examples of such applications may include, but are not limited to, one or more of the following (or combinations thereof):
  Website applications/software (e.g., applications/software use for implementing portions of a website such as, for example, www.uspto.gov, youtube.com, etc.);
  Web-based applications/services (such as, for example, those provided by Mircosoft® Office Online, office-.microsoft.com, Google's search, Salesforce.com, etc.);
  Web-based application services (such as, for example, Amazon's S3 storage service or Google's adwords);
  General purpose business applications (such as, for example, Oracle, SAP, enterprise resource planning, customer relationship management, payroll, accounting, human resources, logistics, stock trading such as www.schwab.com, etc.);
  Communications applications (such as, for example, Asterisk or Skype);
  Video on-demand applications;
  High-performance-computing applications;
  Online gaming systems (such as, for example, Blizzard's World of Warcraft);
  Online desktops;
  Network services, such as, for example, the Domain Name Service, proxy servers, e-mail filters, e-mail servers, etc.;
  Video-conferencing services (such as, for example, Cisco's WebEx);
  Service-oriented architecture and XML web service components (such as, for example, the Aivea eShip Web Service at www.aivea.com/eshipinfo.htm, and/or the GeoIP lookup service at www.hostip.info/use.html)
  E-commerce applications such (such as, for example, Amazon.com, e-Bay and Apple iTunes)
  Parallel computation applications (such as, for example, applications based on MPI interface or MapReduce interfaces like Hadoop);
  Data mining applications (such as, for example, customer loyalty databases, mapping software; video, image and sound processing and conversion);
  In-the-cloud services (like Google's MapReduce);
  Content delivery networks, including but not limited to applications that provide distributed content by caching or other methods closer to the consumer;
  DataGrid Component(s)/Application(s) providing functionality for monitoring and acquiring various types of information from the data center system(s)/component(s), and for reporting/providing at least a portion of the acquired information to the DataGrid System 98. For example, in at least one embodiment, one or more DataGrid Component(s)/Application(s) may include DataGrid Subscriber component(s) configured or designed to provide functionality for monitoring and acquiring various types of information from the data center system(s)/component(s) such as, for example, one or more of the following (or combinations thereof):
  Configuration data.
  Signal data.
  Operating information about data center servers, configurations and vulnerabilities.
  Token Map Repository information.
  Customer account information, at least a portion of which may be anonymized.
  Etc.
  Etc.

Additionally, in at least one embodiment, one or more of the data centers may be operable to provide various types of database services such as, for example, data storage, database queries, data access, etc.

Additionally, by utilizing virtualization software, one or more of the servers of a given data center may be implemented as a server grid which may be operable to enable utility computing for distributed applications. Additionally, in at least one embodiment, multiple server grids from different data centers may be linked together to form a virtual global server grid which may be used to facilitate utility computing for distributed applications.

In at least one embodiment, a distributed application may be characterize as an application made up of distinct components (e.g., virtual appliances, virtual machines, virtual interfaces, virtual volumes, virtual network connections, etc.) in separate runtime environments. In at least one embodiment, different ones of the distinct components of the distributed application may be hosted or deployed on different platforms (e.g., different servers) connected via a network. In some embodiments, a distributed application may be characterize as an application that runs on two or more networked computers.

In the example of FIG. 2, users (e.g., at subscriber systems and/or other network devices) may be able to access one or more of the data centers (and/or associated data center application(s)/server(s)) via the WAN 90. Additionally, as explained in greater detail below, one or more of the data centers may include hardware/software for implementing a DataGrid System 98 which may be used to provide users and/or data centers with various types of different functionalities. In at least one embodiment, the global network 99 may be collectively referred to as a DataGrid network.

In at least one embodiment, one aspect of the various DataGrid techniques described herein may be directed to a cloud-based computing service. For example, in one embodiment, one or more DataGrid-related services may be implemented as a global service which, for example, may be operable to provide computing resources to users according to various pricing models (such as, for example, subscription model, pay-as-you-go model, etc.). In one embodiment, the service(s) may be operated by a business entity, and the computing resources may be provided by the business entity's hosting partners or other service subscribers.

Example Embodiments of DataGrid System Architecture(s)

Figure 3:
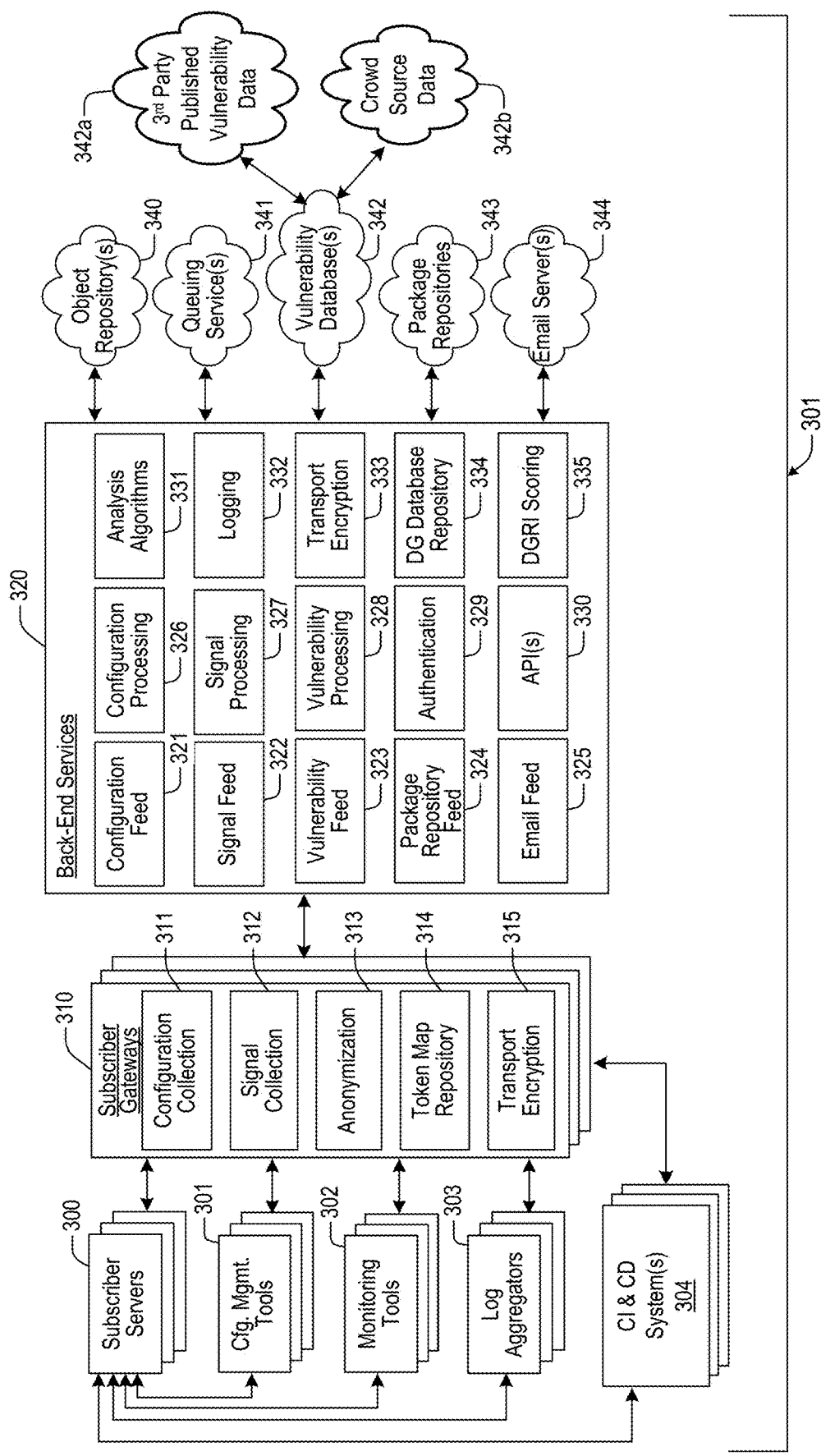
FIG. 3 shows an example embodiment of a DataGrid System 301 which may be configured or designed to implement various DataGrid techniques described herein.

FIG. 3 shows an example embodiment of a DataGrid System 301 which may be configured or designed to implement various DataGrid techniques described herein. For the purposes of illustration, various components illustrated in the DataGrid System of FIG. 3 may include, but are not limited to, one or more of the following (or combinations thereof):

- Subscriber Servers: The Subscriber Servers 300 may be configured or designed to include functionality for sending configuration and signal data to the Subscriber Gateways 310 and for querying the API 330 to get information about servers, configurations and vulnerabilities pertaining to a particular account.
- Configuration Management Tools: Components of the DataGrid System embodied with Configuration Management Tools 301 may be configured or designed to include functionality for: querying the API 330 to get information about servers, configurations and vulnerabilities pertaining to a particular account; causing Subscriber Servers 300 to send configuration or signal data to the Subscriber Gateways 310; installing or uninstalling packages on Subscriber Servers 300.
- Monitoring Tools: Monitoring Tools 302 may be configured or designed to include functionality for sending email notification of service availability events (e.g., offline or online) to the application Email Server 344, and for sending signals directly to the Subscriber Gateways 310 (e.g., using webhooks or API calls).
- Log Aggregators: Components of the DataGrid System embodied with log aggregators 303 may be configured or designed to include functionality for sending signal data to the Subscriber Gateways 310.
- Subscriber Gateways: The Subscriber Gateways 310 provide interface to the DataGrid service. As shown in the example of FIG. 3, the Subscriber Gateways 310 functionality comprises Configuration Collection 311, Signal Collection 312, Anonymization 313, tokenization (see Token Map Repository 314), and Transport Encryption 315. Each instance of a subscriber gateway provides interface for a different set of customer accounts (e.g., all servers associated to a particular account communicate with the same subscriber gateway instance, whereas all subscriber gateway instances communicate with the same back-end services); in some embodiments, one or more Subscriber Gateways may be shared by multiple customer accounts.
- Configuration Collection: Configuration Collection 311 may be configured or designed to include functionality for collecting configuration data from Subscriber Servers 300, which data is anonymized (see Anonymization 313) before it is sent (see Transport Encryption 315) to the Back-end Services 320. In some embodiments, the Configuration Collection 311 may be configured or designed to include functionality for receiving configuration information sent spontaneously by the Subscriber Servers 300
- Signal Collection: Signal Collection 312 may be configured or designed to include functionality for collecting signal data from Subscriber Servers 300, which data is anonymized (see Anonymization 313) before it is sent (see Transport Encryption 315) to the Back-end Services 320. The Signal Collection 312 may also be configured to receive signals from the Monitoring Tools 302, Configuration Management Tools 301, Log Aggregators 303 and other customer systems that may have information about the Subscriber Servers 300.
- Anonymization: Anonymization 313 may be configured or designed to include functionality for anonymizing collected configuration and signal data using a per-account token dictionary (see Token Map Repository 314). In some embodiments, the Anonymization 313 may use encryption (e.g., symmetric cypher) to create reversible tokens and not use Token Map Repository 314
- Token Map Repository: The Token Map Repository 314 may be configured or designed to include functionality for tokenization of sensitive data (e.g., in collected configurations and signals).
- Transport Encryption: Transport Encryption 315 may be configured or designed to include functionality for encryption of data being passed over a network (e.g., flowing between the Subscriber Gateways 310 and the Back-end Services 320, Subscriber Servers 300, Configuration Management Tools 301, Monitoring Tools 302, or Log Aggregators 303).
- Back-end Services: The Back-end Services 320 provides back-end services to the DataGrid System. As shown in the example of FIG. 3, the Back-end Services 320 comprises that functionality provided by components 321-335. In some embodiments, the Back-end Services 320 may further comprise the components 340, 341, 342, 343 and/or 344.
- Configuration Feed: Configuration Feed 321 may be configured or designed to include functionality for receiving configuration data from the Subscriber Gateways 310 (and/or the Subscriber Servers 300 directly) and storing this data in the Object Repository 340. In some embodiments, the Configuration Feed 321 may further receive configuration data directly from the Subscriber Servers 300, the Configuration Management Tools 301 and/or other systems with purview of the configuration of the Subscriber Servers 300.

Signal Feed: Signal Feed 322 may be configured or designed to include functionality for receiving signal data from the Subscriber Gateways 310 and storing this data in the Object Repository 340. In some embodiments, the Signal Feed 322 may further receive signal data directly from the Subscriber Servers 300, the Configuration Management Tools 301 and/or other systems with purview of the configuration of the Subscriber Servers 300.

Vulnerability Feed: Vulnerability Feed 323 may be configured or designed to include functionality for retrieving vulnerability data (e.g., in the form of CVE (Common Vulnerabilities and Exposures) identifiers and metrics) from the Vulnerability Database 342 (e.g., the NIST (National Institute of Standards and Technology) NVD (National Vulnerability Database) CVE feed), and storing this data in the DG Database Repository 334. According to different embodiments, vulnerability data may be obtained from various sources, including, for example: $3^{rd}$ party Published Vulnerability Data 342$a$ (e.g., vendor-provided vulnerability data), Crowd Sourced Data 342$b$, and/or other data sources.

Package Repository Feed: Package Repository Feed 324 may be configured or designed to include functionality for retrieving software package data (e.g., package change logs) from Package Repositories 343 (e.g., any of publically available software package repositories), processing this data (e.g., to extract the list of fixed CVEs for a package), and storing this data in the DG Database Repository 334.

Email Feed: Email Feed 325 may be configured or designed to include functionality for retrieving email messages from the Email Server 344, processing these messages (e.g., to construct signal data), and for feeding signals to the Subscriber Gateways 310.

Configuration Processing: Configuration Processing 326 may be configured or designed to include functionality for polling events from the Queuing Service 341, retrieving the configuration object associated to the event from the Object Repository 340, processing the object to construct one or more records or documents, and storing these records or documents in the DG Database Repository 334. In some embodiments, the Configuration Processing 326 may additionally trigger the Analysis Algorithms 331 to process the newly arrived configuration data in addition to the data already in the DG Database Repository 334

Signal Processing: Signal Processing 327 may be configured or designed to include functionality for polling events from the Queuing Service 341, retrieving the signal object associated to the event from the Object Repository 340, processing the object to construct one or more records or documents, and storing these records or documents in the DG Database Repository 334. In some embodiments, the Signal Processing 327 may additionally trigger the Analysis Algorithms 331 to process the newly arrived signal data in addition to the data already in the DG Database Repository 334

Vulnerability Processing: Vulnerability Processing 328 may be configured or designed to include functionality for processing new or changed vulnerability data (e.g., stored in the DG Database Repository 334 by Vulnerability Feed 323 or Package Repository Feed 324), and for updating the association of vulnerabilities to packages or vulnerabilities to configurations which is stored in the DG Database Repository 334. In some embodiments, the Vulnerability Processing 328 may additionally trigger the Analysis Algorithms 331 to process the newly arrived vulnerability data in addition to the data already in the DG Database Repository 334

Authentication: Authentication 329 may be configured or designed to include functionality for authenticating (e.g., using per-account basic authentication) requests sent by the Subscriber Gateways 310 to the Back-end Service 320.

API: API 330 provides programmatic access to DataGrid services (e.g., to service a request for information about servers, configurations, signals or vulnerabilities pertaining to a customer account which has been received from the Subscriber Gateways 310).

Analysis Algorithms: Any of various analysis algorithms (see Analysis Algorithms 331) may be configured or designed to include functionality for analyzing data read from the DG Database Repository 334 (e.g., data related to configurations, signals, packages, vulnerabilities, servers, etc.) in order to assess the performance, reliability, security, operation, functionality, capability, maintainability, stability, or utility of systems or their operating systems or applications or services.

Logging: Logging 332 provides message and event logging services to Back-end Services 320.

Transport Encryption: Transport Encryption 333 may be configured or designed to include functionality for encryption of data being passed over a network (e.g., flowing between Back-end Services 320 and the Subscriber Gateways 310, Object Repository 340, Queuing Service 341, Vulnerability Database 342, Package Repositories 343, Email Server 344, Subscriber Servers 300, Configuration Management Tools 301, Monitoring Tools 302, Log Aggregators 303, or CI & CD Systems 304).

Database Repository: DG Database Repository 334 (e.g., mongodb, couchdb, and/or MySQL) may be configured or designed to include functionality for storing organized collections of data for Back-end Services 320. In some embodiments, the DG Database Repository 334 may be provided as a service (e.g., the Amazon DynamoDB service).

DGRI Scoring: DGRI Scoring 335 may be configured or designed to include functionality for assigning DGRI Scores to entities (e.g., a package, or a configuration, or any data known to or constructed by the DataGrid System which represents or contributes to the representation of systems or their operating systems or applications or services) or collections of entities. In some embodiments, the DGRI Scoring 335 component may assign and provide scores and evaluations other than the DGRI Scores, for example, popularity rank, change success probability, vulnerability score, reliability score, compatibility score, etc.

Object Repository: Object Repository 340 (e.g., Amazon S3) may be configured or designed to include functionality for storing objects (e.g., configuration and signal data fed to Configuration Feed 321 or Signal Feed 322) for Back-end Services 320. In some embodiments, the Object Repository 340 may be provided by a data store that is part of the Back-end Services 320 (e.g., the DG Database Repository 334).

Queuing Service: Queuing Service 341 (e.g., Amazon SQS) provides queueing services to the Back-end Services 320 (e.g., Queuing Service 341 may be configured to subscribe to new objects stored in Object Repository 340, so that an event is automatically posted to a queue whenever an object is stored). In some embodiments, the Queuing Service 341 may be provided by the Back-end Services 320, using software such as RabbitMQ, Reddis, etc.

Vulnerability Database: Vulnerability Database 342 provides publicly accessible vulnerability data (e.g., CVE identifiers and metrics) to the Vulnerability Feed 323. In some embodiments, the Vulnerability Feed 323 may access directly the Vulnerability Database 342, the 3$^{rd}$ Party Published Vulnerability Data 342a, the Crowd Source Data 342b and/or other publicly or privately accessible vulnerability data feeds.

Package Repositories: Any of publicly accessible package repositories (see Package Repositories 343) provide publicly accessible software package data (e.g., package change logs) to the Package Repository Feed 324. In some embodiments, the Package Repositories may include some privately accessible package repositories (e.g., ones requiring subscriptions for access).

Email Server: Email Server 344 may be configured or designed to include functionality for receiving and storing emails (e.g., indicating a change in the availability state of a service) sent from Monitoring Tools 302. In some embodiments, the Email Server 344 may further receive e-mails from other sources, including the Log Aggregators 303, CI & CD Systems 304 or other systems with purview over the operation of the Subscriber Servers 300, as well as from systems related to the Vulnerability Databases 342, 342a, 342b, and Package Repositories 343.

Continuous Integration (CI) and Continuous Delivery (CD) Systems 304: In the field of software engineering, continuous integration (CI) is the practice of merging all developer working copies to a shared mainline on a frequent basis (e.g., several times a day) and performing automated testing. Continuous delivery (CD) is a software engineering approach in which teams produce software in short cycles, ensuring that the software can be reliably released at any time, as well as performing automated releases. It aims at building, testing, and releasing software faster and more frequently. The approach helps reduce the cost, time, and risk of delivering changes by allowing for more incremental updates to applications in production. In some embodiments, the CI & CD Systems 304 use the APIs 330 (directly, or indirectly, through webhooks) to determine if new test or release is needed and/or to obtain configuration recommendations, evaluations and/or DGRI scores. In some embodiments, the CI & CD systems 304 provide configuration and/or signal feeds to the Subscriber Gateways 310 and/or directly to the Back-end Services 320

Figure 4:
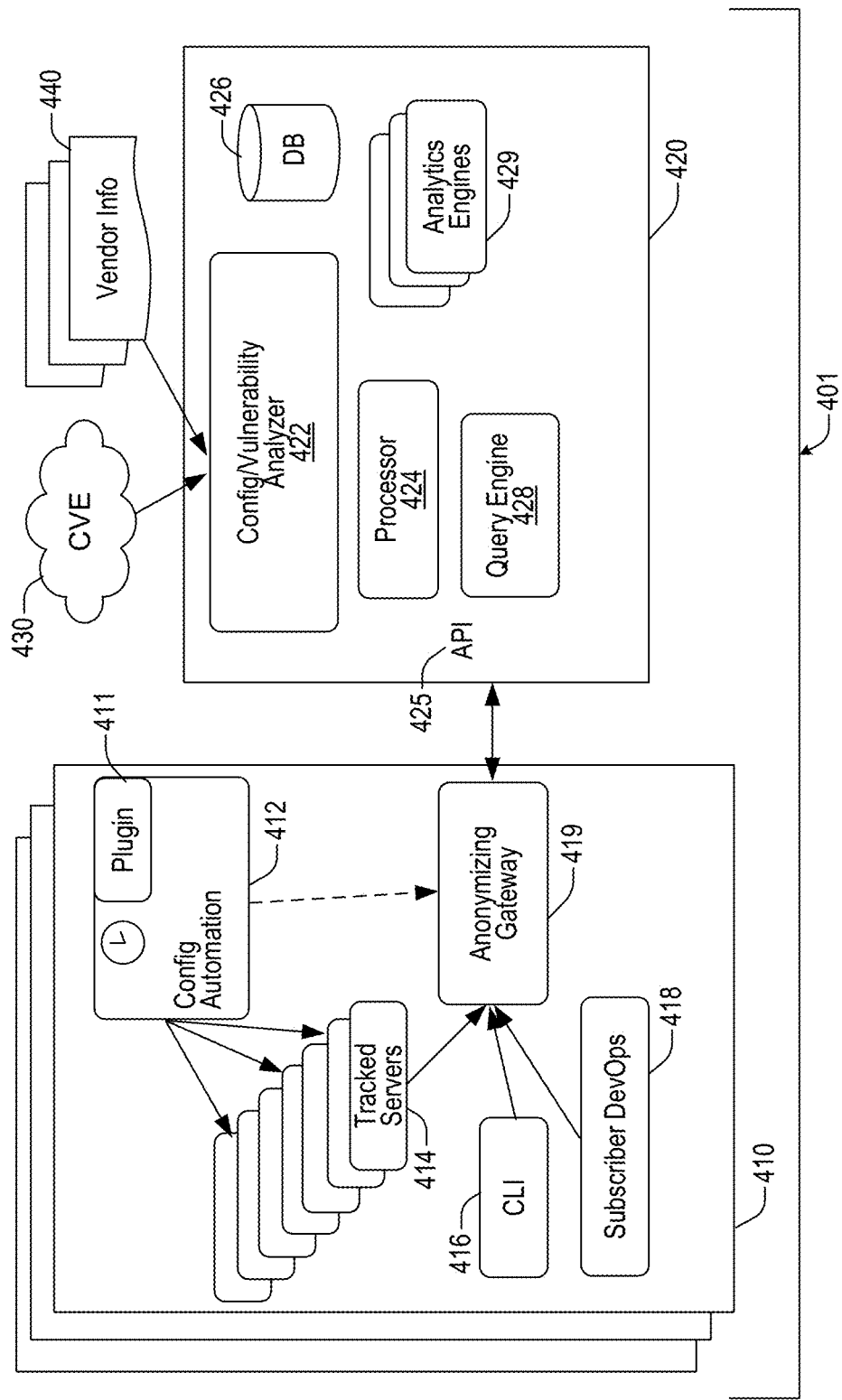
FIG. 4 shows an alternate example embodiment of a DataGrid System 401 which may be configured or designed to implement various aspects of DataGrid technology described herein.

FIG. 4 shows an alternate example embodiment of a DataGrid System 401 which may be configured or designed to implement various aspects of DataGrid technology described herein. As illustrated in the example embodiment of FIG. 4, components/systems illustrated in the DataGrid System of FIG. 4 may include, but are not limited to, one or more of the following system(s), component(s), etc. (or combinations thereof):

DataGrid Analytics Service 420. According to different embodiments, the DataGrid Analytics Service may be configured or designed to include functionality and/or component(s) for implementing various DataGrid techniques such as, for example, one or more of those performed by the Back-end Services System 320 of FIG. 3. For example, as illustrated in the example embodiment of FIG. 4, the DataGrid Analytics Service may be configured or designed to implement various DataGrid techniques, including those provided by components 422-429, which, for example, may include, but are not limited to, one or more of the following (or combinations thereof):

API Service 425, which, for example, may be configured or designed to:
  Provide interface(s) for exchanging data between the subscriber environments 410 (e.g., Tracked Servers 414, directly or indirectly, Anonymizing Gateway 419, CLI 416, DevOps systems 418, Config Automation 412, Plugin 411 and/or Subscriber).
  Example Input Data: request from the subscriber environment; telemetry data and even reports.
  Example Output Data: query responses (see, e.g., CLI examples).
  Example Triggering Events: Continuously and/or periodically in use between subscriber environments and the DataGrid back-end.
  Who it talks to:
    On the subscriber side: Tracked Servers, Config Automation, Plugin, Anonymizing Gateway, CLI, subscriber DevOps or other systems that invoke the API directly (or through an SDK/library).
    On the back-end side: all other systems that provide information that is submitted from or returned to the subscriber environment, primarily the DB database, Processor, Query engine, Config/Vuln Analyzer.
  Example use cases:
    Submit telemetry data from subscriber environment to the back-end service for storing and analysis.
    Execute a query (see, e.g., CLI examples).
    Perform custom query or operations instructed by the DevOps systems.

Processor 424 may be configured or designed to:
  Receive telemetry data about subscriber server configuration(s) and event(s), record this information in the DB database and trigger analysis and updates if needed.
  Example Input Data: telemetry data, primarily configurations and events from the Tracked Servers
  Example Output Data: stored data in the DB database and triggered re-evaluation/analysis or notification to subscribers via the API.
  Example Triggering conditions: Continuously and/or periodically in use; primarily used for telemetry collection, not dissemination of results.
  Who it talks to: Tracked Servers (indirectly via API), DG Database, Analytics Engines, etc.
  Example use cases:
    Record new system configuration from Server XYZ, trigger analysis if signification/interesting changes found
    Record reported telemetry event(s) (signals) for Server XYZ (directly or through a monitoring system) indicating that the application on the server is working well (or not); may trigger score improvement or degradation.

Query Engine 428 (e.g., back-end service) may be configured or designed to:

Execute queries received, perform data filtering and aggregation, as well as pagination and notifications of changes Example Input Data: subscriber queries (see, e.g., API, CLI)

Example Output Data: query results (see, e.g., API, CLI)

Example Triggering conditions: always used, primarily to return data, either about individual systems or aggregate (e.g., score)

Who it talks to: subscriber systems (Config Automation/Plugin, CLI, subscriber DevOps and other subscriber operations monitoring and automation systems), DG Database, Configu/Vuln Analyzer Example use cases: (see, e.g., CLI query use cases)

DG Database 426 may be configured or designed to:

Stores telemetry data, analysis results, subscriber information

Example Input Data: telemetry data, configurations, signals, package data, vulnerability data, analysis data, subscriber subscription info, subscriber account information Example Output Data: same as the Example Input Data Example Triggering Events: Continuously and/or periodically in use, storage for the telemetry data and analysis data (both intermediate and finalized results)

Who it talks to: it is a passive element, may submit notifications to other systems such as the analytics engines, query engine when data changes or new data is available Example use case:
Store received telemetry information about Tracked Servers
Retrieve intermediate analytics data/state to facilitate further computations/machine learning
Retrieve configuration information about a queried server Config/Vulnerability Analyzer 422 may be configured or designed to:

Extract vulnerability and configuration quality (reliability) information from external sources (as opposed to telemetry collected from the subscriber systems 410; machine parse data (e.g., API, screen-scraping, etc.); compile data from multiple sources to achieve more complete/reliable information Analyze configurations collected from the Tracked Servers and provide information/score based on the information compiled from external sources Example Input data: external sources, telemetry data/configurations Example Output data: list of vulnerabilities, affected and available packages, vulnerability, reliability and other scores Example Triggering events: used to evaluate systems against data from external sources to complement data from internal modeling and analytics engines Who it talks to: external sources, DG Database; may trigger additional analytics engines and/or notifications to the subscriber via the API Example use cases:
Parse Red Hat-provided vulnerability database to identify packages and specific versions/releases that are vulnerable vs. those that have patches for these vulnerabilities
Parse glibc test coverage and results status page to determine whether installed versions may expect failures to known bugs/regression problems
Compare installed packages/versions and configurations against the compiled data from external source and report which issues affect a particular system (or group of systems)
Recommend which versions/configuration can be used to improve performance and security, based on data from external sources Analytics Engines 429 may be configured or designed to:

Analyze data collected from different subscribers' Tracked Servers, both configuration and event/monitoring data, to determine configurations that are more frequently used (or indicate they are rare/unusual), create models for reliability prediction and configuration recommendations, based on the totality of the telemetry received, specifically using information collected from one subscriber (or many subscribers) to provide predictions/value for a different subscriber. In some embodiments, the Analytics Engines use machine learning techniques to create models based on the telemetry data (configurations, signals and/or known outcomes) and evaluate configurations using these models, provide recommendations in configuration changes and perform operations affecting the Tracked Servers 414. In some embodiments, the Analytics Engines use artificial intelligence techniques to provide recommendations and perform operations affecting the Tracked Servers 414.

Example Input data: telemetry data, vulnerability/configuration data from external sources, events, queries, decisions made by subscriber to accept or reject prior recommendations, outcome information following subscriber's accepting prior recommendations Example Output data: score, reliability and compatibility predictions (e.g., probability for success/failure), mean time between failures (MTBF) prediction, popularity, rank and trending info, recommendations for configurations and packages/version to use for improved operations Example Triggering events: request for recommendation, telemetry data received, received adverse information (e.g., package version being superseded or rolled back, downtime/crash reports, etc.)

Who it talks to: primarily DG Database to retrieve telemetry data (e.g., configs and events), may use data from the config/vuneraiblity analyzer (e.g., external sourced data), may receive signals directly from the Processor; may send notifications/trigger further analysis or trigger notifications to subscriber about newly discovered or changed characteristics Example use cases:
Model reliability of different software packages and configurations based on specific versions in use; based on positive (e.g., uptime) and negative signals (e.g., crashes, rollbacks, etc.), across large population of configurations, identify specific software packages, versions and configuration/operations parameters that likely cause reliability problems and lower their score Model compatibility of packages, either on the same system or across subscriber-server (or multi-point) connections, based on configurations found and positive/negative signals from differing configurations, identify particular combinations of packages/versions and configuration/operations parameters that work well together (or don't work together), make recommendations for best combinations Tracked servers 414 (e.g., subscriber-provided). In at least some embodiments, these are subscriber systems, which can be any computing system, including physical server, virtual machine, Docker or similar container, as well as hardware appliance (SAN/NAS, router, switch, load balancer, etc.) or mobile device, laptop, desktop, or even any computer-controlled device such as CNC lathe, environment conditioning, robots, etc. According to different embodiments, the servers may directly (e.g., via installed DataGrid Subscriber component(s)) or indirectly (e.g., through the Config Automation system or similar) send telemetry data/event(s) to DataGrid service, including OS info, installed software packages and their versions, configuration parameters, network connections and services provided and used, CPU/memory/network metrics, etc. In some embodiments, DataGrid Subscriber components may be installed on the Tracked Servers 414 and send configuration and/or signal telemetry data to the Anonymizing Gateway 419 or directly to the API 425.

Config automation tools/systems 412 (e.g., subscriber-provided, optional). In at least one embodiment, this is a system and/or toolkit for automatic configuration management, such as Chef, Puppet, Ansible, Salt Stack, Microsoft System Center, etc. Its role is to execute subscriber-initiated or automated procedures in order to maintain the Tracked Server's configurations within subscriber-specified setups (or changes). It talks to the Tracked Servers to (a) collect information (e.g., configuration and signal telemetry) and (b) execute commands/changes on them. For example, according to different embodiments, the config automation tool(s) may be used to facilitate, enable, initiate, and/or perform one or more of the following operation(s), action(s), and/or feature(s) (or combinations thereof):

Install package(s)

Effect a configuration change(s) (e.g., change permitted cypher codes for SSL or configure number of threads for a web server).

Collect configuration information and send it to DataGrid service.

Provide signals about events occurring on the Tracked Servers, such as reboot, change of configuration, failure and/or software startup completion.

Provide a conditional software/configuration update which will be executed (or rejected) based on information provided from DataGrid service (e.g., upgrade package if the new package provides significant improvement of DGRI score, is widely deployed and it has not been found to cause problems in other deployments).

DataGrid plugin 411 (alongside with plugins from other vendors) may be configured or designed to provide DataGrid-related functionality, for example periodic scans, mass upgrades, update approval/filtering, etc.

The DataGrid Analytics Service 420 may provide commands (input) to these systems and may consume responses/notifications from them about actions taken/problems found Some subscribers will not use Config Automation systems instead opting for alternate mechanisms via Subscriber DevOps automation 418 or directly installing DataGrid Subscriber components on the Tracked Servers.

Subscriber DevOps 418 and other management systems (e.g., subscriber-provided, optional)

These are other subscriber-provided systems that control subscriber's IT operations; they may cooperate with the Config Automation system 412 or, as it happens in many cases, entirely supplant it It may include dashboards, policy verifiers, CI/CD systems (continuous integration/continuous delivery), etc., management and IT operations tools, whether or not integrated with the software development process at the subscriber site, monitoring systems such as Nagios, New Relic, etc.

The Subscriber DevOps systems 418 may query the DataGrid API 425 (directly or via anonymization gateway 419) in order to make deployment and operations decisions (similar to what Config Automation 412 does), including whether to upgrade packages/change configuration, or even deploy new versions of the software and systems CVE 430 (Common Vulnerabilities and Exploits) info database (e.g., third party)

Existing database of known/reported vulnerabilities

The DataGrid Analytics Service may use these to provide supplementary information about packages and configurations (not gathered directly through DataGrid telemetry collection of the Tracked Servers)

Example Input: usually provided by vendors and security researchers; the DataGrid Analytics Service have provided input as well (esp. regarding inconsistencies in the database necessitating corrections)

Example Output: list of vulnerabilities, what software/configurations are affected, and what software versions are affected Vendor Info 440 (or Community Info) (e.g., third party)

Existing database of known/reported vulnerabilities provided by vendors and/or community for OS or other software package and configuration artifact In addition to vulnerabilities, those may include quality information about configurations and package versions, such as:

Known bugs;

Test code coverage;

Test pass/failure details;

Discussion forums where issues are discussed;

Etc.

The DataGrid Analytics Service 420 may use these to provide supplementary information about packages and configurations (not gathered directly through DataGrid telemetry collection of the Tracked Servers)

Plugin 411 may be configured or designed as DataGrid software which runs in subscriber environments. In at least some embodiments, configuration of a Plugin may be modified by the subscriber).

According to different embodiments, functions/features may include, but are not limited to, one or more of the following (or combinations thereof):
Facilitating telemetry collection from Tracked Servers.
Intercepting configuration change requests to provide filtering, reject/accept the change (e.g., to upgrade or not), determine the specifics (e.g., particular package version or configuration parameter to set), etc., based on data obtained from the back-end service/analytics and/or policies defined by subscriber (e.g., based on different in the DGRI score between current package and new package, the difference to be greater than a policy defined by the subscriber)
Providing lifecycle events and identification/attributes information, such as, for example, one or more of the following (or combinations thereof):
New server deployed.
Server "destroyed" or shut down.
Configuration change notification.
Server identity/role information (e.g., hostname or role in an app).
Server attributes, such as server/subscriber, dev vs. test vs. production environment, location, etc.
Server up/down events, including infrastructure (e.g., power) and end-to-end service up/down events (e.g., service availability and performance for end-users), performance measurement events, etc.
Example Input: commands (e.g., such as upgrade), time-based events (check Tracked Servers every 4 hours), monitoring events, identity and attributes, notifications from DataGrid back-end service about score changes
Example Output: execute operations on the Tracked Servers usually via the Config Automation system; provide telemetry data, including monitoring and outcome information, to DataGrid service
Example Triggering Events: Plugins are used primarily when the subscriber already uses Config Automation systems and wants to avoid installing clients on each system. Alternatively, Plugins and Config Automation may be not present/used and a DataGrid Subscriber used to provide the Plugin's function on each server separately, possibly under the control of subscriber's DevOps system
Who it talks to: one or more of: Config Automation system, Tracked Servers, DataGrid Back-end service, Anonymizing gateway, DevOps systems
Example use cases:
Periodically check tracked servers for configuration changes and if found, send telemetry data.
Intercept configuration change requests (e.g., such as upgrade Apache to the latest version) and modify the request, resulting in either allowing it as is, modifying the version to be upgraded, or simply rejecting the request (e.g., due to known problems with the target version or configuration)
DataGrid Client may be used as an alternative to Plugin 411, and may provide functionality similar to that of Plugin 411.
Respective DataGrid Client may be installed on each Tracked Server 414 (or once per group of related Tracked Servers, such as on the host for a set of container systems).
May be configured or designed to have similar functions and other characteristics as Plugin 411. In at least one embodiment, a respective DataGrid client may be deployed or implemented on each Tracked Server separately, and may be orchestrated by subscribers' DevOps system or may be configured or designed to work independently, such as periodically deciding whether to upgrade packages/make config changes.
CLI 416 (optional) may be configured or designed as DataGrid software which runs in subscriber environments, including, for example, IT operator laptops, etc.
Functions/features: provide easy way for human administrators and scripted coded systems to execute queries and other operations on the DataGrid API 425.
Provides an easy-to-use syntax for humans and scripts (e.g. as compared to programmatic API invocations).
Provides easy to see, human-oriented output (e.g. as opposed to JSON or XML coded responses); also provides machine-readable responses (e.g. such as JSON or XML) for use in scripts.
Alternative to direct use of the API 425.
Example Input Data: request, query (e.g., list systems, get vuln info, get score), filters (show all systems that have vulnerabilities with severity 7 or above, or DGRI score less than 700, or recent reduction; systems that are part of a particular application or geographic region, etc.)
Example Output Data: list of matching entities (e.g., such as systems, packages, vulnerabilities, etc.), score, configuration values, entity info, etc.
Example Triggering Events: used instead of direct programmatic calls to the API, for convenience of human users (e.g., IT administrators, DevOps), esp. for ad-hoc queries and diagnostics; as well as for simpler scripting (e.g., bash scripts) where may be more convenient to invoke a utility with command line parameters than make an API call
Who it talks to: the DataGrid back-end API, either directly or indirectly (via the Anonymizing Gateway)
Example use cases:
(query) List all systems (Tracked Servers) that have not reported telemetry data for more than 24 hours.
(query) Obtain detailed information about a particular system, incl. IP address, hostname, configuration details, etc.
(query) Find what systems are affected by a particular problem or problem with certain characteristic (e.g., vulnerable to certain type of attack, has reliability issues, etc.).
Delete system, rename system, add attributes to system, etc.
Anonymizing Gateway 419 may be configured or designed as DataGrid software which runs in subscriber environments, or as a service provided by DataGrid System. In at least some embodiments, configuration of the Anonymizing Gateway may be modified by customers. According to different embodiments, the Anonymizing Gateway may be configured or designed to:
Strip, tokenize, and/or encrypt sensitive information from the subscriber environment, such as host names, IP addresses, company names, URL, etc., from telemetry information and queries; preferably in a way that can be reversed when data is returned back (e.g., encrypt hostnames from Tracked Servers, and decrypt them when returned on a queried list of servers affected by a given vulnerability).

Restore/rebuild sensitive information when extracting data from DataGrid backend and returning it to the subscriber, so that the information will be more useful/meaningful. The data may be encrypted/decrypted; or tokenized and stored locally in subscriber environment and only tokens sent to DataGrid, restoring them by resolving the returned tokens to the original information via the local store.

Facilitate queries which filter by some of the anonymized fields where the backend 420 may not have sufficient data to evaluate the requested filter Example Input Data: outgoing requests, such as telemetry data and API requests going from subscriber environment to the back-end; the same data sent out to the back-end after anonymization (see functions above)

Example Output Data: API responses, notifications; takes data returned from the back-end, and restores the sensitive data before returning it to the subscriber environment.

May facilitate certain queries for which the back-end does not have the necessary information, for example, querying list of systems by host name with wildcard (e.g., *.example.com), which may be partially processed in the Anonymizing Gateway.

Example Triggering Events: the Anonymizing Gateway is used when the subscriber wants to ensure that sensitive data is not stored in the back-end database, so that it may not even accidentally be disclosed (e.g., due to breach in DG Database or other back-end systems, or through bugs in the analytics engines).

Who it talks to: on the "protected side" (subscriber side), to subscriber systems, including Tracked Servers, Config Automation/Plugin, DevOps and other API clients, CLI; on the "back-end side" (DataGrid service side), the back-end API 425

Example use cases:
  Server telemetry data from server A contains sensitive fields such as the hostname (db.example.com) and IP address (e.g., 72.15.140.15), together with less sensitive data, such as OS type and version. The gateway will encrypt the hostname and IP address in a repeatable way using keys residing on the gateway (e.g., subscriber environment) before forwarding to the API, so that the sensitive data cannot be retrieved by DataGrid.
  User queries list of servers matching the wildcard "*.example.com". The gateway queries list of all servers or consults local cache to find encrypted values for all servers matching the query, then queries the API for these servers; upon return, decrypts the sensitive data (e.g., hostnames, IP addresses) before returning it to the querying system (e.g., such as, for example, CLI, DevOps/other ops systems, Config automation, etc.)

Example DGRID Terms and Definitions

The meanings or referents of some terms are presented below as conditioned by one or more contexts. These contextually conditioned meanings or referents do not impair the most general applicable reading of these terms in other contexts or where specified.

Attribute: When used in the context of data which is sent by a server which has the DataGrid Subscriber component(s) installed to the DataGrid System in a configuration, the term attribute means any of: any operating system identifier including name, version, CPE (Common Platform Enumeration) name, bug report URL, or vendor product URL; any identifier for an installed package including name, version, release, architecture, vendor, dependencies (requires), provides, or obsoletes, or identifiers for CVEs which have been fixed in the package; BIOS version; chipset identifiers; virtualization driver identifiers; CPU architecture identifiers; IP address; hostname; FQDN; machine ID; or any setting or data read from any package, application, program, service or operating system configuration file.

Characteristic: When used in the context of data which is sent by a server which has the DataGrid Subscriber component(s) installed to the DataGrid System in a configuration, the term characteristic means: any attribute or characteristic (in the most general applicable sense) of the server or its operating system or applications or services that determines or affects the performance, reliability, security, operation, functionality, capability, maintainability, stability, or utility of the server or its operating system or applications or services.

Configuration: There are two uses of the term configuration which may be distinguished by the context of their use. When a server with the DataGrid Subscriber component(s) installed sends data to the DataGrid System, one kind of data that it sends is termed a configuration. Here, in the first use, the term configuration means one or more attributes or characteristics. See FIG. 65 for an example of a configuration sent to the DataGrid Application in at least one embodiment. In at least one embodiment, when the DataGrid System receives such a configuration it stores it in the database. In at least one embodiment in this process, the received data is separated into two sets and stored as two different records or documents. The first is termed the system record or document, and the second is termed the configuration record or document. When used in the context of configuration data read from the database, e.g., for the purpose of analysis, the term configuration, in this second use, refers to data stored with the configuration record or document.

Configuration element: A configuration element is an attribute or characteristic of the server, for example, those that can be identified, recorded and/or tracked. Some examples of configuration elements include:
  Operating system name and version.
  Software packages (e.g., specifying for a given package: package name, vendor, version, architecture, and release, as well as a list of CVEs (Common Vulnerabilities and Exposures) which have been fixed for the package, extracted on the subscriber from package changelogs).
  Package repositories configured that may provide updated versions of packages or new packages to be installed; such as the operating system "yum" and "apt" repositories, the Microsoft Update service, the Comprehensive Perl Archive Network (CPAN), the Sonatype Central Repository, GitHub repository, etc.
  System, component, and/or application configuration files and related configuration parameters (e.g., the value of the MaxRequestWorkers in the Apache httpd.conf configuration file).
  Installed hotfixes, updates, service packs, patches, etc.
  BIOS or firmware versions.
  Hostname, IP address, unique system ID, Amazon instance ID, Amazon Image ID, Openstack instance ID.
  Chipset model and version.

Device or virtualization driver name and version.

Etc.

Configuration record: The configuration record or document includes attributes or characteristics which may be common to many different servers and do not depend on any particular server. More specifically, the configuration record or document records together those attributes or characteristics any difference in which would result in a different configuration record when considered for the purposes of analyzing the performance, reliability, security, vulnerability, operation, functionality, capability, compatibility, maintainability, stability, or utility of those systems (or their operating systems or applications or services) which share the same configuration record. For this reason the configuration record or document excludes attributes and characteristics such as the server ID, hostname, FQDN (fully qualified domain name), IP address, etc., which may depend on a particular server and which do not meaningfully contribute to such an analysis. Examples of different types of information which may be included in one or more configuration records may include, but are not limited to, one or more of the following (or combinations thereof):

Configuration element(s).

Attribute(s).

Characteristic(s).

Operating system information, such as, for example, name and/or version.

Package information, such as, for example, package name, vendor, version, architecture, and release, as well as a list of CVEs (Common Vulnerabilities and Exposures) which have been fixed for the package, extracted on the subscriber from package changelogs.

Information obtained from one or more package repositories which may provide information about updated versions of packages and/or about new packages to be installed, such as, for example, the operating system "yum" and "apt" repositories, the Microsoft Update service, the Comprehensive Perl Archive Network (CPAN), the Sonatype Central Repository, GitHub repository, etc.

Information relating to system, component, and/or application configuration file(s) and related configuration parameters (e.g., the value of the MaxRequestWorkers in the Apache httpd.conf configuration file)

Information relating to installed hotfixes, updates, service packs, patches, etc.

Etc.

The configuration record may also include data which is not obtained from configurations sent to the DataGrid System by subscriber servers but which is obtained or determined from other sources. In at least one embodiment this data may include, but are not limited to, one or more of the following (or combinations thereof):

Information about vulnerabilities affecting packages in this configuration record.

The DataGrid Reliability Index (DGRI) Score for the configuration.

Scoring information relating to relating to one or more metrics of the configuration and/or elements thereof. Examples of Scoring information may include, but are not limited to, one or more of the following (or combinations thereof): Vulnerability Score; Compatibility Score; Reliability Score; Configuration popularity score; Package popularity score; Trend score; Combined score; User-weighted score; etc.

Information about the number of systems which use this configuration currently.

Information about the number of systems which have used this configuration historically.

A unique configuration ID used as a primary key. In some embodiments, the configuration ID may be a hash of the sorted combined package names, versions, releases, architectures and vendors found in the configuration. This ID also serves as the primary key for a separate signal survey record or document which records signal data associated to this configuration record including the number of signals by signal type sent by some or all servers using this configuration. In some embodiments, the configuration ID may be a combination of the operating system name and version and a portion of the hash.

Etc.

System Record: The system record or document includes attributes or characteristics which are associated by the DataGrid System to a particular server. These attributes and characteristics may include, for example: hostname, fully-qualified domain name (FQDN), system ID, BIOS version, chipset identifiers, virtualization driver identifiers, etc. Many different system records may be associated to a single configuration record. In some embodiments, the system record may also include data which is not obtained from configurations sent to the DataGrid System by subscriber servers but which is obtained or determined from other sources. In at least one embodiment this data includes: number of ping signals sent by this server, current configuration ID, a configuration history list including for at least one historical configuration the configuration ID and the start time and the end time of the use of that configuration, timestamp of the last ping signal from this server, the number of ping signals received historically from this server, and the timestamp of the creation of the system record.

Server: By server is meant a physical or virtual computer server, a virtual machine, a container (e.g., Linux container, Solaris Zone container, Docker container) and/or any other computing execution environment System: By system is typically meant a server, including a physical or virtual computer server, a virtual machine, a container (e.g., Linux container, Solaris Zone container, Docker container) and/or any other computing execution environment. The term system is also used in its most general applicable sense when referring to the DataGrid System as a system. See also system record.

Signal: When a server with the DataGrid Subscriber component(s) installed sends data to the DataGrid System, one kind of data that it sends is termed a signal. In this context signal means any data representing any event related to, or any change of state of, the server or its operating system or applications or services, which may be used to assess or contribute to the assessment of the performance, reliability, security, operation, functionality, capability, maintainability, stability, or utility of the server or its operating system or applications or services. By way of illustration, as used herein, a signal may include, but is not limited to, one or more of the following types of specific signals practiced in at least one embodiment:

Ping: A ping signal indicates the server is alive and functioning. For example, when a configuration is fed to the application API, it is also considered a ping signal.

Reboot: A reboot signal indicates the server has rebooted.

Crash: A crash signal indicates the server has experienced a kernel failure such as a segmentation fault or out-of-memory-killer.

Offline: An offline signal indicates a service provided by the server is reported offline.

Online: An online signal indicates a service provided by the server is reported online.

Log error: A log error signal indicates an Error or higher severity log message.

Log event: any log event produced from software running on the server

Rollback: A rollback signal indicates the server has reverted to a previous configuration.

User fail: A user fail signal is a user-created failure signal.

User success: A user success signal is a user-created success signal.

These signals include qualifying information such as the type of crash, or what service has gone offline, or what application generated a log error, its severity and the error message. See FIG. 66 for an example of a signal sent to the DataGrid Application in at least one embodiment.

To be understood in this context signals do not have to come from a server with the DataGrid Subscriber component(s) installed. Rather, according to different embodiments, they may come from any useful source, such as, for example:

- The DataGrid Subscriber component(s) installed on a server.
- Monitoring tools such as Nagios, Ganglia or Zabbix. These tools already use configured service monitoring checks in best-practice operations. These tools may send service online or offline signals to the DataGrid Application signal email monitoring service (most service monitoring systems are capable of sending email notification when the state of a service changes). These signals may also be fed directly to the application API (many monitoring tools or front-ends may do this, e.g., Centreon on top of Nagios). The DataGrid System associates these events not just to the immediate state of the server or service (which is the original purpose of these monitoring tools) but to the configuration associated to that server at that time. In this way signals from many different servers which use the same configuration are aggregated over time.
- Configuration management tools such as Chef, Puppet and Ansible. These tools may be used to send signals for managed servers or groups of servers to the application API using the DataGrid software installed with such a system.
- IT configuration, management and orchestration systems, such as VMware vSphere, Microsoft System Center, Docker Datacenter, etc.
- Log aggregators such as Splunk or Logstash. These tools may be used send signals extracted from the logs of servers which use these services and which have the DataGrid Subscriber component(s) installed.
- The DataGrid application. The DataGrid Application may generate internal signal events for a server, for example in the case where a server reports a new configuration which is a rollback to a previous configuration.

DGRI Score: In at least one embodiment, a DGRI Score is a value or set of values or tuples of values assigned by any of different analysis algorithms to any entity or collection of entities and which represents any assessment of that entity or collection of entities which indicates or may contribute to an indication of the performance, reliability, security, operation, functionality, capability, compatibility, maintainability, stability, or utility of systems or their operating systems or applications or services. Here the term entity means any data known to or constructed by the DataGrid System which represents or contributes to the representation of systems or their operating systems or applications or services. Here the term entity also means by inclusive or any of these: a system, a server, a configuration element, an operating system, an application, a service, a configuration, a package, a security vulnerability, a signal, a DGRI Score.

Different analysis algorithms may assign separate DGRI Scores to the same entity or collection of entities. For example, a configuration may be assigned separate DGRI Scores representing performance, security or reliability. For example, a collection of two configurations may be assigned separate DGRI Scores representing the probability of successfully changing from the first configuration to the second, and from the second configuration to the first, where these changes involve the upgrade, downgrade, installation or removal of software packages. In some embodiments, a DGRI score can also represent the probability of success (or another metric characteristic of) a change from one configuration to another.

An analysis algorithm may analyze some or all or part of the data representing any entity, whether or not that entity is to be assigned a DGRI Score. For example, when assigning a DGRI Score to a configuration, an algorithm may consider only a subset of that configuration's packages, or may consider some vulnerabilities and ignore others, or may consider some signals and ignore others.

In at least one embodiment a DGRI Score is assigned to at least one configuration as a single number which represents the confidence or reliability of that configuration. A DGRI Score may also be assigned to at least one package (unique in respect of its name, version, release, architecture and vendor), also representing its confidence or reliability, and these DGRI Scores may be used in an analysis which assigns a DGRI Score to a configuration.

In at least one embodiment, the DGRI Score may be used to make recommendations to select a configuration element or a change of a configuration element. In at least one embodiment, the DGRI Score may be used to make an automated decision, optionally based on a customer-specific policy, to trigger a change of a configuration element in one or more systems.

DataGrid Application Embodiments

Example Input and Output of the DataGrid Application—

By way of illustration, the DataGrid Application may be examined in terms of its inputs and outputs. Input to the DataGrid Application may include, but are not limited to, one or more of the following (or combinations thereof):

- Configurations: The DataGrid Application exposes a REST API which may be used to feed configurations for servers belonging to different customer accounts to the application. For example, servers with the DataGrid Subscriber component(s) installed periodically feed their current configuration to the DataGrid application. In an alternate embodiment, the DataGrid Subscriber component(s) checks whether the server configuration has changed (e.g., by comparing the last sent configuration hash or timestamp to the current configuration hash or to the timestamp of the server package database), and sends an update only when it detects that a change has occurred (or might have occurred), thus reducing the amount of data transmitted and the load on the receiving application servers due to sending duplicate configuration data.
- Signals: The DataGrid Application API may be used to feed server signals to the application. Signals are associated to the configuration of that server at that time.

Other: Other input to the DataGrid Application includes information which is not crowdsourced directly or indirectly from servers, but is sourced by the application itself from external services and resources. This input includes public feeds of CVE (common vulnerabilities and exposures) data, and publically accessible package repositories (used, for example, to retrieve package changelogs, number of open issues, test results, etc.).

Output from the DataGrid Application may include any data returned with an API request. For example, the application API may be used to get information about servers, configurations and vulnerabilities pertaining to a particular customer account, including the DGRI Scores for configurations and other entities.

Example Embodiment of DataGrid Application

An example embodiment of the DataGrid Application may be implemented using an Amazon Virtual Private Cloud (VPC) which provisions a logically isolated section of the Amazon Web Services (AWS) Cloud. The DataGrid Application uses Amazon Elastic Load Balancing (ELB) to handle incoming traffic to DataGrid API services. Some or all API requests are made using HTTPS, and SSL termination is done in ELB. The API services are accessed using two different URLs, separating feed requests (posted configuration and signal data) from other query requests (e.g., get information about servers, configurations, or vulnerabilities). Feed requests are handled by the feed server, and some or all other requests are handled by the API server, at least one implemented using a separate Amazon EC2 instance. At least one of these instances uses Docker containers to deploy applications and their dependencies within software containers which provide resource isolation through operating system level virtualization. In general, at least one Docker container is used to deploy a service which contributes to the overall functioning of the DataGrid System.

API Server—

According to different embodiments, the API server may deploy one or more of the following additional containers:

API: This container runs the API server apisrv.py, a python script which handles query requests, previously authenticated, for information about systems, configurations and vulnerabilities pertaining to a particular DataGrid customer account. The API server verifies the sanity of the account name provided in the request header and extracts any query data provided (e.g. a system, configuration ID or vulnerability ID). The API server queries the database, retrieves the relevant documents according to the request type, and constructs and returns a JSON response. Supported requests include: health check of the DataGrid API; list some or all systems associated to an account; get information on a specific system by system ID; get the DGRI Score and metrics for a system's current configuration; get a system's current configuration; get information for a specified configuration; get the DGRI Score and metrics for a specified configuration; get information on a specified vulnerability; get a list of some or all vulnerable systems associated to an account. See FIGS. 67-73 for example API server requests and responses.

The Feed Server:

According to different embodiments, the feed server deploys the following additional containers:

feed: This container runs the feed server feedsrv.py, a python script which handles configuration and signal feed requests, previously authenticated, and received as POST data. The feed server validates this data by: verifying the data is valid JSON; verifying the type of data is 'config' or 'signal'; verifying the sanity of the account name; and verifying the data includes a server or system ID. Once the data is validated, the feed server: generates a current received-at-server timestamp and stores the JSON data in an Amazon S3 bucket 'feed' under a key '<account>/<timestamp>'. An Amazon SQS queue 'feed' is configured to subscribe to new objects in the 'feed' bucket, so an event is automatically posted to this queue when the JSON document is stored.

proc: This container runs the processing server procsrv.py, a python script which long polls SQS events for the 'feed' queue, at least one with a pointer to the related configuration or signal document in S3. The processing server retrieves the event document from S3 and parses it into an internal representation (e.g., JSON dictionary). It finalizes the system identity (ordinarily using the provided system_id, but more complex analysis may be done here), stores the definitive system_id in the document root level, and dispatches the event to the appropriate handler based on the type of data—signal or configuration. Any message from the SQS queue which cannot be processed for any reason is re-posted to the Amazon DLQ (Dead Letter Queue) together with a brief explanation of why it was sent to the DLQ and by whom. This operation is configured with the feed SQS queue so that after 5 attempts the message is automatically moved to the DLQ. Processing success and failure are both logged.

According to different embodiments, both of the feed and API servers access services provided by the following containers (regardless of where they are deployed) through the EC2 internal network. At least one of the feed server and/or API server may deploy one or more of the following containers:

nginx: This container runs nginx which acts as a reverse proxy to retrieve resources on behalf of the subscriber request. Some or all requests are first authenticated using the service provided by the auth container, so that only authenticated requests ever reach the feed or API services.

auth: This container runs uwsgi_python to provide basic authentication of some or all API requests using a python script. Account-based authentication information is provided in some or all request headers.

log: This container runs rsyslogd to provide support for message logging to services running in other containers.

db: This container runs a mongodb server, a document-oriented database used in at least one embodiment. Some or all processed configuration, signal and vulnerability data is stored in mongodb.

vuln: This container runs the vulnerability server vuln-srv.py and also includes utilities useful for integrating vulnerability data with the DataGrid service. The vulnerability server is responsible for keeping the database vulnerability data up to date, and for updating the association of vulnerabilities to packages.

nlyz: This container runs the analysis server nlyzsrv.py; in some embodiments, this component may run one or more different analytics engines, in one or separate containers. The analysis server is responsible for analysis tasks which are queued, or performed in batch, or which may require a long time to execute. In general these tasks have been de-synchronized from other operations because of their latency. In at least one embodiment the analysis server is responsible for updating the association of vulnerabilities to configurations when changes to vulnerability data associated to packages occurs, and for recalculating the DGRI Score for configurations in the same case. The analysis server processes packages in the database which are marked as changed (indicating that the package vulnerability list has changed since the last time configurations which include this package have been updated by the analysis server). For at least one such package, the analysis server:

Updates at least one configuration in the database which includes this package to modify the list of vulnerabilities which affect that configuration (adding or removing as required), and recalculates the DGRI Score for the configuration.

Marks the package as not changed.

The analysis server may perform additional analysis of configuration and signal data, using pattern recognition and other mathematical analysis to determine confidence scores associated with configurations and packages. For example, it may identify that in many cases when a problem exists, a particular version of a package is present and thus predict that other configurations containing the same package version are also subject to this problem.

monitor: This container runs the monitoring server monitor.py which processes emails from system monitoring tools such as Nagios or Ganglia which have been sent to the DataGrid notification email server. The monitoring server authenticates at least one email, parses the data according to account based rules or templates, and feeds signal events for monitored servers (e.g., when a service associated with a server changes availability state becoming either offline or online). In an alternate embodiment, email notifications are not sent to a DataGrid email server, but are sent to a mail box controlled by a customer. In this case, the application implements per-customer-account workers which are configured with a POP3 mail box and which securely collect messages, parse them and feed signal events for monitored servers.

In at least some embodiments, the configuration event handler retrieves the system record for the server from the database (or creates a new one as required) and computes the posted configuration ID (a hash of the combined package names, versions, releases, architectures and vendors found in the configuration). If the system already currently has this configuration, then the configuration handler updates the last pinged timestamp of the system and the timestamp of the last time the system reported itself using this configuration, and processing is finished. Otherwise, the configuration handler retrieves the configuration record from the database (or creates a new one as required, including calculating its DGRI Score) and attaches this configuration to the system record (adding the previously known configuration to the configuration history list of the system record together with timestamps indicating the start and end of the use of this configuration). Next the configuration handler updates the previous and new configuration records to decrement the count of systems using the previous configuration and increment this count for the new configuration. If the new configuration is present in the configuration history of this system, then this is a configuration rollback, and the handler generates an internal rollback signal event.

The signal event handler retrieves the system record for the server from the database. If a system record is not found, a new system record is created with no known configuration (e.g., to handle out-of-order events). If a configuration ID is provided with the signal, the signal handler verifies it matches the current system configuration or rejects the signal (e.g., this may occur when the configuration was changed but this change was not received by the DataGrid System, and a subsequent crash or offline signal is received). If the signal is a ping, the signal handler updates the ping count and the last ping timestamp of the system record; otherwise, it updates the signal count by type associated to the signal survey record for this configuration record and recalculates the configuration's DGRI Score.

In some embodiments, the incoming configuration and signal data is accepted by a feed server which stores the data and orders it by received-at time stamp. This allows the DataGrid System to receive configuration and signal data when only the feed server is operational, even if some or all other DataGrid services are down, and provides for the regeneration of the database and re-processing of received data either entirely or over any span of time or over any subset, for example, in the case of a change in the database schema. See FIGS. 65 and 66 for example feed server requests and responses.

Alternate or additional embodiments of configuration and signal processing may include, but are not limited to, one or more of the following features (or combinations thereof):

When a configuration change occurs, compare the previous and new configurations and kick off a notification of system configuration change which includes the previous and new configuration IDs and the DGRI Score difference. The notification may be limited to significant DGRI Score differences. Such notifications may be sent to customers or used internally by the DataGrid System to track and analyze such changes.

When a new configuration is created, kick off a configuration analysis process which creates or updates records associating to at least one package (by name, version, release, architecture and vendor) an array of configuration IDs and a set of tuples indicating various package confidence scores created by different algorithms. This associated data may also include an array of configuration change sets that include or exclude this package during a configuration change.

Rather than, or in addition to, tracking signal counts by signal type associated to each configuration, signal processing may save each signal event with a server signal history. This allows for the replay and analysis of signal events over all servers over time.

In at least some embodiments, the vulnerability server periodically polls the NIST (National Institute of Standards and Technology) NVD (National Vulnerability Database) CVE (Common Vulnerabilities and Exposures) feed which provides comprehensive and frequently updated XML data for more than 70,000 CVEs organized by year. For at least one CVE this data includes: a CVE identifier, a published time, a last modified time, a list of vulnerable software by name and version, and CVSS (Common Vulnerability Scoring System) metrics including a CVSS score. The vulnerability server checks the HTTP HEAD of each annual archive for the last modified time and compares this to a timestamp of the last time this annual archive has been processed. If an updated archive is found, the server downloads and parses the archive and converts it from XML to JSON with minimal semantic changes and feeds each vulnerability back into the main vulnerability server using Python's generator construct. For each new or modified vulnerability, the vulnerability server creates JSON documents representing the CVE data and updates the database accordingly. In this process some semantic changes are made to the data:

The CVE list of vulnerable software 'product' field is interpreted to determine what kind of entity is affected (e.g., OS, hardware/firmware, application, rpm-type package) and the 'edition' field is interpreted into release and architecture specifications for packages.

A number of vulnerability types are skipped as at least one embodiment does not support their entities (e.g., Windows OS, IOS, Android, firmware).

For each new or modified vulnerability, the vulnerability server updates the list of vulnerabilities associated to each affected package in the database, marking each affected package entry as changed. Because the CVE data only lists the affected mainline software versions, whether or not a particular package version is affected by a vulnerability is determined by checking against the list of fixed CVEs extracted from package changelogs and included in package specific configuration data sent to the DataGrid service whenever a configuration is fed from a subscriber server. In an alternate embodiment, the list of fixed CVEs for a package is sourced from package changelogs obtained from publically available package repositories rather than from server configuration data. In an alternate embodiment, information about package and configuration vulnerabilities may be obtained from databases provided by vendors and/or communities, including operating system vendors, packaged software vendors, open source communities, etc. Such vulnerability databases may also provide information about when fix(s) were implemented for specific vulnerabilities relating to specific versions and/or releases and in which version/release of a package fixes for specific vulnerabilities were implemented. In at least one embodiment, the DataGrid service acquires and/or aggregates information about vulnerabilities from multiple different sources in order to provide more complete and fine-grained information and identification of vulnerable (and non-vulnerable) packages and configurations.

According to different embodiments, the vuln container may include one or more utilities, such as, for example
  vulnupdate: vulnupdate is a maintenance utility which may perform any of these operations:
  Force-load from the NIST NVD feed and process the CVE archive for a given year, processing some or all vulnerability updates (new and changed CVE entries) and storing the updated vulnerability information in the database.
  Update the vulnerability list associated to some or all affected packages in the database:
  based on CVEs imported through force-loading
  based on some or all CVEs in the NIST NVD feed
  based on a subset of some or all CVEs currently in the database. In this case, the subset may be some or all CVEs or a subset match based on a query string.
  Create and store one or more diagnostic files: an uncompressed XML format CVE archive; a pretty-printed JSON format CVE archive; a list of updated or new CVEs in a CVE archive in comparison to CVEs in the application database; a list of changed packages including their changes.
  vulnget: vulnget is a utility which gets the CVE archive for a given year from the NIST NVD feed and outputs it to stdout (in JSON array, JSON line per CVE, or XML format). The output may also be used to feed into the vulnupdate utility.

Calculating the DGRI Score
In at least one embodiment the DGRI Score is calculated for a configuration (or configuration element) based on:
  The current number of servers using this configuration.
  The total number of servers which have used this configuration historically.
  Trend in changing the number of servers that use this configuration historically and/or in recent time (e.g., several weeks)
  The number of signals by signal type associated to the configuration historically.
  The number and CVSS severity score of vulnerabilities affecting this configuration.
Alternate or additional embodiments may modify or extend this analysis to include:
  Use of other CVSS metrics such as access-vector, access complexity, authentication, confidentiality-impact, integrity-impact and availability-impact.
  Use of vulnerability or reliability data from alternate sources such as websites which include user reports of vulnerability, compatibility or reliability issues in software packages or combinations of software packages, github issue tracking, etc.
  Analysis algorithms which analyze any of the crowdsourced server data and/or any differently sourced data such as vulnerability data to yield useful insights derived from these large data sets. For example, an algorithm may identify a misbehaving package in a set of configurations using conditional probability.
  Separate scores for different algorithms, or different types of data (e.g., separate scores representing vulnerability and signal data), which may be used independently or used in combination to produce a single score.
  Separate scores for different entity types. For example, packages may be scored independently of configurations, and the relevant package scores may be included in the calculation of a configuration score.
  Excluding or including a vulnerability in the vulnerability list associated to a package (and by extension to configurations) based on manual input. In this case a human being determines whether or not a vulnerability affects a particular package and this determination over-rides the programmatic determination.
  Using noise filtering and other techniques to determine which signals may affect a configuration's confidence and to what degree. For example, multiple signals coming from the same systems may have less impact on a configuration's score than fewer signals coming from a broader set of servers (including servers from different customer accounts).

DataGrid Subscriber Component(s)
DataGrid Subscriber component(s) may be installed on servers associated to customer accounts which participate in sending crowdsourced server data to the DataGrid System. According to different embodiments, these DataGrid Subscriber component(s) may be configured or designed to include various functionality and/or functional components such as, for example, one or more of the following (or combinations thereof):
  DataGrid yum plugin: The DataGrid yum plugin intercepts configuration change operations (e.g., install, upgrade, uninstall, downgrade, as well as 'history undo'), and after yum determines the full set of changes, including their dependencies, the plugin checks the DGRI Score and other information relevant to the confidence of the proposed configuration changes. It does this by taking the existing configuration of the server (e.g., in the form of a list of installed packages and their specific version information) and performing the changes that yum is about to do upon this list to create a target configuration. The plugin feeds the target configuration using the DataGrid API, and requests the DGRI Score for the target configuration and any additional relevant information. It then displays this information and asks the user whether or not to proceed with executing the configuration change. For example, the plugin may display the DGRI Score for the current configuration, the score for the target configuration, the score change (improvement or degradation), and optionally additional information such as the number of known data points for the new configuration and vulnerability information. These data points may include: the number of systems using the target configuration historically or currently, the number of signal events received from these systems, the number of these events by type (e.g., successful user or online events, or failure events such as reboot, offline, logerror, user, crash or rollback).

During operation, the user may ask to see additional information by pressing the c?' key rather than 'Y' or 'N' when prompted to proceed. In this way the user may further judge whether or not to proceed. The default action ('Y' or 'N' to proceed) is determined by whether or not the target configuration DGRI Score degrades. See figures #161-164 for example operations which use the DataGrid yum plugin.

dgri-query: dgri-query is a command line interface (CLI) tool which uses the DataGrid API server API to obtain information about systems, configurations and vulnerabilities pertaining to a customer account, and displays this information to the user. Supported operations include: health check of the DataGrid API; list some or all systems associated to an account; get information on a specific system by system ID; get the DGRI Score and metrics for a system's current configuration; get a system's current configuration; get information for a specified configuration; get the DGRI Score and metrics for a specified configuration; get information on a specified vulnerability; get a list of some or all vulnerable systems associated to an account. See figures #146-155 for examples of dgri-query operations.

dgri-logmon.py: dgri-logmon.py is started as a system service during the server boot process. It monitors the server system log, waiting for more data to read if at end-of-file. dgri-logmon.py parses read data to extract kernel crash events such as segmentation faults or out-of-memory-killer events, server reboots, and log messages of severity Error or higher. Some or all events are timestamped from the log message and fed as signals to the DataGrid feed server API.

dgri-signal.py: dgri-signal.py is a command line utility which constructs a signal request in JSON format based on command line arguments and feeds this signal data to the DataGrid service using the feed server API.

dgri-collect.py: dgri-collect is a command line utility which uses server identification, operating system, and package information from the subscriber server to construct configuration data in JSON format, and feeds this data to the DataGrid service using the feed server API.

crontab: A crontab on the subscriber server periodically executes dgri-collect.py in order to feed the server's current configuration to the DataGrid service using the feed server API.

According to different embodiments, the DataGrid Subscriber component(s) may also include an active agent which monitors services, resources, load or other operational characteristics of a server and feeds signals to the DataGrid API. In some embodiments, the DataGrid Subscriber component(s) may be extended to support package management tools such as apt, and to support other software or module installation tools such as PEAR (PHP) or CPAN (Perl), and to support non-Linux operating systems such as Windows.

In some embodiments, the operation of the yum plugin may be extended to support user defined policies (e.g., customer account or server specific) which determine whether a proposed transaction may proceed or not based, for example, on the target configuration DGRI Score, or the score differential, or the number of data points associated to the target configuration. Such a policy may also be combined with conditionally prompted user input. For example a policy may define:

a minimum score, below which the configuration change may not be allowed a score threshold, above which the user may not be prompted in between these two, the user is prompted A policy may also define a minimum score and minimum number of data points required before an update is allowed. This allows the normal OS auto-update not to install updates right away, but only after enough people are using the target configuration and the target configuration DGRI Score is high enough (indicating both a sufficiently high score and a sufficiently high confidence).

In some embodiments, the DataGrid yum plugin may also recommend alternative configurations, or from the onset of its operation offer not the latest configuration but a recommended configuration, based on DGRI Scores. One way to do this is to add a command-line option such as "yum upgrade all—recommended" which causes the yum plugin to participate not only in the post-package-selection phase but also in the initial package selection process, replacing the default yum behavior (which is "get me the latest").

In some embodiments, the DataGrid yum plugin may be supplemented by other package management plugins, extensions and replacement utilities (e.g., for the "apt" package manager). In some embodiments, the user prompt, as well as the change approval decision, may be provided through a workflow management system, which codifies the customer organization's policies and procedures and may be performed outside of the scope of the DataGrid system (e.g., through a web-based or mobile user interface).

DataGrid Configuration Management Tools

In at least one embodiment, the DataGrid System includes hardware and/or software component(s) which may be installed on a server running a configuration management system such as Chef, Puppet, or Ansible. The example DataGrid Application embodiment supports Ansible, and includes two DataGrid Ansible modules and two Ansible playbooks which are used to remotely execute commands on servers managed by Ansible. According to different embodiments, the DataGrid Configuration Management Tools may be configured or designed to include various functionality and/or functional components such as, for example, one or more of the following (or combinations thereof):

dgri-query: see the DataGrid Subscriber component(s) section for details.

dgri: dgri is an Ansible module which may be used to send configurations or signals to the DataGrid API or to get the DGRI Score and other information (e.g., lists of associated vulnerabilities) for configurations and systems.

dgri-yum: dgri-yum is an Ansible module which may be used to install, update or uninstall packages on servers managed with Ansible, as well as to evaluate potential configuration changes, for example by executing a dry-run of yum with the requested package changes and a change set. In this way yum does not actually apply the changes but instead returns a list of proposed packages and versions. This change set is sent to the DataGrid service for evaluation and recommendations (e.g., to change a particular package version in the change set).

dgri.yml: dgri-yml is an Ansible playbook which may be used to:
  Cause one or more servers being managed with Ansible to send configuration data to the DataGrid feed server API.
  Cause one or more servers being managed with Ansible to send a signal to the DataGrid feed server API.
  Get the DGRI Score for one or more servers being managed by Ansible and display this information to the user.
  See FIGS. 48-49 for example operations which use the dgri.yml Ansible playbook.

dgri-yum.yml: dgri-yum.yml is an Ansible playbook which may be used to install and uninstall packages on servers being managed with Ansible (e.g., in consideration of the change in the DGRI Score resulting from configuration changes). See FIGS. 56-60 for example operations which use the dgri-yum.yml Ansible playbook.

Additional Datagrid System Functionality

In at least one embodiment, the DataGrid System may expose web-based graphical user interfaces which make use of and demonstrate new uses of the DataGrid Technology, including, for example, interacting with users, servers, and configuration management systems in novel ways. Example embodiments of various DGRID interfaces are illustrated and described with respect to FIGS. 13-46.

In at least some embodiments, various aspects of the DataGrid technology may be embodied in the programmatically driven build process of virtual machine images, physical machine images or container images. In many best practices, especially in devops using CI/CD (Continuous Integration/Continuous Delivery), an automated system is used to assemble an image using a set of instructions which may pick a set of third party packages (e.g., OS, database, applications, etc.), as well as the customer's own software, to use in the construction of the image. Changes to the customer's own software most often trigger the CI/CD rebuild process. The set of third party packages used during the build process may be different from those used in previous builds. This may happen when newer packages become available, or because new customer code may require new packages (new versions or additional packages), or because of new package dependencies.

The DataGrid System may be used to assess the confidence and reliability of such configuration changes. It may also provide information about how this assessment is made, or what defects or vulnerabilities may be introduced by configuration changes, or what operational characteristics of the resulting image may need to be changed to accord with or make better use of configuration changes (e.g., changes to package configuration files, or to image resource allocation). This information may be used to inform the build process or to make build changes, or to inform the evaluation, testing, use or deployment of the resulting image.

In some embodiments, API calls may be made to the DataGrid service during or after the build process to evaluate configurations or configurations changes, or to recommend configuration changes. This information is used to inform decisions, whether made programmatically or by a user or in combination, of whether or not to proceed with the build, or how to test the resulting image, or to flag the image with information obtained from the DataGrid System such as the DGRI Score of the configuration, or configuration vulnerabilities, or problematic packages, or recommended changes to the configuration, or recommended changes to package configuration files or image resource allocation or other operational characteristics. The DataGrid System may also provide this information in comparison to previous or alternate builds.

In some embodiments, one or more DataGrid service(s) may be used during or after the Docker build process. This build process may be automated using Dockerfiles which are scripts of instructions used to build a Docker image step-by-step, or layer-by-layer, beginning with a source or base image. Packages are included in the resulting image from the base image as well as from other sources such as package repositories or file systems. For example, one layer of the build process may install mongodb packages and their dependencies. In this way, succeeding layers of the build process may contribute to the sequential aggregation of a configuration (e.g., collection of packages) for the resulting image.

In one embodiment, after the build process is complete, a DataGrid utility extracts package and other information from the resulting image, or from a deployed container based on that image, and constructs an image configuration using this data. The utility sends this configuration to the DataGrid API for evaluation, and displays this information to the user, optionally in comparison to previous builds or alternate images. In another embodiment instead of or in addition to displaying information to the user, the utility automatically makes a decision to pass or fail the build (or the test of such build), which decision may optionally be based on criteria specified by the user for such a decision (e.g., minimum DGRI Score, the presence of vulnerabilities or a minimum vulnerability score, blacklisted/whitelisted packages, etc.).

In another embodiment the Docker build system is modified or extended to automatically send customer and image identifiers and image configurations to the DataGrid API. A customer accesses a DataGrid web interface to examine and evaluate image configurations using the DataGrid System, or to evaluate a configuration in relation to previous builds or other images, or in relation to recommended changes, or in relation to images available through a public registry or repository of Docker images.

In another embodiment DataGrid software associates configurations to different layers of the Docker image build process and evaluates these separately as well as in sequential relation. The examination of a resulting configuration as a series of configuration changes may yield insight into what layers contribute to the improvement or degradation of the configuration DGRI Score. For example, this may indicate that the base image is not itself reliable, or that the packages installed for a particular service such as Apache are responsible for degradation of the DGRI Score.

Yet another embodiment uses the DataGrid System during a build process controlled or monitored by the Jenkins build server when such a process is used to automate, monitor or test the build of a virtual machine image, physical disk image, ISO install image or container image. Jenkins is a continuous integration tool often used to perform continuous builds and automated test execution of software projects, virtual machine images, etc. In one such embodiment a DataGrid plug-in for Jenkins is used as part of the build or test of an image. This plugin extracts package and other information from an artifact of the build process, or from the built image, and constructs an image configuration using this data. The plugin sends this configuration to the DataGrid API for evaluation, and displays this information to the user, optionally in comparison to previous builds or alternate images. In another embodiment instead of or in addition to displaying information to the user, the utility automatically makes a decision to pass or fail the build (or the test of such build), which decision may optionally be based on criteria specified by the user for such a decision (e.g., minimum DGRI Score, the presence of vulnerabilities or a minimum vulnerability score, blacklisted/whitelisted packages, etc.).

Some embodiments may make use of server resource metrics such as resource allocation, CPU load, memory usage, network load, and disk load. DataGrid Subscriber component(s) (or resource monitor probes) send such metrics at intervals or conditionally over time, directly or indirectly, to the DataGrid API. The DataGrid System associates this data to the configuration, or to packages, used by the subscriber server at the time such metrics are sent. The DataGrid System analyzes this data in order to recommend changes in resource allocation to servers as well as to recommend changes to configuration elements. This analysis may include many related data sets such as: server configurations over time, server signals over time, and server resource metrics over time. For example, analysis may indicate that Weblogic application server crashes occur significantly more frequently when the less than 2 GB of memory are allocated to the subscriber server. Based on this the DataGrid System may recommend resource allocation changes to Weblogic servers with less than 2 GB of memory, or provide reports of potential resource allocation issues with configurations including the Weblogic application packages, or specific versions of these packages.

Example Procedures and Flow Diagrams

FIGS. 5-11 illustrate various example embodiments of different DataGrid-related procedures and/or procedural flows which may be used for facilitating activities relating to one or more of the DataGrid aspects disclosed herein.

According to different embodiments, at least a portion of the various types of functions, operations, actions, and/or other features provided by the DataGrid Procedures of FIGS. 5-11 may be implemented at one or more client systems(s), at one or more System Servers (s), and/or combinations thereof.

In at least one embodiment, one or more of the DataGrid procedures may be operable to utilize and/or generate various different types of data and/or other types of information when performing specific tasks and/or operations. This may include, for example, input data/information and/or output data/information. For example, in at least one embodiment, the DataGrid procedures may be operable to access, process, and/or otherwise utilize information from one or more different types of sources, such as, for example, one or more local and/or remote memories, devices and/or systems. Additionally, in at least one embodiment, the DataGrid procedures may be operable to generate one or more different types of output data/information, which, for example, may be stored in memory of one or more local and/or remote devices and/or systems. Examples of different types of input data/information and/or output data/information which may be accessed and/or utilized by the DataGrid procedures may include, but are not limited to, one or more of those described and/or referenced herein.

In at least one embodiment, a given instance of the DataGrid procedures may access and/or utilize information from one or more associated databases. In at least one embodiment, at least a portion of the database information may be accessed via communication with one or more local and/or remote memory devices. Examples of different types of data which may be accessed by the DataGrid procedures may include, but are not limited to, one or more of those described and/or referenced herein.

According to specific embodiments, multiple instances or threads of the DataGrid procedures may be concurrently implemented and/or initiated via the use of one or more processors and/or other combinations of hardware and/or hardware and software. For example, in at least some embodiments, various aspects, features, and/or functionalities of the DataGrid procedures may be performed, implemented and/or initiated by one or more of the various systems, components, systems, devices, procedures, processes, etc., described and/or referenced herein.

According to different embodiments, one or more different threads or instances of the DataGrid procedures may be initiated in response to detection of one or more conditions or events satisfying one or more different types of minimum threshold criteria for triggering initiation of at least one instance of the DataGrid procedures. Various examples of conditions or events which may trigger initiation and/or implementation of one or more different threads or instances of the DataGrid procedures may include, but are not limited to, one or more of those described and/or referenced herein.

According to different embodiments, one or more different threads or instances of the DataGrid procedures may be initiated and/or implemented manually, automatically, statically, dynamically, concurrently, and/or combinations thereof. Additionally, different instances and/or embodiments of the DataGrid procedures may be initiated at one or more different time intervals (e.g., during a specific time interval, at regular periodic intervals, at irregular periodic intervals, upon demand, etc.).

In at least one embodiment, initial configuration of a given instance of the DataGrid procedures may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the DataGrid procedures may correspond to and/or may be derived from the input data/information.

It will be appreciated that the procedural diagrams of FIGS. 5-11 are merely specific examples of procedural flows and/or other activities which may be implemented to achieve one or more aspects of the DataGrid techniques described herein. Other embodiments of procedural flows (not shown) may include additional, fewer and/or different steps, actions, and/or operations than those illustrated in the example procedural diagrams of FIGS. 5-11.

Figure 5:
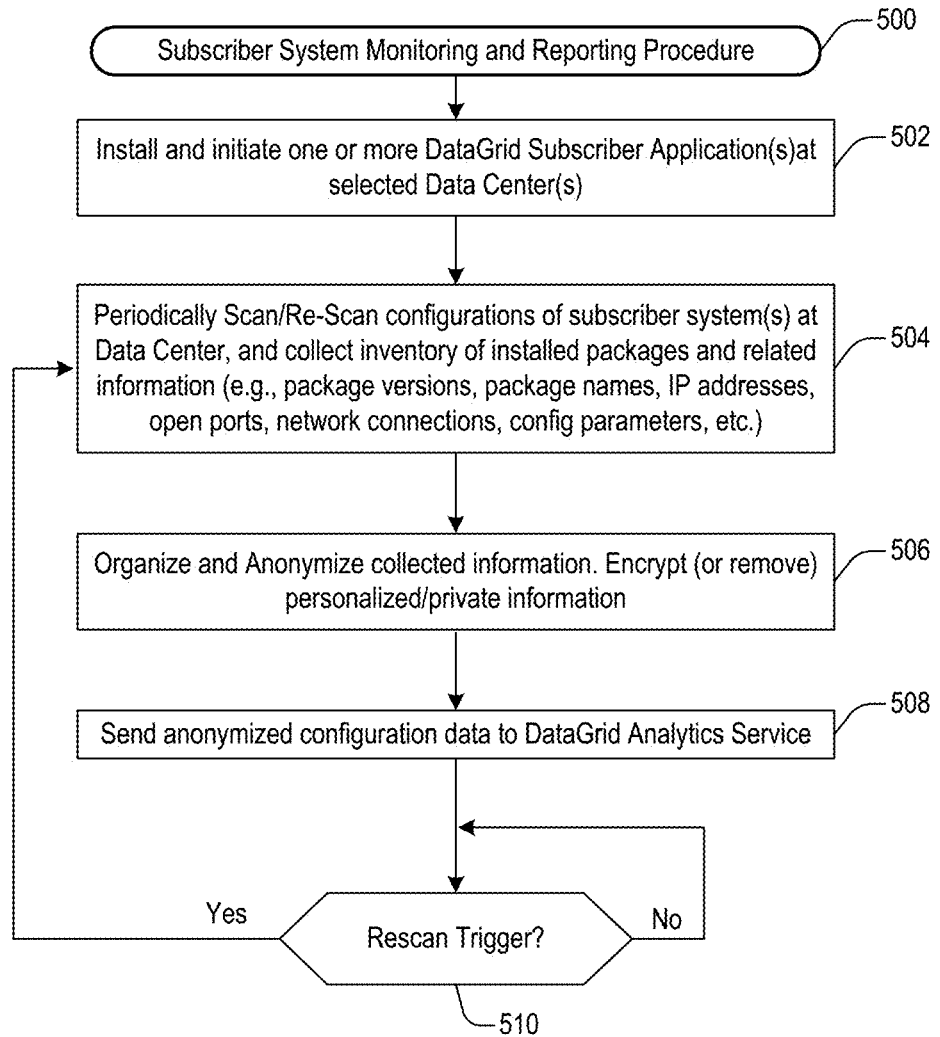
FIGS. 5-11 illustrate various example embodiments of different DataGrid-related procedures and/or procedural flows which may be used for facilitating activities relating to one or more of the DataGrid aspects disclosed herein.

FIG. 5 shows an example of a Subscriber System Monitoring and Reporting Procedure 500 in accordance with a specific embodiment. In at least one embodiment, the one or more instances of the Subscriber System Monitoring and Reporting Procedure may be installed and executed at one or more different data centers for monitoring and reporting (e.g., to the DataGrid Analytics Service) various types of information relating to one or more servers in each data center, such as, for example: server activities and events, configuration information, installed packages, errors/problems, and/or other server telemetry information described and/or referenced herein.

For example, as illustrated in the example embodiment of FIG. 5 the Subscriber System Monitoring and Reporting Procedure may be operable to facilitate, initiate and/or perform one or more of the following operation(s)/action(s) (or combinations thereof):

- Install and initiate (502) one or more DataGrid Subscriber Application(s) (also referred to herein as "DataGrid Client Application(s)") at selected data center(s).
- Telemetry/Inventory gathering: Periodically scan all or selected group(s) of running/active subscriber systems of data center for telemetry events, signals, inventory, configuration, version and/or other information. Clients have ability to opt in/out of scan. For each data center, periodically scan/re-scan (504) configurations of subscriber system(s), and collect inventory of installed packages, configuration elements and related information, such as, for example, one or more of the following (or combinations thereof):
  - package versions,
  - package names,
  - IP addresses,
  - open ports,
  - network connections,
  - configuration parameters,
  - etc.
- Organize and Anonymize (506) collected information. In at least some embodiments, this may include encrypting and/or removing personalized information from the information to be reported to the DataGrid Analytics Service, such as, for example, IP addresses, MAC addresses, customer names, security data, etc.
- Send (508) anonymized configuration data to the DataGrid Analytics Service.
- Initiate rescanning (510) of selected subscriber system(s) upon detecting one or more Rescan Triggering Events such as, for example, one or more of the following (or combinations thereof):
- Reboot of a subscriber system.
- Change (e.g. install/uninstall/upgrade/downgrade) of a subscriber system package. According to different embodiments, such changes may be detected in a number of ways, such as, for example
  - Using a package manager plugin which receives notifications.
  - Implementing the change(s) to the subscriber system via the DataGrid System (e.g., user accesses DataGrid System GUI to implement changes to an identified subscriber system, and the DataGrid System responds by causing the changes to be implemented at the identified subscriber system).
  - Checking the package database for changes (e.g., by comparing and detecting changed file times, checksums, etc.).
- Configuration change(s) to one or more subscriber system(s) and/or their configuration elements (e.g., changes to configuration file parameters, etc.)
- Time-based events/conditions (e.g., rescan every n minutes, rescan every n hours, etc.).
- And/or other types of event(s) and/or condition(s) which satisfy defined minimum threshold criteria.

By way of illustration, the Subscriber System Monitoring and Reporting Procedure may be configured or designed to perform system scans once per hour and compare to previous scan(s). In some embodiments, changes which are detected may be reported to the DataGrid Analytics Service. Additionally, in at least some embodiments, changes which are detected may trigger a rescan of the subscriber system. For example, periodically monitor and compare checksum and/or timestamp info of subscriber system configuration file (e.g., package database or Apache http server configuration file). Any detected change in checksum/timestamp automatically triggers re-scan of subscriber system.

In some embodiments, a separate instance of a DataGrid Subscriber Application may be instantiated for each subscriber system in the data center. For a given data center, multiple instances of the DataGrid Subscriber Application may run concurrently with each other for monitoring and reporting telemetry events, signals, and/or other information to the DataGrid Analytics Service.

A data center may include a plurality of different systems (e.g., physical servers, virtual servers, virtual machines, containers, etc.) which are managed, controlled, owned and/or administered by different customers. In at least some embodiments, each customer may choose to have their systems "opt-in" or "opt-out" to/from the DataGrid System. A system which has been designated to "opt-in" to the DataGrid System may be referred to as a "subscriber system", and may install and run a DataGrid Subscriber Application for monitoring and collecting that system's telemetry events, signals, and/or other information and reporting the collected information to the DataGrid Analytics Service. In other embodiments, subscriber systems may include other types of systems, devices, and/or components which are not part of a data center. Examples of different types of subscriber systems may include:

- Physical servers;
- Virtual servers;
- Virtual machines;
- Switches;
- Routers;
- Mobile devices;
- Network devices;
- Printers;
- Containers;
- And/or other types of network device(s)/system(s), including network systems beyond servers, such as home and industrial automation appliances, transportation and/or other Internet-of-Things (IoT) devices.

Figure 6:
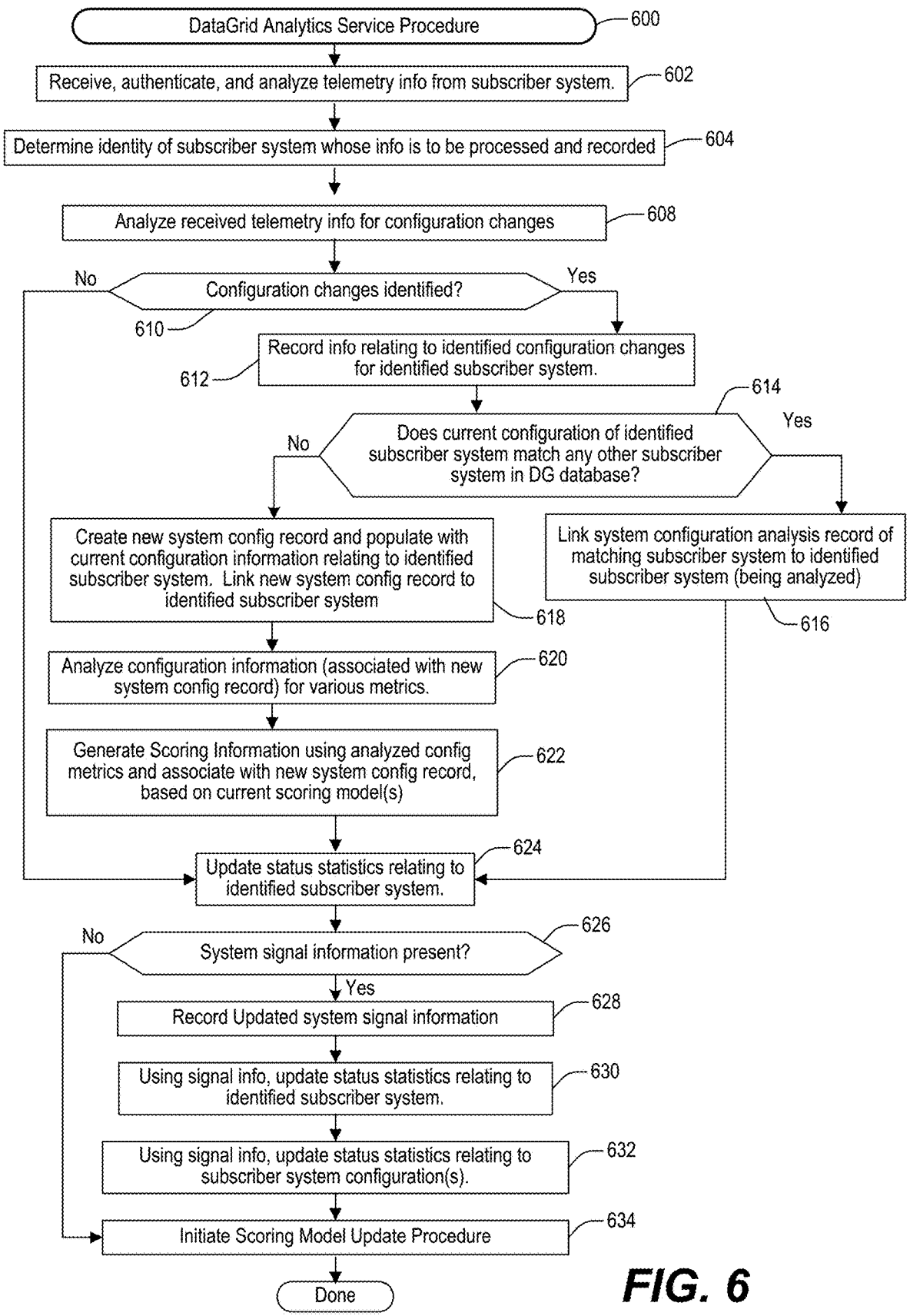

FIG. 6 shows an example of a DataGrid Analytics Service Procedure 600 in accordance with a specific embodiment. In at least one embodiment, at least a portion of the DataGrid Analytics Service Procedure may be implemented at one or more DataGrid Servers (e.g., 420, FIG. 4) and/or at other network device(s)/system(s) which have been configured or designed to include functionality for performing DataGrid analytics services.

In the specific example embodiment of FIG. 6, it is assumed for purposes of illustration, that telemetry information about a specific subscriber system (e.g., from a specific data center) has been received at a DataGrid Analytics Server which is running an instance of the DataGrid Analytics Service Procedure. In at least some embodiments, batched data may be received which includes telemetry info about multiple different servers (e.g., from a given data center).

As shown at 602, the DataGrid Analytics Service Procedure may receive, authenticate, and analyze reported telemetry and other information for identified subscriber system.

Examples of telemetry information may include, but are not limited to, one or more of the following (or combinations thereof):
System configuration information such as, for example, one or more of the following (or combinations thereof):
OS versions;
Installed packages and corresponding versions;
CPU and Mem consumption;
Network service end connections;
Configuration elements and/or parameters (e.g., memory pool sizes, number of worker threads, etc.);
Etc.
System signal information, such as, for example, one or more of the following (or combinations thereof):
Reboot events;
Crash events;
Error events;
System health status;
System or application log events;
Successful events (e.g., system recovered, system up, etc.);
Etc.
Other types of information which may be reported to, and analyzed by the DataGrid Analytics Service may include, but are not limited to, one or more of the following (or combinations thereof):
package names,
package versions,
IP addresses,
open ports,
network connections,
configuration parameters,
etc.

As illustrated in the example embodiment of FIG. 6, the DataGrid Analytics Service Procedure may determine (604) the identity of a subscriber system whose telemetry information is to be processed and recorded, and may analyze (608) the subscriber system telemetry information for configuration changes (e.g., since last update/analysis). In at least one embodiment, if no changes are detected (612) for the identified subscriber system, the DataGrid Analytics Service Procedure may advance to the operation of updating (624) status statistics relating to the identified subscriber system.

In at least one embodiment, if the DataGrid System identifies or detects (610, 612) configuration changes to subscriber system (e.g., since last update/analysis), it may record details relating to the subscriber system's configuration changes and/or current configuration. Examples of various types of configuration changes may include, but are not limited to, one or more of the following (or combinations thereof):
Change of component/device/system configuration settings and/or parameter(s).
Change of system component(s).
Change of system package(s).
Change of system container(s).
Change of system package version.
Change of system container version.
Change of OS, package or component version (e.g., kernel version/release, library version/release, etc.).
Change of OS, package or component distribution (e.g., vendor).
Change of OS, VM or container image.
Change of system configuration, including resource provisioning and constraints (e.g., allocated/reserved/max. CPU use, memory size, I/O or cache buffer sizes).
Change in operational parameters, such as number of data replicas, replica location, number of servers in an auto-scaling group, criteria for triggering adding/removing auto-scaling group servers, frequency and type of backup (e.g., incremental vs. full).
Etc.

Assuming that the DataGrid System identifies configuration changes to the subscriber system, the DataGrid System may determine the subscriber system's current configuration, and may perform a search of the DG database to determine (614) if the configuration of identified subscriber system matches that of any other subscriber system configuration in DG database. If the DataGrid System identifies another subscriber system with a configuration matching the current configuration of identified subscriber system (being analyzed), it may link the system configuration analysis record of matching subscriber system (identified in the DG database) to identified subscriber system (being analyzed).

Alternatively, if the DataGrid System is unable to identify any subscriber system(s) in the DG database having a configuration matching the current configuration of identified subscriber system, the DataGrid System may create (618) new subscriber system configuration record for the identified subscriber system, and populate it with current configuration information relating to the identified subscriber system.

As shown at 620, the DataGrid Analytics Service Procedure may analyze configuration information (associated with newly created subscriber system configuration record) for various metrics such as, for example, one or more of the following (or combinations thereof):
Vulnerabilities.
Compatibility.
Reliability.
Popularity.
Trend (e.g., change of one or more metrics over time).
And/or other types of subscriber system metrics.

As shown at 622, the DataGrid Analytics Service Procedure may generate Scoring Information for the current configuration of the identified subscriber system. According to different embodiments, the generated Scoring Information may include various types of scores (and associated score values), such as, for example, one or more of the following (or combinations thereof):
Vulnerability Score.
Compatibility Score.
Reliability Score.
DGRI Score (DataGrid reliability index score).
Configuration popularity score (overall configuration popularity, taking into account only key functional packages, e.g., Ubuntu 14 with apache and My SQL).
Package popularity score (e.g., popularity of MySQL vs. PostgreSQL).
Package version popularity score (e.g., popularity of v1 vs. v2).
Trend score (package trending up/down, package version trending up/down, etc.).
Combined score (e.g., a DataGrid-chosen weighted combination of other scores).
User-weighted score (each user can choose a formula for the scores shown to him, e.g., by defining weights of the other scores: e.g., trend with weight 0 (to ignore trend score), vulnerability with weight 0.5 (so half of score is determined by vulnerability level), reliability with weight 0.25, etc.).

And/or other types of scores which may be used to indicate the subscriber system's vulnerabilities, compatibilities, reliability, popularity, etc.

According to different embodiments, generation or calculation of the scores and/or scoring information may be based on defined scoring models (e.g., defined scoring model for each respective score type), and may be based, at least partially, on the analyzed metrics associated with the identified subscriber system.

In at least one embodiment, when subsequent configuration changes of the subscriber system are detected, the DataGrid System may initiate rescoring of the subscriber system's Scoring Information based on the modified subscriber system configuration. Rescoring may also be initiated or triggered based on other factors, such as, for example, detrimental signal info from similar subscriber system configurations.

As shown at 624, the DataGrid Analytics Service Procedure may update one or more status statistics relating to identified subscriber system. Examples of various status statistics which may be updated may include, but are not limited to, one or more of the following (or combinations thereof):

System Up time.

Configuration run-hours (e.g., number of total servers with a given configuration, each multiplied by the number of hours this server has run in that configuration).

Number of signals received from system.

Timestamp info relating to telemetry info.

Any detected errors in telemetry info.

Number of System reboot(s).

Etc.

As shown at 626, the DataGrid Analytics Service Procedure may analyze the received subscriber system telemetry information to determine if any subscriber system signal information is present. If subscriber system signal information is identified as being present, the DataGrid System may facilitate, enable, initiate, and/or perform one or more of the following operation(s), action(s), and/or feature(s) (or combinations thereof):

Record (628) the identified subscriber system signal information.

Update (630) status statistics relating to the identified subscriber system (e.g., based on the identified subscriber system signal information).

Update (632) status statistics relating to the identified subscriber system configuration(s) (e.g., based on the identified subscriber system signal information).

Figure 7:
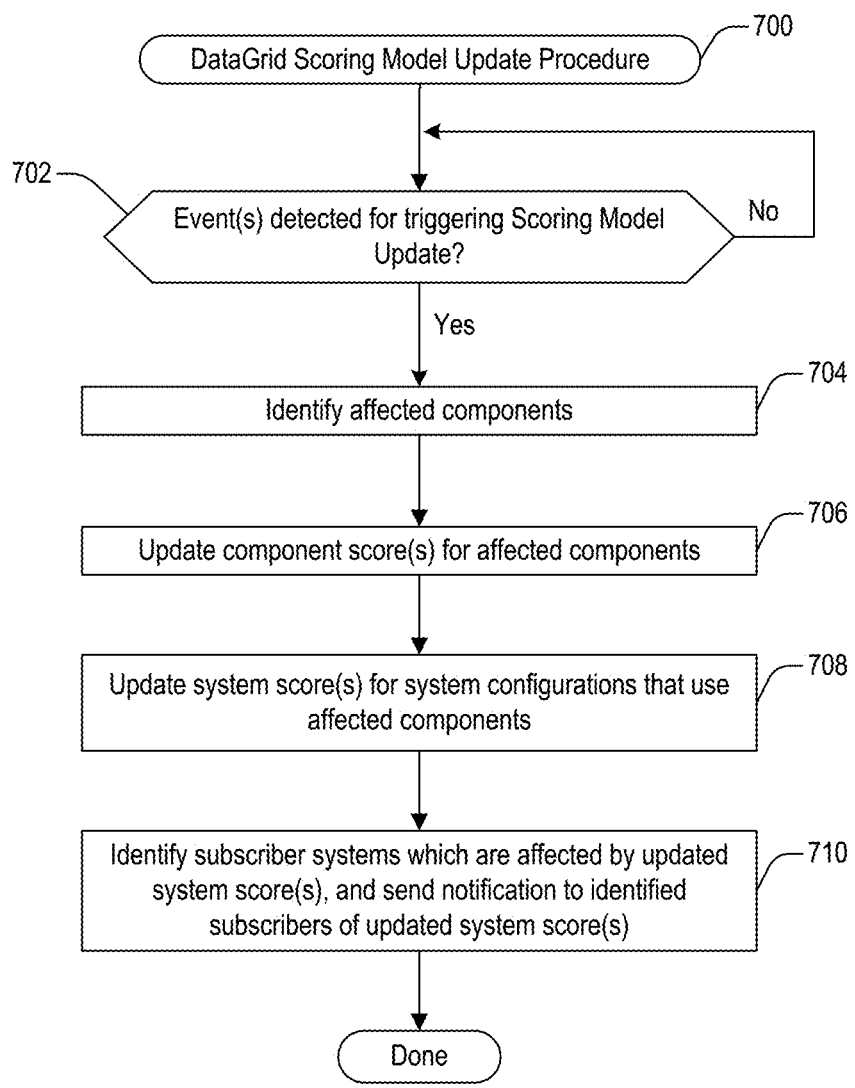

As shown at 634, the DataGrid Analytics Service Procedure may initiate a Scoring Model Update Procedure, such as that illustrated and described with respect to FIG. 7.

In at least some embodiments, a separate instance of a DataGrid Analytics Service Procedure may be instantiated for different subscriber systems to be analyzed and scored. Additionally, multiple instances of the DataGrid Analytics Service Procedure may run concurrently with each other.

FIG. 7 shows an example of a Scoring Model Update Procedure 700 in accordance with a specific embodiment. In at least one embodiment, at least a portion of the Scoring Model Update Procedure may be implemented at one or more DataGrid Servers and/or at other network device(s)/system(s) which have been configured or designed to include functionality for performing DataGrid analytics services.

As shown at 702, the Scoring Model Update Procedure may continuously and/or periodically monitor for detection of triggering event(s) for initiating one or more Scoring Model Update(s). Examples of different types of events which may trigger Scoring Model Updates may include, but are not limited to, one or more of the following (or combinations thereof):

Time based events (e.g., periodically every hour, few hours, day, etc.)

Critical mass of telemetry events accumulated (e.g., multiple failure events from configurations with the same configuration element). For example, sufficient number of failure signals (or success signals) received that can be correlated to a particular configuration or configuration element (e.g., a package, a configuration parameter, etc.). Failure signals may indicate systems failing to perform properly. Success signals may indicate systems continuing to work properly. Signals may be selectively reported on subscriber systems that have a particular configuration element(s).

Telemetry event(s) occurrence (e.g., telemetry data sent by a subscriber system, regardless of the type of event or configuration).

The release of a new version of an OS and/or package version, containing new features, bug fixes and/or fixes for vulnerabilities, incompatibilities, etc.

Increase or decrease in reported usage of a new or updated configuration element(s)

And/or other types of event(s)/condition(s) which satisfy defined threshold criteria for triggering Scoring Model Update(s).

As shown at 704, if a Scoring Model Update triggering event is detected, the DataGrid System may respond by identifying the affected component(s) associated with the detected triggering event. For example, in at least one embodiment where the triggering event relates to detection of multiple failure (or success) signals from multiple different subscriber system, the DataGrid System may analyze the failure (or success) signals to identify component(s) of the subscriber system which may be negatively (or positively) affected.

As shown at 706, the Scoring Model Update Procedure may update and record component score(s) for the identified component(s) which may be affected. In at least one embodiment, the updated component scores may be determined using the failure/success signal data and/or other associated telemetry information.

As shown at 708, the Scoring Model Update Procedure may identify affected system configuration(s) which use one or more of the affected component(s), and may update and record system score(s) for the identified system configurations (e.g., using the failure/success signal data and/or other associated telemetry information). In at least one embodiment, the updating of the system scores includes identifying affected subscriber system(s) having configuration(s) which use one or more of the affected component(s), and updating the respective score(s) associated with each of the affected subscriber system(s).

As shown at 710, the Scoring Model Update Procedure may identify subscriber systems which are affected by updated system score(s), and send notification(s) of updated system score(s) to identified subscribers. In at least one embodiment, a subscriber may be implemented as an automated processes which monitors notification/subscription channel(s), and which initiates automated activities in response to the notifications.

In at least some embodiments, a separate instance of a DataGrid Analytics Service Procedure may be instantiated for different subscriber systems to be analyzed and scored.

Additionally, multiple instances of the DataGrid Analytics Service Procedure may run concurrently with each other.

Figure 8:
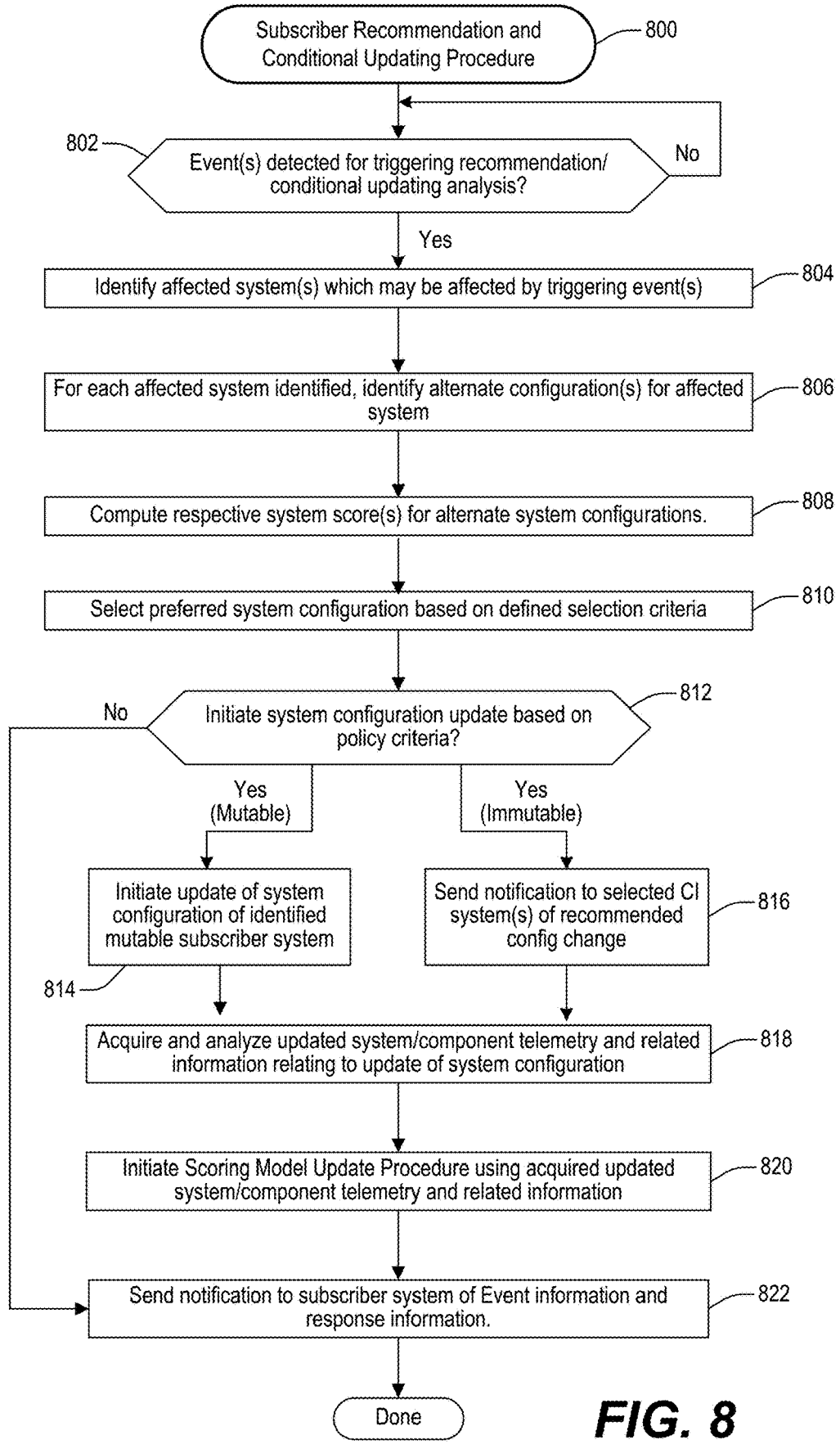

FIG. 8 shows an example of a Subscriber Recommendation and Conditional Updating Procedure 800 in accordance with a specific embodiment. In at least one embodiment, at least a portion of the Subscriber Recommendation and Conditional Updating Procedure may be implemented at one or more DataGrid Servers and/or at other network device(s)/system(s) which have been configured or designed to include functionality for performing DataGrid analytics services.

As shown at 702, the Subscriber Recommendation and Conditional Updating Procedure may continuously and/or periodically monitor for detection of triggering event(s) which may trigger initiation of a recommendation/conditional updating analysis. Examples of different types of events which may trigger initiation of one or more recommendation/conditional updating analyses may include, but are not limited to, one or more of the following (or combinations thereof):

Notification of updated system score(s) (e.g., either increase or decrease);
Notification of updated component score(s) (e.g., either increase or decrease);
Notification of new component version availability;
Defined event(s)/condition(s), which, for example, may include user-defined event(s)/condition(s), pre-defined event(s)/condition(s), etc.
Time-based event(s)
And/or other types of event(s)/condition(s) which satisfy defined threshold criteria for triggering a recommendation/conditional updating analysis.

In the specific example embodiment of FIG. 8, it is assumed for purposes of illustration, that the DataGrid System receives one or more notification(s) regarding a reduction in a component score for an identified system component, thereby triggering a recommendation/conditional updating analysis to be performed.

As shown at 804, the Subscriber Recommendation and Conditional Updating Procedure may identify affected subscriber system(s) which may be affected by the triggering event(s). For example, in the present example scenario, the DataGrid System may query the DG database to identify subscriber system(s) having system configurations which include the identified system component (e.g., associated with the reduced component score).

As shown at 806, for each affected subscriber system identified, the Subscriber Recommendation and Conditional Updating Procedure may automatically identify alternative system configuration(s) for that affected system. According to different embodiments, some of the activities and/or operations which may be carried out by the DataGrid System as part of the process of identifying alternative system configurations may include, but are not limited to, one or more of the following (or combinations thereof): finding alternate versions of affected component(s) which have relatively same or higher component score(s); creating new alternate system configuration(s) which utilize the alternate components; computing system score(s) for one or more of the alternate system configurations; comparing scores of alternate system configurations to those of the affected subscriber systems, etc.

Accordingly, as shown at 808, the Subscriber Recommendation and Conditional Updating Procedure may compute respective system score(s) for each of the alternate system configurations.

As shown at 810, the Subscriber Recommendation and Conditional Updating Procedure may select a preferred system configuration based on defined selection criteria. In at least one embodiment, the preferred system configuration may be selected from among the current (or existing) system configuration (e.g., which utilizes the affected component) and the alternate system configuration(s) (e.g., which do not use the affected component). According to different embodiments, the defined selection criteria may be standardized criteria, pre-defined criteria, and/or user-defined criteria such as, for example: select system with highest DGRI score or highest relative system score(s) (e.g., where system score is computed as the average of all system-related scores).

As shown at 812, the Subscriber Recommendation and Conditional Updating Procedure may determine whether or not to initiate a system configuration update (e.g., for one or more affected subscriber system(s)) based on defined policy criteria. According to different embodiments, the defined policy criteria may be standardized criteria, pre-defined criteria, and/or user-defined criteria such as, for example: only initiate upgrade for an identified subscriber system if the system score of the selected (preferred) system configuration exceeds the system score of the subscriber system's current configuration by at least n % (e.g., n=5, 10, 20, 25, etc.).

In at least one embodiment, if the Subscriber Recommendation and Conditional Updating Procedure determines that the defined policy criteria for initiating an system configuration update has not been met or satisfied (e.g., for an identified subscriber system), it may refrain from initiating a system configuration update for the identified subscriber system, and may send notification to the identified subscriber system about the event information and/or its recommendations.

In at least one embodiment, if the Subscriber Recommendation and Conditional Updating Procedure determines that the defined policy criteria for initiating a system configuration update or modification has been met or satisfied (e.g., for an identified mutable subscriber system), it may respond by taking appropriate action(s) to initiate (814) a system configuration update for the identified mutable subscriber system.

In at least one embodiment, a system may be considered to be a mutable system if changes or modifications can be made to that system's environment (e.g., where the system's environment may be defined as a collection of resources that have been provisioned and configured). For mutable systems (e.g., systems which permit changes or modification of the system's component(s), configuration(s), and/or other resources), the DataGrid System may automatically implement the selected system configuration updates using configuration automation tools such as Chef, Puppet, CFEngine, Salt, Ansible, and the like.

Alternatively, a system may be considered to be an immutable system if no changes or modifications can be made to that system's environment. As commonly known in the art, a basic concept of programming immutability is that once a system has been instantiated (be it a physical server, virtual server, virtual machine image, container image, system component, etc.), that system's environment is never changed. Instead, changes or modifications are effected by replacing the existing instance with a new, modified instance which incorporates the desired changes/modifications. In at least some embodiments, this may be achieved via the use of Continuous Integration (CI) and Continuous Delivery (CD) workflows, such as those illustrated and described with respect to FIGS. 9 and 10.

Continuous Integration (CI) is a development practice that encourages developers to integrate code into a shared repository frequently (e.g., several times a day). Each check-in is then verified by an automated build, allowing teams to detect problems early. Examples of Continuous Integration systems include Jenkins, and Travis CI. Continuous delivery (CD) is a software engineering approach in which teams produce software in short cycles, ensuring that the software can be reliably released at any time (and, for software-as-a-service systems, may be deployed). It aims at building, testing, and releasing software faster and more frequently. The approach helps reduce the cost, time, and risk of delivering changes by allowing for more incremental updates to applications in production.

As illustrated in the example embodiment of FIG. 8, if the Subscriber Recommendation and Conditional Updating Procedure determines (812) that the defined policy criteria has been satisfied for initiating a system configuration update for an immutable system, the DataGrid System may take appropriate action to initiate the immutable system configuration change by sending (814) notification of the recommended configuration change(s) to one or more Continuous Integration (CI) system(s). In at least one embodiment, it may be assumed that the Continuous Integration (CI) and Continuous Delivery (CD) systems are configured or designed to effect implementation of the recommended configuration changes by instantiating and deploying a new, modified instance of the identified immutable system which incorporates the recommended changes.

For illustrative purposes, some examples of configuration recommendations which may be generated by the DataGrid System may be:

For component Y of System ABC, set parameter X to 5 instead of 8.
For System DEF, upgrade package X to version Y.
For System DEF, remove package X.
For System DEF, replace package X version Y with package Z version W (e.g., replacing My SQL with MariaDB).
For System DEF, upgrade two or more related packages, e.g., package X to version Y and package Z to version W.
For System DEF, upgrade package X to the latest available version.
For System HIJ, set data redundancy level to 3 replicas.
For component Y of System HIJ, set data redundancy level to 3 replicas (e.g., if Y is a database or object store).
For System KLM, set autoscaling group size to 8 members.
For System KLM, set autoscaling trigger parameter P to value V.
For System KLM, set required redundancy to 3 systems running in different geographic locations or availability zones.
For System KLM, set backup policy to BBB (e.g., daily incremental backups, with monthly full backups, keep for 90 days).
For System DEF, use OS image H (e.g., setting distro name, version, update level).
For System DEF, use container image ID H.
For System DEF, use container image ID H and update package X to version Y.
For System ABC, set resource allocation X to Y (e.g., CPU to 2 dedicated cores, memory limit to 2 GB, storage performance to 1000 IOPS, or disk size to 100 GB, etc.). (Note: IOPS=I/O Operations Per Second a storage performance metric)
For Systems KLM and OPQ, the network route to R.
For System DEF, install patch, hotfix or update L.
For component Y of system ABC, use version V of library P.
For application A of system ABC, use version E.
For application A of system ABC, install patches L, M and N.
Etc.

As illustrated in the example embodiment of FIG. 8, it is assumed that an instance of the updated subscriber system configuration (e.g., whether it be a mutable subscriber system, or an immutable subscriber system) has been instantiated and deployed in a runtime environment, and that an instance of the Subscriber System Monitoring and Reporting Procedure is periodically collecting and reporting telemetry event(s)/signal(s) and other information relating to the runtime operation of the updated subscriber system configuration.

As shown at 818, the DataGrid System may acquire and analyze the telemetry event(s)/signal(s) and other information relating to the runtime operation of the updated subscriber system configuration.

As shown at 820, using the acquired telemetry and related information, the Subscriber Recommendation and Conditional Updating Procedure may initiate one or more Scoring Model Update Procedure(s) for updating one or more scores relating to the updated subscriber system configuration and/or components thereof.

As shown at 822, the Subscriber Recommendation and Conditional Updating Procedure may cause the DataGrid System to generate and send notification to the identified subscriber system about the relevant event information and/or response information. For illustrative purposes, some examples of such notifications may be:

System score decreased by N, but no modifications were made to current system configuration;
System score decreased by Y, and new configuration implemented: parameter X of component A set to 5 instead of 8, package X upgraded to version Z;
Score of component A decreased by M %, but no modifications were made to current system configuration;
Score of component A decreased by M, system score decreased by Y, recommend setting parameter X of component A to 5 instead of 8;
Score of component A decreased by M, recommend upgrading package X to version Z;
Etc.

In at least some embodiments, separate instances of a Subscriber Recommendation and Conditional Updating Procedures may be instantiated for different subscriber systems. Additionally, multiple instances of the Subscriber Recommendation and Conditional Updating Procedure may run concurrently with each other.

Figure 9:
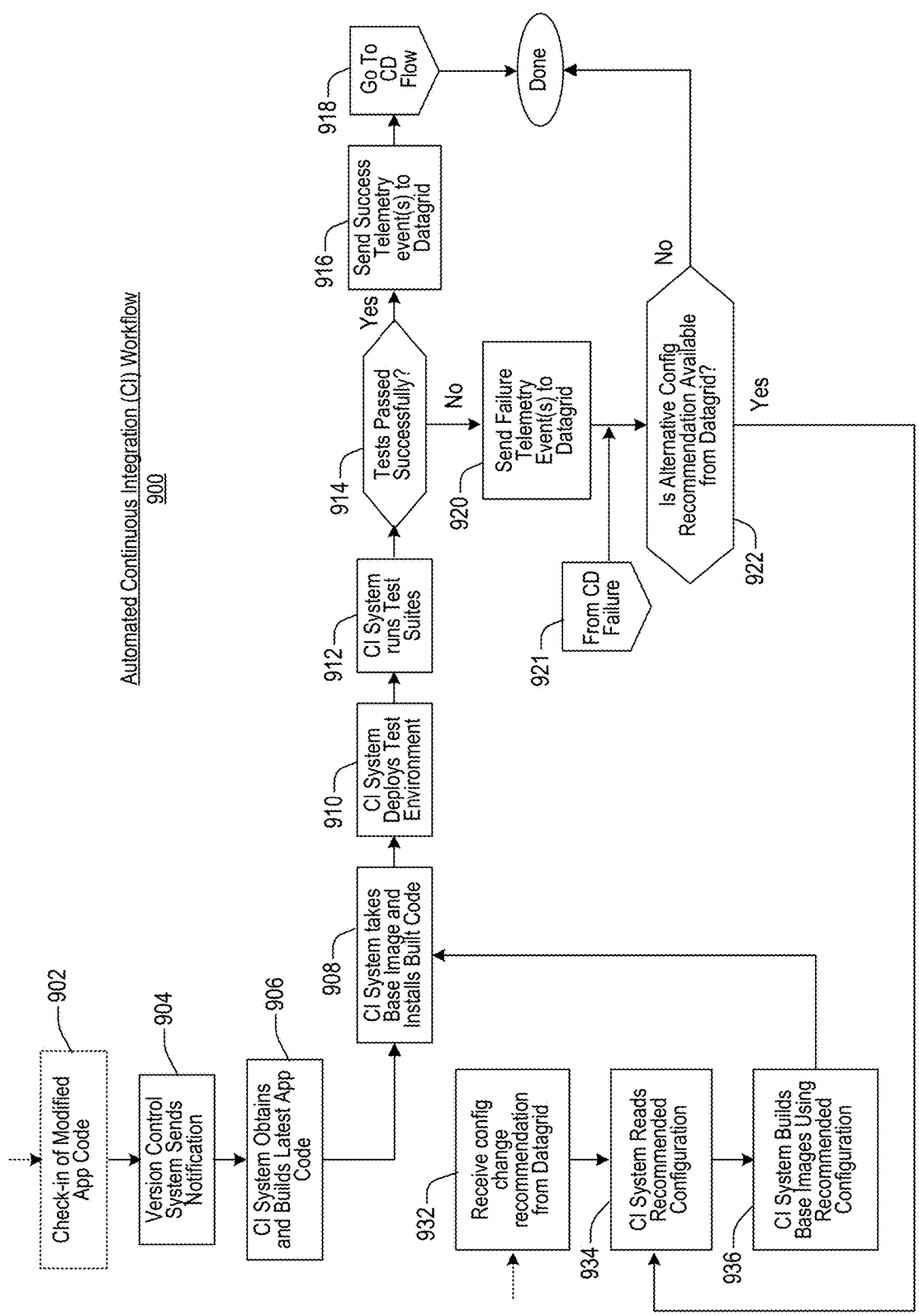

FIG. 9 shows an example of an Automated Continuous Integration (CI) Workflow 900 in accordance with a specific embodiment. In at least one embodiment, at least a portion of the Automated CI Workflow may be implemented at one or more Continuous Integration systems such as, for example, 304 of FIG. 3.

As illustrated in the example embodiment of FIG. 9, there are several different paths for causing a Continuous Integration system to perform testing and evaluation of new/modified software components. One such path is illustrated by the sequence of operations indicated at 902-906 of FIG. 9. For example, as shown at 902, it is assumed that a developer or other entity initiates a "check-in" of modified software code into a Version Control (VC) system. In at least one embodiment, the "check-in" operation is initiated for the purpose of causing the modified software code to be tested and evaluated by the Continuous Integration system. The VC system may then notify (904) the Continuous Integration (CI) system of modified code to be tested. In alternate embodiments, the CI system may periodically poll the VC system for modified code to be tested. Upon receiving the notification from the VC system, the CI system may obtain and build (906) (e.g., compiles) a base image of an updated app code which includes the modified code to be tested.

Another such path is illustrated by the sequence of operations indicated at 932-936 of FIG. 9. For example, as shown at 932, the Continuous Integration system may receive notification of a system configuration change recommendation from the DataGrid Analytics Service (e.g., as illustrated at 816, of FIG. 8). According to different embodiments, a configuration change recommendation notification may include different types of configuration change recommendations such as, for example, one or more of the following (or combinations thereof):

package version change recommendations;
code change recommendations;
parameter change recommendations;
component version change recommendations;
container change recommendations;
package change recommendations;
component change recommendations;
virtual machine change recommendations;
version upgrade recommendations;
version downgrade recommendations;
etc.

Upon receiving such notification, the CI system may read (934) the recommended configuration changes, and build (936) a base image of a modified system configuration using the system configuration change recommendations.

As shown at 908, the CI system utilizes the base image, and installs built code. In at least one embodiment, this may result in the creation of a "new build" disk image which is ready to be instantiated (e.g., run on virtual machine, incorporated into container image, etc.), tested, and evaluated by the Continuous Integration system.

As shown at 910, the CI system deploys a test environment, and instantiates a runtime instance of the new build disk image for testing and evaluation purposes. The CI system then runs (912) one or more selected test suite(s) on the instance of the test disk image running in the test environment, and evaluates the test results to determine (914) if all tests were passed successfully.

Figure 10:
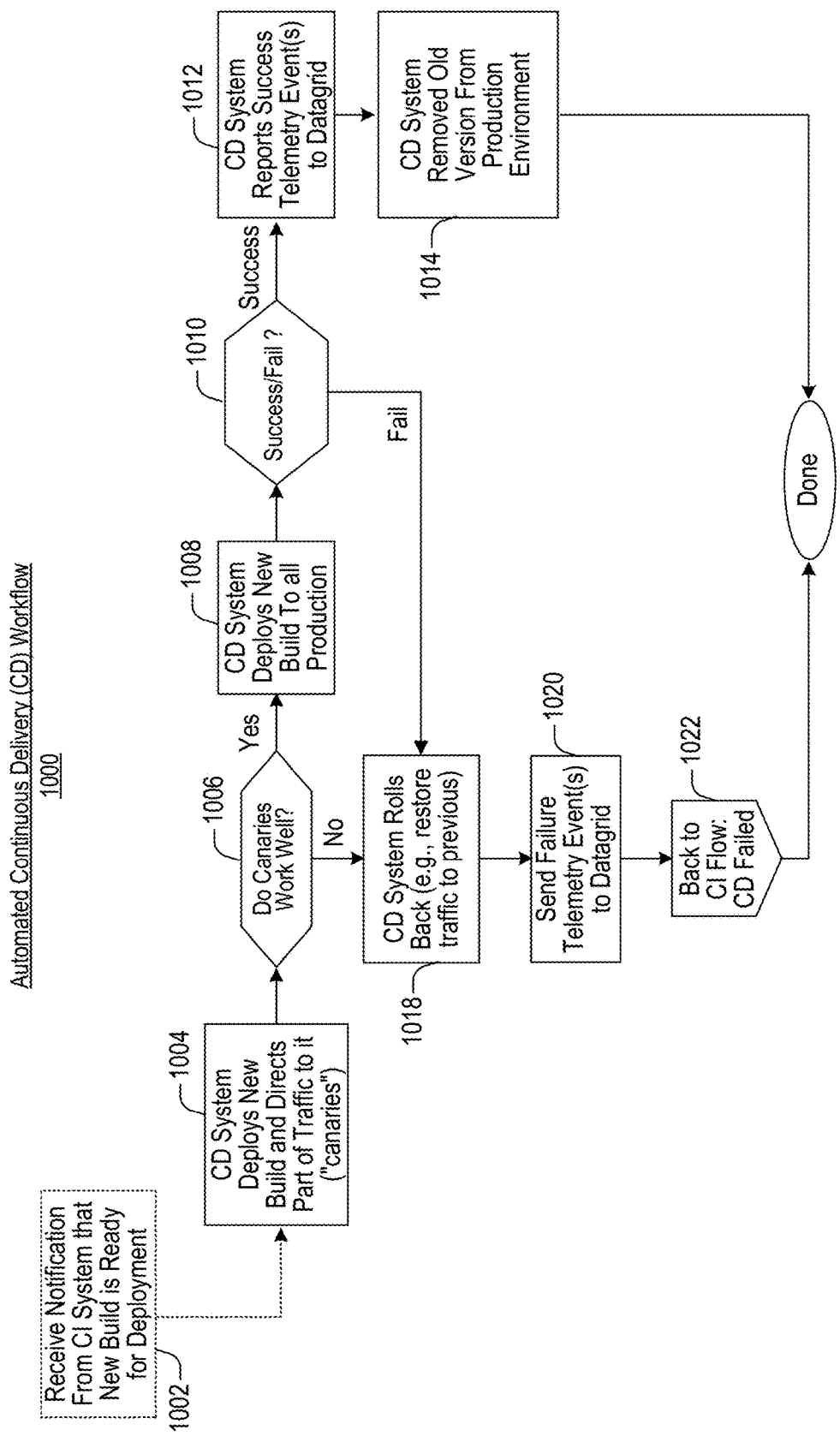

In at least one embodiment, if the CI system determines that all tests were passed successfully, it may generate and send (916) to the DataGrid Analytics Service "success" telemetry event(s) and other information relating to the testing and evaluation of the new build. Additionally, the Continuous Integration system may take appropriate actions to initiate a Continuous Delivery workflow for performing additional testing and deployment of the new build. An example embodiment of a Continuous Delivery workflow is illustrated in FIG. 10.

Returning to 914 of FIG. 9, if the CI system determines that one or more tests were not passed successfully, it may generate and send (920) to the DataGrid Analytics Service "fail" telemetry event(s) and other information relating to the testing and evaluation of the new build. Additionally, as shown at 922, the Continuous Integration system may query the DataGrid Analytics Service to determine if any alternate configuration recommendations are available. If alternate configuration recommendations are available from the DataGrid Analytics Service, the CI system may read (934) the alternate configuration recommendations, and build (936) a base image of a modified system configuration using the alternate configuration recommendations.

In at least some embodiments, the Continuous Integration workflow may include automated functionality for discriminating between a failure caused by a coding error and one caused by the OS/container base image itself. In this way, the success/failure notification from a build may be fed as a signal that may then be used (e.g., by the DataGrid Analytics Service) to evaluate an OS/container configuration.

In some embodiments, the operation(s) of building a new base image may be implemented as a set of configuration modification instructions to be executed on an existing base image, such as, for example during the "cloud init" phase of an Amazon EC2 virtual machine image, or using a Dockerfile that builds a new image starting from a prior image and performing configuration changes to create the desired configuration.

FIG. 10 shows an example of an Automated Continuous Delivery (CD) Workflow 1000 in accordance with a specific embodiment. In at least one embodiment, at least a portion of the Automated CD Workflow may be implemented at one or more Continuous Delivery systems such as, for example, 304 of FIG. 3.

As shown at 1002, it is assumed that the Continuous Delivery system receives notification from the Continuous Integration system that a new build is ready for attempted deployment in live production environments.

As shown at 1004, CD system deploys new/modified version of application build in selected live production environment(s) (e.g., new build is deployed at selected severs which are deployed in live customer environment), and directs a portion of traffic to each for testing, verification and evaluation purposes. These initial live production test servers may be referred to as "Canaries".

As shown at 1006, the Continuous Delivery system monitors and evaluates performances of each of the Canaries. In at least one embodiment, if the Continuous Delivery system determines that the deployed Canaries are not performing well (e.g., performances of some or all Canaries does not satisfy defined minimum performance criteria or fails to process application requests), the CD system may roll back (1018) deployment of the Canaries, for example, by restoring diverted traffic back to deployed builds of the previous build version. In at least some embodiments, the Continuous Delivery system may generate and send (1020) to the DataGrid Analytics Service "fail" telemetry event(s) and other information relating to the deployment and evaluation of the new build. Additionally, as illustrated at 1022, the Continuous Delivery system may notify the Continuous Integration system of the failed deployment of the new build, and may take appropriate action to cause the workflow to return back to the CI workflow (e.g., as illustrated at 921 of FIG. 9). In some embodiments, this may trigger an alternate configuration to be attempted for the new deployment, resulting in a successful deployment.

In at least some embodiments, if the Continuous Delivery system determines that the deployed Canaries are performing well (e.g., performances of the deployed Canaries satisfies defined minimum performance criteria), the CD system may deploy (1008) the new build to all (or selected) live production environment(s), and may continuously and/or periodically monitor (1010) the production environment(s)

where instances of the new build have been deployed for occurrences of success/fail telemetry event(s).

As illustrated at 1010 in the example embodiment of FIG. 10, if the Continuous Delivery system detects failures in one or more of the new builds which have been deployed to the live production environment(s), the CD system may roll back (1018) deployment of the new builds, for example, by redeploying the previous build version and/or by routing traffic to deployed builds of the previous build version. The Continuous Delivery system may also generate and send (1020) to the DataGrid Analytics Service "fail" telemetry event(s) and other information relating to the deployment and evaluation of the new build. Additionally, as illustrated at 1022, the Continuous Delivery system may notify the Continuous Integration system of the failed deployment of the new build, and may take appropriate action to cause the workflow to return back to the CI workflow.

As shown at 1012, if the Continuous Delivery system detects success telemetry event(s) in all (or selected) live production environment(s) where the new builds have been deployed, the Continuous Delivery system may report (1012) the "success" telemetry event(s) to the DataGrid Analytics Service. Additionally, in at least some embodiments, the CD system may take appropriate action 1014 to remove old build version(s) from production environments (e.g., by freeing appropriate system resources).

Proactive DataGrid Mechanisms for Testing Unknown Data Points

Monte Carlo simulation techniques generally refer to a broad class of computational algorithms that rely on repeated random sampling to obtain numerical results. For example, in some embodiments, Monte Carlo simulation furnishes the decision-maker with a range of possible outcomes and the probabilities they will occur for any choice of action, and performs risk analysis by building models of possible results by substituting a range of values (e.g., probability distribution) for any factor that has inherent uncertainty. It may then calculate results over and over, each time using a different set of random values from the probability functions. Depending upon the number of uncertainties and the ranges specified for them, a Monte Carlo simulation could involve thousands or tens of thousands of recalculations before it is complete.

Figure 12:
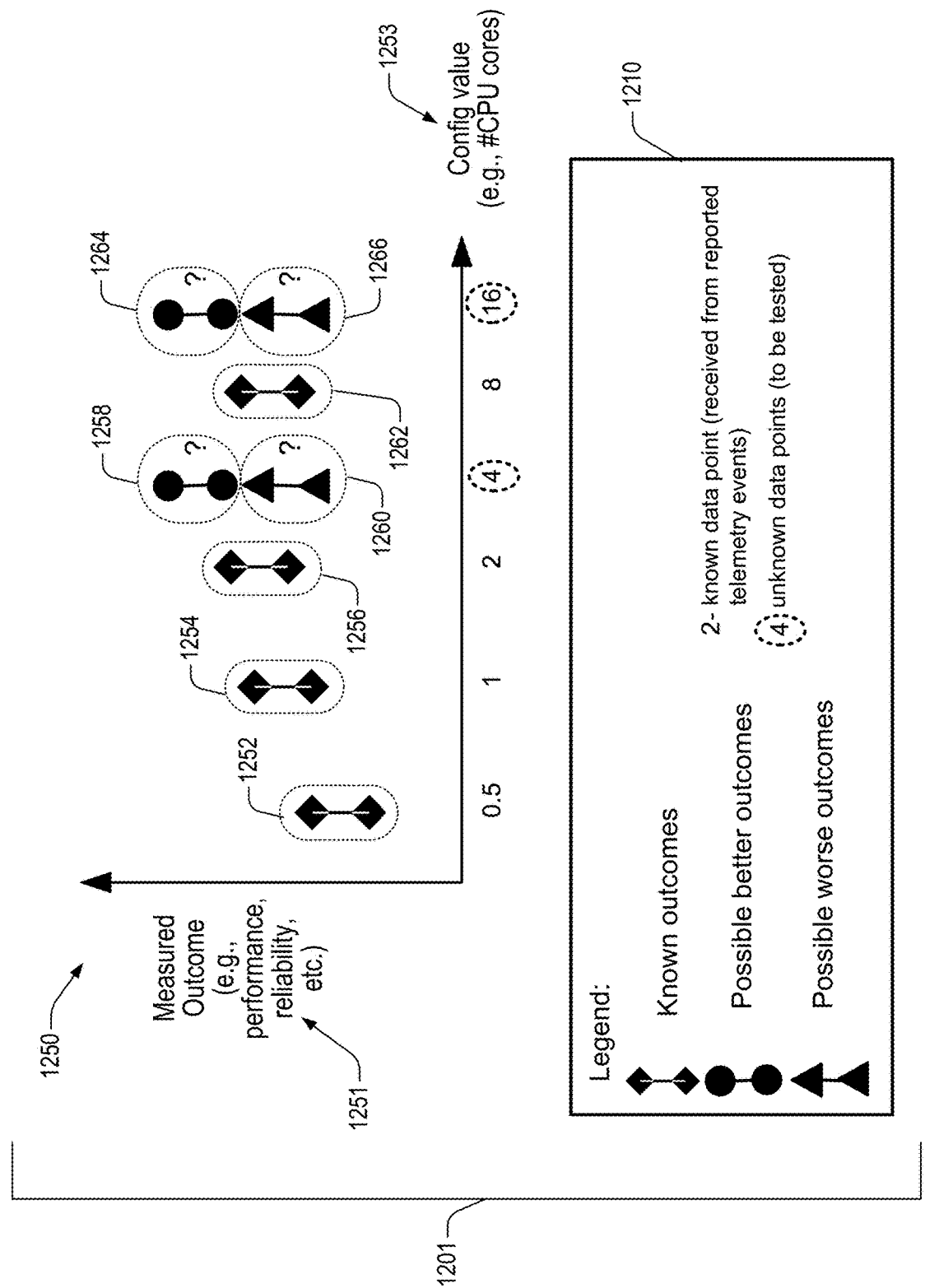
FIG. 12 shows an example graph 1250 (with legend 1210) (collectively referred to as chart 1201) in which a range of known and unknown data points are plotted.

FIG. 12 shows an example graph 1250 (with legend 1210) (collectively referred to as chart 1201) in which a range of known and unknown data points are plotted. In this particular example, it is assumed that the plotted data points relate to the measured outcomes (Y-axis, 1251) of a particular system configuration metric (e.g., performance, reliability, vulnerability, etc.) which have been plotted as a function of a specific configuration parameter (e.g., number of CPU cores) (X-axis, 1253). For purposes of illustration, and ease of explanation, it will be assumed that the system configuration metric being measured (at the Y-axis) is system performance.

As illustrated in the example embodiment of FIG. 12, graph 1250 includes a plurality of known data points (and/or known ranges of data), as indicated at 1252, 1254, 1256, and 1262. In this example, it is assumed that the known data displayed at the graph 1250 has been obtained from subscriber system telemetry information collected from a plurality of different subscriber systems (e.g., deployed at one or more data centers). For example, in at least one embodiment, at least a portion of the subscriber system telemetry information may be collected by multiple instances of the Subscriber System Monitoring and Reporting Procedure (e.g., FIG. 5), and reported to the DataGrid Analytics Service.

Interpreting the plotted data of FIG. 12, it can be readily be observed that:

The range of values of measured system performance for subscriber system configurations having 0.5 CPU cores is relatively lower than the ranges of values of measured system performance for subscriber system configurations having 1, 2, or 8 CPU cores.

The range of values of measured system performance for subscriber system configurations having 2 CPU cores is relatively higher than the ranges of values of measured system performance for subscriber system configurations having 0.5, 1, or 8 CPU cores.

However, as illustrated in the graph of FIG. 12, the ranges of values of measured system performances for subscriber system configurations having either 4 CPU cores or 16 CPU cores is unknown. This is because (as assumed in this particular example) there are currently no active subscriber system configurations which are configured to have either 4 CPU cores or 16 CPU cores. In order to help fill in the missing data, the DataGrid Analytics Service may be configured or designed to include functionality for facilitating the acquisition of unknown or missing data points. One example of such functionality is represented by the DataGrid Monte Carlo Sampling Procedure of FIG. 11.

Figure 11:
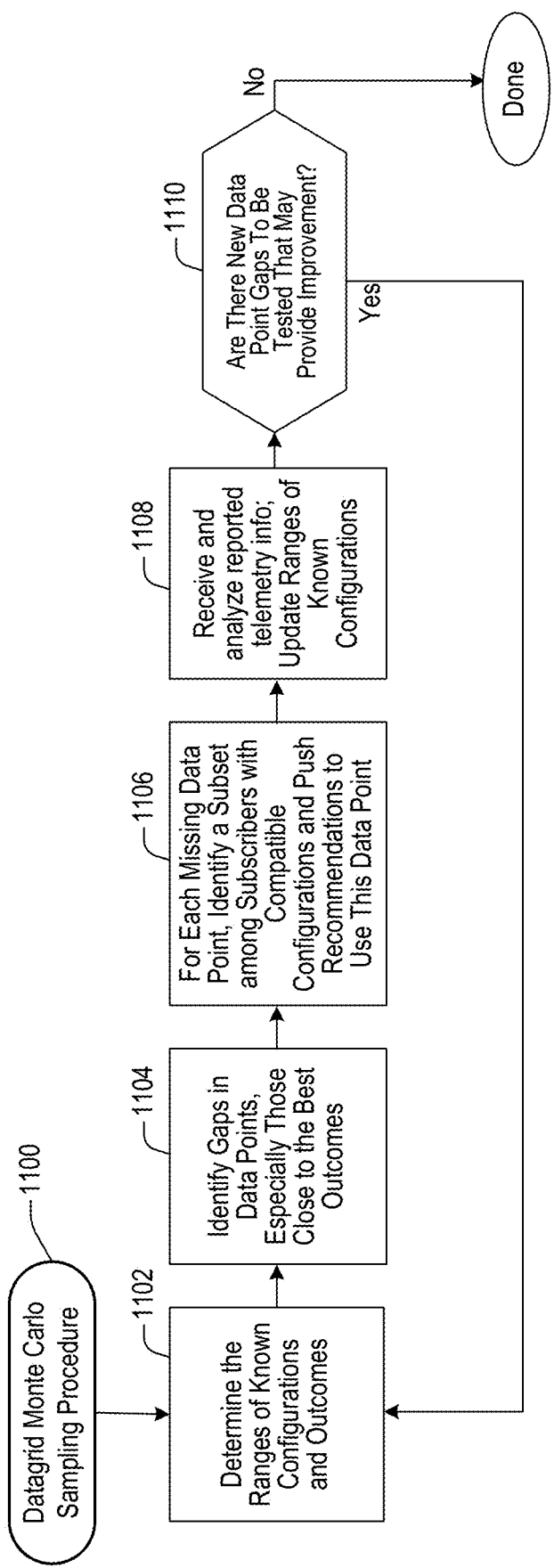

FIG. 11 shows an example of a DataGrid Monte Carlo Sampling Procedure 1100 in accordance with a specific embodiment. In at least one embodiment, at least a portion of the DataGrid Monte Carlo Sampling Procedure may be implemented at one or more DataGrid Servers and/or at other network device(s)/system(s) which have been configured or designed to include functionality for performing DataGrid analytics services. For purposes of illustration, it is assumed in the specific example embodiment of FIG. 11 that the DataGrid Monte Carlo Sampling Procedure 1100 is implemented by the DataGrid Analytics Service.

The DataGrid Monte Carlo Sampling Procedure of FIG. 11 leverages a modified technique of Monte Carlo simulation which has been specifically adapted for use within the DataGrid and Subscriber networks. More specifically, unlike conventional Monte Carlo simulation techniques, the DataGrid Monte Carlo Sampling Procedure does not rely on repeated random sampling to obtain numerical results, but rather engages in directed and proactive manipulation of different subscriber system configurations for the purpose of determining and/or acquiring unknown data points (or other desired information which is currently unknown), rather than passively waiting for such data points to occur naturally.

For purposes of illustration, the flow diagram of FIG. 11 will be described by way of illustration with reference to the example data illustrated in the graph 1250 of FIG. 12.

In at least one embodiment, the DataGrid Analytics Service may be configured or designed to include functionality for analyzing reported subscriber system telemetry information, identifying unknown or missing data points, and for proactively facilitating the acquisition of subscriber system telemetry information relating to unknown/missing data points. Accordingly, in this example, it is assumed that the DataGrid Analytics Service initiates the DataGrid Monte Carlo Sampling Procedure to acquire subscriber system telemetry information for subscriber system configurations having 4 CPU cores, and for subscriber systems having 16 CPU cores.

As shown at 1102 of FIG. 11, the DataGrid Analytics Service may determine the ranges of known configurations and outcomes. For example, referring to the example of FIG. 12, the DataGrid Analytics Service may determine the ranges of the following known configuration values and outcomes:

TABLE 1

| Config Value (# CPU Cores) | Range of Known Outcomes |
|---|---|
| 0.5 | R1-R2 |
| 1 | R3-R4 |
| 2 | R5-R6 |
| 4 | ? |
| 8 | R7-R8 |
| 16 | ? |

As shown at 1104, the DataGrid Analytics Service may identify gaps in data points or data point ranges (e.g., range of outcomes unknown for config value=4; range of outcomes unknown for config value=16), particularly those closest to data points associated with relatively favorable outcomes.

As shown at 1106, for each identified missing data point, the DataGrid Analytics Service may identify a different subset of systems among subscriber systems with compatible configurations, and push system configuration recommendations to the identified subset of systems to cause each of them to change their respective configurations by using the recommended configuration parameter associated with the identified missing data point. In at least one embodiment, it is preferable that the subset of systems identified for testing a particular missing data point are distributed across large populations and/or distributed across many different subscribers and/or subscriber systems so that no single subscriber is significantly and/or adversely affected by the test configurations.

For example, referring to the example of FIG. 12, the DataGrid Analytics Service may:

- Identify a config value of 4 CPU Cores as first missing data point to be tested using the DataGrid Monte Carlo Sampling Procedure.
- Identify a configuration value of 16 CPU Cores as second missing data point to be tested using the DataGrid Monte Carlo Sampling Procedure.
- Identify a first subset of "test" systems among subscriber systems with compatible configurations, and push a first set of system configuration recommendations to the first subset of systems to cause each of them to change their respective configurations to use exactly 4 CPU cores.
- Identify a second subset of "test" systems among subscriber systems with compatible configurations, and push a second set of system configuration recommendations to the second subset of systems to cause each of them to change their respective configurations to use exactly 16 CPU cores.

In at least some embodiments, the act of pushing a set of system configuration recommendations may be performed by the Automated Continuous Integration Workflow illustrated in FIG. 9, the Automated Continuous Delivery Workflow illustrated in FIG. 10, and/or the Subscriber Recommendation and Conditional Updating Procedure illustrated in FIG. 8.

In at least one embodiment, each of the "test" systems (e.g., corresponding to the first and second subsets of subscriber systems) may implement the recommended configuration changes. Various instances of the Subscriber System Monitoring and Reporting Procedure may collect telemetry information (e.g., telemetry event(s), signal(s), outcomes, etc.) for each of the test subscriber systems, and may report the collected telemetry information to the DataGrid Analytics Service. By way of illustration, in the present example, the first subset of "test" subscriber systems may each report their respective telemetry information, which may include measured outcomes for various metrics associated with systems configured to have 4 CPU cores. Similarly, the second subset of "test" subscriber systems may each report their respective telemetry information, which may include measured outcomes for various metrics associated with systems configured to have 16 CPU cores.

As shown at 1108, the DataGrid Analytics Service may receive and analyze reported telemetry information corresponding to the first and second subsets of "test" systems. The DataGrid Analytics Service may use the reported telemetry information to identify configuration values and measured outcomes corresponding to one or more of the missing data points, and may use such information to update ranges of known configurations and outcomes. In at least some embodiments, the newly received data points may be automatically and/or dynamically selected by the DataGrid System to complement the set of known data points, enabling the DataGrid Analytics Service to identify or determine if the newly received data points provide better or worse outcomes than the previously known data points.

As shown at 1110, the DataGrid Analytics Service may analyze the update ranges of known configurations and outcomes to determine if there are any new/additional data point gap(s) (or unknown data points) to be tested which may provide improvement. For example, referring to the graph of FIG. 12, it can be observed from the plotted data that the relatively best measured outcomes are associated with system configurations having 2 CPU cores and 8 CPU cores. Additionally, as illustrated in the example embodiment of FIG. 12, the range of measured outcomes associated with system configurations having anywhere from 3 CPU cores to 7 CPU cores is unknown. However, in at least one embodiment, the DataGrid Analytics Service may be configured or designed to include functionality for interpreting the trend of the known data points to suggests that improved outcomes may possibly be obtained by systems configured to have a number of CPU cores within the range of 3-7 CPU cores. Accordingly, based on this data, the DataGrid Analytics Service may automatically and dynamically initiate multiple different instances of the DataGrid Monte Carlo Sampling Procedure to test system configurations having a number of CPU cores within the range of 3-7 CPU cores. In at least some embodiments, multiple instances of the DataGrid Monte Carlo Sampling Procedure may run concurrently with each other in order to concurrently test multiple different system configurations during a given time period.

In at least some embodiments, the additional data point gap searches may be "fractal", for example, by going to finer granularity with each additional data point gap searches. For example, testing system configurations with 6 CPU cores, once measured outcomes are known for systems with 4 CPU cores and 8 CPU cores. Thereafter, testing system configurations with 5 CPU cores, once measured outcomes are known for systems with 4 CPU cores and 6 CPU cores, etc.

According to different embodiments, the DataGrid Monte Carlo Sampling Procedure may be adapted to test any type of system resource which may be configured, including, for example, memory resources, CPU resources, interface resources, component resources, package version number (e.g., release 1, 2, 3, 4, 5), etc. Additionally, in at least some embodiments, the configuration parameter (or value) to be tested may be multidimensional (e.g., number of CPU cores and memory limit; size of RAM and package version number; etc.).

Figure 13:
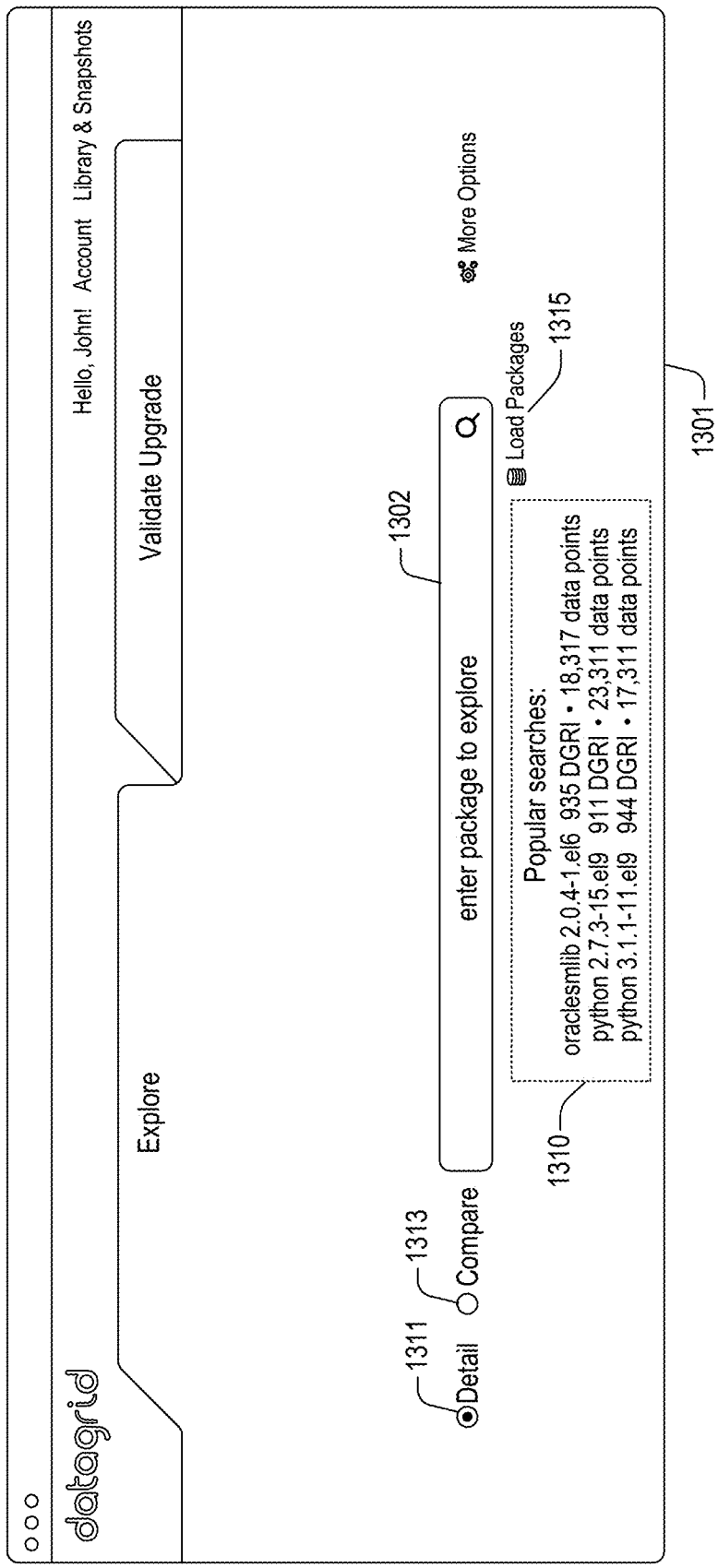

FIG. 13 illustrates an example screenshot of a graphical user interface (GUI) 1301 which may include functionality for causing the DataGrid System to initiate and/or perform various operation(s) and/or action(s) relating to the DataGrid technology.

In at least one embodiment, GUI 1301 may serve as a starting point for a user to search for packages they may be interested in using or evaluating. The search bar 1302 allows the user to enter some or all or part of a package name. As the package name is entered, or upon the user pressing the Enter key or mouse-clicking on the magnifying glass icon, the system searches the database and displays packages which match the user query, ordered by popularity (see FIG. 14).

Figure 15:
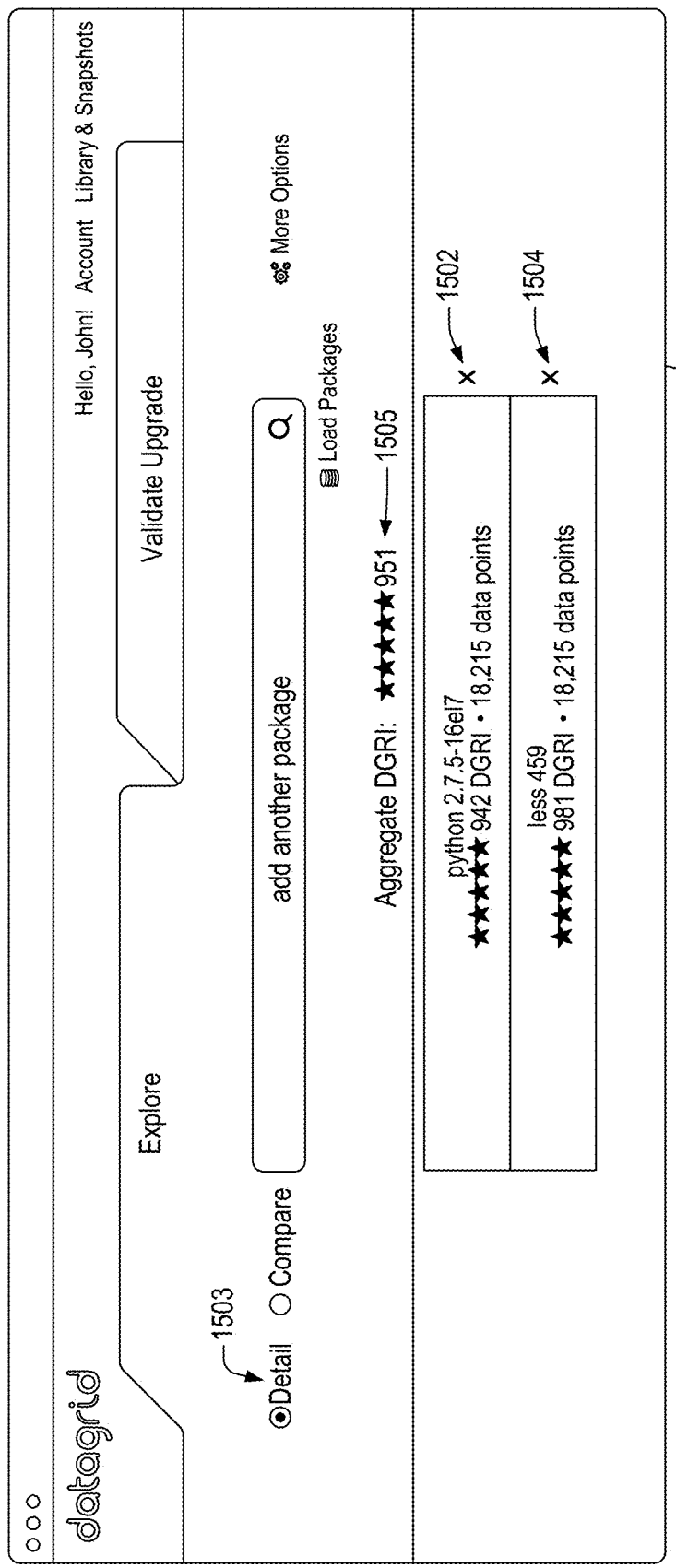
Figure 16:
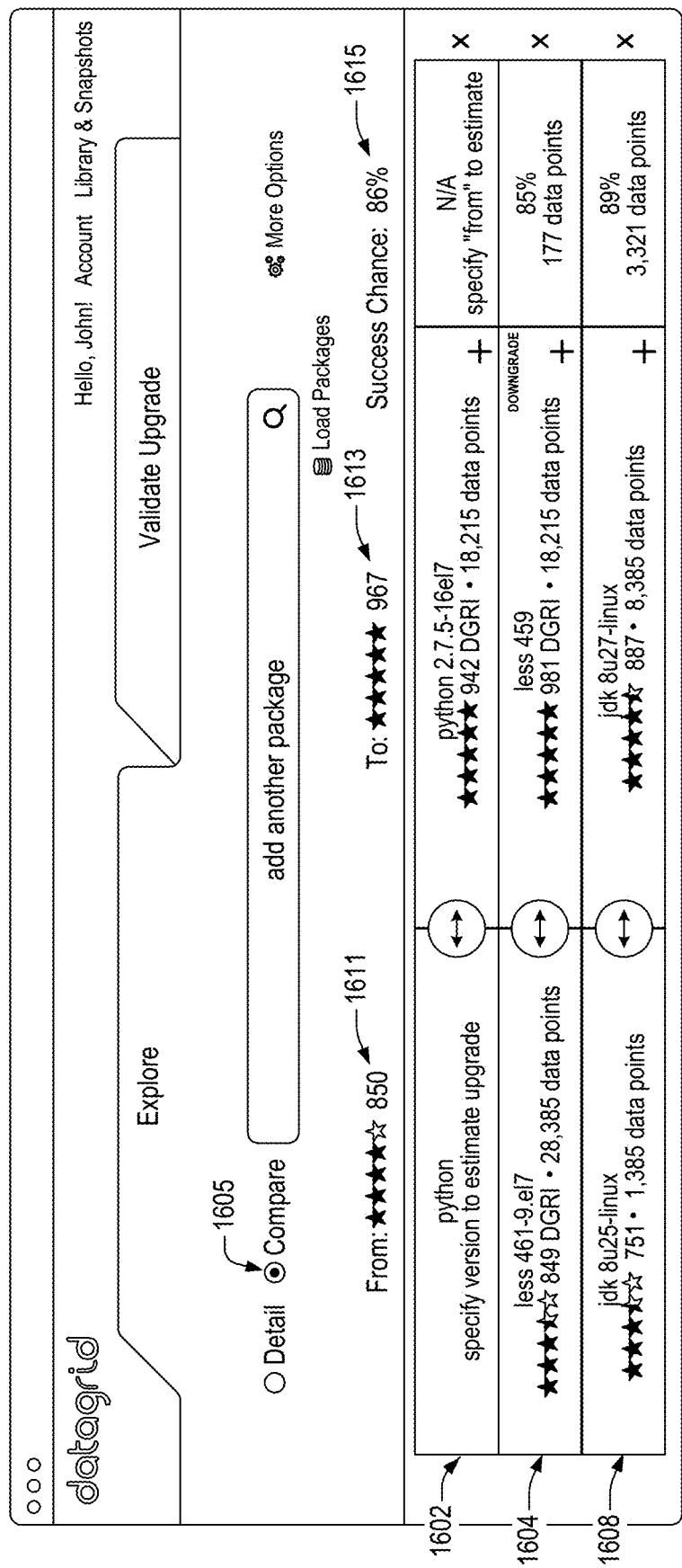

The Explore Tab provides the GUI used for performing package searches (see FIGS. 13-14), picking packages from search results to include in a package pick list (see FIG. 15), and comparing packages in this list to other versions of these packages which may be used in upgrading or downgrading from the versions in the first list (see FIG. 16). In relation to package changes, the pick list may be considered a list of source packages, while the compared-to list may be considered as a list of target packages.

The Validate Upgrade Tab provides a related GUI (see FIG. 22) which allows a user to indicate, search for, examine, and evaluate detailed information related to upgrading or downgrading a particular package from one or more source versions to one or more target versions (see FIGS. 22-27).

The Detail radio button 1311, if selected, causes the GUI to display a detailed pick list of packages (see FIG. 15). The Compare radio button 1313, if selected, causes the GUI to display the pick list in relation to a target list. Packages on the pick list (From list) are shown in comparison to packages on the target list (To list). See FIG. 16. The Load Packages icon 1315 allows a user to upload a server configuration (e.g., list of packages) from the user's local computer to be included in the pick list (see FIG. 19). Before the user has entered a search query, this GUI shows some of the most popular searches 1310 made by some or all users.

As illustrated in the example embodiment of FIG. 13, each entry in the popular search list is displayed along with related information including, for example: a respective DGRI score, the number of data points for this package, etc.

For example, as illustrated in the example embodiment of FIG. 13, one popular package version is python version 2.7.3-15.e19, which has an associated DGRI score of 911, and an associated number of data points of 23,311.

In at least one embodiment, a respective DGRI score may represent a statistical assessment of the confidence of a particular server configuration, or of a particular package, and, like a credit score, is dynamic and predictive rather than forensic. The DGRI score is programmatically calculated from a large, and growing, set of historical data crowdsourced from many servers. The determination of a DGRI score may also be affected by other data sources such as publically available package vulnerability data, package issue-tracking databases, and test results published for particular package versions.

In at least one embodiment, a respective number of data points may represent the number of servers known by the DataGrid System to have the package installed, currently or historically.

In the specific embodiment of FIG. 13, it is assumed that:
The user has just loaded this web page and has performed no other operations.
Popular searches are automatically displayed with no query being entered.
The Detail radio button is selected by default.

Some embodiments of the GUI of FIG. 13 may be configured or designed to provide other types of information, content and/or functionality, including, for example, functionality for loading package lists from other sources such as from server configurations already present in the DataGrid System which may be related to the user's account.

Figure 14:
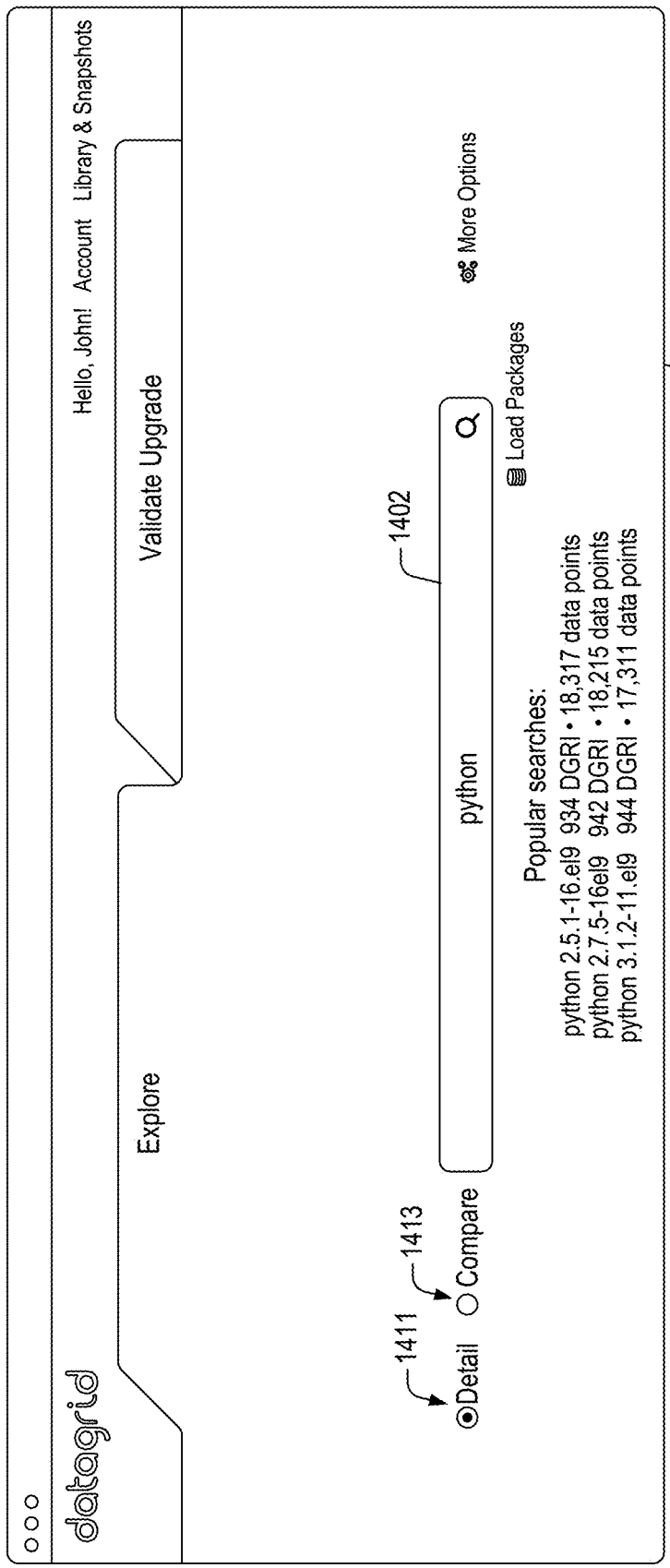

FIG. 14 illustrates an example screenshot of a graphical user interface (GUI) 1401 which may include functionality for causing the DataGrid System to initiate and/or perform various operation(s) and/or action(s) relating to the DataGrid technology such as, for example, one or more of the following (or combinations thereof):
Enabling users to search for desired packages by entering some or all or part of a selected package name in the search box.
Enabling user to select a package from among the search results to include in a package pick list.

In the specific embodiment of FIG. 14, it is assumed that the user has entered the term "python" in the search bar 1402 to initiate a search query for Python packages.

Once the user has entered a package name in the search bar, the DataGrid System uses the database to determine popular versions and associated DGRI scores of packages matching the input search terms, and display them to the user as a list of search results. Popular versions of the search results may be highlighted or prominently displayed.

Selecting the detail button 1411 enables the user to view details relating to one or more selected search results. Selecting the compare button 1413 enables the user to view details of one or more selected search results in comparison to other versions (e.g., installed, latest or targeted).

The user may click on particular search result to add it to a user-customizable pick list of packages. This is illustrated, for example, in FIG. 15. This list of packages may represent a partial, or even complete, configuration for a server.

Some embodiments of the GUI of FIG. 14 may be configured or designed to provide other types of information, content and/or functionality, such as, for example, one or more of the following (or combinations thereof):
Search results may be ordered by other means than popularity (number of data points), such as, for example, by package DGRI score.
Search results may be limited to show only package versions which are compatible with those specific packages already included in the pick list of packages.

FIG. 15 illustrates an example screenshot of a graphical user interface (GUI) 1501 which may include functionality for causing the DataGrid System to initiate and/or perform various operation(s) and/or action(s) relating to the DataGrid technology such as, for example, one or more of the following (or combinations thereof):
Enabling users to search for and identify additional packages (e.g., 1502, 1504) and to selectively add one or more of them to the user's customized package pick list.

Enabling users to remove one or more packages from the package pick list (e.g., by clicking on the X icon next to the package in the pick list).

In the specific embodiment of FIG. 15, it is assumed that the user has already searched for "python" and "less" packages, and selected from the search results one Python package and one less package to include in the pick list. In this specific example, it is assumed that the user has included the following packages in the pick list:

python version 2.7.7-16.e17
less version 459

As illustrated in the example embodiment of FIG. 15, GUI 1501 may be configured or designed to display various information related to each package on the pick list such as, for example, one or more of the following (or combinations thereof):

Package name.
Package version information.
Package DGRI score.
Number of data points for the package.
Package vulnerabilities.
And/or other information related to each package.

As illustrated in the example embodiment of FIG. 15, GUI 1501 may be configured or designed to display various information related to the entire pick list of packages, including, for example Aggregate DGRI score 1505. In at least one embodiment, this is the DGRI score for the entire pick list as calculated by the DataGrid System.

FIG. 16 illustrates an example screenshot of a graphical user interface (GUI) 1601 which may be configured or designed to serve as an interface for a user to evaluate a package pick list as a "From" configuration in comparison to a second list as a "To" configuration which is arrived at by upgrading or downgrading packages in the From list to their corresponding package in the To list. In some embodiments, this functionality may be used to plan and implement future configuration changes, e.g., by choosing which packages to upgrade and to what versions. Additionally, in at least some embodiments, this functionality may be used to analyze configuration changes that have already been performed.

According to different embodiments, GUI 1601 may include functionality for causing the DataGrid System to initiate and/or perform various operation(s) and/or action(s) relating to the DataGrid technology such as, for example, one or more of the following (or combinations thereof):

Enabling users to search for additional packages and add them to the From list.
Enabling users to remove one or more packages from the From list (e.g., by clicking on the X icon next to a row in the package table). This also removes any corresponding To list package entry.
Enabling users to add, remove or change one or more packages in the To list (e.g., by clicking on a + icon in the To list). (See, e.g., FIG. 17)
Enabling user to switch the positions of a pair of From and To packages (e.g., by clicking on the two-headed arrow icon).

In the specific embodiment of FIG. 16, it is assumed that:
The user has included three packages in the package pick list (python 1602, less 1604, and Java JDK 1608).
The user has clicked on the Compare radio button 1605 to cause the GUI to display the pick list as a From list, along with an associated To list.
The user has included three packages in the To list.

As illustrated in the example embodiment of FIG. 16, GUI 1601 may be configured or designed to display various information related to each package on the From or To list such as, for example, one or more of the following (or combinations thereof):

package name
package version information
package DGRI Score
number of data points for the package
package vulnerabilities
etc.

As illustrated in the example embodiment of FIG. 16, GUI 1601 may be configured or designed to display various information related to the each of the From and To lists, including for example: Aggregate DGRI scores (e.g., 1611, 1613). In at least one embodiment, the aggregate DGRI score for a given list (e.g., To list, From list) may be calculated by the DataGrid System based on the entire list of packages included in that particular list.

As illustrated in the example embodiment of FIG. 16, GUI 1601 may be configured or designed to display various information related to the each pair of packages on the From and To lists such as, for example, one or more of the following (or combinations thereof):

A percent chance of success in performing the upgrade or downgrade from the From package to the To package.
The number of data points known by the DataGrid System for the package change operation (e.g., the number of times such an upgrade or downgrade has occurred historically).

As illustrated in the example embodiment of FIG. 16, GUI 1601 may be configured or designed to display various information related to the chance of success of performing some or all the package change operations including, for example, A percent chance of success (e.g., 1615) in performing some or all the upgrade or downgrade operations from the From list to the To list.

Some embodiments of the GUI of FIG. 16 may be configured or designed to provide other types of information, content and/or functionality, such as, for example, functionality for downloading and executing, using the GUI a script of instructions for a command line package management utility such as yum, which may be configured or designed to perform the package change operations indicated in the relation between the From and To lists of packages.

Figure 17:
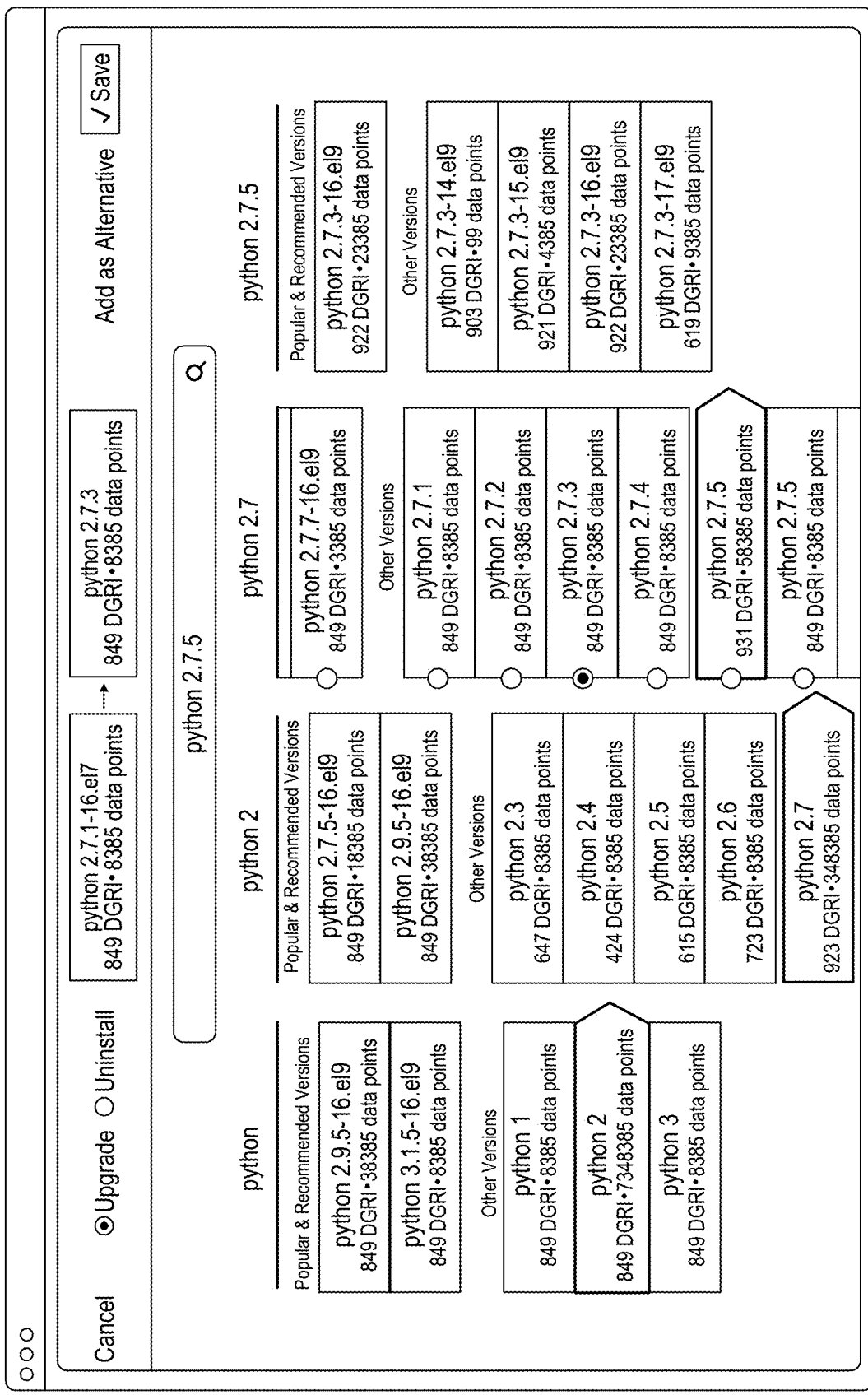

FIG. 17 illustrates an example screenshot of a graphical user interface (GUI) 1701 which may include functionality for causing the DataGrid System to initiate and/or perform various operation(s) and/or action(s) relating to the DataGrid technology including, for example, enabling users to explore and specify changing a package from one version to another using a rich set of data displayed to the user which indicates the possible changes which may be made by package major version, minor version, bugfix version and release number. In some embodiments, the GUI 1701 may present these possible changes in a tree-form, where, for example, selecting a major version for the target package causes to GUI to change the display of minor versions to include exactly those which are available with the major version, and, likewise, selecting a minor version causes the GUI to change the display of bugfix versions to include exactly those which are available with the minor version, etc.

In the specific embodiment of FIG. 17, it is assumed that:
The user has previously selected a particular package to change, and initiated the change operation, causing GUI 1701 to be displayed by the DataGrid System. In the example of FIG. 17 the package which has been selected to change is python 2.7.1-16.e17.

The user has previously selected the major version of the target package (Python 2, as selected in the left column), then the minor version of the target package (Python 2.7, as selected in the next column), then the bugfix version (Python 2.7.3 as indicated by the radio button selection in the next column).

As illustrated in the example embodiment of FIG. 17, GUI 1701 may be configured or designed to display various information related to each partial or complete package version specification such as, for example, one or more of the following (or combinations thereof):

Package name.
Package version information.
Package DGRI Score.
Number of data points for the package.
Etc.

In at least one embodiment, the DataGrid System calculates and provides DGRI scores, as well as the number of data points, not only for a completely specified package version, but for each of the successively more specific components of the complete version information.

Some embodiments of the GUI of FIG. 17 may be configured or designed to provide other types of information, content and/or functionality. For example, in at least one embodiment, each (or selected) component(s) of a package version specification may be display a range of package DGRI scores for some or all packages included in less significant components. For example, the major version may display a range of 400-810, indicating that amongst some or all packages of this major version, package DGRI scores range from a minimum value (e.g., 400) to a maximum value (e.g., 810).

Figure 18:
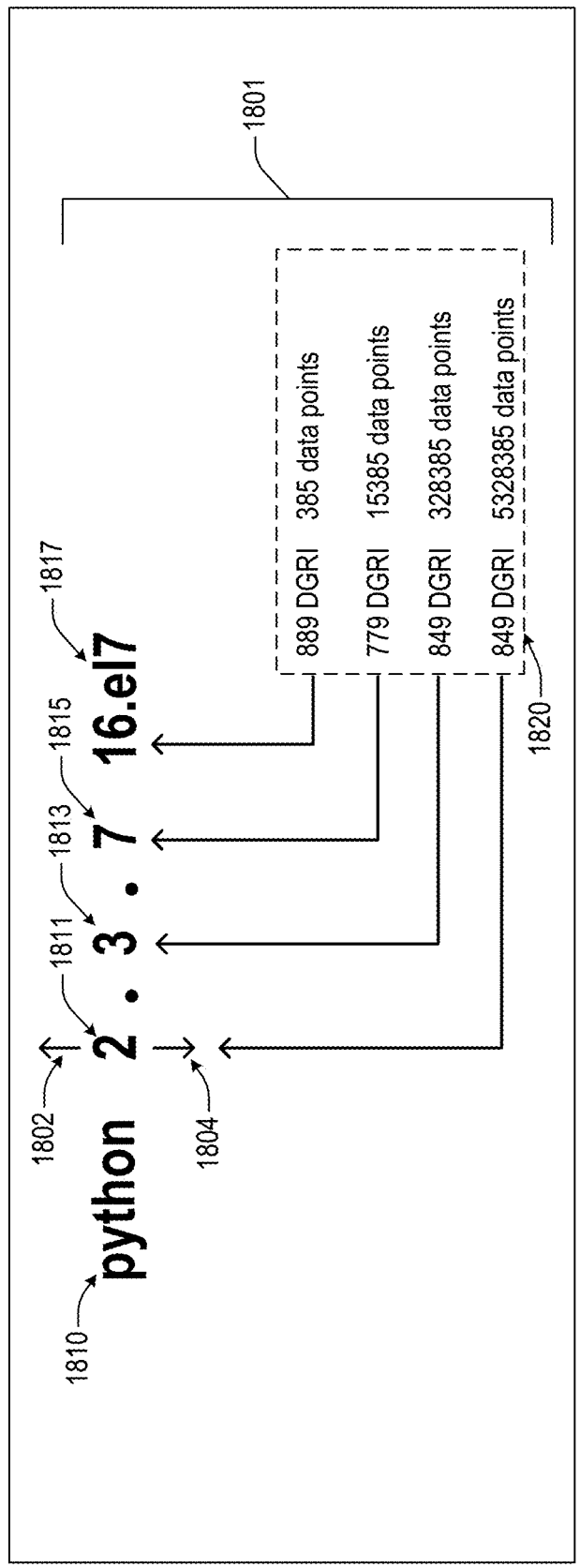

FIG. 18 illustrates an example screenshot of a graphical user interface (GUI) 1801 which may include functionality for causing the DataGrid System to initiate and/or perform various operation(s) and/or action(s) relating to the DataGrid technology including, for example, enabling users to explore and specify changing a package from one version to another by independently indicating changes (e.g., via increase/decrease adjustment arrows 1802, 1804) to one or more of the following (or combinations thereof):

The package major version (e.g., 1811),
The package minor version (e.g., 1813),
The package bugfix version 1815,
And/or the package release number 1817.

In at least one embodiment, the GUI 1801 may be configured to present these possible changes in the form of a package name and version specification, where, for example, selecting a component of the version specification causes up and down arrows to be displayed. The user may click on arrows 1802, 1804 to increment and/or decrement the selected version specifier, causing the GUI to change the display of associated DGRI scores and data points for the new version specifier. For example, in FIG. 18, python version 2 has a DGRI score of 849, version 2.3 a score of 849, version 2.3.7 a score of 779 and version 2.3.7-16.e17 a score of 889.

In the specific embodiment of FIG. 18, it is assumed that the user has previously selected a particular package to change, and initiated the change operation, causing this GUI (FIG. 18) to be displayed by the DataGrid System. In the example of FIG. 18 the package which has been selected to change is Python, and the current expression of the selected versioning is 2.3.7-16.e17.

As illustrated in the example embodiment of FIG. 18, GUI 1801 may be configured or designed to display various information (e.g., 1820) related to each component of a package version specification (e.g., major version, minor version, bugfix version, and release number) in relation to preceding (or including) components. For example, one or more of the following (or combinations thereof) may be displayed:

Version component DGRI Score;
Number of data points for the version component;
Etc.

In at least some embodiments, the DataGrid System may be configured or designed to include functionality for calculating and providing DGRI scores, as well as the number of data points, for each of the successively more complete specification of the complete version information.

Some embodiments of the GUI of FIG. 18 may be configured or designed to provide other types of information, content and/or functionality, such as, for example; each (or selected) component(s) of a package version specification may be display a range of package DGRI scores for some or all packages included in less significant components. For example, the major version may display a range of 400-810, indicating that amongst some or all packages of this major version, package DGRI scores range from a minimum of 400 to a maximum of 810.

Figure 19:
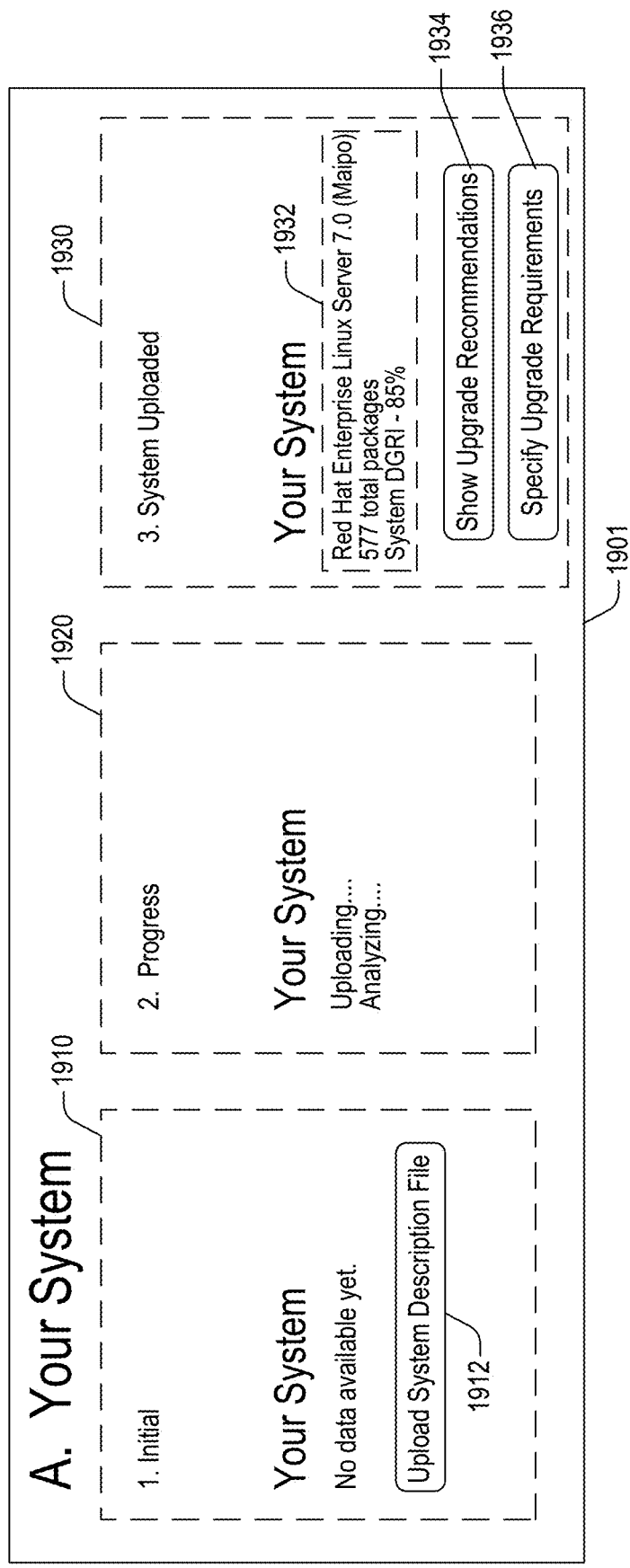

FIG. 19 illustrates an example screenshot of a graphical user interface (GUI) 1901 which may include functionality for causing the DataGrid System to initiate and/or perform various operation(s) and/or action(s) relating to the DataGrid technology such as, for example, one or more of the following (or combinations thereof):

Upload (1912) one or more system descriptor file(s). In at least one embodiment, a system description file may include a list of packages installed on a server which together are termed a server configuration.
Display a list of recommended upgrades to the server configuration (e.g., 1934)
Specify requirements for upgrades (e.g., 1936)

In the specific embodiment of FIG. 19, it is assumed that the user has previously chosen to upload a system description file and, using the GUI of FIG. 19, has selected such a file from the user's local computer, and uploaded the file to the DataGrid System.

As illustrated in the example embodiment of FIG. 19, GUI 1901 may be configured or designed to:

Display real-time status information (e.g., 1920, 1930) relating to the uploading and processing of the system description file.
Display various information 1932 relating to the uploaded system description file such as, for example, one or more of the following (or combinations thereof):
Operating system name
Operating system version
Number of packages in the server configuration
DGRI score of the server configuration
Etc.

Figure 20:
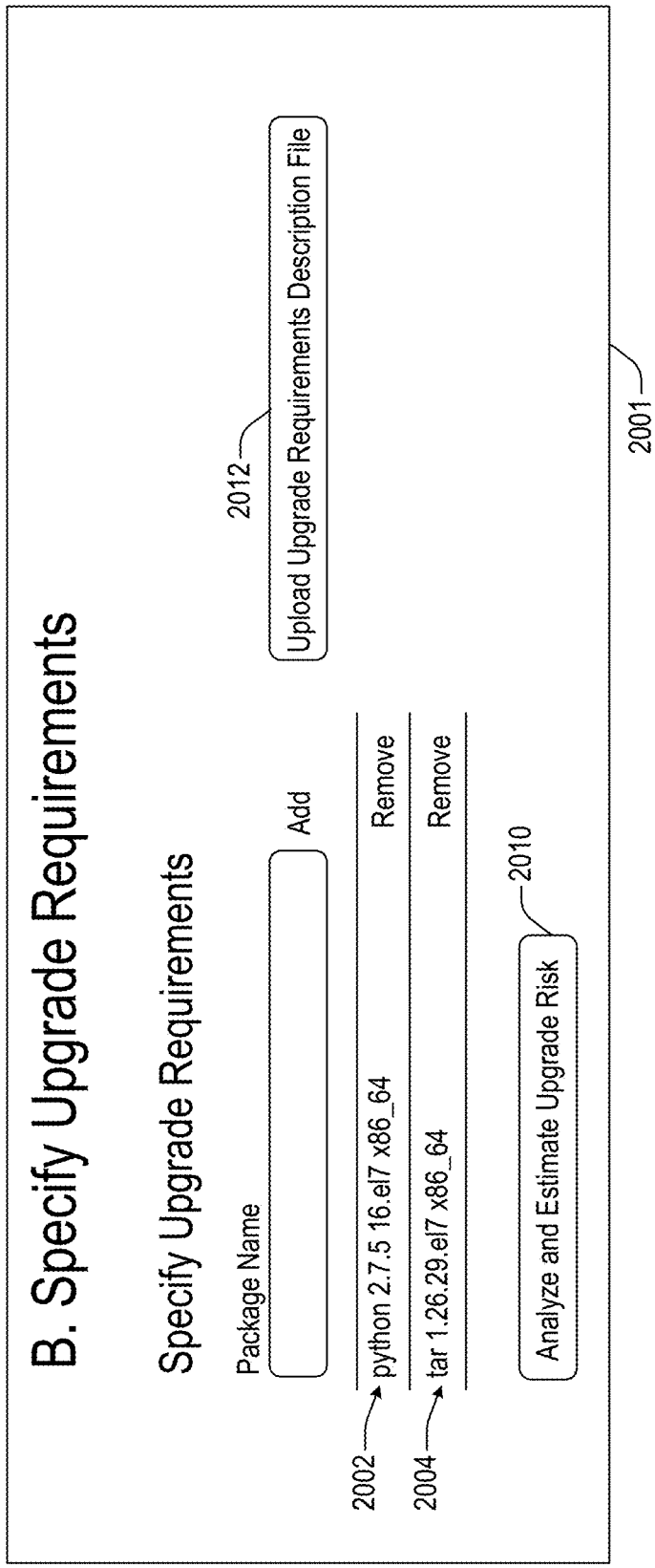

FIG. 20 illustrates an example screenshot of a graphical user interface (GUI) 2001 which may include functionality for causing the DataGrid System to initiate and/or perform various operation(s) and/or action(s) relating to the DataGrid technology such as, for example, one or more of the following (or combinations thereof):

Specify specific packages (e.g., 2002, 2004) which are to be required in the upgrade of a server configuration by entering the package names and version information using the GUI of FIG. 20.
Specify specific packages which are to be required in the upgrade of a server configuration by uploading (2012) one or more file(s) describing these requirements.

Analyze the risk of making the required package upgrades to the server configuration.

For example, in one embodiment, the DataGrid System creates a target server configuration based on the configuration to be upgraded and the upgrade requirements, analyzes this configuration, and displays the DGRI score of the target configuration and other information such as the number of data points and configuration vulnerabilities. In the specific embodiment of FIG. 20, it is assumed that the user has previously chosen to specify upgrade requirements for a server configuration (e.g., by clicking on the Specify Upgrade Requirements button 1936 of FIG. 19).

FIG. 21 illustrates an example screenshot of a graphical user interface (GUI) 2101 which may include functionality for causing the DataGrid System to initiate and/or perform various operation(s) and/or action(s) relating to the DataGrid technology including, for example, displaying a list of recommended package upgrades to a server configuration. In the specific embodiment of FIG. 21, it is assumed that the user has previously chosen to view recommended upgrades for a server configuration (e.g., by clicking on the Show Upgrade Recommendations button 1934 of FIG. 19).

As illustrated in the example embodiment of FIG. 21, GUI 2101 may be configured or designed to display various information 2120 related to each package (e.g., 2122, 2124, 2126) of the recommended packages upgrades such as, for example, one or more of the following (or combinations thereof):

Package name 2121
Version 2123
Release 2125
Architecture 2127
Recommended target version 2129
The reliability of the upgraded package 2131 (e.g., which may be calculated by the DataGrid System and expressed as a percent)
The number of data points for the target package 2133
Etc.

As illustrated in the example embodiment of FIG. 21, GUI 2101 may be configured or designed to display various information related to the aggregate of some or all upgrades such as, for example, one or more of the following (or combinations thereof):

The current system configuration DGRI score 2110
The estimated system DGRI score after the upgrade to 2134
The reliability estimate of some or all upgrades together 2132
Etc.

In at least one embodiment, the reliability estimate may be based on the probability of all package upgrades being successful, and may be calculated based on the probability of each package upgrade to be successful (as may be recorded by telemetry data received from various customer servers making these and/or similar version changes).

Figure 22:
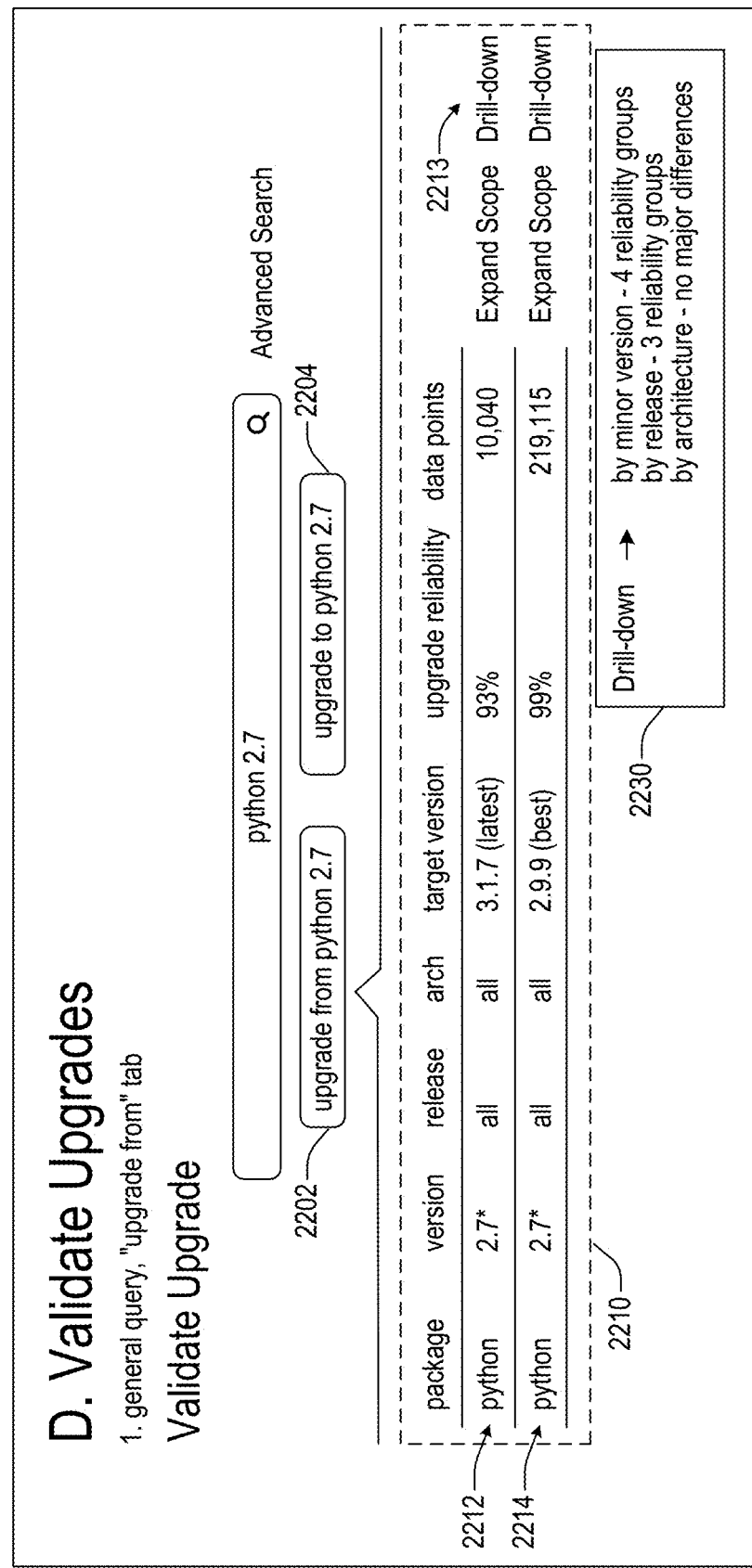

FIG. 22 illustrates an example screenshot of a graphical user interface (GUI) 2202 which may include functionality for causing the DataGrid System to initiate and/or perform various operation(s) and/or action(s) relating to the DataGrid technology including, for example, enabling a user indicate, search for, examine, and/or evaluate detailed information related to upgrading or downgrading a particular package from one or more source versions to one or more target versions (e.g., as illustrated in the example screenshots of FIGS. 22-27).

In the specific embodiment of FIG. 22, it is assumed that the user has previously entered "python 2.7" in the search bar, with the "upgrade from tab" 2202 selected (indicated by the angular projection). The DataGrid System searches for, selects, and displays the "latest" and "recommended" target versions based on the input which includes the package name, major version and minor version. In this case the target version may be an upgrade from some or all 2.7.* versions of python. In at least some embodiments, the "latest version" is the latest released stable version whenever the target version has not been limited by a user specification, and the "recommended version" is the version recommended by the DataGrid System as having the highest probability of a reliable result (e.g., the highest DGRI score).

As illustrated in the example embodiment of FIG. 22, GUI 2201 may be configured or designed to display various information related to the source package such as, for example, one or more of the following (or combinations thereof): package name, major version, minor version, bugfix version, release or build version, and architecture.

Additionally, as illustrated in the example embodiment of FIG. 22, GUI 2201 may be configured or designed to display various information related to the latest or recommended target packages such as, for example, one or more of the following (or combinations thereof): package name (e.g., same as source), major version, minor version, the dynamically estimated reliability of the target package calculated by the DataGrid System (e.g., expressed as a percentage), and the number of data points for the target package. In some embodiments, the predicted or estimated reliability of the upgrade process, from the currently installed version to the target version, may also be displayed (e.g., as percentage).

In some embodiments, GUI 2201 may be configured or designed to include functionality (e.g., 2230) for enabling the user to drill down through variations of the un-fixed portions of the source package specification to show details of other matching source versions. For example, in FIG. 22, the source version is specified as "2.7.*" so that the minor/incremental versions may be drilled down to display wildcard matches. In this example, the source package release and architecture specifications are also not fixed and may be drilled down (e.g., by using the GUIs of FIGS. 17 and 18).

Some embodiments of the GUI of FIG. 22 may be configured or designed to provide other types of information, content and/or functionality. For example, in at least one embodiment, GUI 2201 may be configured or designed to be accessed from a preceding interface in which the source package version or the target package version, or both, have been specified. This specification may be partial, for example, just a package name, or a package name and major version. In this case the DataGrid System populates the GUI with the specified information when it initially loads. For example, the user may have navigated to this GUI from the GUI of FIG. 16 in order to validate or complete the specification of a particular package upgrade.

Figure 23:
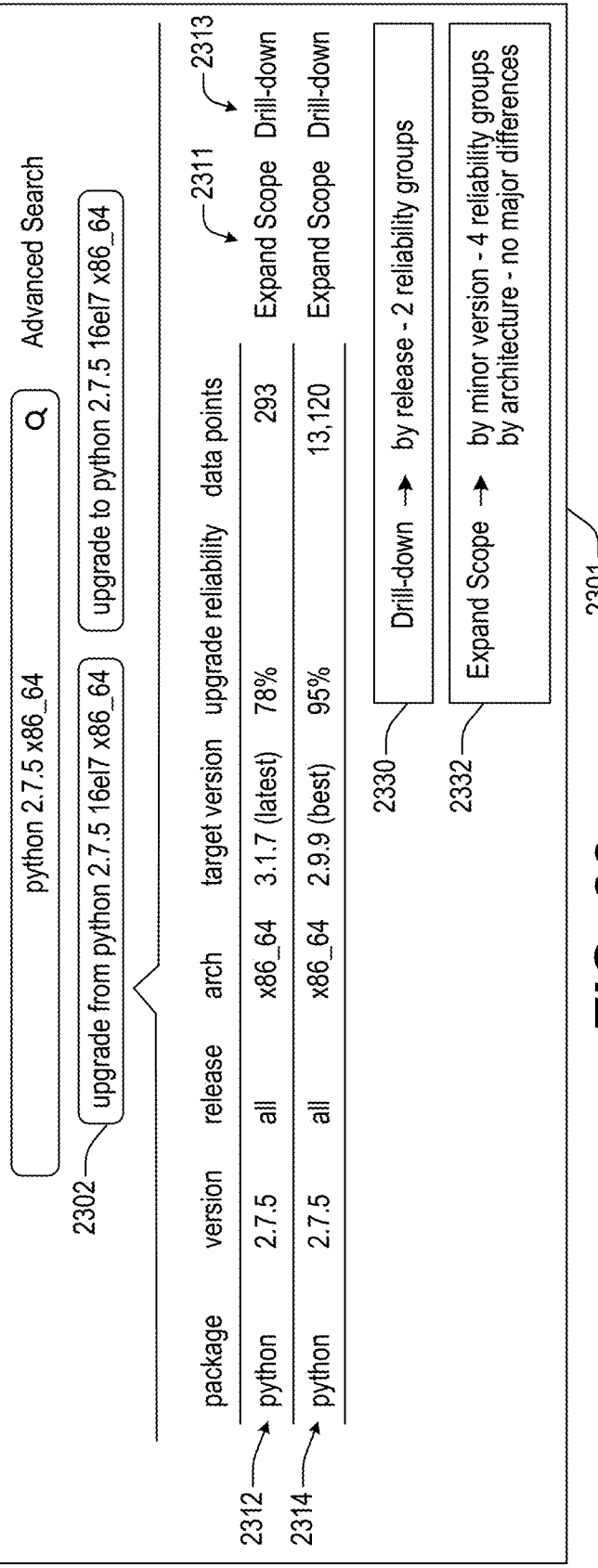

FIG. 23 illustrates an example screenshot of a graphical user interface (GUI) 2301 which may include functionality for causing the DataGrid System to initiate and/or perform various operation(s) and/or action(s) relating to the DataGrid technology including, for example, enabling a user indicate, search for, examine, and evaluate detailed information related to upgrading or downgrading a particular package from one or more source versions to one or more target versions.

In the specific embodiment of FIG. 23, it is assumed that the user has previously entered "python 2.7.5 x86_64" in the search bar, with the "upgrade from tab" 2302 selected.

In at least some embodiments, the DataGrid System searches for, selects, and displays a "latest" target version 2312 and a "recommended" target version 2314, based on the input which includes the package name, major version, minor version and architecture. In this case the target version must be an upgrade from some or all 2.7.5 versions of python which use the x86_64 architecture.

In at least some embodiments, GUI 2301 may be configured or designed to include functionality for enabling the user to drill down (2330) through variations of the un-fixed portions of the source package specification to show details of other matching source versions. For example, in FIG. 23, the source version is specified as 2.7.5 and the architecture as x86_64, so only the release number may be drilled down to display different releases which match the source package specification.

In at least some embodiments, GUI 2301 may be configured or designed to include functionality for enabling the user to expand (2332) the scope of fixed portions of the source package specification to show details of other matching source versions if this fixed portion were not fixed. For example, in FIG. 23, the source version is specified as 2.7.5 so the fixed minor and incremental versions may be expanded in scope to show other minor or incremental versions outside the scope of the user search. Also, the architecture is fixed as x86_64, so its fixed scope may be expanded to show other packages which match the search (e.g., except for the specified architecture). In the example of FIG. 23, there are no results for this expansion, so the GUI 2301 displays "no major difference" rather than the number of matches in the expanded scope (which is none).

Figure 24:
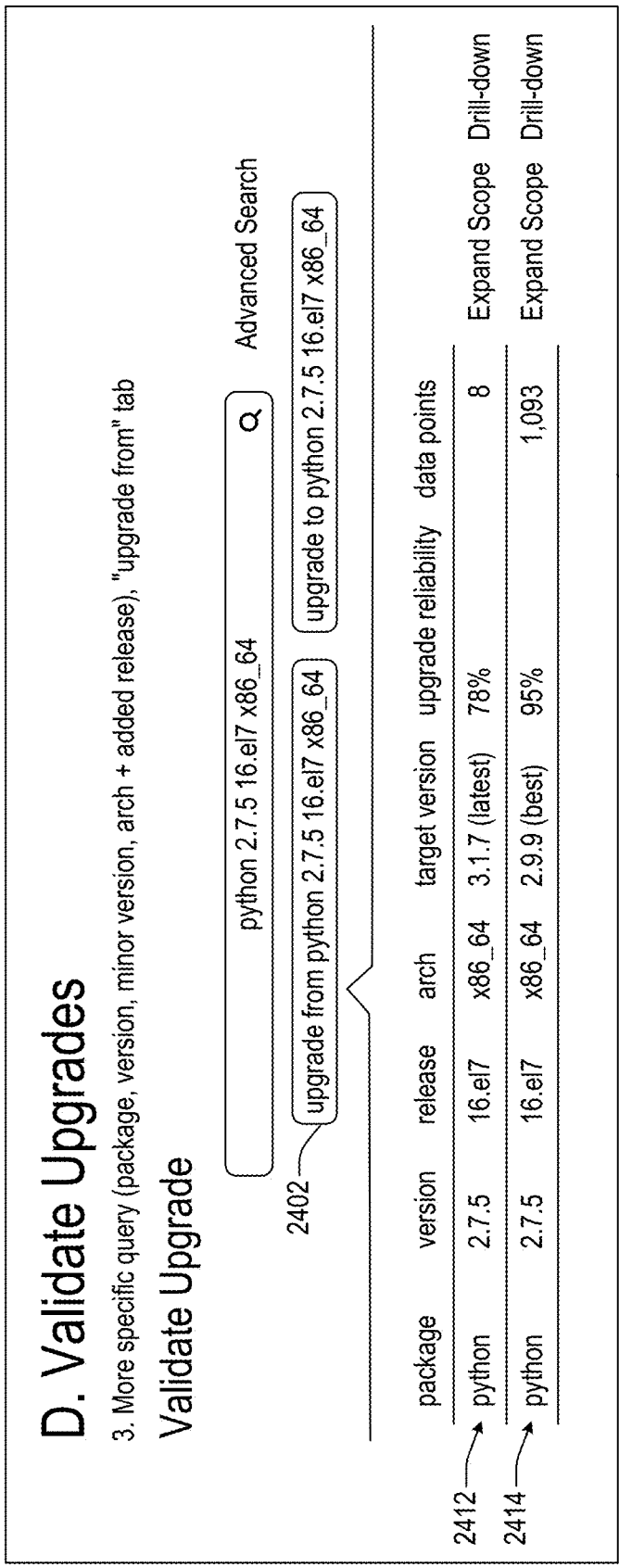

FIG. 24 illustrates an example screenshot of a graphical user interface (GUI) 2401 which may include functionality for causing the DataGrid System to initiate and/or perform various operation(s) and/or action(s) relating to the DataGrid technology including, for example, enabling a user indicate, search for, examine, and evaluate detailed information related to upgrading or downgrading a particular package from one or more source versions to one or more target versions.

In the specific embodiment of FIG. 24, it is assumed that the user has previously entered "python 2.7.5. 16.e17 x86_64" in the search bar, with the "upgrade from tab" 2402 selected. The DataGrid System searches for, selects, and displays the "latest" and "recommended" target versions (e.g., 2412, 2414), based on the input which, for example, includes the package name, major version, minor version, bugfix version, release and architecture. In this case the target version must be an upgrade from some or all 2.7.5-16.e17 versions of python which use the x86_64 architecture.

In at least some embodiments, GUI 2401 may be configured or designed to include functionality for enabling a user to drill down on a selected package to view additional details about that package and/or to expand the scope of the selected package (e.g., by displaying additional information relating to different minor/incremental versions, different releases, different architectures, etc.).

Figure 25:
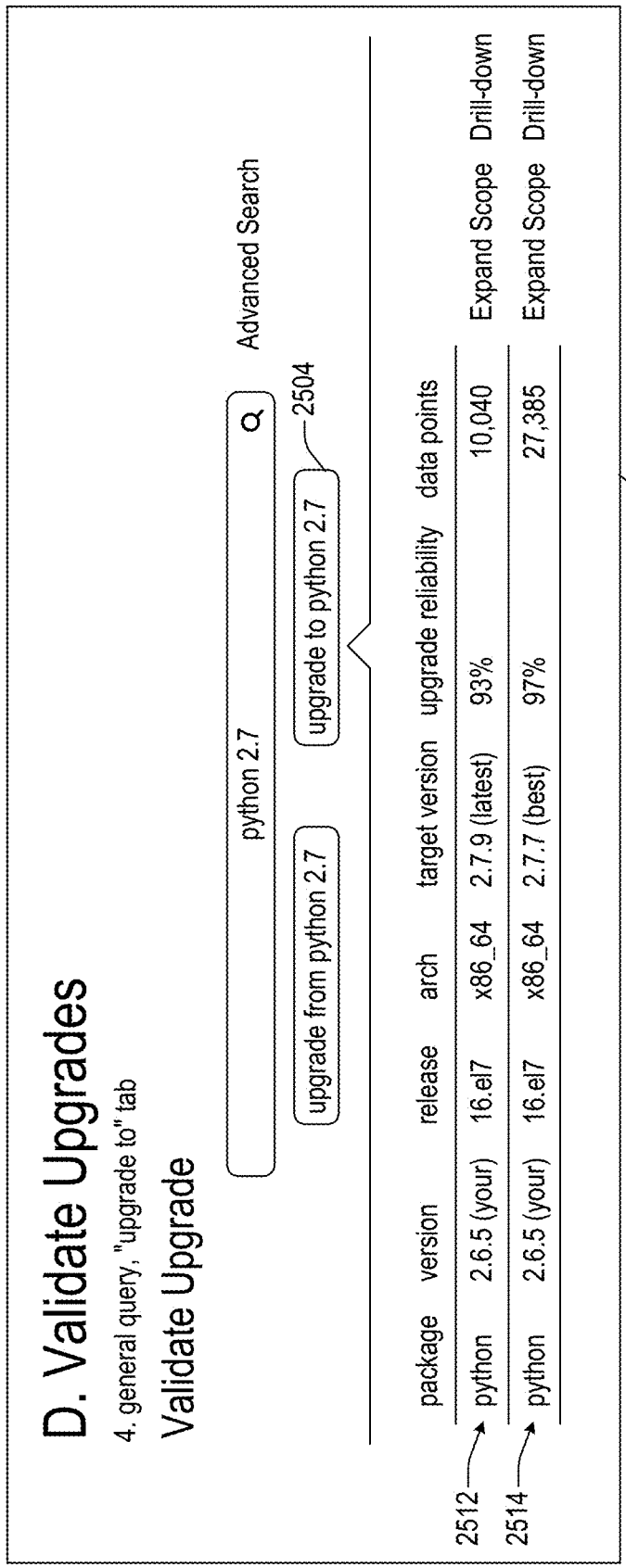

FIG. 25 illustrates an example screenshot of a graphical user interface (GUI) 2501 which may include functionality for causing the DataGrid System to initiate and/or perform various operation(s) and/or action(s) relating to the DataGrid technology including, for example, enabling a user indicate, search for, examine, and evaluate detailed information related to upgrading or downgrading a particular package from one or more source versions to one or more target versions.

In the specific embodiment of FIG. 25, it is assumed that the user has previously fully specified the source package as "python 2.6.5 16.e17 x86_64", and then clicked to select the "upgrade to" tab 2504 (e.g., indicated by the angular projection). To specify the target package, the user has entered "python 2.7" in the search bar. The DataGrid System searches for, selects, and displays the "latest" and "recommended" target versions (2512, 2514) based on the full source package specification and the incomplete target package specification which includes the package name, major version and minor version. In this case the target version must be an upgrade from some or all 2.6.5 16.e17 x86_64 versions of python and must also have a major.minor version specification of 2.7.

In at least some embodiments, GUI 2501 may be configured or designed to include functionality for enabling a user to drill down on a selected package to view additional details about that package and/or to expand the scope of the selected package (e.g., by displaying additional information relating to different minor/incremental versions, different releases, different architectures, etc.).

Figure 26:
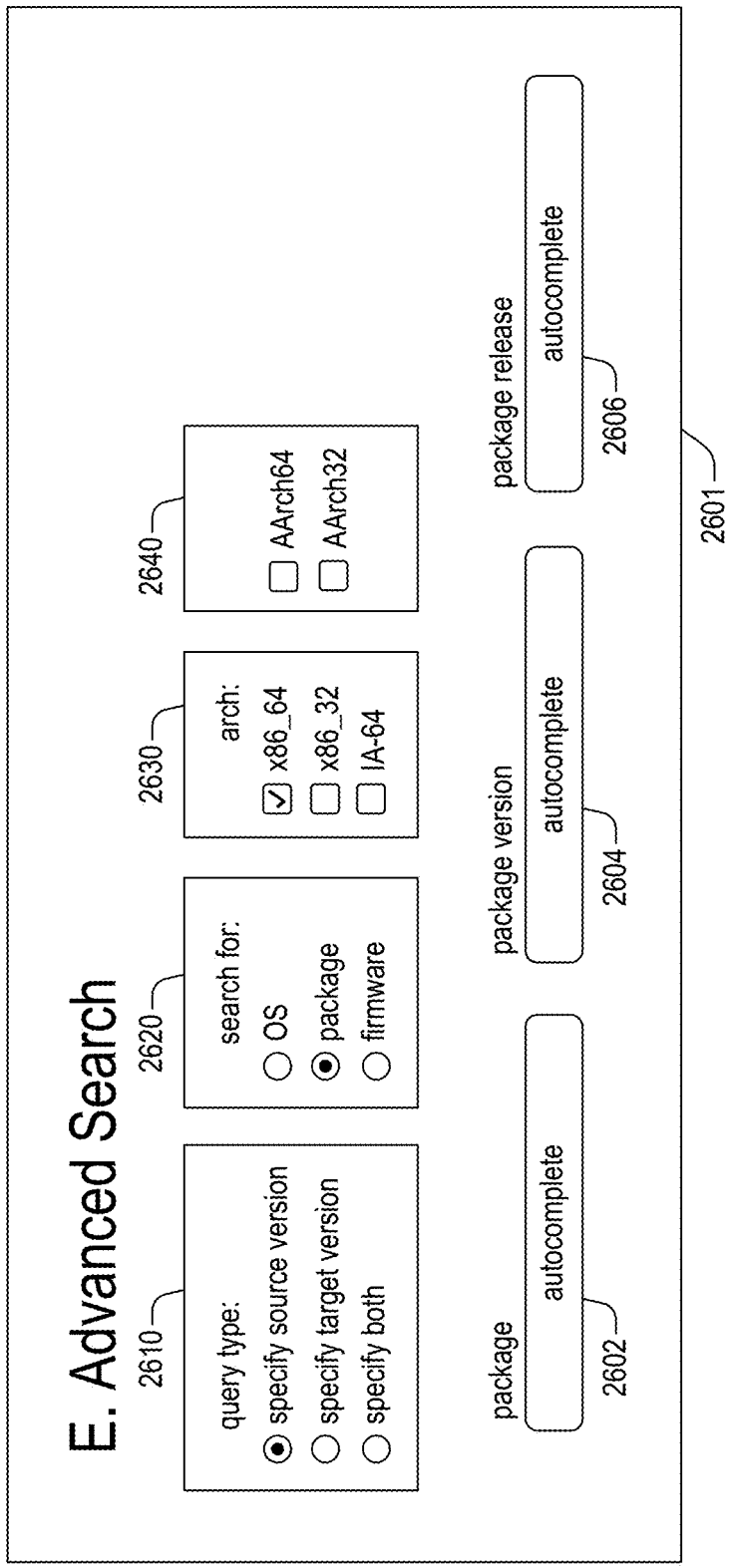

FIG. 26 illustrates an example screenshot of a graphical user interface (GUI) 2601 which may include functionality for causing the DataGrid System to initiate and/or perform various operation(s) and/or action(s) relating to the DataGrid technology including, for example, enabling a user to perform an advanced search for source and/or target packages (2601) which match a specified set of package specifiers (e.g., 2620, 2630, 2640). For example, in the specific embodiment of FIG. 26, it is assumed that the user has selected a source package query for x86_64 packages using the radio buttons. In one embodiment, the user may enter appropriate source package specifiers in the "package" name box 2602, "package version" box 2604 and/or "package release" box 2606 to qualify and/or filter search results. In at least some embodiments, the DataGrid System may be configured or designed to accept partially entered search criteria, and to use the partial search criteria to autosuggest and/or autocomplete selected search criteria matching the partial search criteria.

Figure 27:
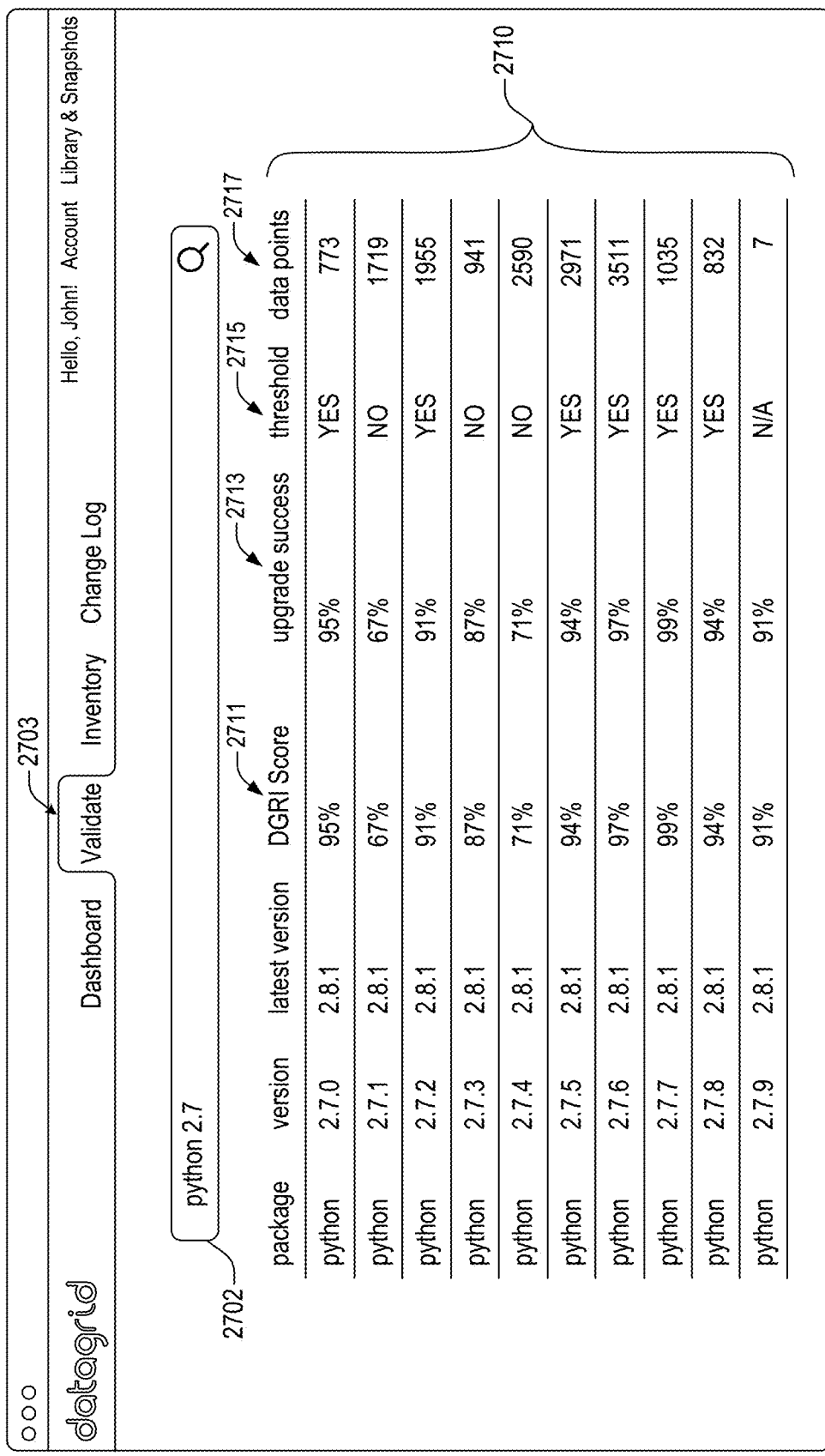

FIG. 27 illustrates an example screenshot of a graphical user interface (GUI) 2701 which may include functionality for causing the DataGrid System to initiate and/or perform various operation(s) and/or action(s) relating to the DataGrid technology including, for example, serving as a starting point for a user to search for packages they may be interested in upgrading, using and/or evaluating. The search bar 2702 allows the user to enter a package name and some or all or part or none of the package version specification. The system searches the database and displays a customized list of packages 2710 that match the user query, and their upgrades to latest version.

In the specific embodiment of FIG. 27, it is assumed that:
User has selected the Validate tab 2703.
The user has entered "python 2.7" in the search bar.
As illustrated in the example embodiment of FIG. 27, GUI 2701 may be configured or designed to display various information related to each upgrade such as, for example, one or more of the following (or combinations thereof):
The DGRI score of the target package version 2711.
The probability of a successful upgrade 2713 (or unsuccessful upgrade) from the source package to the target latest package.
Indications 2715 of whether or not the probability of success (or failure) meets a user defined threshold.
The number of data points 2717 used in calculating the probability of success in upgrading from source to target.
Etc.

Figure 28:
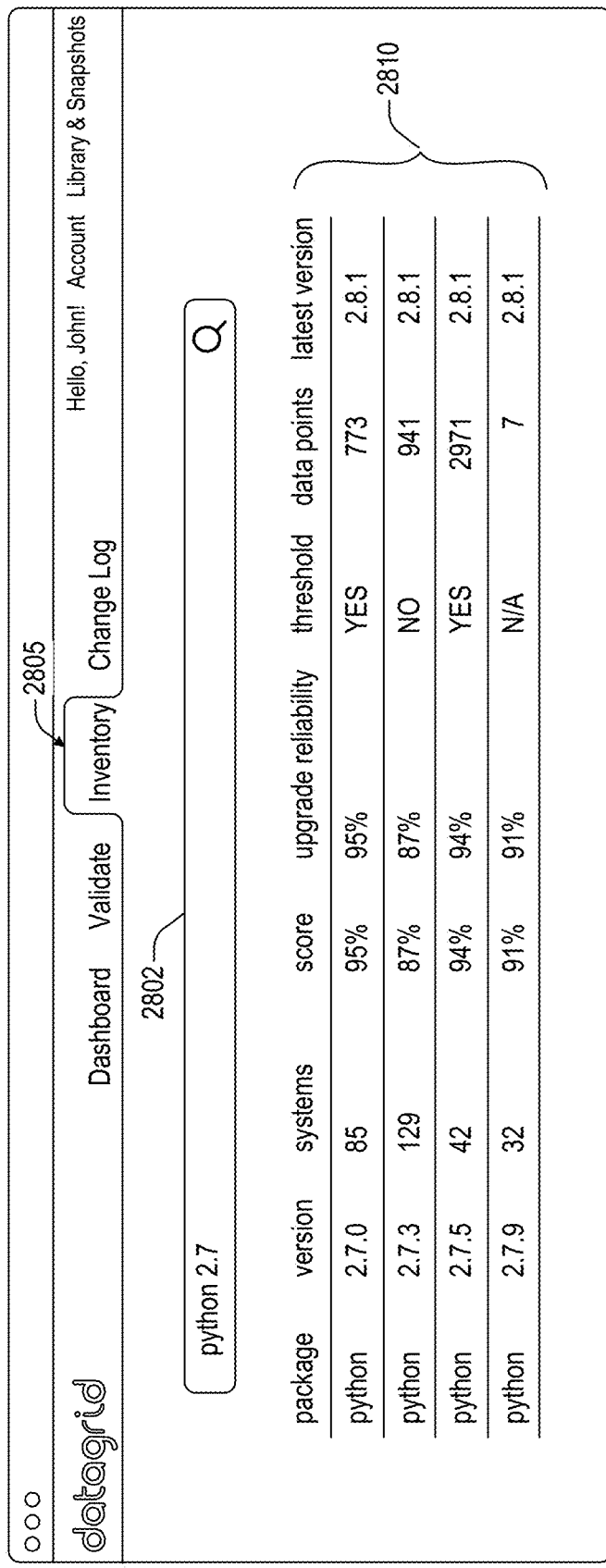

FIG. 28 illustrates an example screenshot of a graphical user interface (GUI) 2801 which may include functionality for causing the DataGrid System to initiate and/or perform various operation(s) and/or action(s) relating to the DataGrid technology including, for example, serving as a starting point for a user to search for packages they may be interested in upgrading, using and/or evaluating. The search bar 2802 enables the user to enter a package name and some or all or part or none of the package version specification. The system searches the current configurations of Subscriber Systems and finds some or all systems which include a package matching the search term, and groups these search results 2810 by differences in major, minor and/or incremental versions.

In the specific embodiment of FIG. 28, it is assumed that:
The user has entered "python 2.7" in the search bar 2802.
User has selected the Inventory tab 2805.

As illustrated in the example embodiment of FIG. 28, GUI 2801 may be configured or designed to display various information related to each grouped search result such as, for example, one or more of the following (or combinations thereof):
The package name and version.
The number of subscriber systems which use this package version (e.g., number of servers on which that exact package version is installed).
The reliability of the upgraded package calculated by the DataGrid System (e.g., expressed as a percentage).
The predicted probability of a successful upgrade from the source package to the target latest package (e.g., as calculated or determined by the DataGrid System).
An indication of whether or not the probability of success meets a user defined threshold.
The number of data points used in calculating the probability of success in upgrading from source to target.
Etc.

Figure 29:
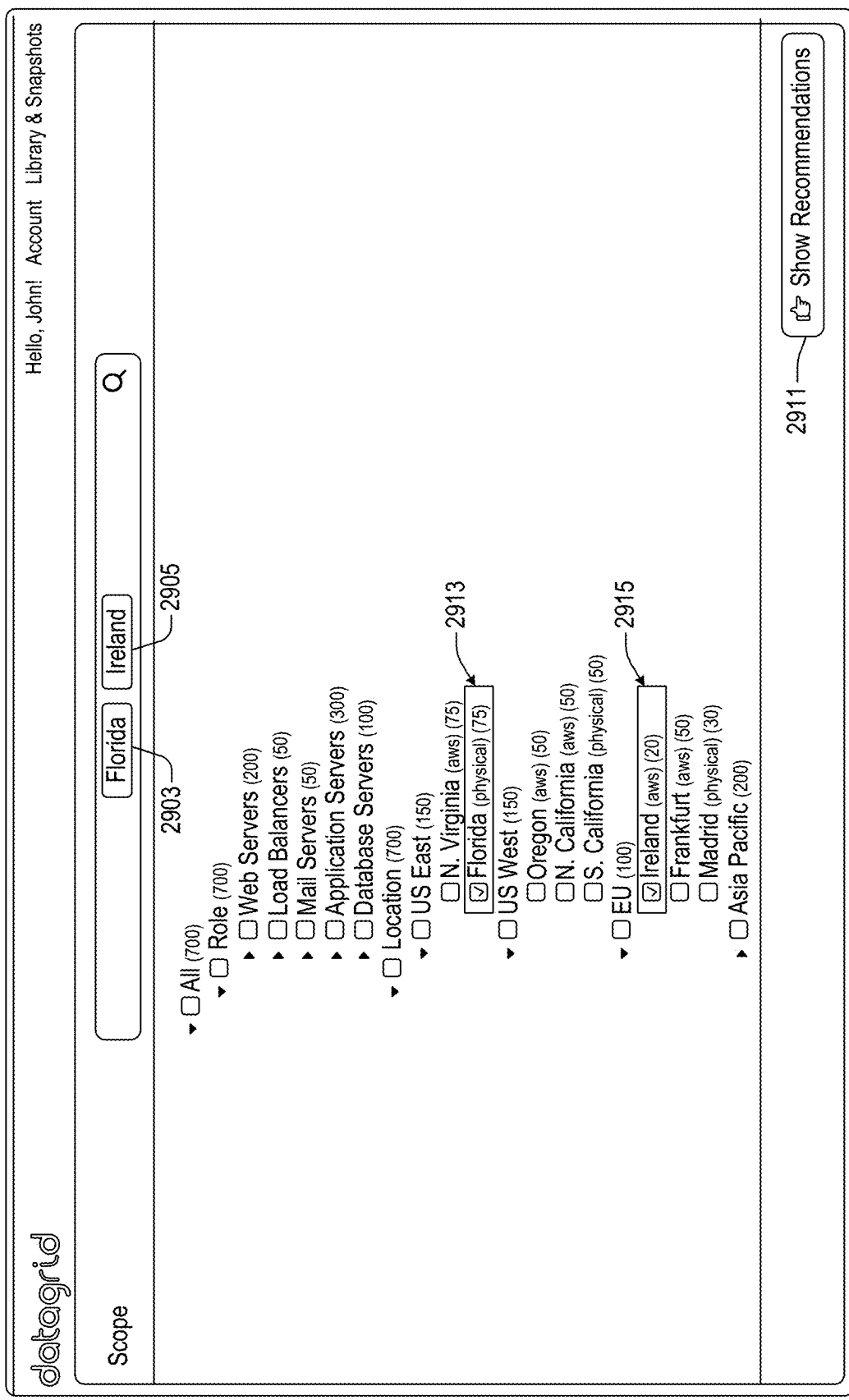

FIG. 29 illustrates an example screenshot of a graphical user interface (GUI) 2901 which may include functionality for causing the DataGrid System to initiate and/or perform various operation(s) and/or action(s) relating to the DataGrid technology such as, for example, one or more of the following (or combinations thereof):
Serve as a starting point for a user to investigate, determine or perform server configuration changes over collections of subscriber servers whose configuration changes are being managed using the DataGrid System, and which participate in sending crowdsourced server data to the DataGrid System. For example, in one embodiment, the DataGrid System uses an API exposed by a configuration management system, for example the Chef Server REST API, to remotely execute server configuration changes on subscriber servers. The list of server scopes (e.g., Web Servers, or servers in Oregon), and their hierarchy, may be configured in the DataGrid System (e.g., by a user using a GUI, CLI or API interface), or may be imported in as a near real time representation already present in configuration automation tools such as Chef, or may be obtained from other APIs such as the Amazon Web Services EC2 API where such a representation may be extracted, for example, from EC2 instance tags.
Determine the scope of servers to be investigated or changed by server role or location. This may be done using either a tree-form menu or search queries to limit the scope.
Show configuration change recommendation 2911 to the scoped servers which are recommended by the DataGrid System.
Etc.

In the specific embodiment of FIG. 29, it is assumed that the user has used the tree-form menu checkboxes to select Florida 2903, 2913 and Ireland 2905, 2915 as the selected geographical scopes of the servers to be managed. In at least one embodiment, the tree view presents multiple different selection criteria, for example: region, application, server role, etc. In some embodiments, the user can also select all servers.

Figure 30:
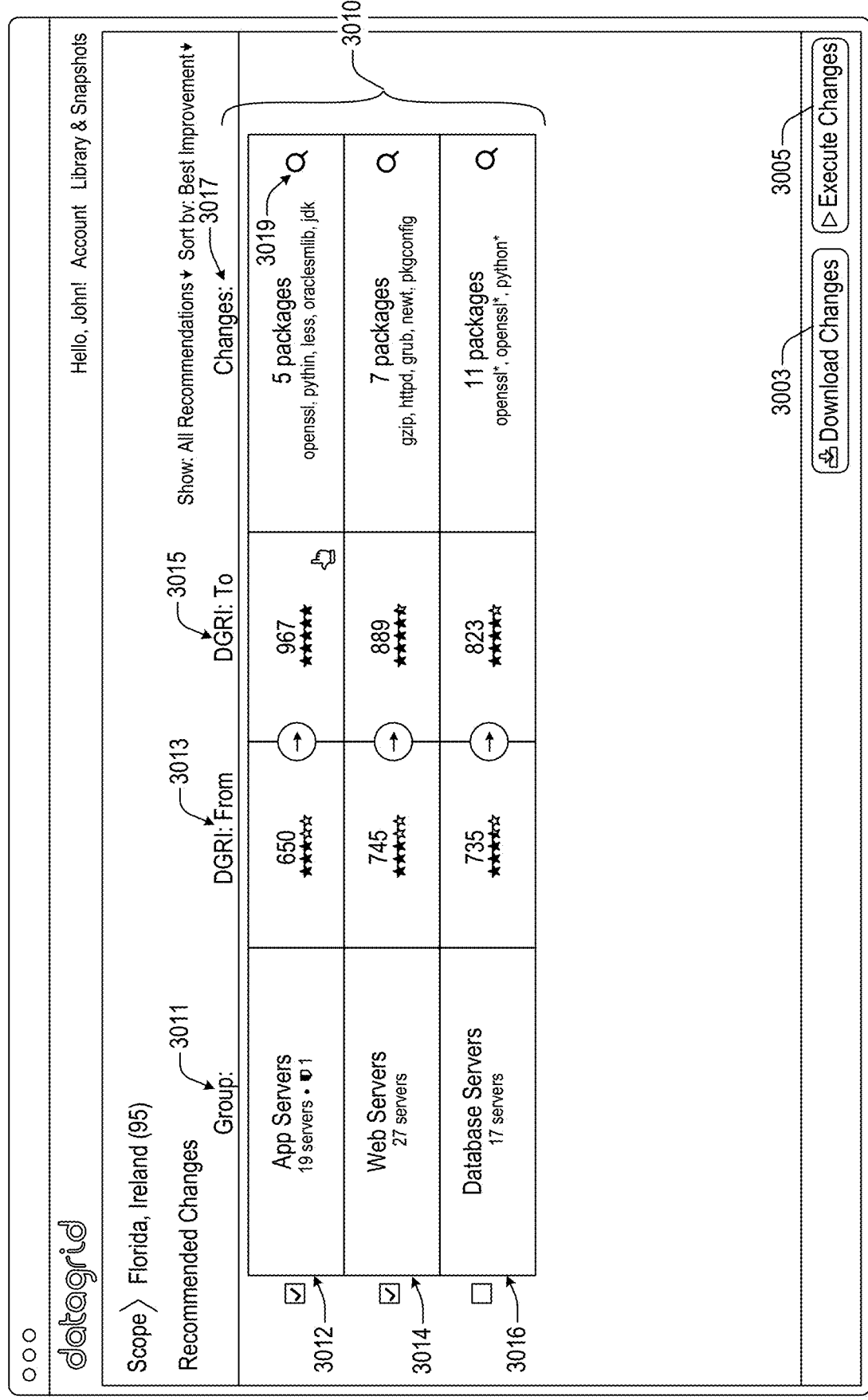

FIG. 30 illustrates an example screenshot of a graphical user interface (GUI) 3001 which may include functionality for causing the DataGrid System to initiate and/or perform various operation(s) and/or action(s) relating to the DataGrid technology such as, for example, one or more of the following (or combinations thereof):
Investigate, determine or perform server configuration changes over collections of servers (e.g., 3010). The scope of the change set being investigated is displayed as a breadcrumb along the top of FIG. 30, where in the example we are including some or all servers from the Florida and Ireland geographic regions and showing that 95 servers are selected.
Select groups of servers within the scope to include or exclude in making any changes by server role, e.g., using the checkboxes to the left of the Groups column, next to each group of servers.
Drill down in the scope to examine or modify the recommended changes for a particular group of servers by role.
The Download Changes button 3003 downloads scripts of instructions for a command line package management utility such as yum (or Chef configuration recipes) which may be executed on servers belonging to different roles to perform the recommended changes for that server, including any modifications to these changes determined by the user using this GUI.
The Execute Changes button 3005 remotely executes the recommended and user determined changes on the selected servers by role using the API of a package management system such as Ansible or Chef
Etc.

In the specific embodiment of FIG. 30, it is assumed that the user has previously selected the geographic scope of Florida and Ireland (e.g., using the GUI of FIG. 29).

As illustrated in the example embodiment of FIG. 30, GUI 3001 may be configured or designed to display various information related to each server group by role such as, for example, one or more of the following (or combinations thereof):
The name of the group by role (e.g., App Servers) 3011.
The number of subscriber servers from the selected scope belonging to the role (e.g., 19 for the App Servers group).
The DGRI score calculated for the server group ("DGRI From" 3013). Servers grouped by function (role) may share similar configurations in the DataGrid System, which calculates a DGRI score for each group of such servers.
The DGRI score estimated for the server group after the recommended and user determined configuration changes have been made ("DGRI To" 3015).
The number of packages which may be changed on each server in the server group 3017.

The names of the packages which may be changed on each server group.

Etc.

In some embodiments, GUI 3001 may be configured or designed to include functionality for enabling the user to selectively drill down to view different set(s) of changes 3017 for a particular server group, e.g., by pressing on a magnifying glass button 3019. In at least one embodiment, the user may also modify the proposed changes, for example, by including or excluding packages, and/or by selecting different versions (e.g., as shown in FIG. 31).

FIG. 31 illustrates an example screenshot of a graphical user interface (GUI) 3101 which may include functionality for causing the DataGrid System to initiate and/or perform various operation(s) and/or action(s) relating to the DataGrid technology such as, for example, one or more of the following (or combinations thereof):

Investigate or modify the recommended changes for a server group by role. The scope of the change set being investigated may be displayed as a breadcrumbs 3113, which in this example includes some or all servers from the Florida and Ireland geographic regions which are also App Servers.

Include or exclude packages in the change set for servers within the current scope using the checkboxes to the left of the table.

Search for new packages to add to the change set using the search bar.

The Save button saves user changes made on this GUI to the change set while the Discard button discards such changes.

In the specific embodiment of FIG. 31, it is assumed that the user has previously selected the geographic scope of Florida and Ireland and the role of App Servers (e.g., using the GUIs of FIGS. 29 and 30).

As illustrated in the example embodiment of FIG. 31, GUI 3101 may be configured or designed to display various information 3110 related to each source and target package in the change set for the server group such as, for example, one or more of the following (or combinations thereof):

The package name and version.

A rating (e.g., star rating) for the package representing the package DGRI score.

The numeric package DGRI score.

The number of package data points (e.g., the number of servers known by the DataGrid System to use, or to have used, this specific package; e.g., as may be used to make the calculation of success probability).

The predicted or estimated probability of a successful change from each package from the source version to the target version.

Etc.

As illustrated in the example embodiment of FIG. 31, GUI 3101 may be further configured or designed to display various information 3110 related to the aggregate of the source packages or the aggregate of the target packages in the change set such as, for example, one or more of the following (or combinations thereof):

A star rating representing the average configuration DGRI score for servers in the change set before the changes have been made (source) or after such changes have been made (target).

The DGRI score for servers in the change set before the changes have been made (source) or after such changes have been made (target).

Etc.

Figure 32:
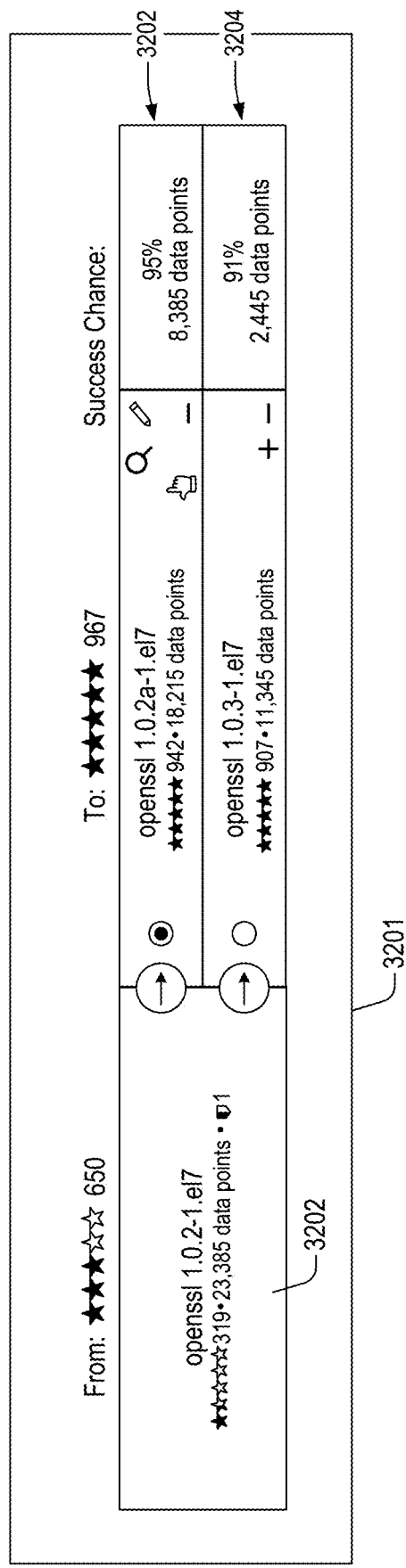

FIG. 32 shows an alternate embodiment of FIG. 31 where the target package is displayed as a user selectable list of more than one target package, selectable by radio button. One purpose of displaying multiple target packages is to provide recommendations for different version branches. For example, as illustrated in the example embodiment of FIG. 32, the user is provided with several different recommended upgrade options (e.g., 3202, 3204) for the identified openssl package version 1.0.2-1.e17 (3202), namely openssl 1.0.2a-1.e17 and openssl 1.0.3-1.e17 incremental branches. Similarly, for example with Python, GUI 3201 may display recommended packages from different major version branches, e.g., 2.x and 3.x. The user choice between or among branches may be made based not only on reliability assessments provided by the DataGrid System, but also on functionality or other criteria unknown to the DataGrid System.

FIG. 33 illustrates an example screenshot of a graphical user interface (GUI) 3301 which may include functionality for causing the DataGrid System to initiate and/or perform various operation(s) and/or action(s) relating to the DataGrid technology such as, for example, one or more of the following (or combinations thereof):

Show details (e.g., 3310) related to one or more selected package(s) in the change set.

Optionally show additional details ("Click for Details" 3311).

In the specific embodiment of FIG. 33, it is assumed that the user has previously moved the mouse so that it is over the magnifying glass icon as shown in FIG. 33, causing the detail balloon 3110 to appear.

As illustrated in the example embodiment of FIG. 33, GUI 3301 may be configured or designed to display various information related to a package in the change set such as, for example, one or more of the following (or combinations thereof):

The package DGRI score.

Details of the package DGRI score broken down by Security, Performance and Reliability, each displayed with a separate score.

The number of data points by type related to this package, including the number of servers known by the DataGrid System to use, or to have used, this specific package, and the number of signals received from such servers.

The number of vulnerabilities for the package.

Etc.

Figure 34:
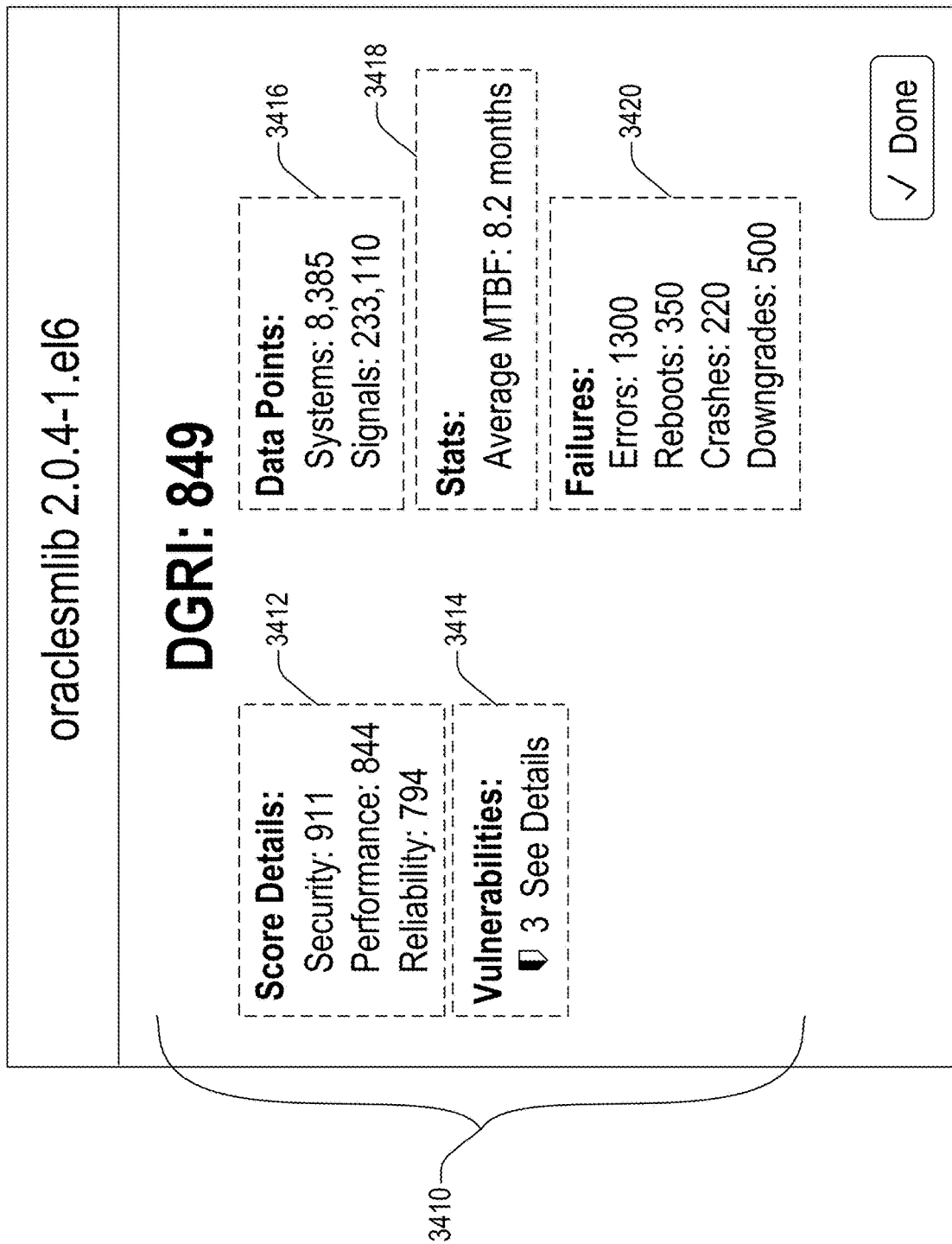

FIG. 34 illustrates an example screenshot of a graphical user interface (GUI) 3401 which may include functionality for causing the DataGrid System to initiate and/or perform various operation(s) and/or action(s) relating to the DataGrid technology such as, for example, one or more of the following (or combinations thereof):

Show additional details for a selected package in the change set.

Show additional vulnerability details for a package in the change set (e.g., by clicking on the See Details 3414 link of the Vulnerabilities section)

In the specific embodiment of FIG. 34, it is assumed that the user has previously selected the "Click for Details" link 3311 from the detail balloon of FIG. 33.

As illustrated in the example embodiment of FIG. 34, GUI 3401 may be configured or designed to display various information 3410 related to additional details of a package in the change set such as, for example, one or more of the following (or combinations thereof):

Score details 3412 for various package metrics.

Vulnerability information 3414.

Data Point information 3416.

Statistics information 3418, including, for example, the average mean time between failures (MTBF) for some or all servers known by the DataGrid System to include the specific package.

Signal/Telemetry information 3420, including, for example, number of occurrences of different signal types (e.g., errors, reboots, crashes, downgrades, success, failure, etc.) for some or all servers known by the DataGrid System to include the specific package.

Figure 35:
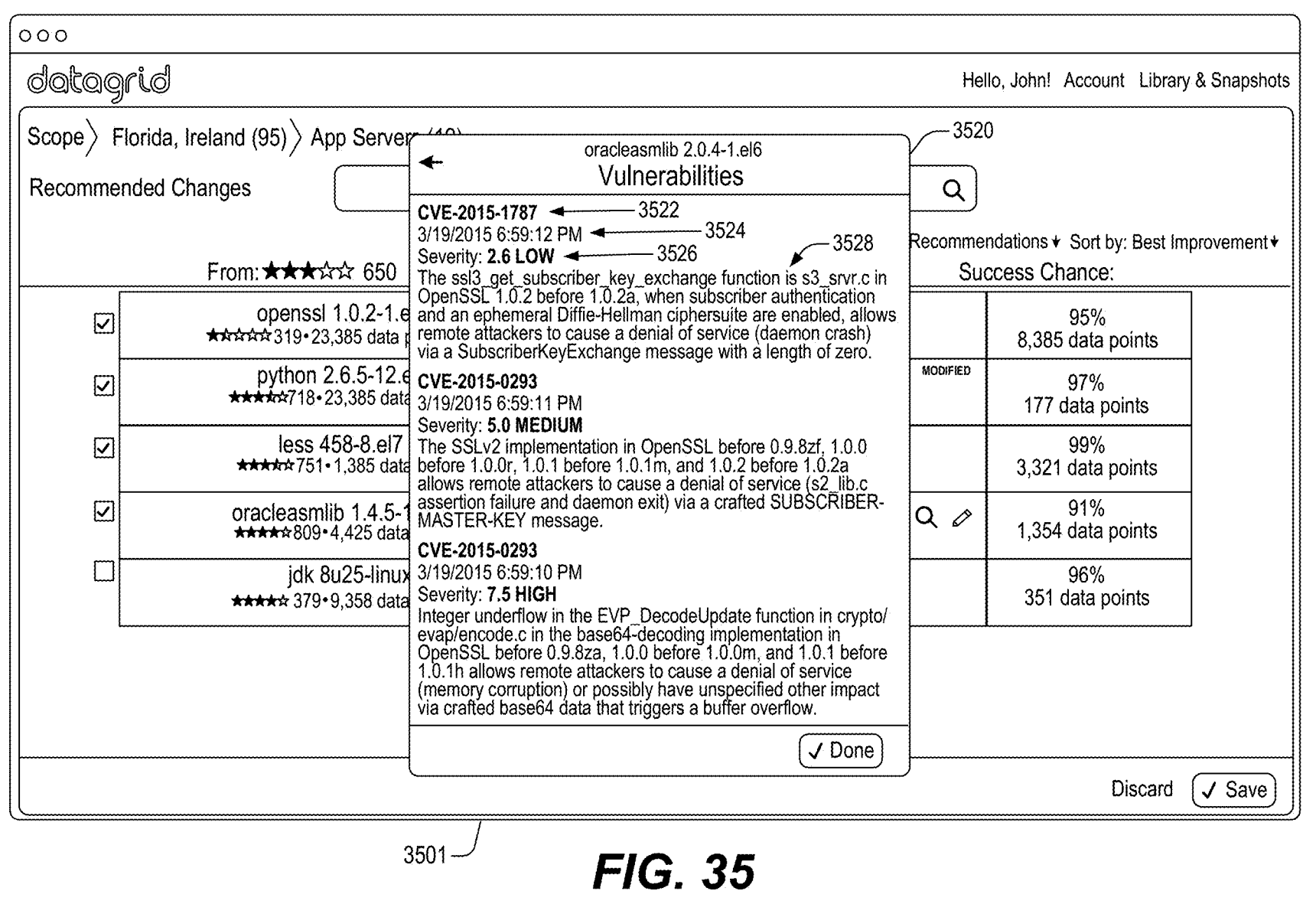

FIG. 35 illustrates an example screenshot of a graphical user interface (GUI) 3501 which may include functionality for causing the DataGrid System to initiate and/or perform various operation(s) and/or action(s) relating to the DataGrid technology including, for example, showing vulnerability details for a selected package in the change set.

In the specific embodiment of FIG. 35, it is assumed that the user has previously selected the "See Details" link 3414 of FIG. 34.

As illustrated in the example embodiment of FIG. 35, GUI 3501 may be configured or designed to display various information related to each vulnerability of a package in the change set such as, for example, one or more of the following (or combinations thereof):

- The vulnerability Common Vulnerabilities and Exploits (CVE) identifier (e.g., 3522).
- The vulnerability Common Vulnerability Scoring System (CVSS) severity score (e.g., 3526).
- The vulnerability reported date (e.g., 3524).
- A description of the vulnerability (e.g., 3528).
- Any of other CVSS metrics such as access-vector, access complexity, authentication, confidentiality-impact, integrity-impact and availability-impact.
- Etc.

FIG. 36 illustrates an example screenshot of a graphical user interface (GUI) 3601 which may include functionality for causing the DataGrid System to initiate and/or perform various operation(s) and/or action(s) relating to the DataGrid technology such as, for example, one or more of the following (or combinations thereof):

- Show recommended versions (e.g., 3612) for a package in the change set.
- Select a package with a specific version from the list of recommended versions
- Optionally show more package version options ("More Options" 3616) to expand the list of recommended versions.
- Search functionality (e.g., 3613), if selected, causes the GUI to display an interface which may be used to search for packages (e.g., see FIG. 37).
- Version History functionality (e.g., 3615), if selected, causes the GUI to display an interface which may be used to examine the history of versions of this package used by servers within the scope (see FIG. 40).
- Uninstall functionality (e.g., 3617), if selected, causes the GUI to display an interface which may be used to cause the package to be uninstalled as part of the package change set for servers within the scope (see FIG. 41).

In the specific embodiment of FIG. 36, it is assumed that:

- The user has clicked on the pencil icon 3619 as shown in FIG. 36, causing the balloon 3610 to appear.
- The user has clicked on the Recommended Tab 3611.

As illustrated in the example embodiment of FIG. 36, GUI 3601 may be configured or designed to display various information related to each package in the list of recommended versions such as, for example, one or more of the following (or combinations thereof):

- The package name.
- The package version.
- The package DGRI score.
- The number of data points for the package (e.g., the number of servers known by the DataGrid System to use, or to have used, this specific package).
- Etc.

In at least one embodiment, the GUI 3601 may be configured or designed to include functionality for enabling a user to modify the selected target version(s) of specific package(s) (and/or to uninstall one or more specific package(s)). As illustrated in the example embodiment of FIG. 36, the balloon 3610 offers multiple options for choosing a target version, e.g., by recommendations, by searching through available versions, and/or by looking at history of previously installed versions.

Figure 37:
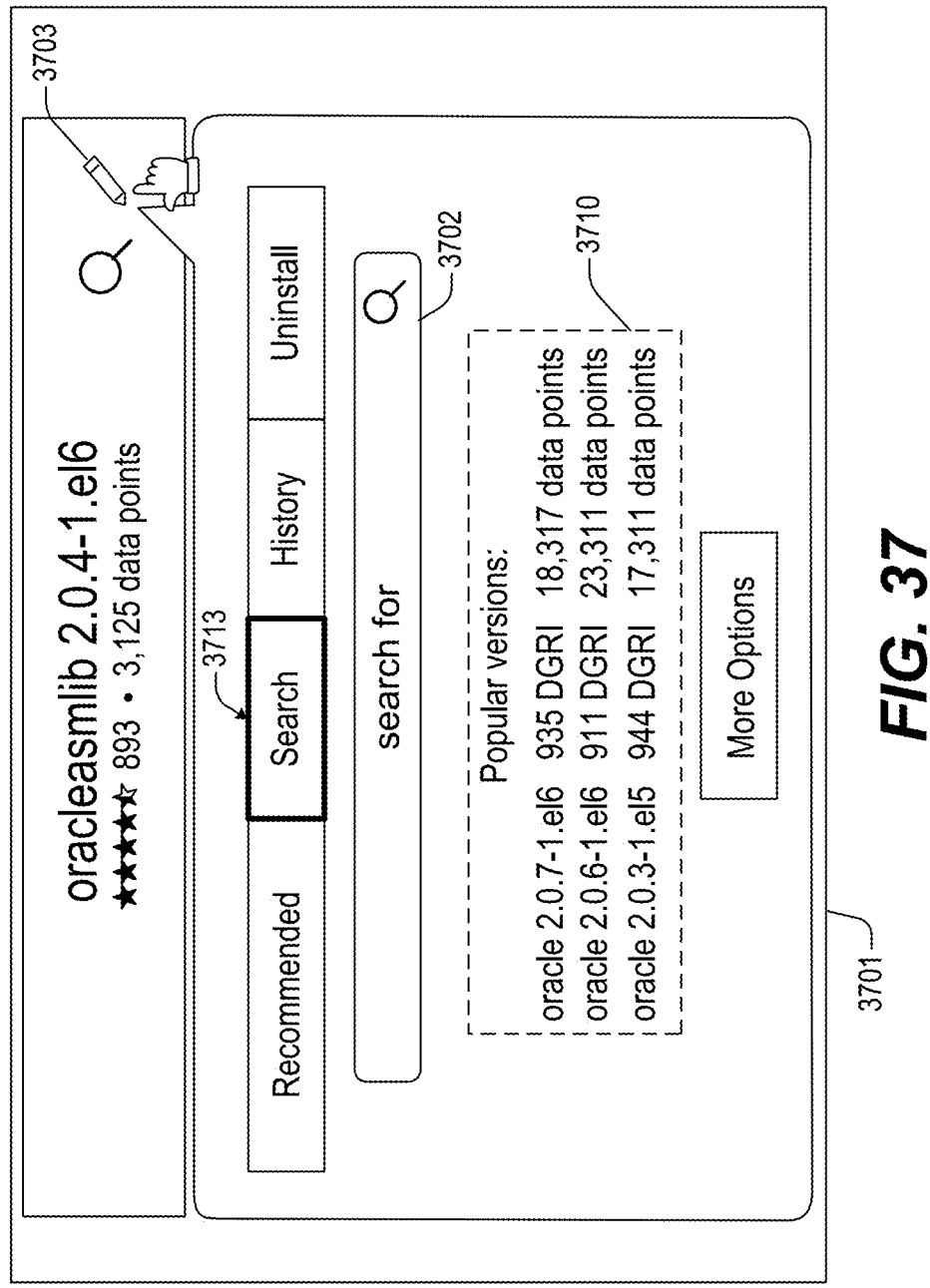

FIG. 37 illustrates an example screenshot of a graphical user interface (GUI) 3701 which may include functionality for causing the DataGrid System to initiate and/or perform various operation(s) and/or action(s) relating to the DataGrid technology such as, for example, one or more of the following (or combinations thereof):

- Search for versions of a package to include in the package change set. The search bar 3702 allows the user to enter some or all or part of a package name. As the package name is entered, or upon the user pressing the Enter key or mouse-clicking on the magnifying glass icon, the system searches the database and displays packages which match the user query, ordered by popularity.
- Select a specific package from search results 3710 to include in the package change set.
- Etc.

In the specific embodiment of FIG. 37, it is assumed that:

- The user has clicked on the pencil icon as shown in FIG. 36, causing the balloon to appear, and then clicked on the Search tab 3713 shown in the GUI 3701.
- GUI 3701 may be configured or designed to show some of the popular package versions (e.g., 3710) used by some or all Subscriber System(s).

As illustrated in the example embodiment of FIG. 37, each entry in the popular packages list is displayed along with related information including, for example: a respective DGRI score, the number of data points for this package, etc. For example, as illustrated in the example embodiment of FIG. 37, one popular package version is oracle version 2.07-1.e16, which has an associated DGRI score of 935, and an associated number of data points of 18,317.

Figure 38:
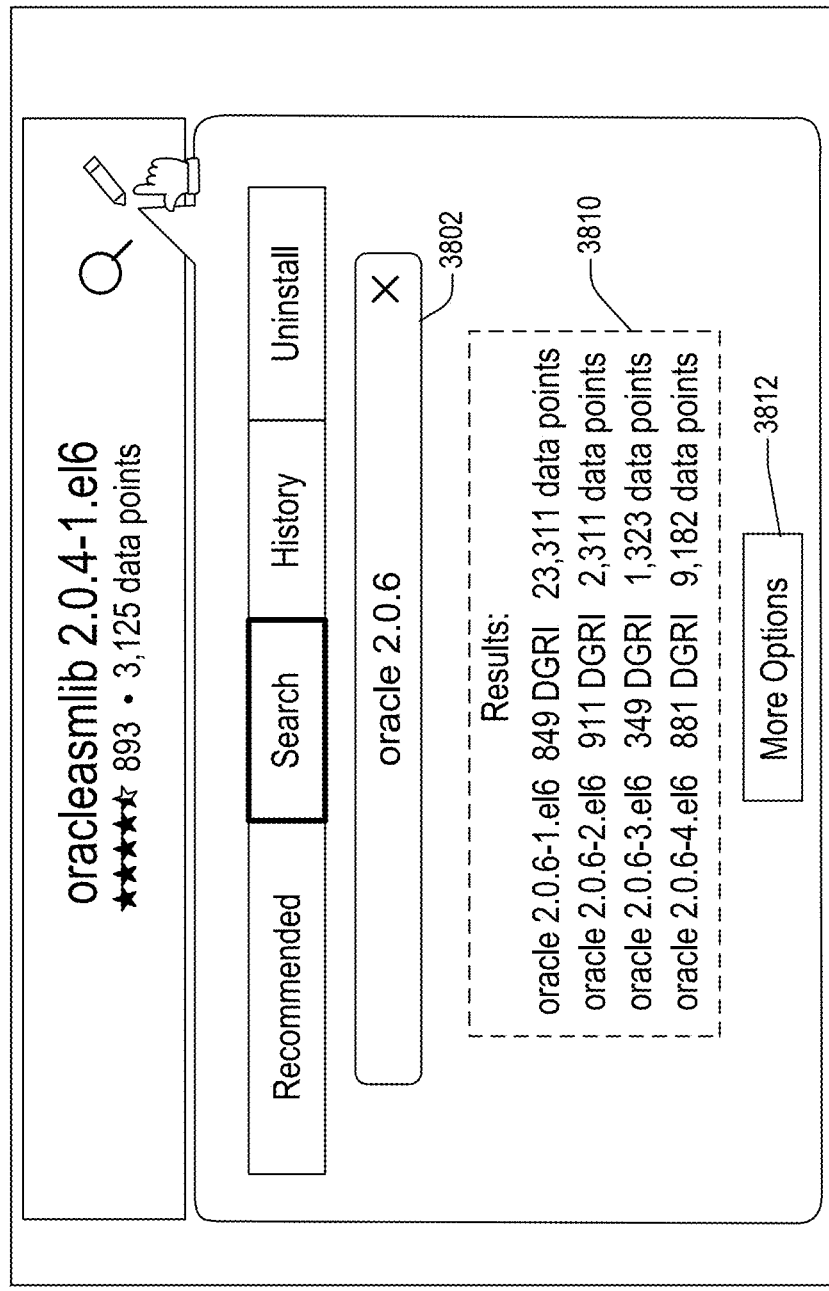
Figure 39:
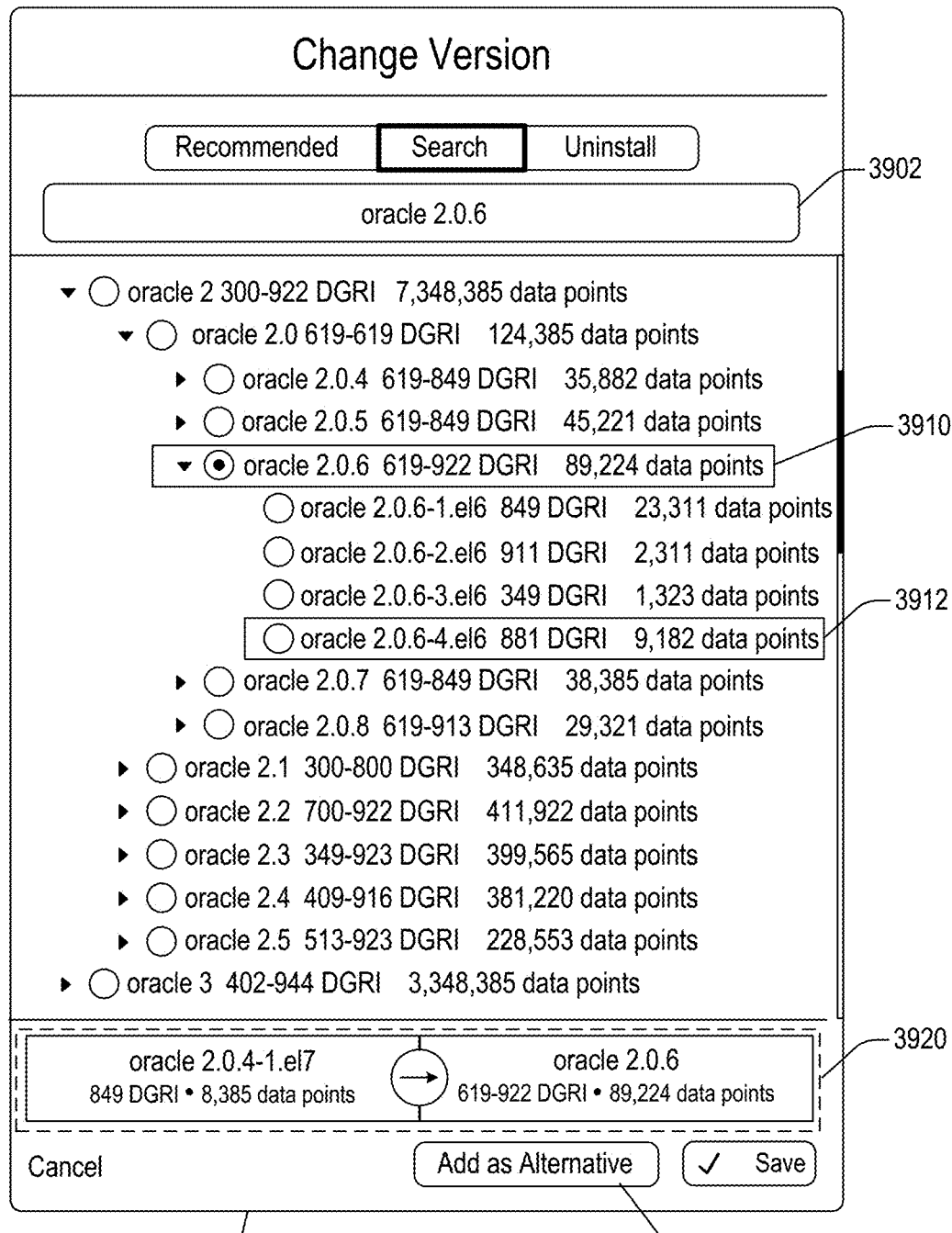

FIG. 38 illustrates an example screenshot of a graphical user interface (GUI) 3801 which may include functionality for causing the DataGrid System to initiate and/or perform various operation(s) and/or action(s) relating to the DataGrid technology such as, for example, one or more of the following (or combinations thereof):

- Search for desired packages by entering some or all or part of a selected package name in the search box 3802.
- Select a package from among the search results 3810 to include in the package change set.
- Display a tree-form menu (e.g., by select "More Options" 3812) which may be used to select a specific package among its available versions (see, e.g., FIG. 39).

In the specific embodiment of FIG. 38, it is assumed that:

- The user has entered the term "oracle 2.0.6" in the search bar 3802 to initiate a search query for Oracle packages version 2.0.6.
- Once the user has entered a package name in the search bar, the DataGrid System may use the database to determine popular versions and associated DGRI scores of packages matching the input search terms, and display them to the user as a list of search results (e.g., 3810).

The user may click on particular search result to add it to the package change set.

As illustrated in the example embodiment of FIG. 38, GUI 3801 may be configured or designed to display various information related to each package in the search results such as, for example, one or more of the following (or combinations thereof):

The package name.
The package version.
The package DGRI score.
The number of data points for the package (e.g., the number of servers known by the DataGrid System to use, or to have used, this specific package).
Etc.

FIG. 39 illustrates an example screenshot of a graphical user interface (GUI) 3901 which may include functionality for causing the DataGrid System to initiate and/or perform various operation(s) and/or action(s) relating to the DataGrid technology such as, for example, one or more of the following (or combinations thereof):

Select a specific package (e.g., 3910, 3912, etc.) to include in the package change set from a tree-form menu including the search results and the expanded scope of the search results which includes some or all other versions of the same package.

Select a specific package using "Add as Alternative" 3903 to include as an alternative in the package change set. The user may elect to do this, for example, in order to consider packages from two different versions branches. See FIG. 32 for an example of the result of such an alternative inclusion.

In the specific embodiment of FIG. 39, it is assumed that the user has entered the term "oracle 2.0.6" in the search bar 3802 of FIG. 38 to initiate a search query for Oracle packages, and then selected "More Options" 3812, causing the GUI of FIG. 39 to be displayed.

As illustrated in the example embodiment of FIG. 39, GUI 3901 may be configured or designed to display various information related to each package in the tree-form menu such as, for example, one or more of the following (or combinations thereof):

The package name.
The package version.
The package DGRI score.
The number of data points for the package (e.g., the number of servers known by the DataGrid System to use, or to have used, this specific package).
Etc.

As illustrated in the example embodiment of FIG. 39, GUI 3901 may be configured or designed to display various information related to each branch of the tree-form menu which has associated therewith one or more package versions depending from this branch such as, for example, one or more of the following (or combinations thereof):

The package name.
A partial specification of the package version associated to the branch.
A range of package DGRI scores for some or all packages depending from the branch.
The aggregate number of data points for some or all packages depending from the branch (e.g., the number of servers known by the DataGrid System to use, or to have used, these specific packages).
Etc.

In at least once embodiment, once the user has selected the desired target package version (e.g., 3910), the resulting proposed change may be displayed (e.g., as shown at 3920), showing the current version (as well as score(s), data points, etc.) and the target version (as well as score(s), data points, etc.).

FIG. 40 illustrates an example screenshot of a graphical user interface (GUI) 4001 which may include functionality for causing the DataGrid System to initiate and/or perform various operation(s) and/or action(s) relating to the DataGrid technology including, for example, displaying the history of versions of a package used by servers within the scope.

In the specific embodiment of FIG. 40, it is assumed that:
The user has selected "History" tab (4015), causing the GUI of FIG. 40 to be displayed.

As illustrated in the example embodiment of FIG. 40, GUI 4001 may be configured or designed to display various information 4010 related to each package in the history results such as, for example, one or more of the following (or combinations thereof):

The package name.
The package version.
The package DGRI score.
The number of data points for the package (e.g., the number of servers known by the DataGrid System to use, or to have used, this specific package).
The span of time during which the package was installed on one or more servers within the scope.
Etc.

FIG. 41 illustrates an example screenshot of a graphical user interface (GUI) 4101 which may include functionality for causing the DataGrid System to initiate and/or perform various operation(s) and/or action(s) relating to the DataGrid technology including, for example, causing a package to be uninstalled as part of the change set relating to servers within the scope. In one embodiment, selecting the Uninstall button 4102 marks the package for uninstallation. In the specific embodiment of FIG. 41, it is assumed that the user has selected "Uninstall" tab 4117, causing the GUI of FIG. 41 to be displayed.

Figure 42:
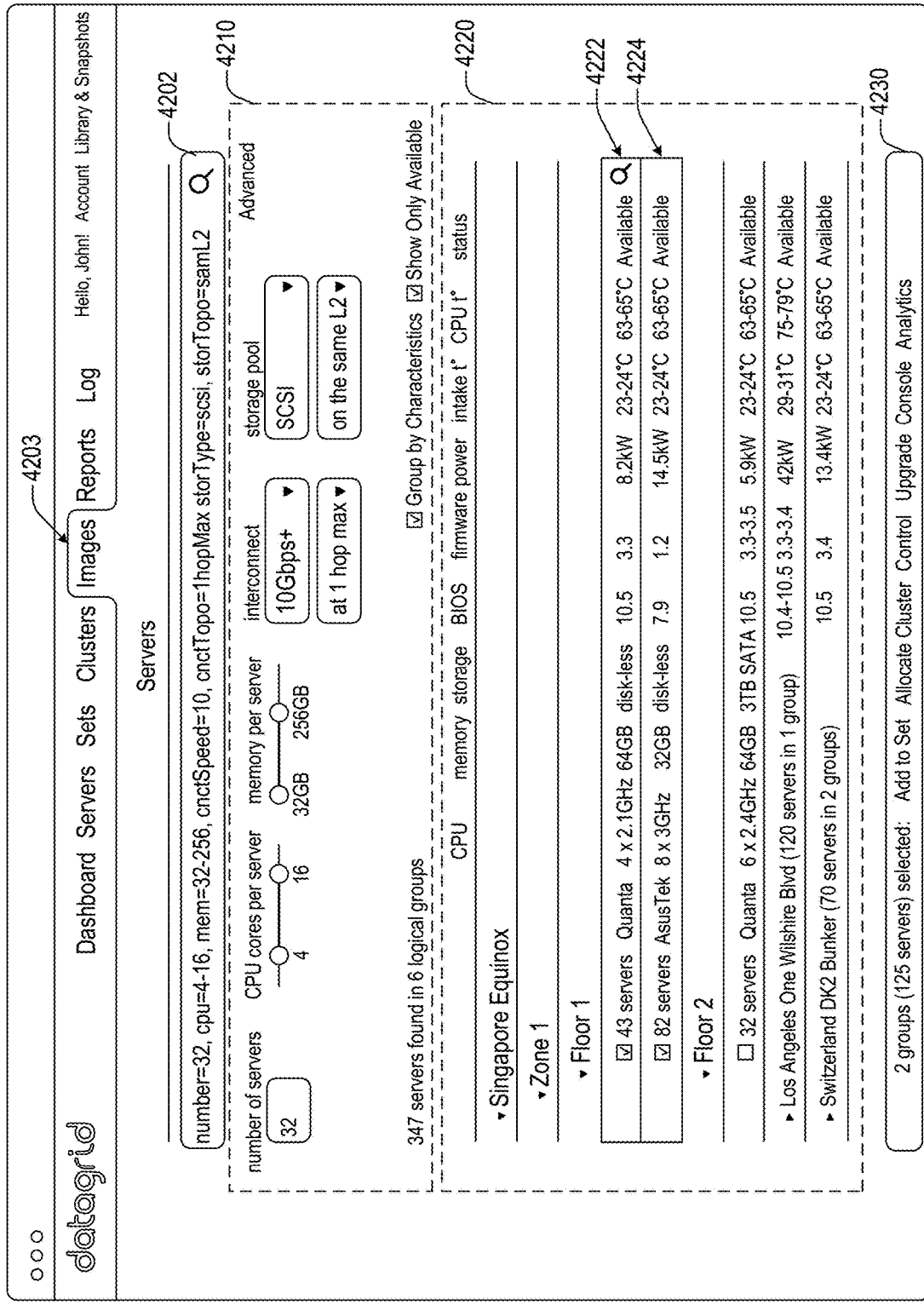

FIG. 42 illustrates an example screenshot of a graphical user interface (GUI) 4201 which may include functionality for causing the DataGrid System to initiate and/or perform various operation(s) and/or action(s) relating to the DataGrid technology such as, for example, one or more of the following (or combinations thereof):

Serve as a starting point for a user to manage servers, including changes to their package configurations, using server groups which are automatically created based on similar or identical characteristics (e.g., hardware, CPU type, disk type, amount of memory, location, role, application, etc.).

Group servers automatically according to similar or identical characteristics (e.g., hardware type and resources).

In the specific embodiment of FIG. 42, it is assumed that the user has used the search bar 4202, and/or the text boxes, sliders and drop-down menus 4210, to define and/or specify hardware resources used to automatically group servers. For example, as illustrated in the example embodiment of FIG. 42, the user has indicated: a range of 4-16 CPU cores per server, a range of 32-256 GB of memory per server, 10 Gbps network interconnects at a maximum of one hop from each other, SCSI storage on the same L2 ethernet domain. In at least one embodiment, the user may also select the desired minimum number of matching servers to be found (e.g., 32 in the example illustrated in FIG. 42).

Using the search parameters specified by the user, the DataGrid System may then perform a Subscriber System database search (e.g., of the entire collection of subscriber servers), to identify server(s) which match or satisfy the user specified hardware resource requirements. For example, in the example embodiment of FIG. 42, the DataGrid System may identify 347 servers which match the user specified hardware resource requirements, and may automatically and/or dynamically group the identified servers into a plurality of different logical groups based on identical or similar hardware resources and other characteristics (e.g., such as location, etc.).

In some embodiments, the GUI 4202 of FIG. 42 may be configured or designed to provide other types of information, content and/or functionality, including, for example, defining and/or creating one or more server groups based on one or more of the following criteria (or combinations thereof):

- Identical package configurations, for example where virtual machines are provisioned from the same base or golden image, or where physical servers are imaged from the same golden image, or where containers are deployed from the same container image
- Similar package configuration, for example where a filter groups servers or containers based on a degree of identity which may be determined by one or more of the following (or combinations thereof):
  - A percent of identical packages (e.g., identical package names and versions).
  - A percent of packages which are identical in name but may vary in version; the degree of variation may also be filtered.
  - Lists of packages which are not to be considered in the grouping determination.
  - Lists of packages whose versions are not to be considered in the grouping determination.
  - Lists of packages which must be considered, if present, in the grouping determination and which must be identical.
  - Lists of packages which must be considered, if present, in the grouping determination and whose versions are not to be considered in the grouping determination.
  - A percent of identical package upgrades recommended by the DataGrid System, where this identity may be determined by one or more of the following (or combinations thereof):
    - Identical source package name.
    - Identical source package version.
    - Identical target package name.
    - Identical target package version.

In at least one embodiment, the GUI 4201 may be configured or designed to include functionality for enabling a user to selectively choose groups of servers to which the same or similar set of changes can be applied (e.g., upgrade to new OS, change version of packages, etc.). In some embodiments, the process of changes may be staged so that the change is at first applied to one (or a few) servers from the group, and once the result is confirmed to be successful, the remaining similar servers are changed (e.g., in one or more subsequent operations). In at least one embodiment, the telemetry data sent from the first few changed servers may be used to determine whether the result is (or is not) successful, and to determine whether (or not) the remaining servers will be changed (and if not, what other change(s) may be applied to them in order to ensure successful result).

FIG. 43 illustrates an example screenshot of a graphical user interface (GUI) 4301 which may be used to facilitate, initiate and/or perform various operation(s) and/or action(s) relating to the DataGrid Technology such as, for example, one or more of the following (or combinations thereof):

- Browse list(s) of subscriber systems 4310 that have sent telemetry data.
- Sort the list(s) by Hostname 4311, System ID 4313 and/or IP address 4315, for example, by clicking on the appropriate column headings.
- Enable users to initiate searches (e.g., using search box 4302) for selected system(s) matching user-specified system properties, such as, for example, Hostname 4311, System ID 4313, IP address 4315, and/or other types of system properties.
- Search for system(s) based on partial match(es) of system properties, such as, for example:
  - By partial hostname, e.g., by a starting/ending portion of the name, a wildcard or a regular expression; or list of hostnames or partial hostnames
  - By System ID (e.g., within a list of system IDs, a portion of a system ID, etc.).
  - By IP address filter (e.g., by a subnet designation, such as, for example 172.17.0.0/16 or 172.17.0.0/24), list of IP addresses or subnets.
  - Etc.
- Select one or more systems for performing or implementing one or more group action(s).
- Acquire additional information from selected Subscriber System(s) (e.g., via user specifying its Hostname, System ID, or IP address)
- Request control actions on selected Subscriber System(s) (e.g., via user specifying its Hostname, System ID, or IP address).
- View detailed information relating to one or more selected or identified Subscriber System(s). Examples of various types of detailed information which may be viewed are illustrated in FIG. 44.

In the specific embodiment of FIG. 43, it is assumed that:

- A user has established a subscriber account with a service based on the DataGrid Technology (e.g., by signing up on a web page of the DataGrid Analytics Service).
- One or more Subscriber System(s) (e.g., physical servers, virtual machines, containers, etc.) have sent telemetry data once or multiple times.
- A user has logged in a GUI application (browser-based or application installed on a laptop or mobile device) and requested the list of systems to be displayed (which may be the initial page on which the GUI opens upon login)

As used herein, the term "DataGrid Technology" may refer to the analytics performed on a system's configuration using the data collected from a plurality of Subscriber System(s) (e.g., crowdsourced, machine-learning, etc.).

Alternate embodiments of the GUI of FIG. 43 may be configured or designed to provide other types of information, content and/or functionality, such as, for example, one or more of the following (or combinations thereof):

- Paging through long lists of systems by selecting a page number, next page or previous page links
- Navigating to a subset of subscriber systems, such as systems in a particular datacenter, systems participating in a specific application service (e.g., accounting), systems of a given type (e.g., only virtual machines), etc.
- Displaying detailed information about each system, such as data initially reported, type and version of operating system running on each system, configuration ID for the system, date/time when the system last sent telemetry data, etc.

Displaying detailed information about qualifications of each system, such as its DGRI score, expected reliability (e.g., mean time between failures), vulnerability status, etc.

Selecting multiple systems (e.g., by shift-clicking on a hostname or using checkboxes).

Etc.

FIG. 44 illustrates an example screenshot of a graphical user interface (GUI) 4401 which may be used to facilitate, initiate and/or perform various operation(s) and/or action(s) relating to the DataGrid Technology such as, for example, one or more of the following (or combinations thereof):

Display information collected from a system, such as, for example, system's hostname, system ID, IP address, operating system type and version, and/or other system related information (e.g., as shown in the System Summary block 4410)

Display the results of analysis of the system's information using the DataGrid Technology, such as, for example, results relating to one or more of the following (or combinations thereof):

Packages 4420 (shown closed),
Vulnerabilities 4430 (shown open),
System's history 4440 (shown closed),
Component/package repositories 4450 (shown closed),
Etc.

Examine lists of packages 4420 installed and configured on the system, including their version and release numbers, available updates, and evaluation score (such as vulnerabilities, DGRI score, popularity rank, reliability, etc.).

Examine lists of vulnerabilities 4430 affecting the system based on the configuration, including vulnerability details such as CVE ID, severity, description, and list of packages and their specific versions that include the vulnerability, as well as configuration values and other configuration elements reported from the system.

Examine vulnerability summaries in the block 4431, including total number of vulnerabilities affecting the system, maximum severity level, and maximum severity level that the system will have if all vulnerabilities that have fixes available are fixed (e.g., maximum severity level of the vulnerabilities for which a fix is currently not available). Some embodiments may also include one or more of the following:

DGRI score
Estimated MTBF and/or vulnerability exposure risk
Percentile of all servers (among all customers/subscribers or within a group of subscribers that have common characteristics, such as location, hardware architecture, products/packages in use, etc.) where this particular server is, based on reliability, projected MTBF, security, vulnerability, reliability or other characteristics by which servers are compared; the percentile may be showed both as of the current configuration as well as for the target configuration (e.g., after a set of changes is selected using the GUI from FIG. 33).

For each vulnerability affecting the system shown in the vulnerability list 4436, examine:

Vulnerability ID (e.g., CVE ID with a hyperlink to more data about the vulnerability, e.g., security database pages provided by the package's vendor or security analysis company), Severity level (e.g., 1 meaning minor impact, 10 meaning critical), Confidence level that the vulnerability actually affects this system (e.g., 10 meaning 100% confident), Brief description of the vulnerability and its impact, Attack vector by which the vulnerability can be exploited (e.g., over a network, only with physical access, etc.), Whether a fix is available for this vulnerability (and whether it fully or only partially resolves the vulnerability), List of one or more packages installed on the system that include exploitable code for this vulnerability (i.e., packages that make the system vulnerable).

Filter the list of vulnerabilities using the filter block 4432, for example by specifying filter parameters such as, for example, one or more of the following (or combinations thereof):

A full or partial vulnerability ID (e.g., CVE-2015 to show vulnerabilities found in year 2015), Severity level range (e.g., all vulnerabilities with severity higher or equal to 7.5), Confidence level range,
Keywords for the description,
One or more attack vector types,
Whether a fix is available or not (e.g., only vulnerabilities that have fixes),
Partial or full package name and/or version,
Etc.

Examine history of the system in the block 4440, including:

When the system was created,
When system has last reported, and/or how many times it has reported.
What changes were made to the system's configuration and at what times (e.g., timestamps and package names/versions that changed; configuration elements that changed; the old and new values, who changed it, who authorized the change, etc.),
Audit(s) of configuration changes.
Etc.

Examine lists of component and package repositories 4450 configured on the system for obtaining updates (e.g., yum or apt repositories), whether digital signature is required when obtaining packages, etc.

In the specific embodiment of FIG. 44, it is assumed that:

A user has performed the steps for selecting a particular system in a user interface, such as the one shown in FIG. 43.

A user has caused telemetry data to be sent from a system for analysis by the DataGrid Technology, and requested the analysis results to be displayed.

Alternate embodiments of the GUI of FIG. 44 may be configured or designed to provide other types of information, content and/or functionality, such as, for example, one or more of the following (or combinations thereof):

Find the overall analytics information for the system as a whole, such as system's DGRI score, expected reliability level, reliability or vulnerability percentile among multiple systems, etc., results from analytics performed with the DataGrid Technology.

Find the possible target score of a recommended configuration that the system can be upgraded to from the current configuration; further, initiate change of configuration to the recommended one and/or edit the recommended configuration prior to initiating the change, examining the expected target score of the edited configuration.

For each recommended or manually selected configuration change, find the probability of successfully making this change (e.g., from the current to the target configuration), based on the analytics provided by the DataGrid Technology (for example, by computing the percent success rate of the same change being applied to other systems in the past and providing the probability of success for this change). Based on subscribed-defined policy, the expected target score and success probability, determine whether to proceed with the change and/or what additional authorizations (e.g., human approval) are necessary.

For each package shown in the collapsible panel 4420, find the package score provided by the DataGrid Technology analytics, representing the package's DGRI score, reliability/compatibility info, vulnerability status, as well as recommended (or manually selected) target version, target score, reliability/compatibility info, target vulnerability status and probability of successfully making the transition to the target version.

Show the detailed changes performed on each configuration update (e.g., when updating packages, show list of newly installed packages, list of removed packages and/or list of packages that were upgraded/downgraded from one version to another, and the specific versions; or show the list of modified configuration files together with the old and new values).

Etc.

FIG. 45 illustrates an example screenshot of a graphical user interface (GUI) 4501 which may be used to facilitate, initiate and/or perform various operation(s) and/or action(s) relating to the DataGrid Technology such as, for example, one or more of the following (or combinations thereof):

Integrate the DataGrid Technology into third party system management products, such as Plesk.

Provide telemetry data and DataGrid Technology analytics results as part of another product.

Select the DataGrid GUI from the product menu 4510.

Provide, enable, initiate, and/or perform one or more operation(s), action(s) such as one or more of those described respect to FIG. 44.

Find summary information about a system in the summary box 4520, such as operating system name and version, when the system first sent telemetry data, when it last sent telemetry data, when the system was last evaluated using the DataGrid Technology, etc.

Find summary results information from both telemetry and analysis results in the box 4530, including, for example; total number of packages, total number of vulnerabilities, maximum severity of all vulnerabilities, maximum severity of all vulnerabilities that don't have fixes available, etc. Compare the summary results of this server/configuration to all or selected (similar) servers.

Compare the summary results of this server/configuration to specific group(s) of servers that use the same third party product (e.g., Oracle, Plesk, Ansible, Docker Compose, etc.).

Find the full list of packages 4540 installed on the tracked system, the information for each package including, for example: the package name (below the heading 4541), the version and release numbers (below the heading 4543), the CPU architecture (below the heading 4545), etc.

Sort the list of packages 4540 by clicking on the column heading to sort on that column, including, for example: sort by name 4541, sort by version/release number 4543, sort by architecture 4545 (e.g., x86, amd64, none), etc.

Provide access to services, features, and/or information 4510 such as, for example, one or more of the following (or combinations thereof):
 System analysis (e.g., a web portal providing further information and/or information about other systems of the same subscriber),
 Mail/messages,
 Applications,
 Files/documents,
 Database access and searching functionality,
 File sharing,
 Statistics,
 Tools and settings,
 Extensions,
 Account information
 User profile information,
 Blogs,
 Community support forums,
 Help desk,
 Social networks,
 Announcements
 Etc.

In the specific embodiment of FIG. 45, it is assumed that:
 A user of a third party product, such as a system management product has installed the DataGrid plugin/extension/module to add the DataGrid Technology capability to that product and/or for that system.
 A user has logged into the third party product GUI and has selected the DataGrid information screen and selected the Packages tab 4540.
 The system in question has sent telemetry data and the DataGrid Technology analytics has been performed (e.g., either prior to user's selection or triggered by it).

Alternate embodiments of the GUI of FIG. 45 may be configured or designed to provide other types of information, content and/or functionality, such as, for example, one or more of the following (or combinations thereof):
 Find the overall analytics information for the system as a whole, such as system's DGRI score, expected reliability level, etc., results from analytics performed with the DataGrid Technology.
 Find the possible target score of a recommended configuration that the system can be upgraded to from the current configuration; further, initiate change of configuration to the recommended one and/or edit the recommended configuration prior to initiating the change, examining the expected target score of the edited configuration.
 For each recommended or manually selected configuration change, find the probability of successfully making this change (from the current to the target configuration), based on the analytics provided by the DataGrid Technology (for example, by computing the percent success rate of the same change being applied to other systems in the past and providing the probability of success for this change).
 For each package shown in the package list 4540, find the package score provided by the DataGrid Technology analytics, representing the package's DGRI score, reliability/compatibility info, vulnerability status, as well as recommended (or manually selected) target version, target score, reliability/compatibility info, target vulnerability status and probability of successfully making the transition to the target version.

Initiate a configuration change, e.g., to upgrade packages, to perform recommended or manually selected configuration changes.

Configure policy for automatically triggering configuration changes based on recommendation(s) made based on the DataGrid Technology analysis (e.g., if the score of the recommended configuration is 100 points or more higher than the current configuration's score, apply configuration; or if the recommended configuration resolves severe vulnerabilities in the current configuration, automatically make the recommended changes, or request them through a workflow system for a manual or automated approval).

Etc.

Figure 46:
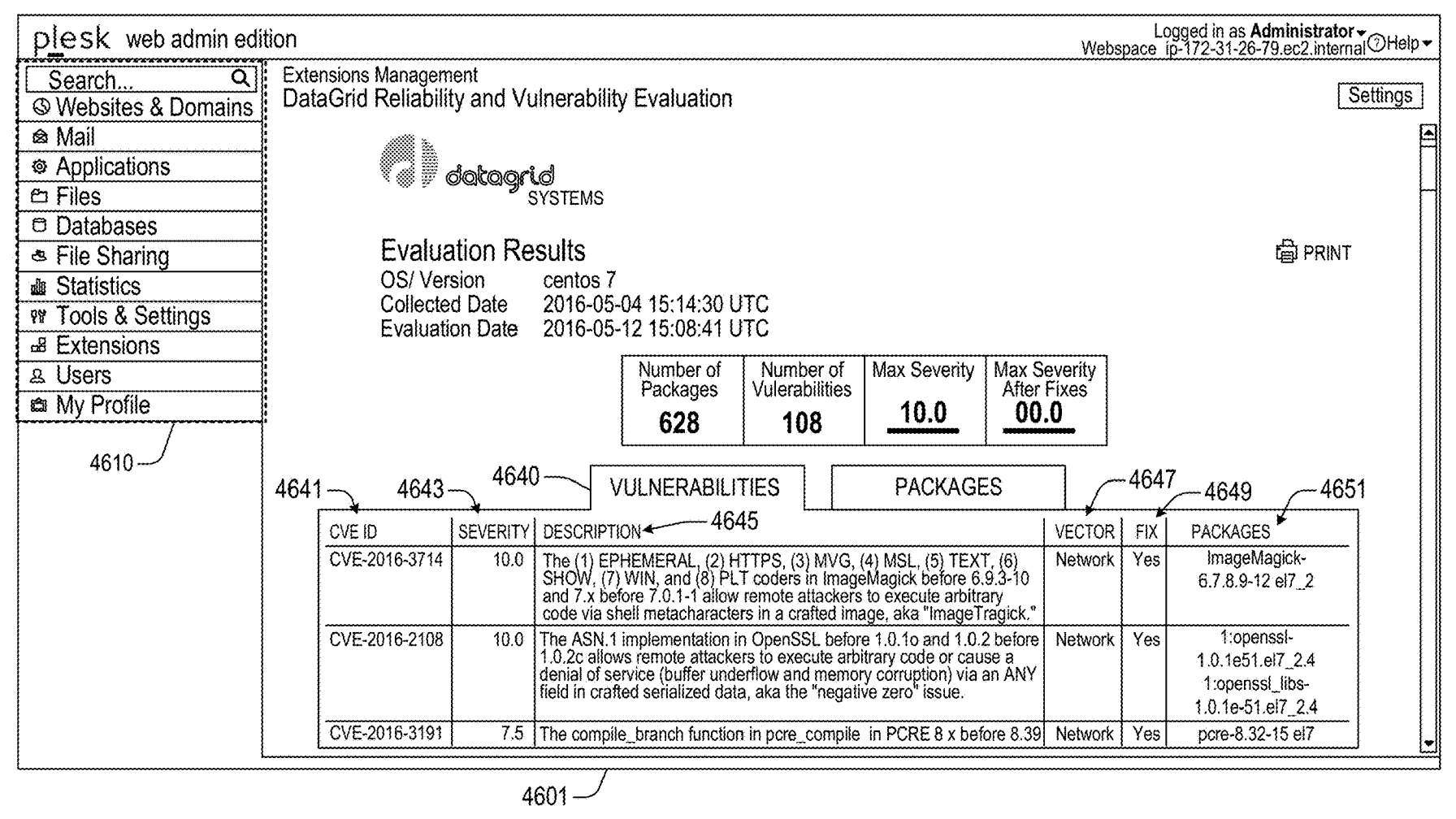

FIG. 46 illustrates an example screenshot of a graphical user interface (GUI) which may be used to facilitate, initiate and/or perform various operation(s) and/or action(s) relating to the DataGrid Technology such as, for example, one or more of the following (or combinations thereof):

Provide, enable, initiate, and/or perform one or more operation(s), action(s) such as one or more of those described respect to FIG. 45.

Integrate the DataGrid Technology into third party system management products, such as Plesk.

Provide telemetry data and DataGrid Technology analytics results as part of another product.

Examine list of vulnerabilities 4640 affecting the system based on the configuration, including installed packages and their specific version, configuration values and other configuration elements reported from the system.

For each vulnerability affecting the system shown in the vulnerability list 4640, examine:

Vulnerability ID (CVE ID) 4641, which may provide hyperlinks to more data about the vulnerability (e.g., security database pages provided by the package's vendor or security analysis company, etc.), Severity level 4643 (e.g., minor impact=1, critical=10), Brief description of the vulnerability and its impact 4645, Attack vector 4647 by which the vulnerability can be exploited (e.g., over a network, only with physical access, etc.), Whether a fix is available for this vulnerability 4649, and/or whether each fix fully or only partially resolves the vulnerability, List(s) 4651 of one or more packages installed on the system that include exploitable code for this vulnerability (e.g., packages that make the system vulnerable).

Sort the list of vulnerabilities according to one or more attributes (e.g., such as attributes indicated by column headers 4641, 4643, 4645, 4647, 4649, 4651)

Find useful links for further understanding of a vulnerability (e.g., by clicking on the vulnerability ID).

Provide access to various services, features, and/or information 4610.

In the specific embodiment of FIG. 46, it is assumed that:

A user of a third party product, such as a system management product has installed the DataGrid plugin/extension/module to add the DataGrid Technology capability to that product and/or for that system A user has logged into the third party product GUI and has selected the DataGrid information screen and has selected the Vulnerabilities tab 4640.

The system in question has sent telemetry data and the DataGrid Technology analytics has been performed (either prior to user's selection or triggered by it).

Alternate embodiments of the GUI of FIG. 46 may be configured or designed to provide other types of information, content and/or functionality, such as, for example, one or more of those described with respect to FIG. 45.

FIGS. 47-49, 50A-B, 51, 52A-B, 53A-B, 54, 55A-B, 56, 57-63, 64A-B, 65A-D, 66-69, 70A-B, 71A-B, 72, and 73A-C illustrate example screenshots of different command line interfaces (CLIs) and/or application programming interfaces (APIs), which may be used to facilitate, initiate and/or perform various operation(s) and/or action(s) relating to the DataGrid Technology.

FIG. 47 illustrates an example screenshot of a command line interface (CLI) 4701 which may include functionality for providing a standalone telemetry client that can be installed on a plurality of tracked systems (subscribers servers). In at least one embodiment, the telemetry client may be configured or designed to support various commands, including, for example:

Collect—collects configuration data and/or Telemetry data and sends it to the DataGrid Analytics Service. Optionally, this command may be requested as conditional, meaning that if the config has changed, it will send the telemetry config data; otherwise it will either do nothing (nop option) or send a telemetry signal (e.g., ping) to indicate that the system is operational and not changed Signal—send a telemetry signal (e.g., such as log error, reboot, system up/down indication, etc.).

In addition, signals may be sent from systems other than the tracked system. For example, a monitoring system such as Nagios, can send a telemetry event for a tracked system that Nagios monitors, e.g., "system_down" indicating that the system is not responsive and/or is not providing its required services.

FIGS. 48-49 illustrate an example screenshots of command line interfaces (CLIs) which may include functionality for causing the DataGrid System to initiate and/or perform various operation(s) and/or action(s) relating to the DataGrid technology such as, for example, one or more of the following (or combinations thereof):

Cause one or more servers being managed with Ansible to send configuration data to the DataGrid feed server API.

Cause one or more servers being managed with Ansible to send one or more signal(s) to the DataGrid feed server API.

Determine and display DGRI score(s) for one or more servers being managed by Ansible.

In at least one embodiment, one or more of these activities may be initiated via a command line utility and a playbook (herein referred to as "dgri.yml") which may be part of an ansible playbook for the DataGrid Ansible module.

For example, in the specific embodiment of FIG. 48, it is assumed that a user has executed the CLI command: ansible-playbook/usr/share/dgri/ansible-playbooks/dgri.yml-v This command may cause all servers listed in the DataGrid Ansible module configuration file to send their configuration to the DataGrid service.

In another embodiment, a user may execute the CLI command: ansible-playbook/usr/share/dgri/ansible-playbooks/dgri.yml-v-e "hosts=test"

This command may cause all servers listed in the Ansible group "test" to send their configuration to the DataGrid service.

In the specific embodiment of FIG. 49, it is assumed that a user has executed the CLI command: ansible-playbook/usr/share/dgri/ansible-playbooks/dgri.yml-v-e "action=score"
This command causes the DataGrid System to acquire, generate, and/or display the DGRI score(s) for all servers listed in the DataGrid Ansible module configuration file.

In another embodiment, a user may execute the CLI command: ansible-playbook/usr/share/dgri/ansible-playbooks/dgri.yml-v-e "action=signal signal=ping hosts=test" This command may cause all servers listed in the DataGrid Ansible module configuration file as members of the server group "test" to send a ping signal to the DataGrid service.

FIGS. 50A-B illustrate an example of a command line interface (CLI) which may include functionality for providing a command line utility (herein referred to as "dgri-query") which uses the DataGrid API server (API) to obtain information about systems, configurations and vulnerabilities (e.g., for servers pertaining to a subscriber account). According to different embodiments, the dgri-query CLI may be configured or designed to provide various types of functionality and/or information, such as, for example, one or more of the following (or combinations thereof):

Display a help message for the dgri-query utility.
Check if the DataGrid API is available and working.
List all systems in the account.
Acquire, generate, and/or display information on a specific system by System ID.
Acquire, generate, and/or display the DGRI score and metrics for a system's current configuration.
Acquire, generate, and/or display a system's current configuration.
Acquire, generate, and/or display information on a specified configuration.
Acquire, generate, and/or display the DGRI score and metrics for a specified configuration.
Acquire, generate, and/or display information on a specified vulnerability.
Acquire, generate, and/or display a list of all vulnerable systems in the account.
Etc.

In the specific embodiment of FIGS. 50A-B, it is assumed that a user has executed the CLI command: dgri-query-help, causing the DataGrid System to display a help message for the utility.

In another embodiment, a user may execute the CLI command: dgri-query health, causing the DataGrid System to check if the DataGrid API is available and working.

In another embodiment, a user may execute the CLI command: dgri-query-p systems, causing the DataGrid System to list all systems in the account.

In another embodiment, a user may execute the CLI command: dgri-query-p systems/i-d332137a, causing the DataGrid System to acquire or retrieve information on a specific system by system ID.

In the specific embodiment of FIG. 51, it is assumed that a user has executed the CLI command: dgri-query-p systems/i-d332137a/score, causing the DataGrid System to acquire, generate, and/or display the DGRI score and metrics for a system's current configuration.

In the specific embodiment of FIGS. 52A-B, it is assumed that a user has executed the CLI command: dgri-query-p systems/i-d332137a/config, causing the DataGrid System to acquire, generate, and/or display a system's current configuration.

In the specific embodiment of FIGS. 53A-B, it is assumed that a user may execute the CLI command: dgri-query-p configs/49a628bda5872af7bf8862acba1ebdb9, causing the DataGrid System to acquire, generate, and/or display information on a specified configuration.

In another embodiment, a user has executed the CLI command: dgri-query-p configs/49a628bda5872af7bf8862acba1ebdb9/score, causing the DataGrid System to acquire, generate, and/or display the DGRI score and metrics for a specified configuration (e.g., the score output may be similar to the one shown in FIG. 51, excluding the system ID information).

In the specific embodiment of FIG. 54, it is assumed that a user has executed the CLI command: dgri-query-p vulnerabilities/CVE-2015-4002, causing the DataGrid System to acquire, generate, and/or display information on a specified vulnerability.

In the specific embodiment of FIGS. 55A-B, it is assumed that a user has executed the CLI command: dgri-query-p vulnerable, causing the DataGrid System to acquire, generate, and/or display a list of all vulnerable systems in the account. In another embodiment, the user can further specify filter parameters, e.g., to obtain the list of servers vulnerable to vulnerabilities with a given severity (e.g., 8 or above), given access vector, etc.

FIG. 56 illustrate an example of a command line interface (CLI) which may include functionality for providing a command line utility and playbook (herein referred to as "dgri-yum.yml") which may be part of an ansible playbook for the DataGrid Ansible module. According to different embodiments, the dgri-yum.yml CLI may be configured or designed to provide various types of functionality and/or information, such as, for example, one or more of the following (or combinations thereof):

Conditionally install or upgrade a package on servers being managed with Ansible, for example, based on the predicted change in the DGRI score resulting from configuration changes. For example, in one embodiment, a user may use the dgri-yum.yml CLI to instruct the DataGrid System to conditionally install or upgrade a specified package if the DGRI score (of the modified system) is predicted to be X units (e.g., or Y %) than the DGRI score of the current (e.g., unmodified) system.
Install a package on servers being managed with Ansible.
Etc.

In the specific embodiment of FIG. 56, it is assumed that a user has executed the CLI command: ansible-playbook/usr/share/dgri/ansible-playbooks/dgri-yum.yml-v-e "name=bind-utils", causing the DataGrid System to conditionally install a package using the Ansible dgri-yum module.

In the specific embodiment of FIG. 57, it is assumed that a user has executed the CLI command: ansible-playbook/usr/share/dgri/ansible-playbooks/dgri-yum.yml-v-e "name=httpd dry_run=1", causing the DataGrid System to perform a dry run of package installation using the Ansible dgri-yum module, and display the score of the resulting change without actually effecting or implementing the change.

In the specific embodiment of FIG. 58, it is assumed that a user has executed the CLI command: ansible-playbook/usr/share/dgri/ansible-playbooks/dgri-yum.yml-v-e "name=httpd min_score=700", causing the DataGrid System to conditionally install the httpd package using the Ansible dgri-yum module only if the change results in a DGRI Score>=700.

In the specific embodiment of FIG. 59, it is assumed that a user has executed the CLI command: ansible-playbook/usr/share/dgri/ansible-playbooks/dgri-yum.yml-v-e "name=httpd state=absent", causing the DataGrid System to uninstall a specified package using the Ansible dgri-yum module. In at least some embodiments, the dgri-yum.yml CLI may be configured or designed to include functionality for causing the DataGrid System to perform a conditional uninstall of one or more specified package(s).

In the specific embodiment of FIG. 60, it is assumed that a user has executed the CLI command: ansible-playbook/ usr/share/dgri/ansible-playbooks/dgri-yum.yml-v-e "name=httpd max_degrade=0", causing the DataGrid System to conditionally install a package using the Ansible dgri-yum module only if the change will not result in a DGRI score decrease. In this particular example, the installation fails to automatically proceed because of the resulting score decrease.

In the specific embodiment of FIG. 61, it is assumed that a user has installed a DataGrid yum CLI plug-in module and then executed the CLI command: yum install screen, causing the DataGrid System to intercept yum configuration change operations, and after yum determines the full set of changes, including their dependencies, the DataGrid yum CLI module uses the DataGrid API to get the DGRI Scores and other information relevant to the confidence of the proposed configuration changes, displays this information to the user and prompts the user whether or not to proceed with the configuration changes. In the specific example embodiment of FIG. 61, is assumed that when prompted, the user has entered 'y' to continue with the installation, automatically and/or conditionally causing the DataGrid yum CLI module to install a new package on the server. Because the resulting configuration is new to the DataGrid System there are no data points, and as a result the DGRI score for the server configuration degrades. In the specific example embodiment of FIG. 61, output particular to the DataGrid yum CLI module is shown bold text. In some embodiments, the user prompt may be invoked only if the minimum required score is not met, or if the score change is close to a specified threshold value (e.g., if the score is below a first minimum threshold value, the installation is automatically cancelled; when the score is above a second minimum threshold value, the installation is automatically completed).

In the specific embodiment of FIG. 62, it is assumed that a user has executed the CLI command: yum upgrade openssl, causing the DataGrid System to automatically and/or conditionally upgrade the openssl package on the server. In one embodiment, the user may be prompted by the DataGrid System before initiating the upgrade, and the user may enter 'y' to continue with the upgrade, and to cause the DataGrid System to upgrade the openssl package on the identified server.

In the specific embodiment of FIG. 63, it is assumed that a user has executed the CLI command: yum history undo 6, causing the DataGrid System to initiate a conditional roll back operation. In the specific example embodiment of FIG. 63, the DataGrid System prompts the user before initiating the roll back operation, and the user may enter 'y' to continue with the roll back, and to cause the DataGrid System to roll back a previous upgrade.

In the specific embodiment of FIGS. 64A-B, it is assumed:
 That a user has executed the CLI command: yum update. When prompted, the user has entered 'y' to continue with the upgrade.
 In one embodiment, this command may cause the DataGrid System to automatically and/or conditionally update and/or upgrade all or selected installed package(s) on the server to their most recent versions.

In at least some embodiments, when prompted, the user may enter '?' via the yum update CLI command to cause the DataGrid System to display more detailed information, including for example, one or more of the following:
 The target configuration DGRI score.
 The number of systems which have used the target configuration historically.
 The number of systems which use the target configuration currently.
 The number of signal events for all systems which have used the target configuration historically.
 The number of success signals.
 The number of failure signals.
 The number of signals by type.
 Vulnerabilities present in the target configuration, including, for each vulnerability, one or more of the following (or combinations thereof): CVE identifier, CVSS severity, and indication of whether the vulnerability is new or is retained from the previous configuration.
 The number of vulnerabilities removed from the target configuration in relation to the previous configuration.
 Etc.

FIGS. 65A-D illustrate an example of a server configuration which has been POSTed as data to the DataGrid feed server API. Subscriber account-based authentication information may be included in the request headers. In this example the configuration feed request has been sent to: https://test-feed.DataGridsys.com/configs In this example the request response is HTTP status code 200 (OK).

FIG. 66 illustrates an example of a server signal which has been POSTed as data to the DataGrid feed server API. Subscriber account-based authentication information may be included in the request headers. In this example the signal feed request has been sent to: https://test-feed.DataGridsys.com/signals In this example the request response is HTTP status code 200 (OK).

In at least one embodiment, the DataGrid CLI may include functionality for enabling a user to initiate, via the DataGrid API, a healthcheck on a specified system, and to return the status of the healthcheck.

For example, in one embodiment, a user may use the DataGrid API to send a GET request to: https://test-api.DataGridsys.com/api/v1/health. Subscriber account-based authentication information may be included in the request headers. The request may cause the DataGrid System to perform a healthcheck on the specified server and return the status of this healthcheck.

FIG. 67 illustrates an example of a response which may be sent by the DataGrid API server in response to a GET request. Subscriber account-based authentication information may be included in the request headers. In the specific example embodiment of FIG. 67, it is assumed that:
 the GET request has been sent to: https://test-api.DataGridsys.com/api/v1/systems.
 The request is to return a list of all systems for a subscriber account, including for each: system identifiers, identifiers for the current and previous configurations, and additional information such as the timespan associated to each historical configuration, the number of ping signals received by the system, etc.

FIG. 68 illustrates a different example of a response sent by the DataGrid API server in response to a GET request. Subscriber account-based authentication information may be included in the request headers. In the specific example embodiment of FIG. 68, it is assumed that:
 The request has been sent to: https://test-api.DataGridsys.com/api/v1/systems/i-e1c26008.

The request causes the DataGrid System to return information on a specific system by system ID, including, for example: system identifiers, identifiers for the current and previous configurations, and additional information such as the timespan associated to each historical configuration, the number of ping signals received by the system, etc.

FIG. 69 illustrates a different example of a response sent by the DataGrid API server to a GET request. Subscriber account-based authentication information may be included in the request headers. In the specific example embodiment of FIG. 69, it is assumed that:

The request has been sent to: https://test-api.DataGridsys.com/api/v1/systems/i-e1c26008/score.

The request causes the DataGrid System to return the DGRI score and other metrics for a system's current configuration. Examples of additional metrics may include, but are not limited to, one or more of the following (or combinations thereof): system identifiers, the current configuration identifier, the number of systems known to the DataGrid System which use or have used this configuration, the number of signals received, the number of signals received by signal type, a list of CVE identifiers of vulnerabilities that affect the configuration, etc.

FIGS. 70A-B illustrate a different example of a response sent by the DataGrid API server to a GET request. Subscriber account-based authentication information may be included in the request headers. In the specific example embodiment of FIG. 70, it is assumed that:

The request has been sent to: https://test-api.DataGridsys.com/api/v1/systems/i-e1c26008/config.

The request causes the DataGrid System to return information on a specific system's current configuration, including, for example: system identifiers, the current configuration identifier, the number of systems known to the DataGrid System which use or have used this configuration, the number of signals received, the number of signals received by signal type, a list of CVE identifiers of vulnerabilities that affect the current configuration, a list of packages in the current configuration, operating system identifiers such as the name, version, etc.

FIGS. 71A-B illustrate an example of the response sent by the DataGrid API server to a GET request. Subscriber account-based authentication information may be included in the request headers. In the specific example embodiment of FIG. 71, it is assumed that:

The request has been sent to: https://test-api.DataGridsys.com/api/v1/configs/169d941a47702160bd2e6f94db0d06bc.

The request causes the DataGrid System to return information for a specified configuration, including, for example: the configuration identifier, the number of systems known to the DataGrid System which use or have used this configuration, the number of signals received, the number of signals received by signal type, a list of CVE identifiers of vulnerabilities that affect the configuration, a list of packages in the configuration, operating system identifiers such as the name, version, etc.

FIG. 72 illustrates an example of the response sent by the DataGrid API server to a GET request. Subscriber account-based authentication information may be included in the request headers. In the specific example embodiment of FIG. 72, it is assumed that:

The request has been sent to: https://test-api.DataGridsys.com/api/v1/configs/169d941a47702160bd2e6j94db0d06bc/score.

The request causes the DataGrid System to return the DGRI score and other metrics for a specified configuration. Additional metrics may include any of: the configuration identifier, the number of systems known to the DataGrid System which use or have used this configuration, the number of signals received, the number of signals received by signal type, a list of CVE identifiers of vulnerabilities that affect the configuration, etc.

FIGS. 73A-C illustrate an example of the response sent by the DataGrid API server to a GET request. Subscriber account-based authentication information may be included in the request headers. In the specific example embodiment of FIG. 73, it is assumed that:

The request has been sent to: https://test-api.DataGridsys.com/api/v1/vulnerable.

The request causes the DataGrid System to return a list of Subscriber Systems which are vulnerable to one or more CVE vulnerabilities, including for each: system identifiers, the current configuration identifier, the DGRI score, a configuration history list, a list of CVE identifiers of vulnerabilities that affect the current configuration, etc.

In some embodiments, a user may use the DataGrid API to send a GET request to return information for a specified vulnerability. For example, a user may use the DataGrid API to send a GET request to: https://test-api.DataGridsys.com/api/v1/vulnerabilities/CVE-2014-6271. The request may cause the DataGrid System to return information for a specified vulnerability including: the CVE identifier, a URL which can be used to view the NIST NVD vulnerability summary for the CVE, a list of packages affected by the vulnerability including for each a version specification, a description of the vulnerability, a severity indicator, and additional information about the vulnerability provided by various package vendors, etc.

Other Features/Benefits/Advantages

Different embodiments of DataGrid Systems (and/or DataGrid Technology) may be configured, designed, and/or operable to provide, enable and/or facilitate one or more of the following features, functionalities, benefits and/or advantages (or combinations thereof):

A. Client System Software for acquiring client system telemetry data and report to DataGrid Servers.

B. Use of Telemetry data reported from plurality of customers to provide guidance for system configurations for other customers.

1. Calculating of scores based on reported telemetry metrics.

2. Using telemetry data and scores to Generate/Determine system reliability/compatibility/performance predictions of other identified systems.

a. For existing Subscriber System(s)—analyze system components/packages and generate scores based on crowdsourced data. Determine whether any system configuration changes are recommended. Determine other recommendations for system. For example, based on current system configuration, the DataGrid System may recommend that you:

1) Back up N times per day/week/month.

2) Add Y additional servers upon reaching X % capacity (recommend the parameter(s) that is(are) X (e.g., CPU load, # requests/sec, memory usage), the threshold value(s) of X, and the value of Y—assisted by guidance based on observation of other system's telemetry).
3) Change configuration parameters (e.g., number of worker threads of a server, amount of memory allocated to a task, number of network buffers, etc.).
4) Change the version of the operating system, e.g., from Ubuntu 12.04 to Ubuntu 16.04.
5) Select a ready disk image to use (e.g., AMI or docker image) from a plurality of versions available.
6) Change the versions of one or more packages installed on your system.
7) Change the vendor for a package (e.g., replace MySQL with MariaDB).
8) Execute code transformations (e.g., run migration tool to upgrade source code from python version 2 to python version 3 so that this code will run on python version 3).
9) Etc.
b. For component/package updates—determine if update is/is not recommended. Determine when to install update (if recommended).
3. Automatically and/or dynamically identify package versions that cause reliability problems.
4. Automatically and/or dynamically identify combination of software components that don't work well together (whether in general or specific versions, e.g., component A version 3 does not work well with component B version 5 but OK with version 4). Combinations of two or more component may be evaluated and identified.
5. Automatically and/or dynamically prevent installation of packages which have been predicted to cause problems with target system; recommend alternative packages (or versions).
6. Conditional Updating/Upgrading:
   a. Automatically and/or dynamically deciding whether to upgrade or not.
   b. Automatically and/or dynamically deciding when is the right time to upgrade.
   c. Automatically and/or dynamically identify recommended version(s) of packages to install (e.g., based on DataGrid DGRI Score and/or other scored metrics).
   d. Automatically and/or dynamically initiating the conditional upgrade/update based on predetermined criteria (which can be defined by the user).
7. Triggering of automated updates when:
   a. A system is identified that is not performing well or is predicted to be using a bad system configuration (e.g., based on crowd-sourced telemetry data).
   b. A new version of packages/images/configurations is available that can improve system performance/metrics.
8. Immutable infrastructure cases:
   a. Triggering build of a new system (instead of triggering update).
   b. Building new system image based on recommended configuration.
   c. Partially deploy new system in group of systems—X % new systems, Y % old systems.
   d. Run automated tests and evaluate/compare the performance and reliability of the new and the old systems.

C. Use of Telemetry data reported from plurality of customers to provide automatic operations decisions for systems of other (or same) customers.
   1. Based on received telemetry from plurality of customers and cross-customer analysis and modeling, choose configuration and actions to perform on these or other customers' systems, such as, for example, one or more of the following (or combinations thereof):
      a. Upgrading package version (or choosing package version).
      b. Upgrading OS version.
      c. Re-deploying application.
      d. Re-testing application.
      e. Changing configuration parameters of one or more systems, for example, setting CPU limits/capacity, assigned memory, assigned I/O throughput, configuration options (e.g., memory pool size, data sharding segments and replication count), number of load balanced worker systems
   2. Based on requirements specified by a customer (such as uptime, reliability, fault tolerance) and analysis of configurations of other customers' telemetry data (including configuration, and events and outcomes), change that customer's configuration parameters, number of load balanced servers, storage redundancy level/ data replication count, backup frequency, geographic distribution, etc., to achieve these requirements.
D. Use of Telemetry data reported from plurality of customers and mathematical models created using machine learning techniques to automatically and/or dynamically generate/implement:
   1. Recommendations about operations procedures or configuration changes on systems of a particular customer.
   2. Automated operations, recommendations, and decisions for similarly configured Subscriber Systems of other customers.
E. Automatically gather data from a plurality of Subscriber System configurations, and periodically monitor these systems to predict outcomes for other customers. Use this information to improve reliability/compatibility.
F. Using dynamically generated scores (e.g., DGRI scores) to drive automatic upgrades of machines/packages.
G. Automatically and/or dynamically deriving metrics based on combinations of packages.
H. Aside from providing guidance for configuration changes, the various DataGrid Techniques described herein can also provide novel views into collections of systems (e.g., with respect to configuration drift, or vulnerability footprint over time, risk, etc.).
I. Aside from providing guidance for configuration changes, the various DataGrid Techniques described herein can also provide novel approaches to Configuration Management Databases (CMDB), for example, by providing automated and dynamic (e.g., real-time) maintenance of the configuration database (e.g., instead of using manual change processes), thus ensuring correctness of the database.
J. The various DataGrid Techniques described herein can also provide information useful to third party software/ hardware or OS developers (e.g., rate of adoption, market penetration, compatibility, usage, early warnings of problems, competitive info, etc.).

Moreover, it will be appreciated that, via the use of specifically configured computer hardware and software, the problems which are solved and/or overcome by the various DataGrid techniques described herein are necessarily rooted in computer technology in order to overcome problems specifically arising in the realm of computer networks. For example, as described previously, numerous problems and limitations are typically encountered when attempting to use existing technology to implement various services and/or features such as those provided in DataGrid-enabled environments. Such problems and limitations specifically arise in the realm of computer networks, and the solutions to these DataGrid environment problems and limitations (e.g., as described herein) are necessarily rooted in computer technology.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer implemented method for facilitating automated management of a plurality of subscriber systems communicatively coupled to a computer network, the plurality of subscriber systems including a first subscriber system, the method comprising causing at least one processor to execute instructions for:
  accessing first subscriber system telemetry information relating to an operating environment of the first subscriber system;
  identifying, using the first subscriber system telemetry information, a first set of configuration elements associated with the first subscriber system;
  acquiring crowdsourced telemetry information for a plurality of systems, the crowdsourced telemetry information including information about attributes, characteristics and/or configuration elements relating to respective operating environments of the plurality of systems;
  analyzing the first subscriber system telemetry information and the crowdsourced telemetry information to evaluate at least one metric associated with at least one entity of the first subscriber system, wherein the at least one metric includes at least one performance metric associated with the at least one entity of the first subscriber system; and
  automatically implementing or initiating, based on the analysis of the first subscriber system telemetry information and crowdsourced telemetry information, a first set of activities relating to management of the first subscriber system;
  wherein the first set of activities includes at least one activity selected from a group consisting of:
  automatically generating, based on the analysis of the first subscriber system telemetry information and crowdsourced telemetry information, first subscriber system reliability information, the first subscriber system reliability information identifying at least one configuration element of the first subscriber system which may cause reliability issues at the first subscriber system;
  automatically generating, based on the analysis of the first subscriber system telemetry information and crowdsourced telemetry information, first subscriber system compatibility information, the first subscriber system compatibility information identifying at least one configuration element installed at the first subscriber system which may cause compatibility issues at the first subscriber system;
  automatically generating, based on the analysis of the first subscriber system telemetry information and crowdsourced telemetry information, the first subscriber system vulnerability information identifying at least one configuration element installed at the first subscriber system which may cause vulnerability issues at the first subscriber system;
  automatically generating, based on the analysis of the first subscriber system telemetry information and crowdsourced telemetry information, at least one configuration recommendation relating to a recommended modification of at least one configuration element at the first subscriber system;
  automatically initiating, based on the analysis of the first subscriber system telemetry information and crowdsourced telemetry information, at least one modification of at least one configuration element at the first subscriber system; and
  automatically preventing, based on the analysis of the first subscriber system telemetry information and crowdsourced telemetry information, initiation of at least one modification of at least one configuration element at the first subscriber system.

2. A computer implemented system for facilitating automated management of a plurality of subscriber systems communicatively coupled to a computer network, the plurality of subscriber systems including a first subscriber system, the system comprising:
  at least one processor;
  at least one interface;
  a memory storing a plurality of instructions;
  the at least one processor being operable to execute a plurality of instructions stored in the memory for causing at least one component of the computer network to:
  access first subscriber system telemetry information relating to an operating environment of the first subscriber system;
  identify, using the first subscriber system telemetry information, a first set of configuration elements associated with the first subscriber system;
  acquire crowdsourced telemetry information for a plurality of systems, the crowdsourced telemetry information including information about attributes, characteristics and/or configuration elements relating to respective operating environments of the plurality of systems;
  analyze the first subscriber system telemetry information and the crowdsourced telemetry information to evaluate at least one metric associated with at least one entity of the first subscriber system, wherein the at least one metric includes at least one performance metric associated with the at least one entity of the first subscriber system; and
  automatically implement or initiate, based on the analysis of the first subscriber system telemetry information and crowdsourced telemetry information, a first set of activities relating to management of the first subscriber system;
  wherein the first set of activities includes at least one activity selected from a group consisting of:
  automatically generating, based on the analysis of the first subscriber system telemetry information and crowdsourced telemetry information, first subscriber system reliability information, the first subscriber system reliability information identifying at least one configuration element of the first subscriber system which may cause reliability issues at the first subscriber system;

automatically generating, based on the analysis of the first subscriber system telemetry information and crowdsourced telemetry information, first subscriber system compatibility information, the first subscriber system compatibility information identifying at least one configuration element installed at the first subscriber system which may cause compatibility issues at the first subscriber system;

automatically generating, based on the analysis of the first subscriber system telemetry information and crowdsourced telemetry information, the first subscriber system vulnerability information identifying at least one configuration element installed at the first subscriber system which may cause vulnerability issues at the first subscriber system;

automatically generating, based on the analysis of the first subscriber system telemetry information and crowdsourced telemetry information, at least one configuration recommendation relating to a recommended modification of at least one configuration element at the first subscriber system;

automatically initiating, based on the analysis of the first subscriber system telemetry information and crowdsourced telemetry information, at least one modification of at least one configuration element at the first subscriber system; and automatically preventing, based on the analysis of the first subscriber system telemetry information and crowdsourced telemetry information, initiation of at least one modification of at least one configuration element at the first subscriber system.

3. The computer implemented system of claim 2 wherein the first subscriber system corresponds to a system or component selected from a group consisting of: a physical server, a virtual server, a virtual machine, a switch, a router, a mobile device, a network device, a printer, and a container.

4. The computer implemented system of claim 2 wherein the first subscriber system telemetry information includes at least one type of information selected from a group consisting of: a package version, a package name, an IP address, an open port, a network connection, a configuration parameter, an OS version, CPU consumption, memory consumption, a network service end connection, a configuration element, a configuration parameter value, a reboot event, a crash event, an error event, an system health status, a system or application log event, and a successful event.

5. The computer implemented system of claim 2:
wherein the first set of activities includes automatically generating, based on the analysis of the first subscriber system telemetry information and crowdsourced telemetry information, first subscriber system reliability information, the first subscriber system reliability information identifying a first configuration element installed at the first subscriber system which may cause reliability issues at the first subscriber system; and
wherein the first configuration element corresponds to a configuration element selected from a group consisting of: a system component or device, a package name, a package version, a package release, a container name, a container version, a virtual machine, a system attribute, a system characteristic, an operating system name, an operating system version, an operating system release, a configuration parameter or setting, a BIOS version, a driver name, a driver version, and a firmware version.

6. The computer implemented system of claim 2:
wherein the first set of activities includes automatically generating, based on the analysis of the first subscriber system telemetry information and crowdsourced telemetry information, first subscriber system reliability information, the first subscriber system reliability information identifying a first configuration element not installed at the first subscriber system which may cause reliability issues at the first subscriber system; and
wherein the first configuration element corresponds to a configuration element selected from a group consisting of: a system component or device, a package name, a package version, a package release, a container name, a container version, a virtual machine, a system attribute, a system characteristic, an operating system name, an operating system version, an operating system release, a configuration parameter or setting, a BIOS version, a driver name, a driver version, and a firmware version.

7. The computer implemented system of claim 2:
wherein the first set of activities includes automatically generating, based on the analysis of the first subscriber system telemetry information and crowdsourced telemetry information, first subscriber system compatibility information, the first subscriber system compatibility information identifying a first configuration element installed at the first subscriber system which may cause compatibility issues at the first subscriber system; and
wherein the first configuration element corresponds to a configuration element selected from a group consisting of: a system component or device, a package name, a package version, a package release, a container name, a container version, a virtual machine, a system attribute, a system characteristic, an operating system name, an operating system version, an operating system release, a configuration parameter or setting, a BIOS version, a driver name, a driver version, and a firmware version.

8. The computer implemented system of claim 2:
wherein the first set of activities includes automatically generating, based on the analysis of the first subscriber system telemetry information and crowdsourced telemetry information, the first subscriber system compatibility information, the first subscriber system compatibility information identifying a first configuration element not installed at the first subscriber system which may cause compatibility issues at the first subscriber system; and
wherein the first configuration element corresponds to a configuration element selected from a group consisting of: a system component or device, a package name, a package version, a package release, a container name, a container version, a virtual machine, a system attribute, a system characteristic, an operating system name, an operating system version, an operating system release, a configuration parameter or setting, a BIOS version, a driver name, a driver version, and a firmware version.

9. The computer implemented system of claim 2:
wherein the first set of activities includes automatically generating, based on the analysis of the first subscriber system telemetry information and crowdsourced telemetry information, first subscriber system vulnerability information, the first subscriber system vulnerability information identifying a first configuration element installed at the first subscriber system which may cause vulnerability issues at the first subscriber system; and wherein the first configuration element corresponds to a configuration element selected from a group consisting of: a system component or device, a package name, a package version, a package release, a container name, a container version, a virtual machine, a system attribute, a system characteristic, an operating system name, an operating system version, an operating system release, a configuration parameter or setting, a BIOS version, a driver name, a driver version, and a firmware version.

10. The computer implemented system of claim 2:
wherein the first set of activities includes automatically generating, based on the analysis of the first subscriber system telemetry information and crowdsourced telemetry information, first subscriber system vulnerability information, the first subscriber system vulnerability information identifying a first configuration element not installed at the first subscriber system which may cause vulnerability issues at the first subscriber system; and
wherein the first configuration element corresponds to a configuration element selected from a group consisting of: a system component or device, a package name, a package version, a package release, a container name, a container version, a virtual machine, a system attribute, a system characteristic, an operating system name, an operating system version, an operating system release, a configuration parameter or setting, a BIOS version, a driver name, a driver version, and a firmware version.

11. The computer implemented system of claim 2:
wherein the first set of activities includes automatically generating, based on the analysis of the first subscriber system telemetry information and crowdsourced telemetry information, at least one configuration recommendation relating to a recommended modification of at least one configuration element at the first subscriber system; and
wherein the at least one configuration recommendation includes at least one configuration recommendation selected from a group consisting of: a package change recommendation, a package version change recommendation, a code change recommendation, a system attribute change recommendation, a system characteristic change recommendation, a system configuration parameter change recommendation, a component version change recommendation, a container change recommendation, an operating system change recommendation, a component change recommendation, a virtual machine change recommendation, a version upgrade recommendation, and a version downgrade recommendation.

12. The computer implemented system of claim 2:
wherein the first set of activities includes automatically initiating, based on the analysis of the first subscriber system telemetry information and crowdsourced telemetry information, at least one modification of at least one configuration element at the first subscriber system; and
wherein the at least one modification includes at least one activity selected from a group consisting of: change of system component, change of system component version, change of configuration setting or parameter, change of system package, change of system package version, change of system container, change of system container version, change of OS version, change of virtual machine, change of system configuration parameter, change of system attribute, change of system resource allocation, and change of system operational parameter.

13. The computer implemented system of claim 2:
wherein the first set of activities includes automatically preventing, based on the analysis of the first subscriber system telemetry information and crowdsourced telemetry information, initiation of at least one modification of at least one configuration element at the first subscriber system; and
wherein the at least one modification includes at least one activity selected from a group consisting of: change of system component, change of system component version, change of configuration setting or parameter, change of system package, change of system package version, change of system container, change of system container version, change of OS version, change of virtual machine, change of system configuration parameter, change of system attribute, change of system resource allocation, and change of system operational parameter.

14. The computer implemented system of claim 2 being further operable to cause the at least one processor to execute instructions for causing at least one component of the computer network to:
automatically initiate a first conditional modification of a first configuration element at the first subscriber system if it is determined that specific threshold criteria has been satisfied for allowing the conditional modification of the first configuration element to proceed;
automatically prevent initiating a first conditional modification of a first configuration element at the first subscriber system if it is determined that specific threshold criteria has not been satisfied for allowing the conditional modification of the first configuration element to proceed; and
wherein the first conditional modification includes at least one activity selected from a group consisting of: change of system component, change of system component version, change of configuration setting or parameter, change of system package, change of system package version, change of system container, change of system container version, change of OS version, change of virtual machine, change of system configuration parameter, change of system attribute, change of system resource allocation, and change of system operational parameter.

15. The computer implemented system of claim 2, wherein the plurality of subscriber systems further comprises a second subscriber system, the system being further operable to cause the at least one processor to execute additional instructions for causing at least one component of the computer network to:
automatically implement or initiate, based on the analysis of the crowdsourced telemetry information, a second set of activities relating to management of the second subscriber system;
wherein the second set of activities includes at least one activity selected from a group consisting of:
automatically generating, based on the analysis of the crowdsourced telemetry information, second subscriber system reliability information, the second subscriber system reliability information identifying at least one configuration element of the second subscriber system which may cause reliability issues at the second subscriber system;

automatically generating, based on the analysis of the crowdsourced telemetry information, second subscriber system compatibility information, the second subscriber system compatibility information identifying at least one configuration element installed at the second subscriber system which may cause compatibility issues at the second subscriber system;

automatically generating, based on the analysis of the crowdsourced telemetry information, the second subscriber system vulnerability information identifying at least one configuration element installed at the second subscriber system which may cause vulnerability issues at the second subscriber system;

automatically generating, based on the analysis of the crowdsourced telemetry information, at least one configuration recommendation relating to a recommended modification of at least one configuration element at the second subscriber system;

automatically initiating, based on the analysis of the crowdsourced telemetry information, at least one modification of at least one configuration element at the second subscriber system; and automatically preventing, based on the analysis of the crowdsourced telemetry information, initiation of at least one modification of at least one configuration element at the second subscriber system.

16. A non-transitory computer usable medium for use in a computer network comprising a plurality of subscriber systems, the computer network including at least one processor, the computer usable medium having computer readable code embodied therein, the computer readable code comprising computer code for causing at least one processor to execute instructions stored in at least one memory for:

accessing first subscriber system telemetry information relating to an operating environment of the first subscriber system;

identifying, using the first subscriber system telemetry information, a first set of configuration elements associated with the first subscriber system;

acquiring crowdsourced telemetry information for a plurality of systems, the crowdsourced telemetry information including information about attributes, characteristics and/or configuration elements relating to respective operating environments of the plurality of systems;

analyzing the first subscriber system telemetry information and the crowdsourced telemetry information to evaluate at least one metric associated with at least one entity of the first subscriber system, wherein the at least one metric includes at least one performance metric associated with the at least one entity of the first subscriber system; and automatically implementing or initiating, based on the analysis of the first subscriber system telemetry information and crowdsourced telemetry information, a first set of activities relating to management of the first subscriber system;

wherein the first set of activities includes at least one activity selected from a group consisting of:

automatically generating, based on the analysis of the first subscriber system telemetry information and crowdsourced telemetry information, first subscriber system reliability information, the first subscriber system reliability information identifying at least one configuration element of the first subscriber system which may cause reliability issues at the first subscriber system;

automatically generating, based on the analysis of the first subscriber system telemetry information and crowdsourced telemetry information, first subscriber system compatibility information, the first subscriber system compatibility information identifying at least one configuration element installed at the first subscriber system which may cause compatibility issues at the first subscriber system;

automatically generating, based on the analysis of the first subscriber system telemetry information and crowdsourced telemetry information, the first subscriber system vulnerability information identifying at least one configuration element installed at the first subscriber system which may cause vulnerability issues at the first subscriber system;

automatically generating, based on the analysis of the first subscriber system telemetry information and crowdsourced telemetry information, at least one configuration recommendation relating to a recommended modification of at least one configuration element at the first subscriber system;

automatically initiating, based on the analysis of the first subscriber system telemetry information and crowdsourced telemetry information, at least one modification of at least one configuration element at the first subscriber system; and automatically preventing, based on the analysis of the first subscriber system telemetry information and crowdsourced telemetry information, initiation of at least one modification of at least one configuration element at the first subscriber system.

\* \* \* \* \*